United States Patent [19]
Cepulis

[11] Patent Number: 6,055,596
[45] Date of Patent: Apr. 25, 2000

[54] EXPANSION CARD SPACE RESERVATION

[75] Inventor: Darren J. Cepulis, Spring, Tex.

[73] Assignee: Compaq Computer Corp., Houston, Tex.

[21] Appl. No.: 08/658,603

[22] Filed: Jun. 5, 1996

[51] Int. Cl.[7] ................................................ G06F 13/00
[52] U.S. Cl. .......................................... 710/104; 710/103
[58] Field of Search ........................ 710/8–10, 101–104, 710/128

[56] References Cited

U.S. PATENT DOCUMENTS

| | | | |
|---|---|---|---|
| 5,014,193 | 5/1991 | Garner et al. | 364/200 |
| 5,056,060 | 10/1991 | Fitch et al. | 364/900 |
| 5,257,387 | 10/1993 | Richek et al. | 395/800 |
| 5,781,798 | 7/1998 | Beatty et al. | 395/830 |
| 5,805,903 | 9/1998 | Elkhoury | 395/750.01 |

OTHER PUBLICATIONS

Bus–to–Bus Adpater, Model 2101 Hardware Manual, Bit–3 Computer Corporation, pp. 1–35, May 1995.

Don Anderson, *PCMCIA System Architecture*, PC System Architecture Series, Second Edition, pp. 21–38, 113–141, 145–162, 229–309, 321–332, Copyright © 1995 by MindShare, Inc., Richardson, TX.

Don Anderson/Tom Shanley, *CardBus System Architecture*, PC System Architecture Series, pp. 17–29, 39–58, 227–236, 321–361, Copyright © 1996 by MindShare, Inc., Richardson, TX.

Hans–Peter Messmer, "The Indispensable PC Hardware Book" (Second Edition), 1995, United States, pp. 450–454 and 483–485.

*Primary Examiner*—Ayaz R. Sheikh
*Assistant Examiner*—Jigar Pancholi
*Attorney, Agent, or Firm*—Williams, Morgan & Amerson, P.C.

[57] ABSTRACT

A method for use in a computer system having buses identifiable by bus identifiers and having an expansion card slot capable of being connected to one of the buses and capable of receiving an expansion card. The method includes assigning the bus identifiers to the buses according to an assignment sequence. The method determines if there is an expansion card that can be accessed via the slot. If not, at least one of the bus identifiers for the slot is reserved in accordance with the assignment sequence. Memory space and I/O space may also be reserved for the slot if the expansion card cannot be accessed.

48 Claims, 127 Drawing Sheets

| Bit | Upstream-to-Downstream | | | Downstream-to-Upstream | | |
|---|---|---|---|---|---|---|
| | Phase 1 | Phase 2 | Phase 3 | Phase 1 | Phase 2 | Phase 3 |
| 20 | CAD00 | CAD20 | CFRAME | CAD00 | CAD20 | CFRAME |
| 19 | CBE3 | CAD19 | CAD31 | CBE3 | CAD19 | CAD31 |
| 18 | CBE2 | CAD18 | CAD30 | CBE2 | CAD18 | CAD30 |
| 17 | CBE1 | CAD17 | CAD29 | CBE1 | CAD17 | CAD29 |
| 16 | CBE0 | CAD16 | CAD28 | CBE0 | CAD16 | CAD28 |
| 15 | CBUFF3 | CAD15 | CAD27 | CBUFF3 | CAD15 | CAD27 |
| 14 | CBUFF2 | CAD14 | CAD26 | CBUFF2 | CAD14 | CAD26 |
| 13 | CBUFF1 | CAD13 | CAD25 | CBUFF1 | CAD13 | CAD25 |
| 12 | CBUFF0 | CAD12 | CAD24 | CBUFF0 | CAD12 | CAD24 |
| 11 | PMW Ack | CAD11 | CAD23 | PMW Ack | CAD11 | CAD23 |
| 10 | Completion Removed | CAD10 | CAD22 | Completion Removed | CAD10 | CAD22 |
| 9 | LOCK | CAD09 | CAD21 | SERR | CAD09 | CAD21 |
| 8 | New Req | CAD08 | EDC7 | New Req | CAD08 | EDC7 |
| 7 | SPARE | CAD07 | EDC6 | SPARE | CAD07 | EDC6 |
| 6 | SPARE | CAD06 | EDC5 | SPARE | CAD06 | EDC5 |
| 5 | SPARE | CAD05 | EDC4 | SPARE | CAD05 | EDC4 |
| 4 | SPARE | CAD04 | EDC3 | SPARE | CAD04 | EDC3 |
| 3 | SPARE | CAD03 | EDC2 | SPARE | CAD03 | EDC2 |
| 2 | SPARE | CAD02 | EDC1 | SPARE | CAD02 | EDC1 |
| 1 | SPARE | CAD01 | EDC0 | SPARE | CAD01 | EDC0 |

FIG. 14

| Single Address Cycle | | 1st phase | 2nd phase | subsequent phases |
|---|---|---|---|---|
| Delayed Read/Write Request | cbuff <3> | buff# | X | NA |
| | cbuff <2> | buff# | X | NA |
| | cbuff<1> | buff# | X | NA |
| | cbuff<0> | buff# | parity$^3$ | NA |
| | ccbe<3:0> | PCI cmd | BE<>$^1$ | NA |
| | cad<> | addr | data<>$^3$ | NA |
| Posted Memory Write | cbuff <3> | X | X | X |
| | cbuff <2> | X | data ready | data ready |
| | cbuff<1> | X | parity error | parity error |
| | cbuff<0> | X | parity | parity |
| | ccbe<3:0> | PCI cmd | BE<> | BE<> |
| | cad<> | addr | data | data |
| Delayed Read/Write Completion | cbuff <3> | buff# | end of completion | end of completion |
| | cbuff <2> | buff# | data ready | data ready |
| | cbuff<1> | buff# | parity error | parity error |
| | cbuff<0> | buff# | parity | parity |
| | ccbe<3:0> | DRC | status | status |
| | cad<> | X | data | data |
| Stream Connect | cbuff <3> | buff# | X | X |
| | cbuff <2> | buff# | data ready | data ready |
| | cbuff<1> | buff# | X | X |
| | cbuff<0> | buff# | X | X |
| | ccbe<3:0> | strm conn | X | X |
| | cad<> | X | X | X |

FIG. 15A

| Dual address cycle | | 1st phase (Class) | 2nd phase | 3rd phase | subsequent phases |
|---|---|---|---|---|---|
| Delayed Read/Write Request | cbuff<3> | buff # | buff # | X | NA |
| | cbuff<2> | buff # | buff # | X | NA |
| | cbuff<1> | buff # | buff # | X | NA |
| | cbuff<0> | buff # | buff # | parity | NA |
| | cbuff<3:0> | DAC | PCI cmd | BE<> | NA |
| | cad<> | ms addr | ls addr | data | NA |
| Posted Memory Write | cbuff<3> | X | X | X | X |
| | cbuff<2> | X | X | X | X |
| | cbuff<1> | X | X | parity error | parity error |
| | cbuff<0> | X | X | parity | parity |
| | ccbe<3:0> | DAC | PCI cmd | BE<> | BE<> |
| | cad<> | ms addr | addr | data | data |

FIG. 15B

| Parameter | Value |
|---|---|
| Impedance (Differential) | 108 +/- 5 Ohms |
| Impedance (Single-ended) | 67 +/- 5 Ohms |
| Propagation Delay | 1.54 ns/ft min, 1.58 ns/ft max |
| Delay Skew | 0.025 ns/ft max |
| Attenuation (Differential) | 0.08 db/ft max @ 50 MHz |
| Length | 12' |
| DC Resistance | 0.070 Ohms/ft max |

FIG. 16

| CHK BIT [ ] | Data Bits — FIFO OUT [0:59] | | | | | | | |
|---|---|---|---|---|---|---|---|---|
| | 0123 4567 | 11 1111 8901 2345 | 1111 2222 6789 0123 | 2222 2233 4567 8901 | 3333 3333 2345 6789 | 4444 4444 0123 4567 | 4455 5555 8901 2345 | 5555 6789 |
| 0 | 0000 0001 | 1100 1100 | 1000 0011 | 1010 0000 | 1111 0011 | 0000 0110 | 1101 1000 | 0000 |
| 1 | 1100 1100 | 0110 1011 | 1000 0001 | 0001 0000 | 0001 0110 | 1001 0011 | 1010 0100 | 0000 |
| 2 | 0011 0110 | 0100 0000 | 1000 0100 | 1001 1100 | 1101 0101 | 0110 1000 | 0110 0010 | 0000 |
| 3 | 0000 1000 | 0001 0000 | 1000 1000 | 0100 0111 | 0011 1111 | 1111 0101 | 0001 0001 | 0000 |
| 4 | 1011 0001 | 0010 0001 | 0110 1110 | 0110 0010 | 0000 0000 | 1100 0000 | 1111 0000 | 1000 |
| 5 | 0000 0111 | 0001 0111 | 0111 0100 | 0100 1010 | 1001 1000 | 0011 0010 | 0000 0000 | 0100 |
| 6 | 1110 0000 | 1001 1001 | 1101 0000 | 0010 1011 | 0110 0000 | 0000 1001 | 0000 0000 | 0010 |
| 7 | 0101 1010 | 1010 0111 | 0011 1011 | 1001 0111 | 0000 1000 | 0000 1000 | 0000 0000 | 0001 |

| | | |
|---|---|---|
| 00 No Error | 20 DB57 | 40 DB58 |
| 01 DB 52 | 21 UNCER | 41 DB44,24 |
| 02 DB53 | 22 UNCER | 42 DB52,12 |
| 03 UNCER | 23 DB 46 | 43 DB12 |
| 04 DB54 | 24 DB 52,32 | 44 UNCER |
| 05 UNCER | 25 DB32 | 45 DB33 |
| 06 UNCER | 26 DB05 | 46 UNCER |
| 07 DB09 | 27 DB55,35 | 47 DB53,33 |
| 08 DB55 | 28 DB41,21 | 48 DB40,00 |
| 09 UNCER | 29 UNCER | 49 DB34 |
| 0A UNCER | 2A DB43 | 4A DB47 |
| 0B DB38 | 2B UNCER | 4B DB58,38 |
| 0C UNCER | 2C DB42 | 4C UNCER |
| 0D DB39 | 2D UNCER | 4D DB54,34 |
| 0E DB37 | 2E DB57,37 | 4E DB44,04 |
| 0F DB24,04 | 2F DB35 | 4F DB16 |
| 10 DB56 | 30 UNCER | 50 DB57,17 |
| 11 UNCER | 31 DB07 | 51 DB26 |
| 12 DB49,09 | 32 UNCER | 52 DB00 |
| 13 DB48 | 33 UNCER | 53 UNCER |
| 14 UNCER | 34 DB21 | 54 DB02 |
| 15 DB49 | 35 UNCER | 55 UNCER |
| 16 DB50 | 36 UNCER | 56 UNCER |
| 17 DB23,03 | 37 UNCER | 57 UNCER |
| 18 UNCER | 38 DB25 | 58 UNCER |
| 19 DB51 | 39 UNCER | 59 UNCER |
| 1A DB40 | 3A UNCER | 5A UNCER |
| 1B UNCER | 3B UNCER | 5B UNCER |
| 1C DB41 | 3C UNCER | 5C UNCER |
| 1D UNCER | 3D DB43,23,03 | 5D UNCER |
| 1E DB25,05 | 3E UNCER | 5E DB57,37,17 |
| 1F UNCER | 3F UNCER | 5F DB56,16 |

FIG. 19A

| | | | | |
|---|---|---|---|---|
| 60 DB59,19 | 80 DB59 | A0 DB 31,11 | C0 UNCER | E0 DB19 |
| 61 UNCER | 81 UNCER | A1 DB13 | C1 DB08 | E1 UNCER |
| 62 UNCER | 82 DB40,20 | A2 DB14 | C2 DB01 | E2 UNCER |
| 63 UNCER | 83 DB23 | A3 DB53,13 | C3 UNCER | E3 UNCER |
| 64 DB28 | 84 DB50,10 | A4 DB06 | C4 DB44 | E4 DB33,13 |
| 65 UNCER | 85 DB24 | A5 DB28,08 | C5 DB22,02 | E5 UNCER |
| 66 DB32,12 | 86 DB27 | A6 DB54,14 | C6 UNCER | E6 DB53,33,13 |
| 67 DB52,32,12 | 87 DB46,06 | A7 UNCER | C7 UNCER | E7 DB36,16 |
| 68 DB11 | 88 UNCER | A8 DB36 | C8 DB31 | E8 UNCER |
| 69 DB30,10 | 89 DB45 | A9 DB43,23 | C9 UNCER | E9 DB42,22,02 |
| 6A DB30,10 | 8A DB04 | AA UNCER | CA DB20,00 | EA DB41,21,0 |
| 6B UNCER | 8B DB29,09 | AB UNCER | CB DB44,24,04 | EB DB34,14 |
| 6C UNCER | 8C DB29 | AC UNCER | CC DB47,27 | EC UNCER |
| 6D DB59,39,19 | 8D DB59,39 | AD UNCER | CD UNCER | ED DB39,19 |
| 6E UNCER | 8E UNCER | AE UNCER | CE UNCER | EE DB50,30 |
| 6F UNCER | 8F UNCER | AF DB45,05 | CF UNCER | EF DB54,34,14 |
| 70 DB17 | 90 UNCER | B0 DB18 | D0 DB40,20,00 | F0 DB 58,18 |
| 71 DB51,11 | 91 DB22 | B1 DB45,25 | D1 DB51,31 | F1 UNCER |
| 72 DB46,26 | 92 DB10 | B2 UNCER | D2 48,08 | F2 DB15 |
| 73 UNCER | 93 UNCER | B3 UNCER | D3 UNCER | F3 UNCER |
| 74 UNCER | 94 DB03 | B4 UNCER | D4 UNCER | F4 UNCER |
| 75 UNCER | 95 UNCER | B5 UNCER | D5 DB55,35,15 | F5 DB26,06 |
| 76 UNCER | 96 UNCER | B6 DB48,28,08 | D6 DB46,26,06 | F6 DB21,01 |
| 77 DB48,28 | 97 DB45,25,05 | B7 DB27,07 | D7 UNCER | F7 DB56,36,16 |
| 78 DB42,02 | 98 DB20 | B8 DB56,36 | D8 UNCER | F8 DB30 |
| 79 UNCER | 99 DB49,29 | B9 DB51,31,11 | D9 UNCER | F9 UNCER |
| 7A UNCER | 9A UNCER | BA UNCER | DA UNCER | FA DB55,15 |
| 7B DB47,07 | 9B UNCER | BB DB38,18 | DB UNCER | FB DB58,38,18 |
| 7C DB50,30,10 | 9C UNCER | BC UNCER | DC UNCER | FC UNCER |
| 7D UNCER | 9D UNCER | BD DB42,22 | DD DB35,15 | FD DB47,27,0 |
| 7E DB37,17 | 9E DB49,29,09 | BE DB43,03 | DE DB41,01 | FE UNCER |
| 7F UNCER | 9F UNCER | BF UNCER | DF UNCER | FF UNCER |

FIG. 19B

Ⓐ OPEN_WINDOW & !ANY_REQ & BUS_IDLE & (N_CURMAST! = CURMAST) / CHANGING_GNT = 1
GNT [7:0] = NOGNT
CURMAST [2:0] = N_CURMAST [2:0]
RR_MAST [2:0]
=N_RR_MAST [2:0]
L1STATE [1:0] =
N_L1STATE [1:0]

Ⓑ OPEN_WINDOW & !ANY_REQ & BUS_IDLE & (N_CURMAST = CURMAST)
/L1STATE [1:0] = N_L1STATE [1:0]

Ⓒ OPEN_WINDOW & (N_CURMAST! = CURMAST) / CHANGING_GNT = 1
GNT [7:0] = NOGNT
CURMAST [2:0] = N_CURMAST [2:0]
UPDATE RR_MAST [2:0]
L1STATE [1:0] = N_L1STATE [1:0]

| CURMAST [2:0] | NEWGNT [7:0] |
|---|---|
| 0 | 00000001 |
| 1 | 00000010 |
| 2 | 00000100 |
| 3 | 00001000 |
| 4 | 00010000 |
| 5 | 00100000 |
| 6 | 01000000 |
| 7 | 10000000 |

FIG. 24

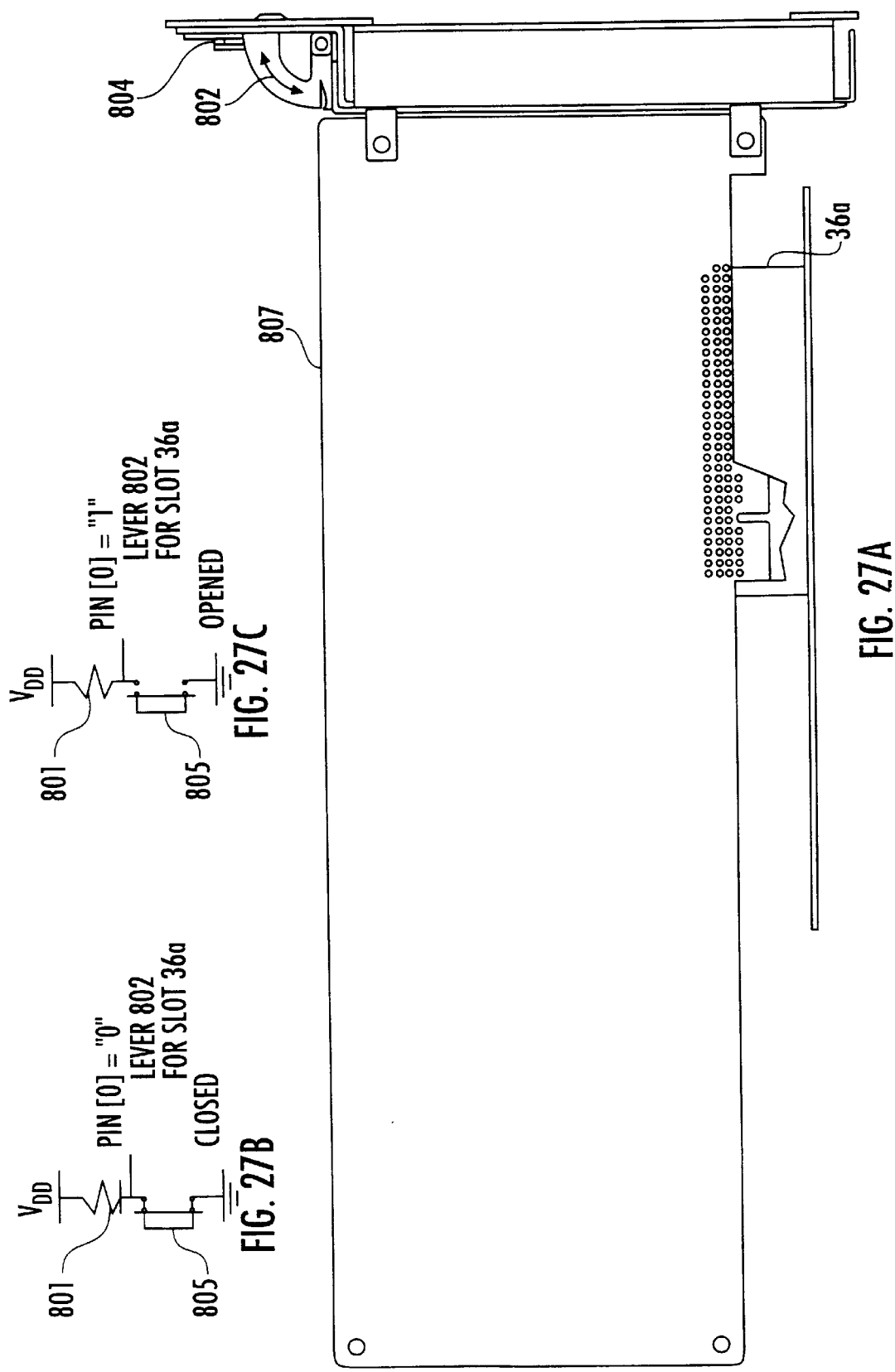

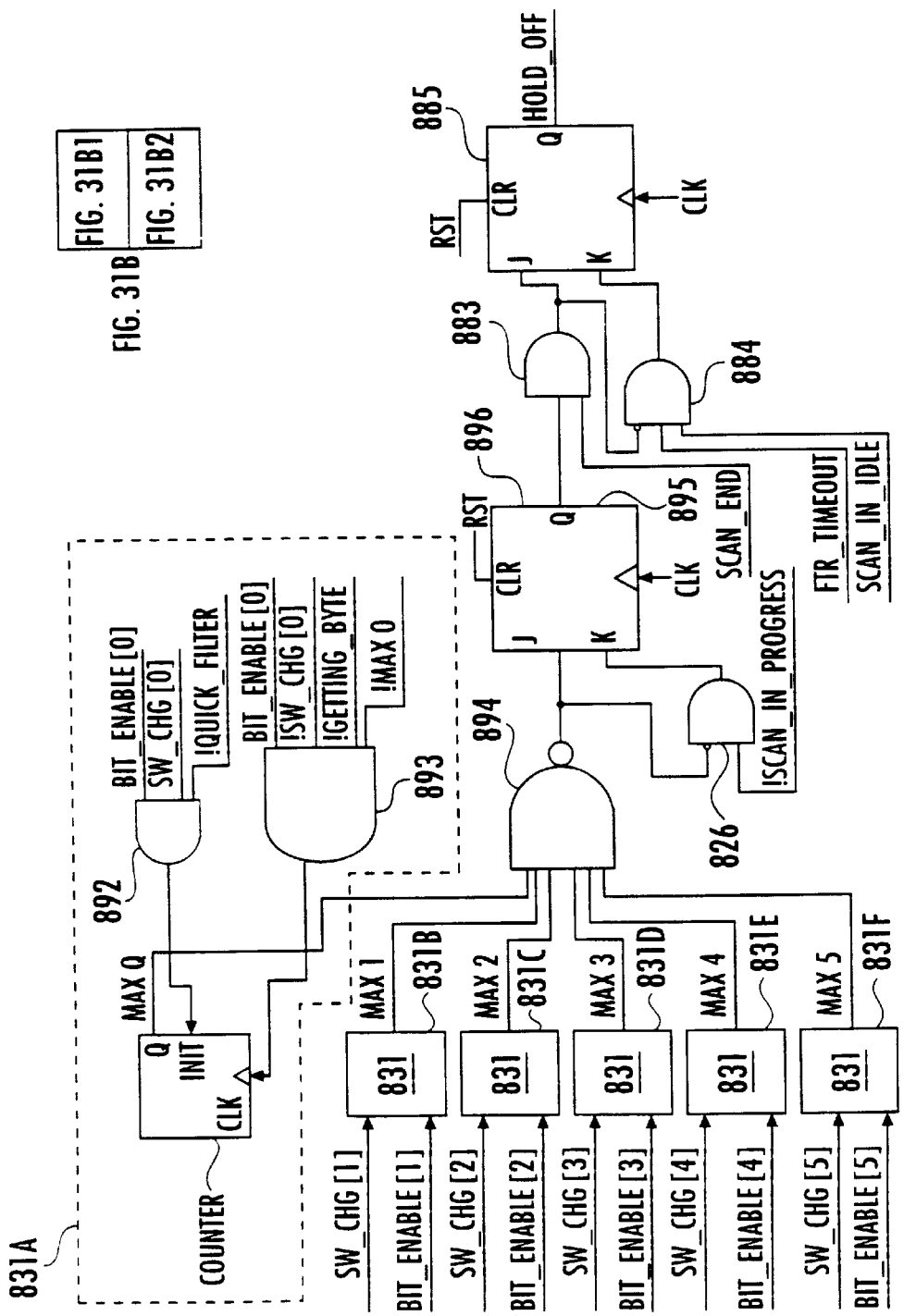
FIG. 31B1

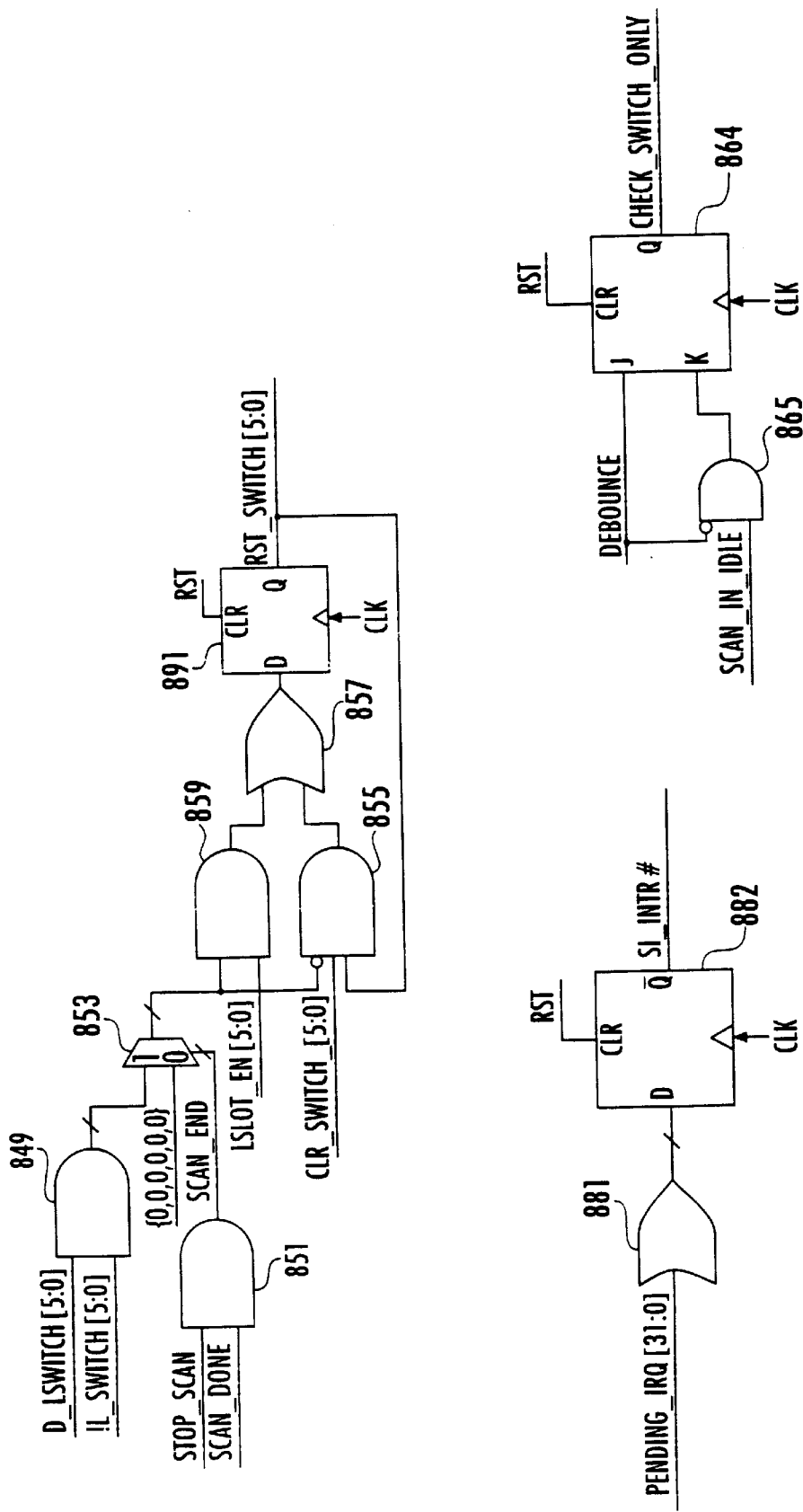
FIG. 31B2

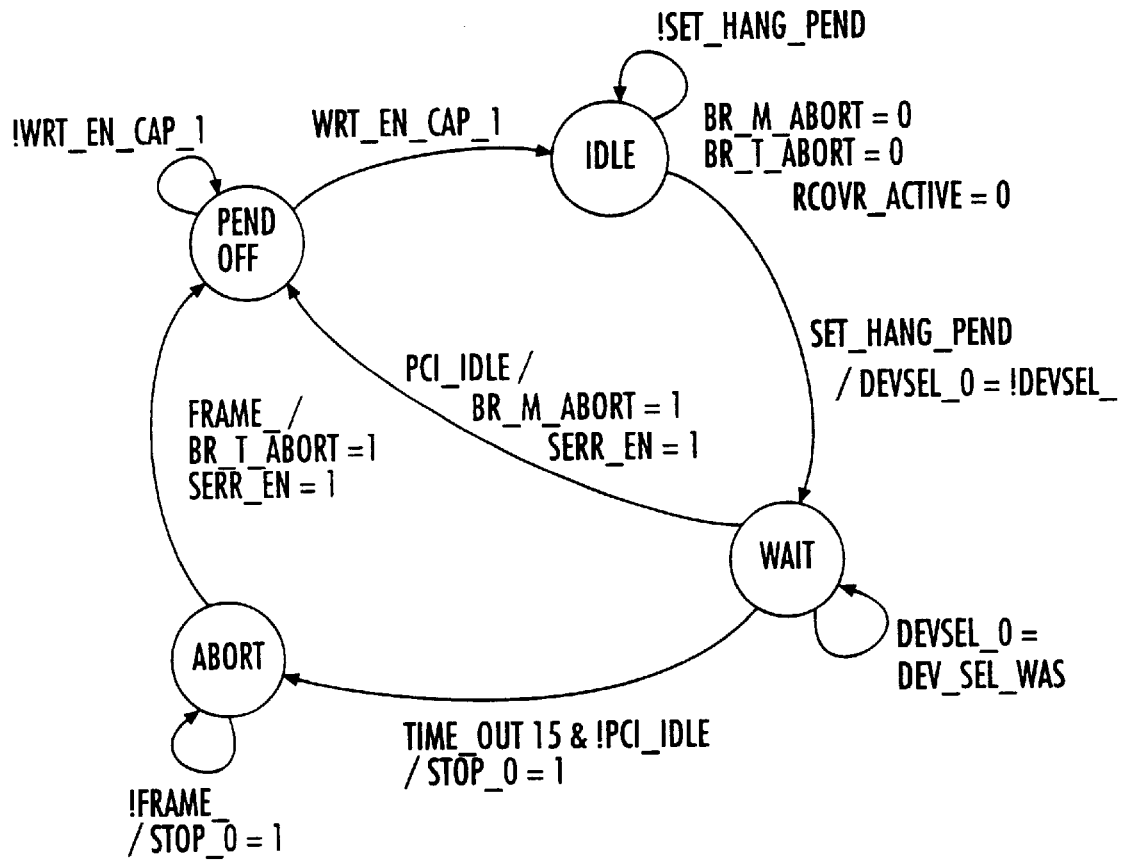
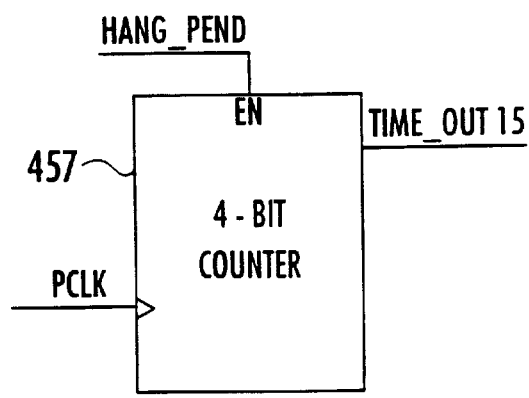
FIG. 41

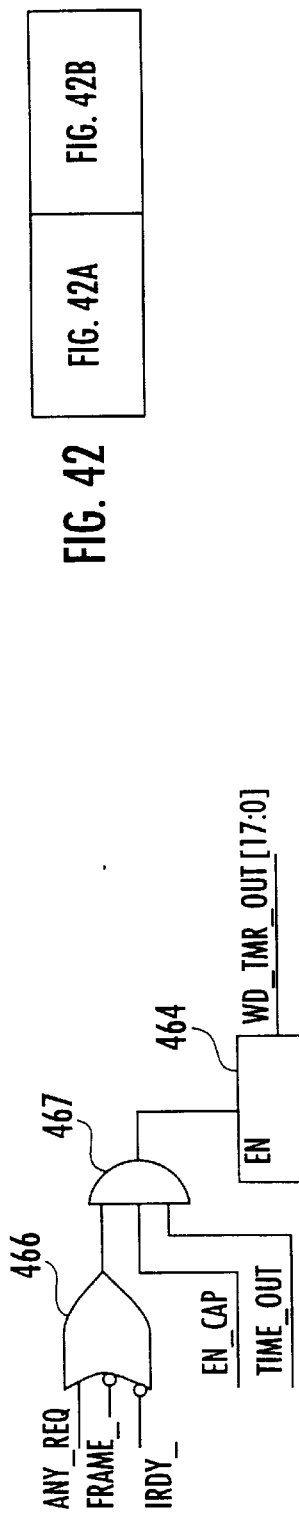
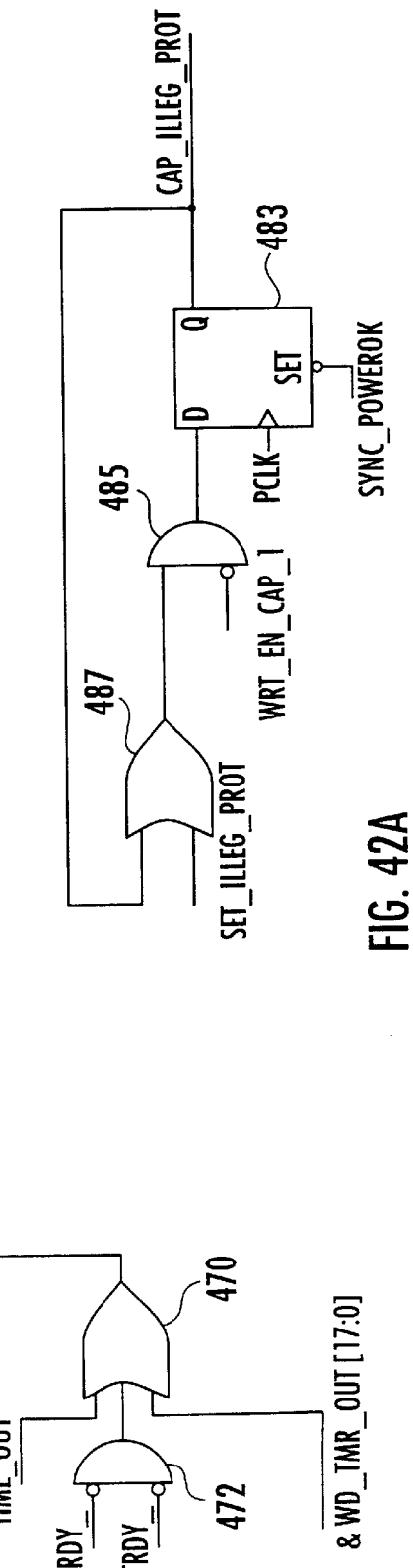
FIG. 42
| FIG. 42A | FIG. 42B |
FIG. 42A

| PRIMARY ADDRESS AD [15::11] | SECONDARY ADDRESS BITS AD [31::16] |
|---|---|
| 00000 | 0000 0000 0000 0001 |
| 00001 | 0000 0000 0000 0010 |
| 00010 | 0000 0000 0000 0100 |
| 00011 | 0000 0000 0000 1000 |
| 00100 | 0000 0000 0001 0000 |
| 00101 | 0000 0000 0010 0000 |
| 00110 | 0000 0000 0100 0000 |
| 00111 | 0000 0000 1000 0000 |
| 01000 | 0000 0001 0000 0000 |
| 01001 | 0000 0010 0000 0000 |
| 01010 | 0000 0100 0000 0000 |
| 01011 | 0000 1000 0000 0000 |
| 01100 | 0001 0000 0000 0000 |
| 01101 | 0010 0000 0000 0000 |
| 01110 | 0100 0000 0000 0000 |
| 01111 | 1000 0000 0000 0000 |
| 1XXXX | 0000 0000 0000 0000 |

FIG. 52

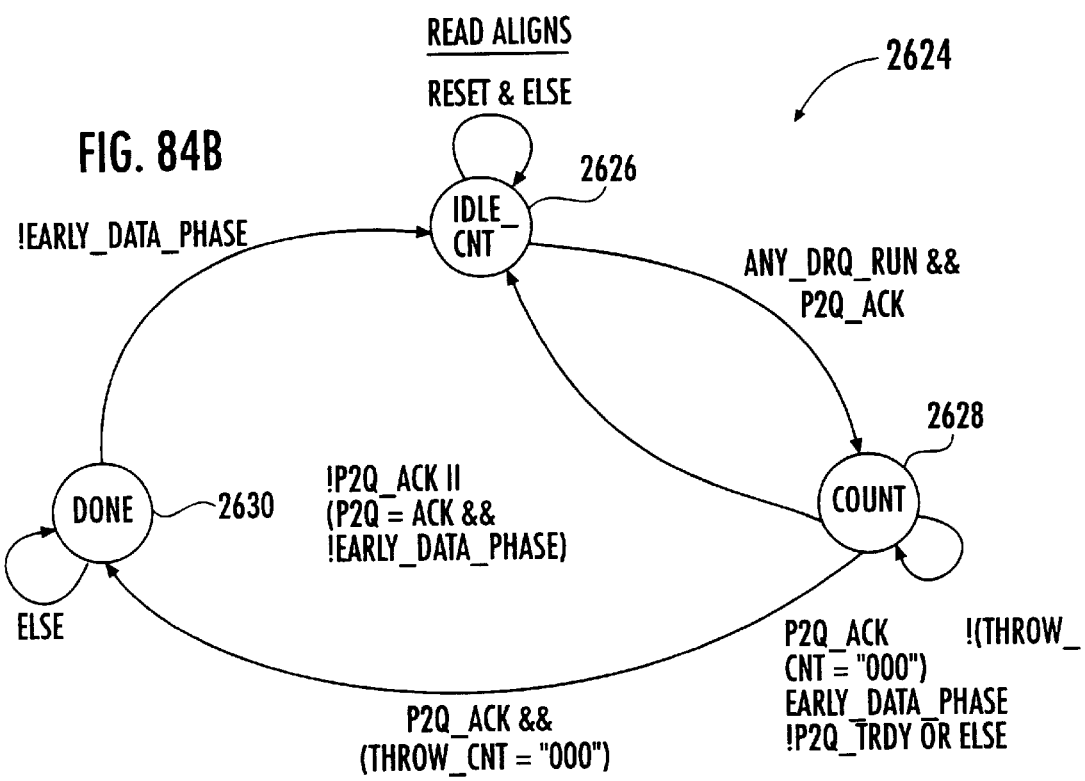
FIG. 84B
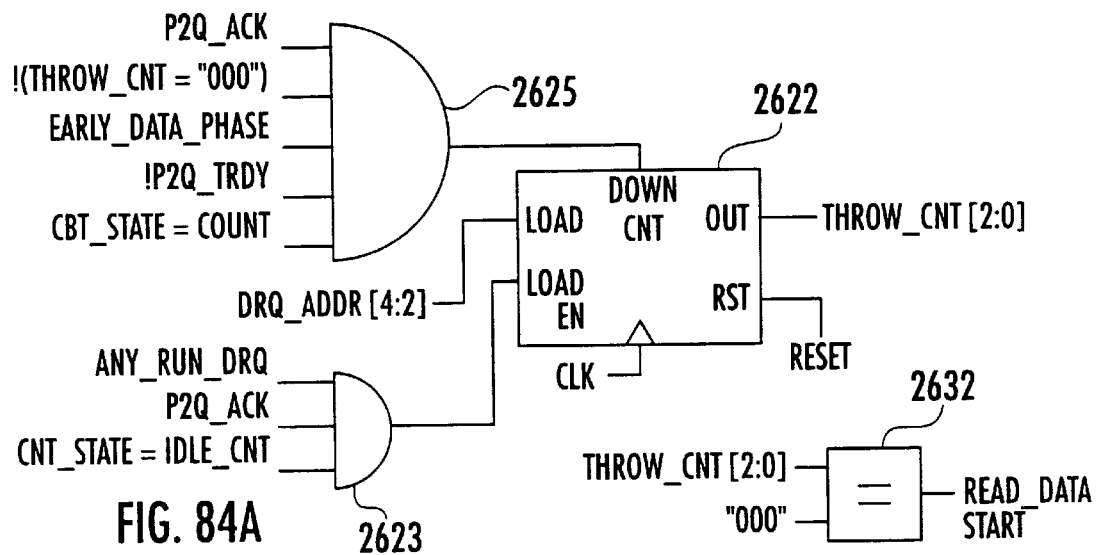
FIG. 84A
FIG. 84C
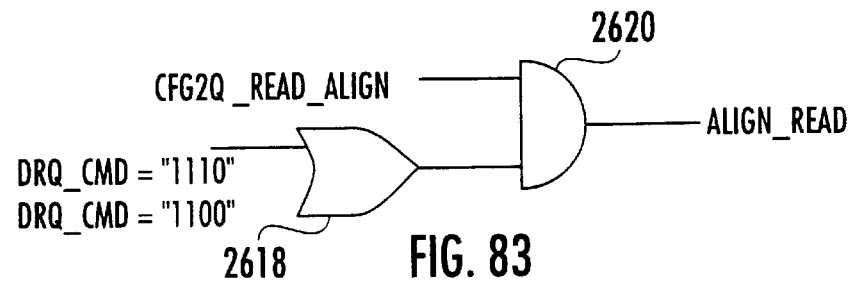
FIG. 83

"0" = I₂O SUBORDINATE
"1" = HOST CPU 14 SUBORDINATE

HOST CONFIGURATION
ENABLE BIT

"1" = CPU 14 MAY CONFIGURE ON PCI BUS 32

"0" = I₂O PROCESSOR 1700 IS CONFIGURING
I₂O SUBORDINATE DEVICES ON BUS 32

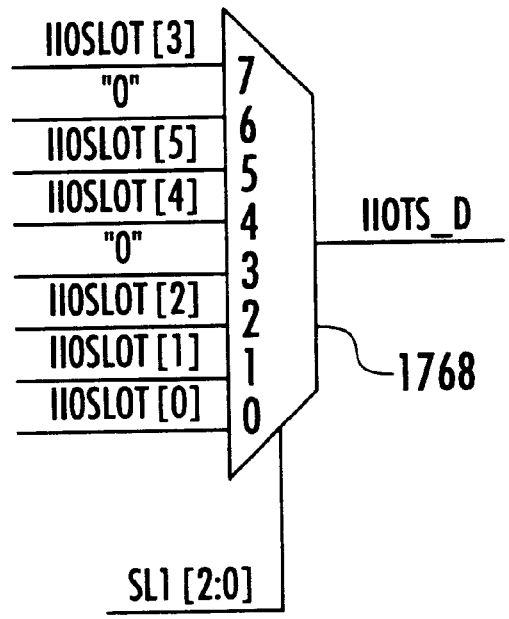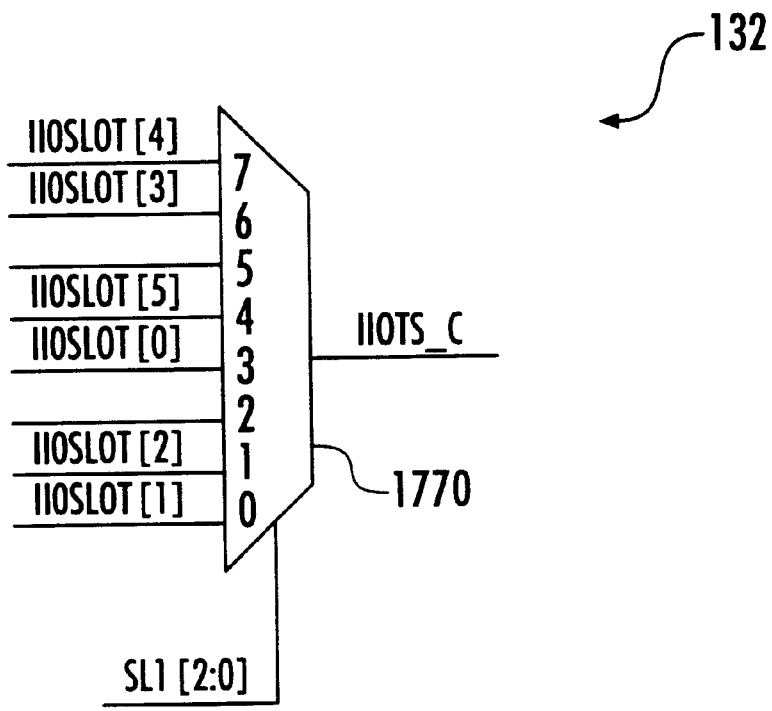
FIG. 97C

| TIME SLICE | INTSDA # | INTSDD # | INTSDC # | INTSDB # |
|---|---|---|---|---|
| T0 |  | SLOT 1. INTD # | SLOT 2. INTC # | SLOT 3. INTB # |
| T1 | SLOT 1. INTA # | SLOT 2. INTD # | SLOT 3. INTC # |  |
| T2 | SLOT 2. INTA # | SLOT 3. INTD # |  | SLOT 1. INTB # |
| T3 | SLOT 3. INTA # |  | SLOT 1. INTC # | SLOT 2. INTB # |
| T4 | SLOT 4. INTA # | SLOT 5. INTD # | SLOT 6. INTC # |  |
| T5 | SLOT 5. INTA # | SLOT 6. INTD # |  | SLOT 4. INTB # |
| T6 | SLOT 6. INTA # |  | SLOT 4. INTC # | SLOT 5. INTB # |
| T7 |  | SLOT 4. INTD # | SLOT 5. INTC # | SLOT 6. INTB # |

FIG. 99

SLOT 1 = SLOT 36A
SLOT 2 = SLOT 36B
SLOT 3 = SLOT 36C
SLOT 4 = SLOT 36D
SLOT 5 = SLOT 36E
SLOT 6 = SLOT 36F

| INTERRUPT LINES ON PCI BUS 24 | EXPANSION BUS 30 INTERRUPT SOURCES | | | | | | | |
|---|---|---|---|---|---|---|---|---|
| INTA # | BR_INTR # | SLOT 1. INTD # | SLOT 2. INTC # | SLOT 3. INTB # | SLOT 4. INTA # | SLOT 5. INTD # | SLOT 6. INTC # | "1" |
| INTB # | SLOT 1. INTA # | SLOT 2. INTD # | SLOT 3. INTC # | "1" | SLOT 5. INTA # | SLOT 6. INTD # | "1" | SLOT 4. INTB # |
| INTC # | SLOT 2. INTA # | SLOT 3. INTD # | "1" | SLOT 1. INTB # | SLOT 6. INTA # | "1" | SLOT 4. INTC # | SLOT 5. INTB # |
| INTD # | SLOT 3. INTA # | "1" | SLOT 1. INTC # | SLOT 2. INTB # | SI_ INTR # | SLOT 4. INTD # | SLOT 5. INTC # | SLOT 6. INTB # |

FIG. 100

EXPANSION CARD SPACE RESERVATION

BACKGROUND

The invention relates to reserving space for expansion cards.

As shown in FIGS. 50A–B, when a computer system 1203 having a Peripheral Component Interconnect (PCI) bus architecture first powers up, a central processing unit (CPU) 1207 locates PCI buses 1217 and PCI devices (e.g., PCI—PCI bridge circuits 1215) of the computer system 1203 and determines the type of each PCI device. The PCI device is non-responsive to memory space and input/output (I/O) space addressing on its PCI bus 1217 until the configuration space of the PCI device is programmed by the CPU 1207 through configuration cycles which use a PCI device identifier set for addressing the PCI device.

The PCI device identifier set uniquely identifies each PCI device and includes a unique integer bus number (identifying the PCI bus 1217 to which the PCI device is connected) and an integer device number. The device numbers are unique for PCI devices coupled to a common PCI bus 1217. The PCI device identifier set further includes an integer function number used to address PCI functions of the PCI device.

The CPU 1207 locates PCI buses 1217 and devices at power up by scanning, or "walking," the computer system 1203. The CPU 1207 assigns the unique bus number to each PCI bus 1217 that is found during the scanning of the computer system 1203. The CPU 1207 allocates memory and I/O space for each PCI device and, using the configuration cycles, programs the configuration space of each PCI device with the addresses of the memory and I/O space allocated for the PCI device. After the configuration cycles are completed, each PCI device may then be assigned I/O and/or memory space, and each PCI device then responds to memory space and I/O space bus cycles accordingly.

The numbering of the PCI buses 1217 forms a hierarchical tree 1205. The primary PCI bus 1217a, the one located closest to the CPU 1207, is typically assigned bus number zero. A PCI bus 1217 that is located downstream of (farther from the CPU 1207, as measured by PCI—PCI bridge circuits 1215, than) another PCI bus 1217 must have a higher bus number than the PCI bus 1217 that is located upstream (closer to the CPU 1207, as measured by PCI—PCI bridge circuits 1215).

SUMMARY

In general, in one aspect, the invention features a method for use in a computer system having buses identifiable by bus identifiers and having an expansion card slot capable of being connected to one of the buses and capable of receiving an expansion card. The method includes assigning the bus identifiers to the buses according to an assignment sequence, determining if there is an expansion card that can be accessed via the slot, and if not, reserving at least one of the bus identifiers for the slot in accordance with the assignment sequence.

Implementations of the invention may include one or more of the following. The expansion card cannot be accessed because the slot is disconnected from the bus (e.g., a PCI bus) or not inserted into the slot. Determining may include determining whether communication is possible with a bus device on the card. The method may include at a later time, determining if there is a card that has become accessible via the slot, and if so, assigning a reserved bus identifier to a bus on the card. The method may include finding an additional bus on the expansion card if the card can be accessed and assigning one of the bus identifiers to the additional bus in accordance with the assignment sequence. The method may include programming a configuration memory space of a bridge circuit that interfaces the additional bus to the bus connected to the slot. The method may include reserving memory space for the slot if the expansion card cannot be accessed. The method may include, at a later time, determining if there is a card that has become accessible via the slot and, if so, allocating memory space or I/O space for the slot from the reserved memory space and/or I/O space for the slot. The method may include reserving I/O space for the slot if the expansion card cannot be accessed. The determining may occur at initial configuration of the computer system.

In general, in another aspect, the invention features a method for use in a computer system having an expansion card slot capable of being connected to the bus and capable of receiving an expansion card. The method includes determining if there is an expansion card that can be accessed via the slot, and if not, reserving memory space for the slot.

Implementations of the invention may include one or more of the following. The method may include finding an additional bus on the expansion card if the card can be accessed and assigning memory space for the additional bus. The method may include reserving a bus identifier for the slot in accordance with a bus assignment sequence if the expansion card cannot be accessed.

In general, in another aspect, the invention features a computer system having buses identifiable by bus identifiers and an expansion card slot capable of receiving an expansion card and capable of being connected to one of the buses. The computer system has a microprocessor and a memory for configuring the microprocessor to assign the bus identifiers to the buses according to an assignment sequence, determine if there is an expansion card that can be accessed via the slot, and if not, reserve at least one of the bus identifiers for the slot in accordance with the assignment sequence.

In general, in another aspect, the invention features a computer system having a bus and an expansion card slot capable of receiving an expansion card and capable of being connected to the bus. The computer system has a microprocessor and a memory for configuring the microprocessor to determine if there is an expansion card that can be accessed via the slot and reserve memory space for the slot if the expansion card cannot be accessed.

In general, in another aspect, the invention features reserving I/O space for the slot if the expansion card cannot be accessed.

Among the advantages of the invention are one or more of the following. PCI—PCI bridge circuits of the computer system do not have to be reconfigured when an expansion card having an additional PCI bus is inserted into the computer system that is already powered up. No new PCI bus numbers have to be allocated or reassigned when an expansion card having an additional PCI bus is inserted into the computer system that is already powered up. At initial power up of the computer system, memory and I/O space is reserved for an expansion card that is yet to be inserted into the computer system. The computer system that is powered up does not have to be powered down or reconfigured when an expansion card is inserted.

Other advantages and features will become apparent from the following description and from the claims.

DESCRIPTION

FIG. 14 is a table of the information carried by the cable.

FIG. 15A is a table showing the type of information carried by the cable signals associated with single address cycle transactions.

FIG. 15B is a table showing the type of information carried by the cable signals associated with dual-address cycle transactions.

FIG. 16 is a table of parameters associated with the cable.

FIG. 18 is a parity-check matrix for generating check bits in the error detection and correction circuit.

FIG. 19 is a syndrome table for generating fix bits in the error detection and correction circuit.

FIG. 24 is a table showing generation of new grant signals based on the current master.

FIG. 27A is a side view of an expansion card inserted into a slot.

FIG. 27B–C are schematic diagrams of lever circuitry.

FIGS. 28–31 are schematic diagrams of circuitry of the expansion box.

Figure 32A:
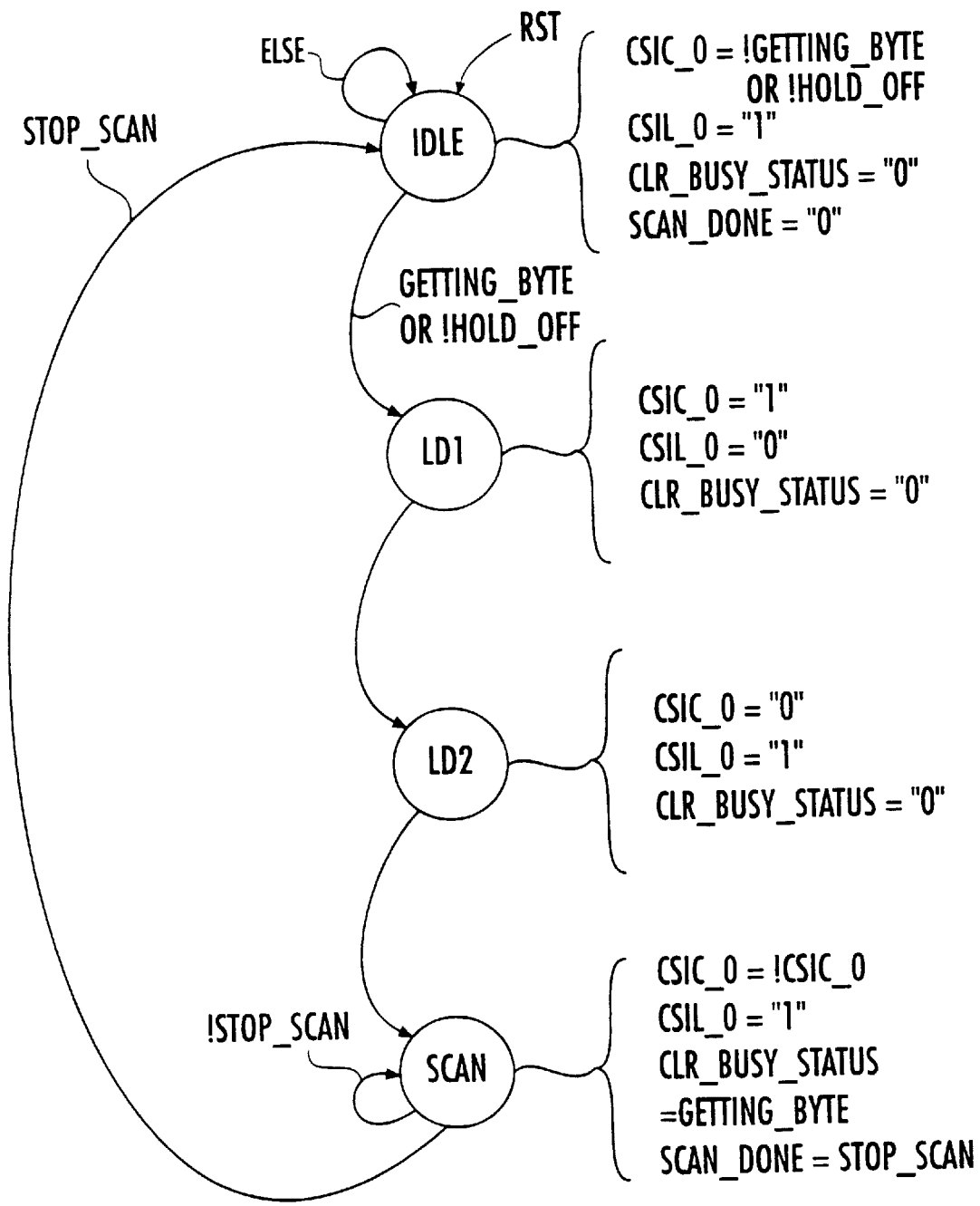

FIG. 32A is a state diagram from the circuitry of the expansion box.

Figure 32B:
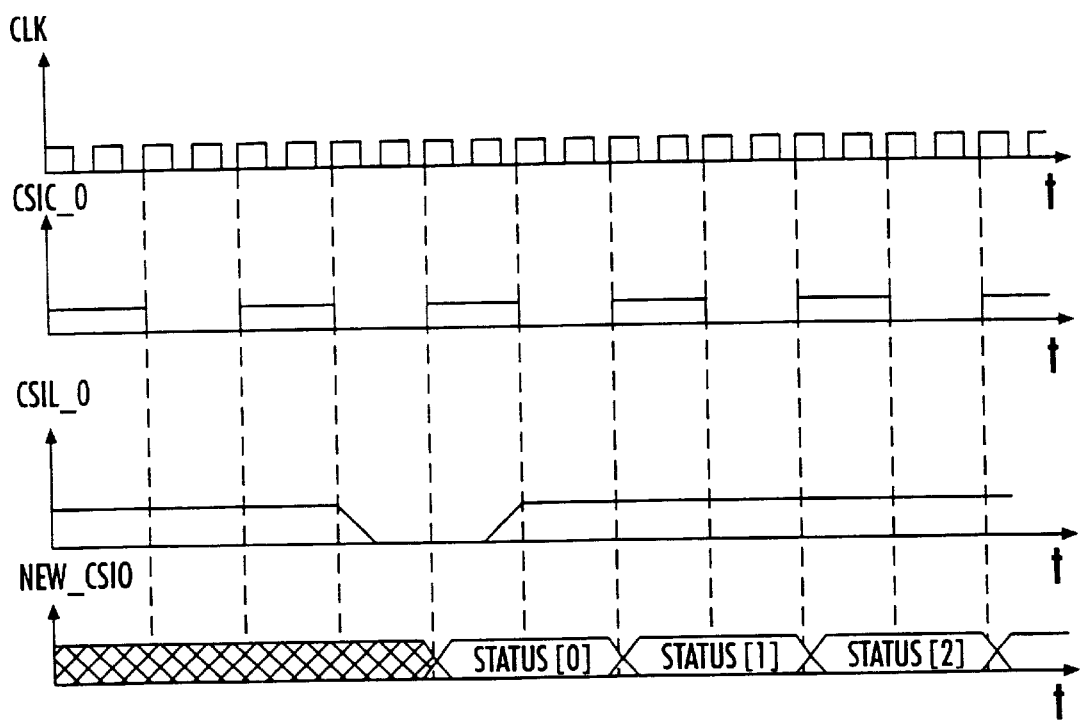

FIG. 32B are waveforms from the circuitry of the expansion box.

Figure 33A:
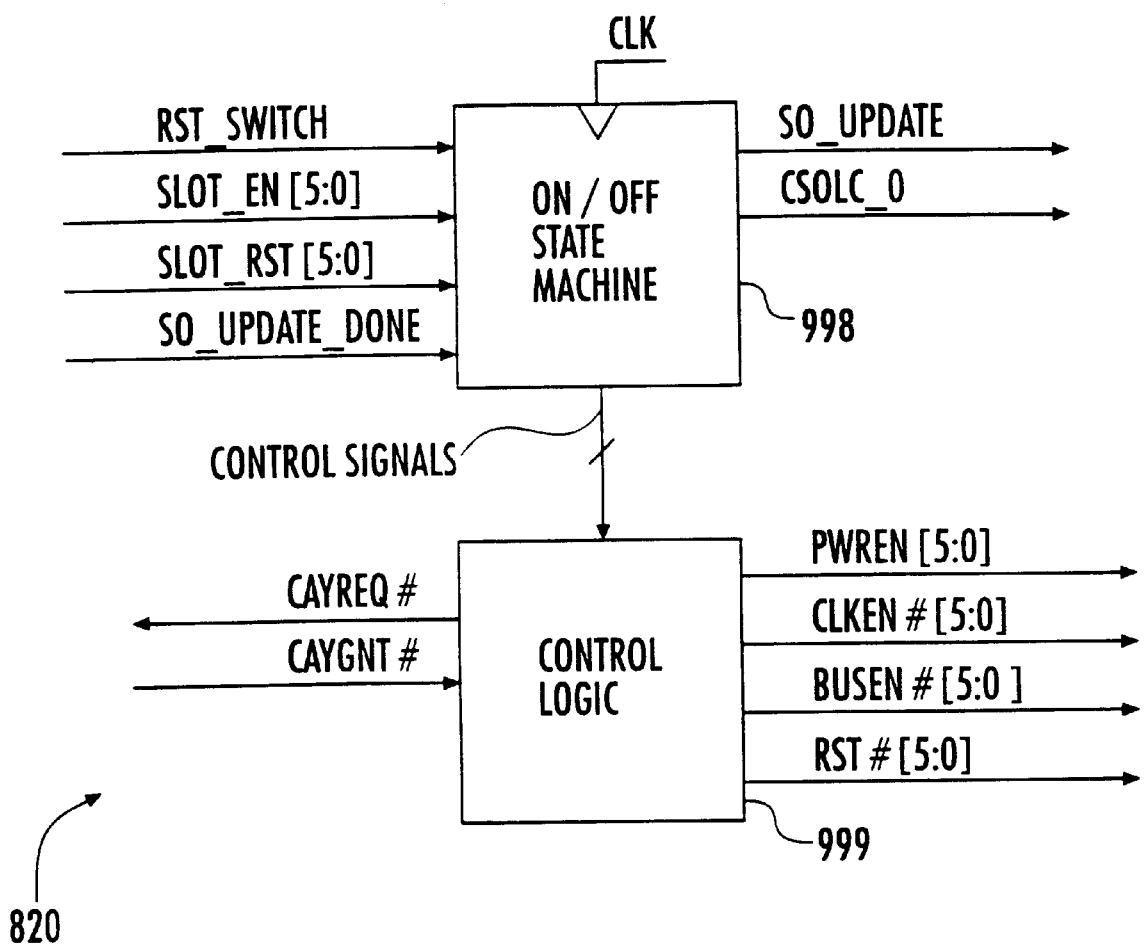

FIG. 33A is a schematic diagram of circuitry of the expansion box.

Figure 33B:
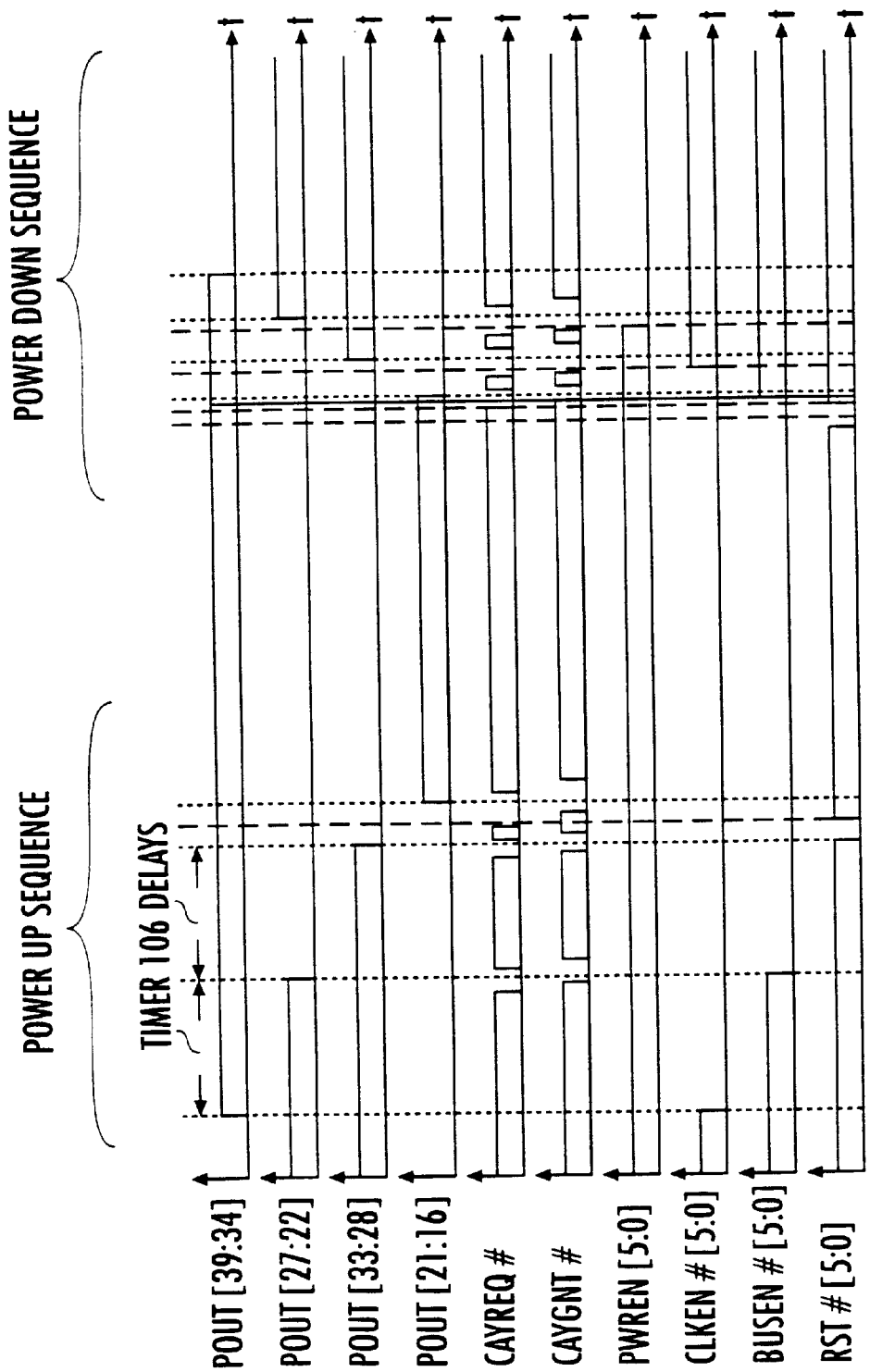
Figure 33C:
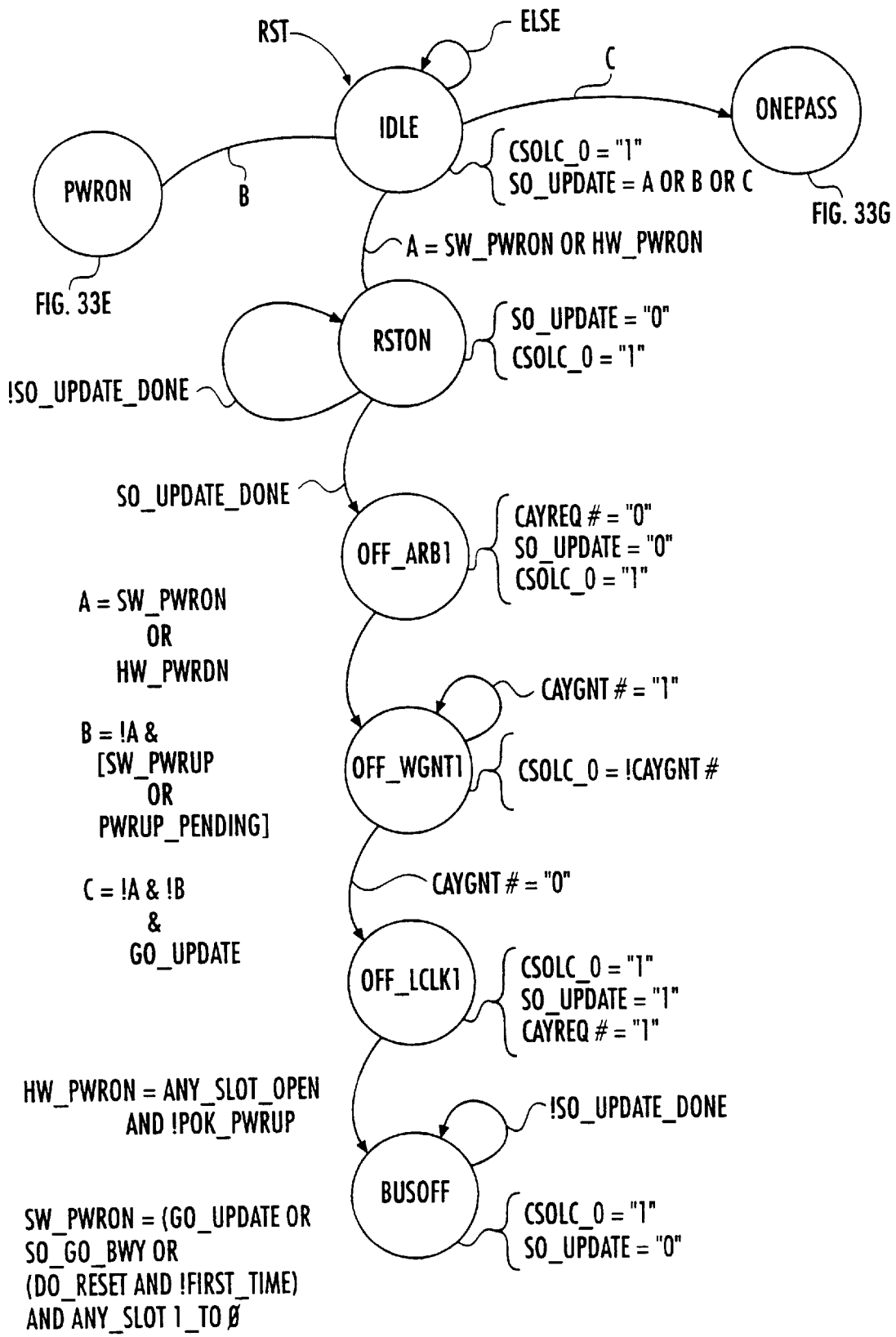
Figure 33D:
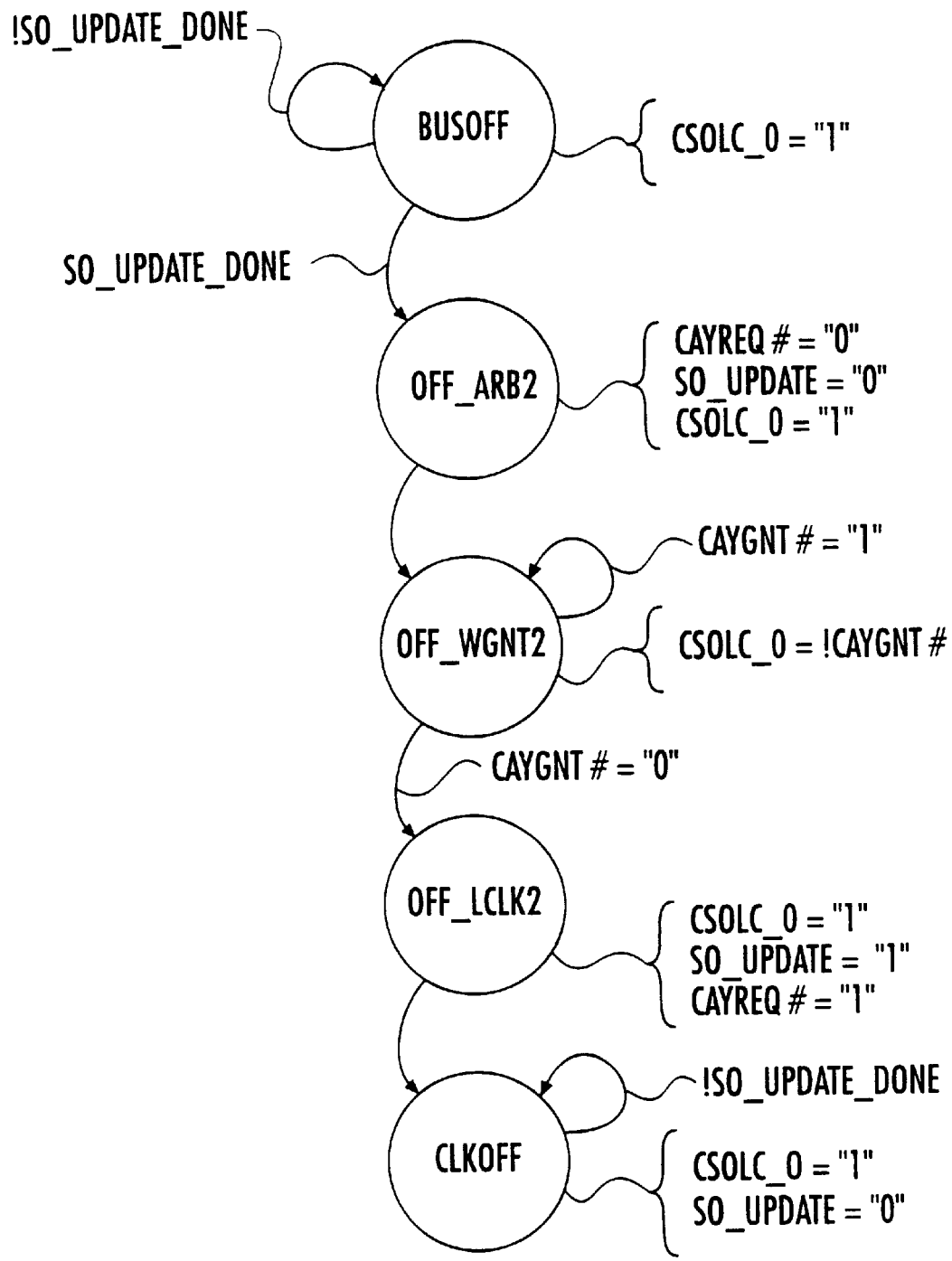
Figure 33E:
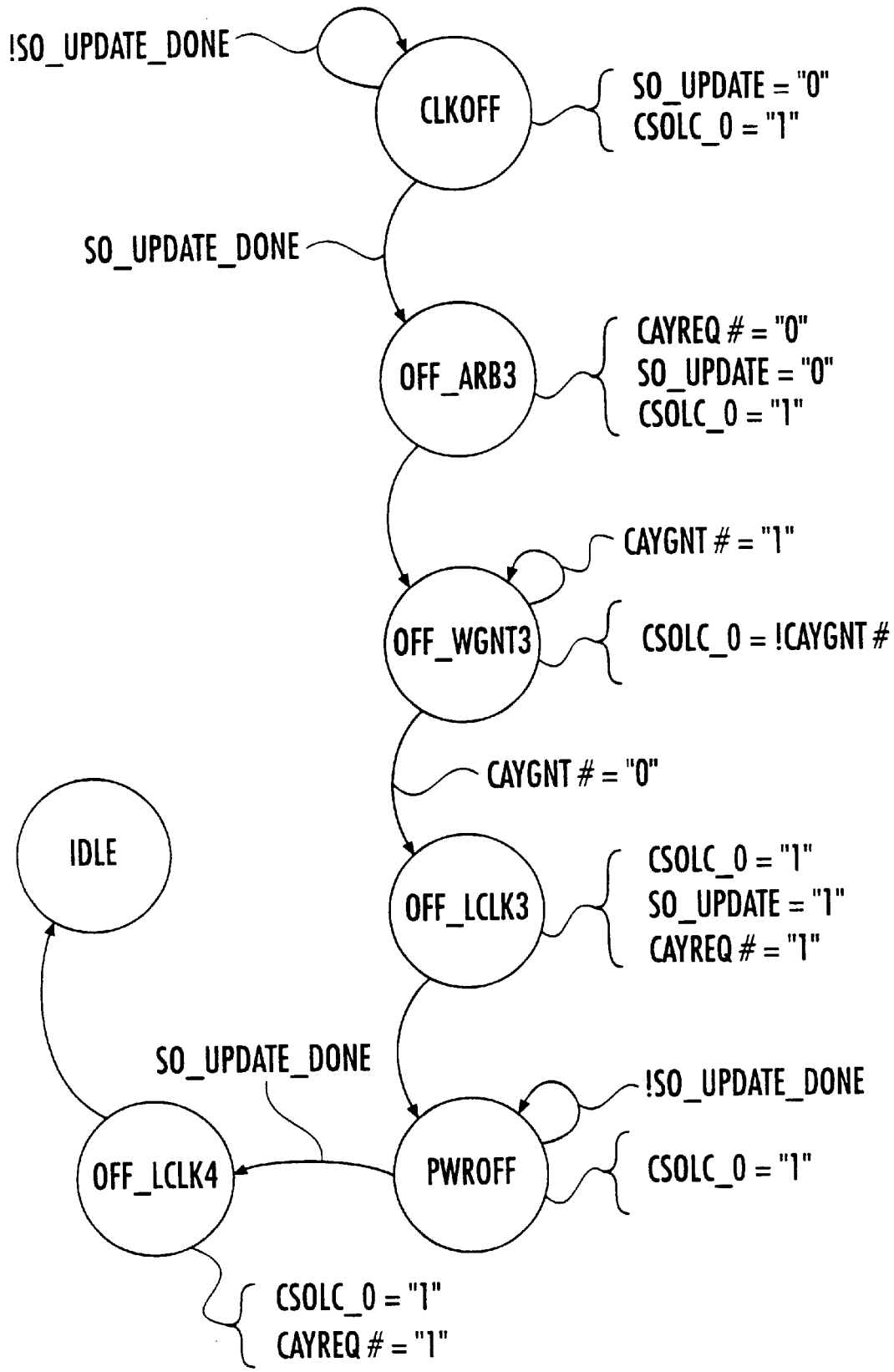
Figure 33F:
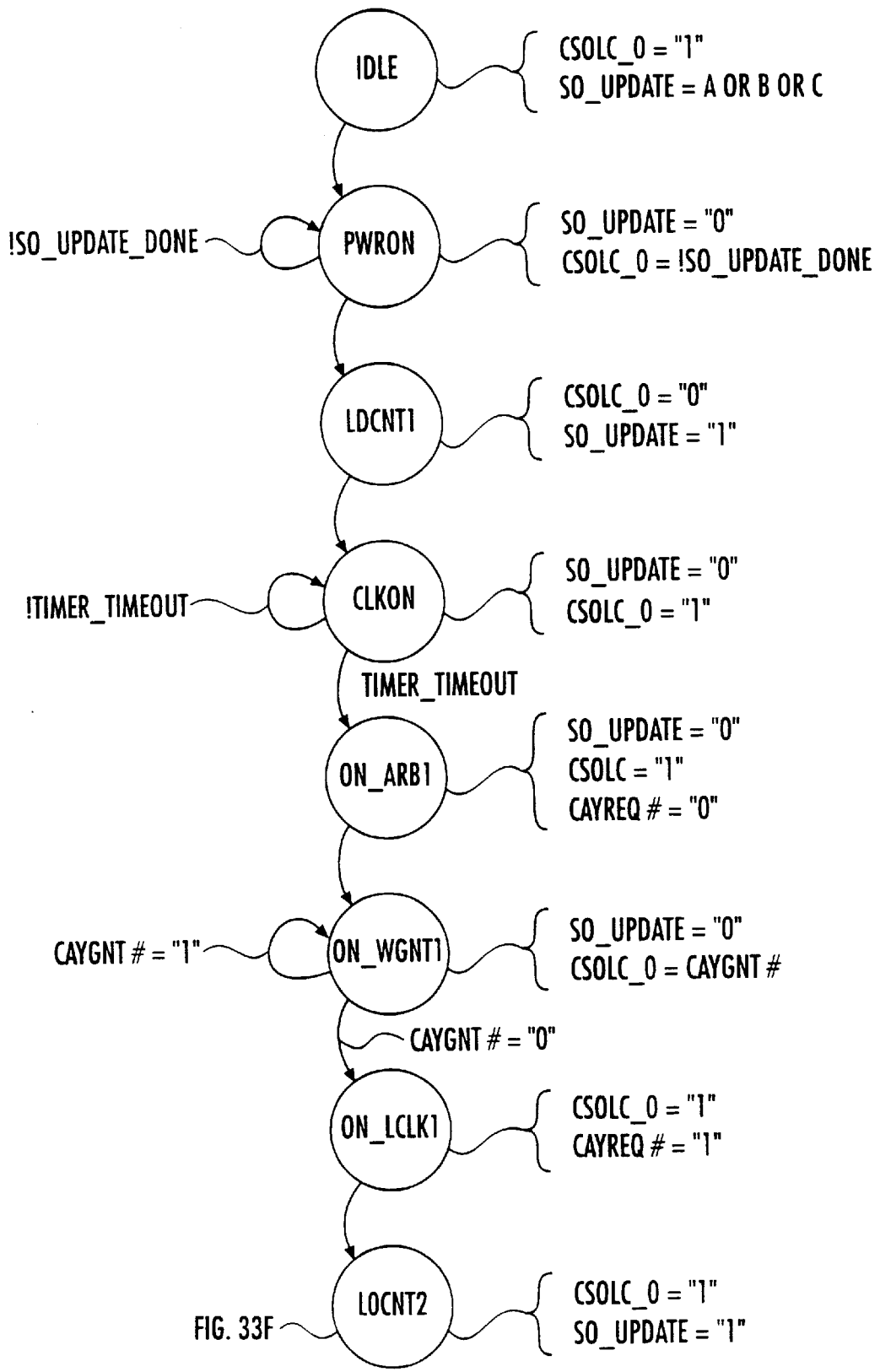
Figure 33G:
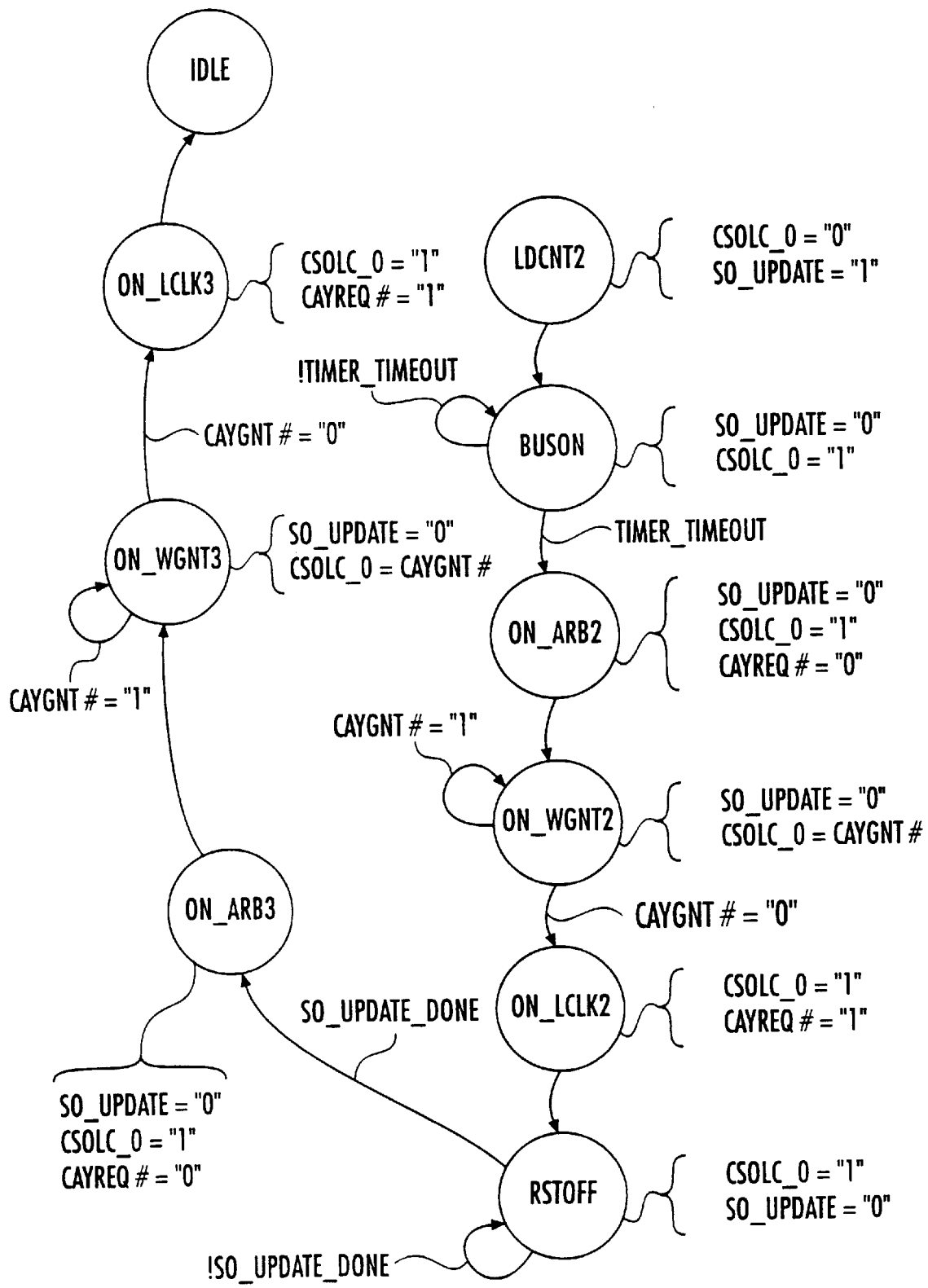
Figure 33H:
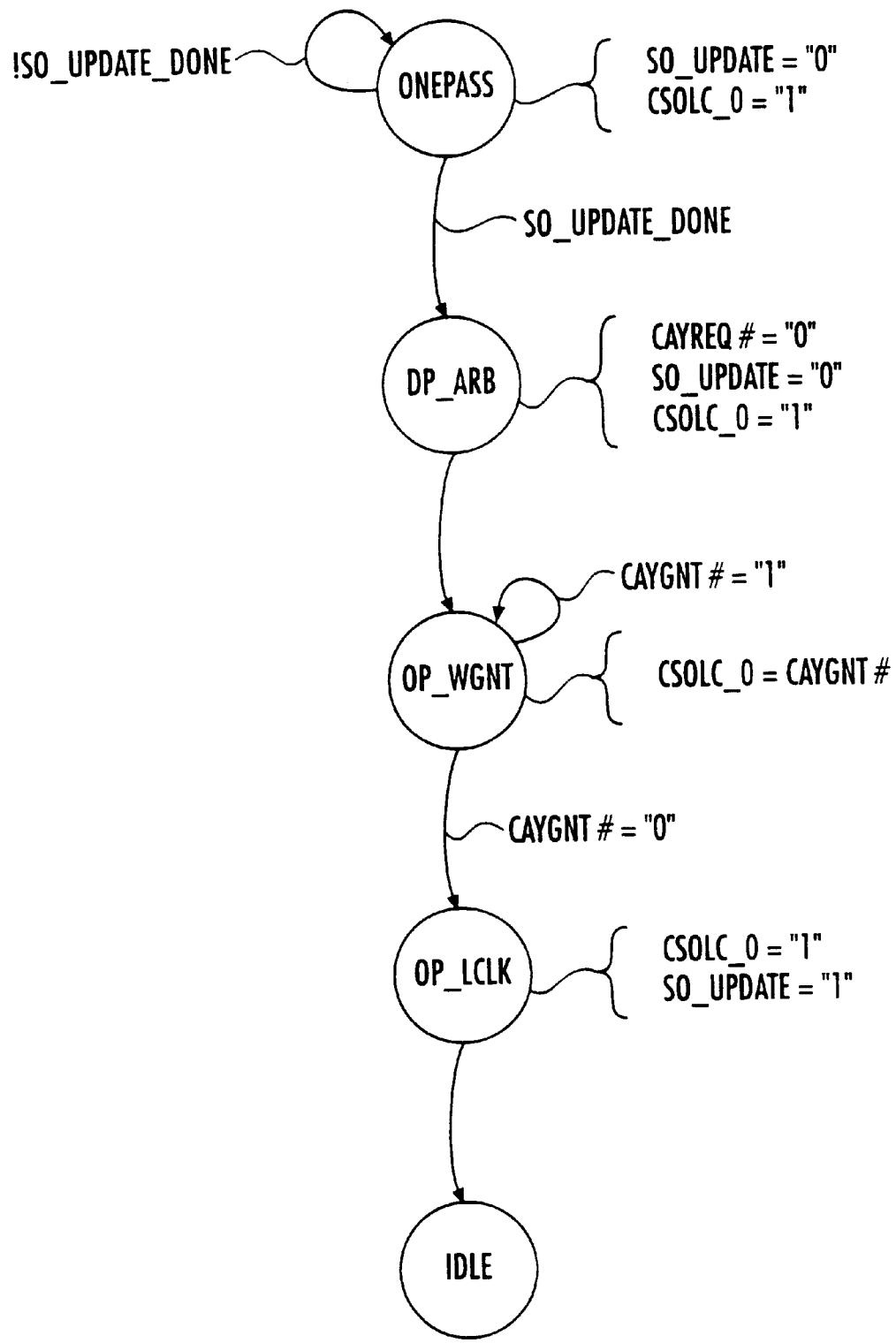

FIG. 33B are waveforms from the circuitry of the expansion box.

FIGS. 33C–H are a state diagram from the circuitry of the expansion box.

Figure 34:
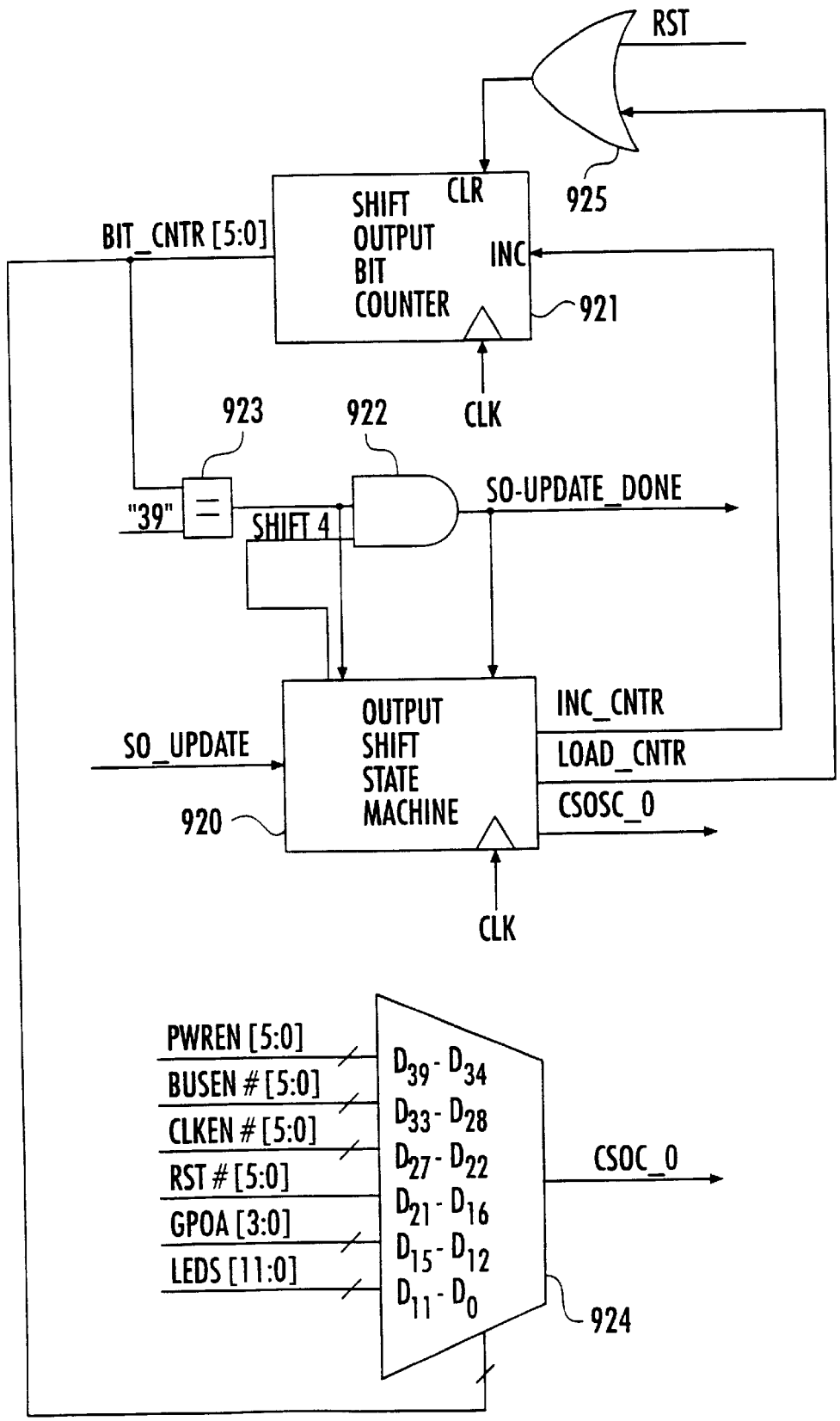

FIG. 34 is a schematic diagram of circuitry of the expansion box.

Figure 35A:
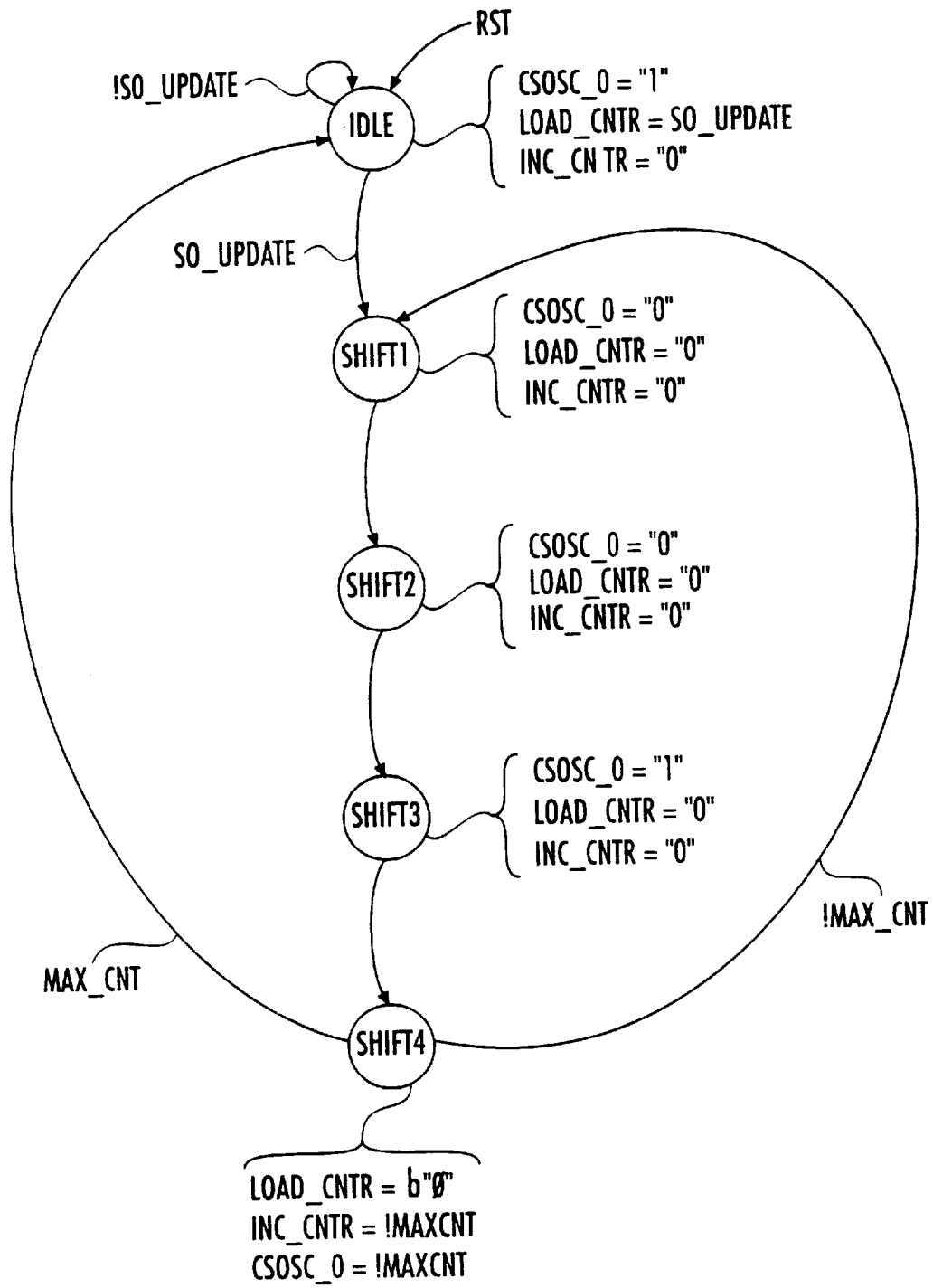

FIG. 35A is a state diagram from the circuitry of the expansion box.

Figure 35B:
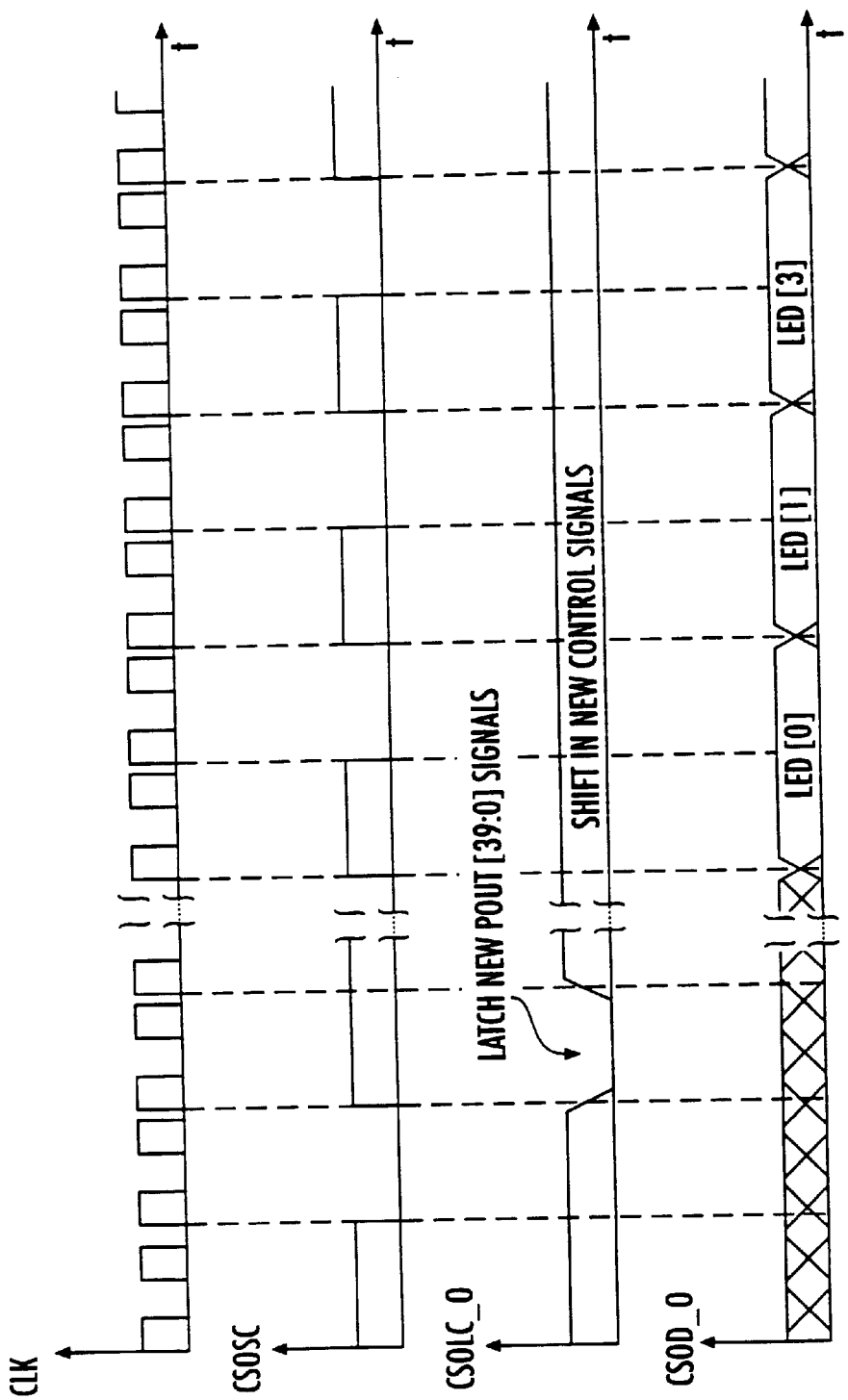

FIG. 35B are waveforms from the circuitry of the expansion box.

Figure 36:
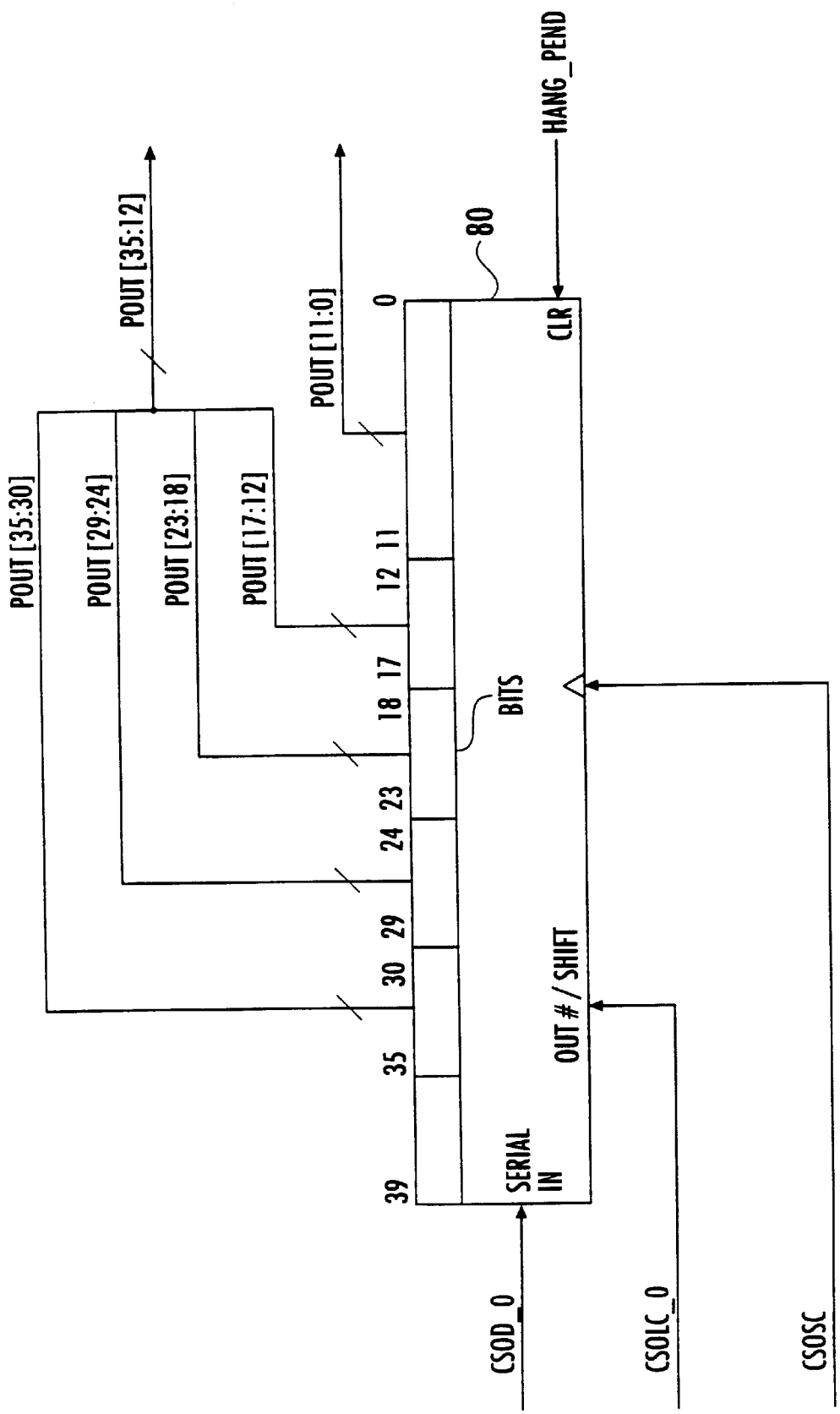

FIG. 36 is a schematic diagram of circuitry of the expansion box.

Figure 37:
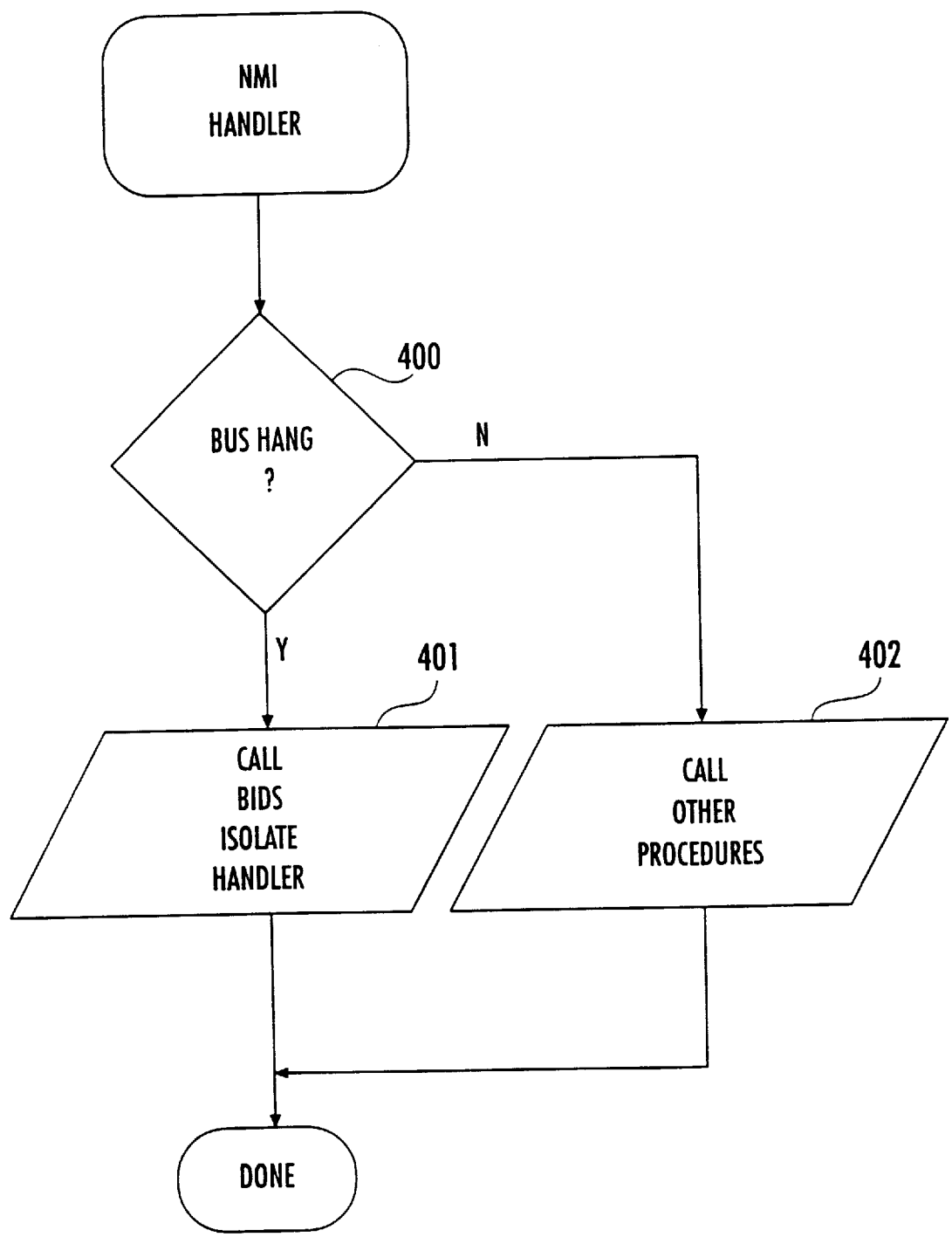

FIG. 37 is a flow diagram of a non-maskable interrupt handler invoked in response to detection of a bus hang condition in the computer system.

Figure 38:
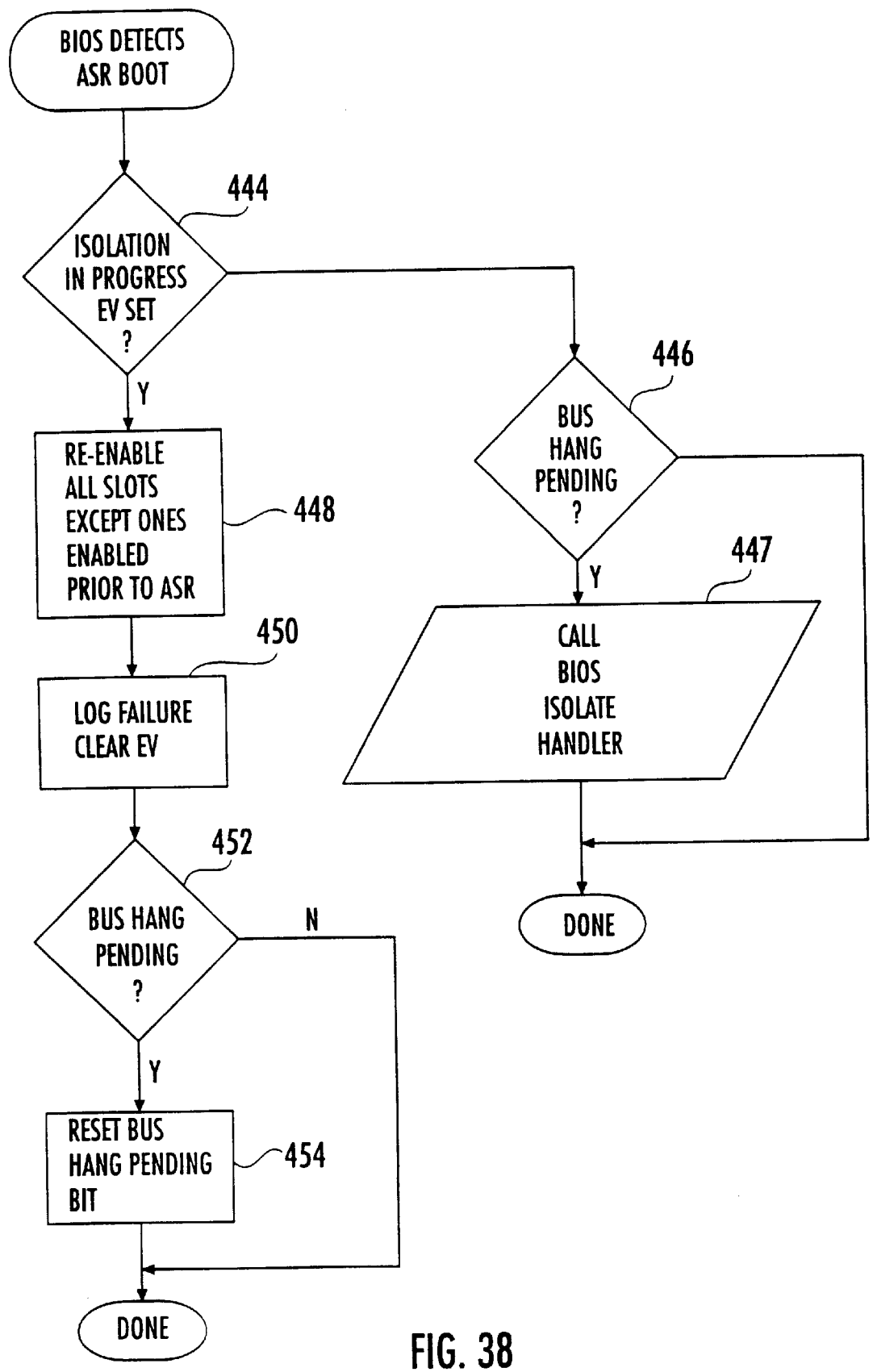

FIG. 38 is a flow diagram of a BIOS routine that is invoked by a computer system lock-up event.

Figure 39A:
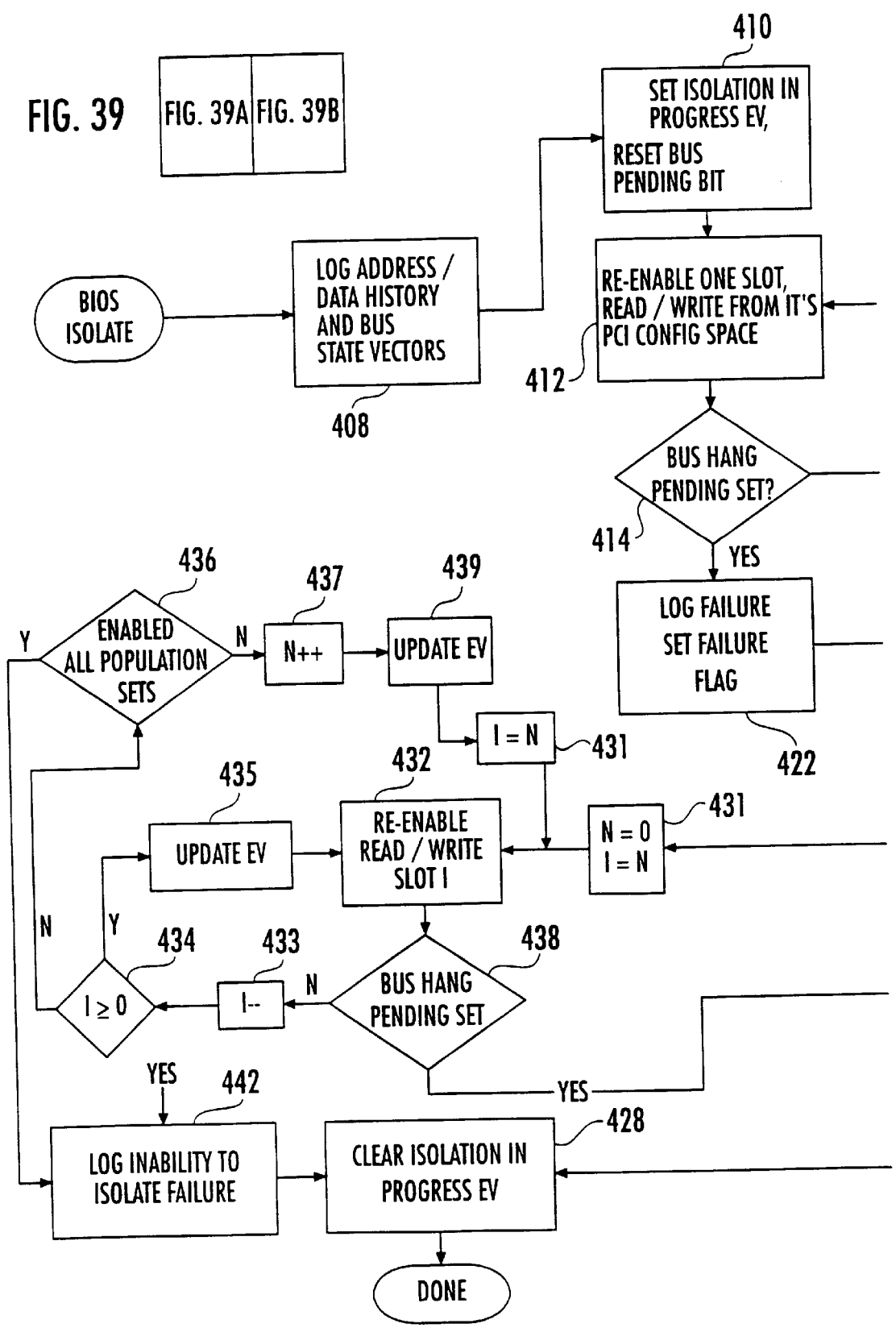
Figure 39B:
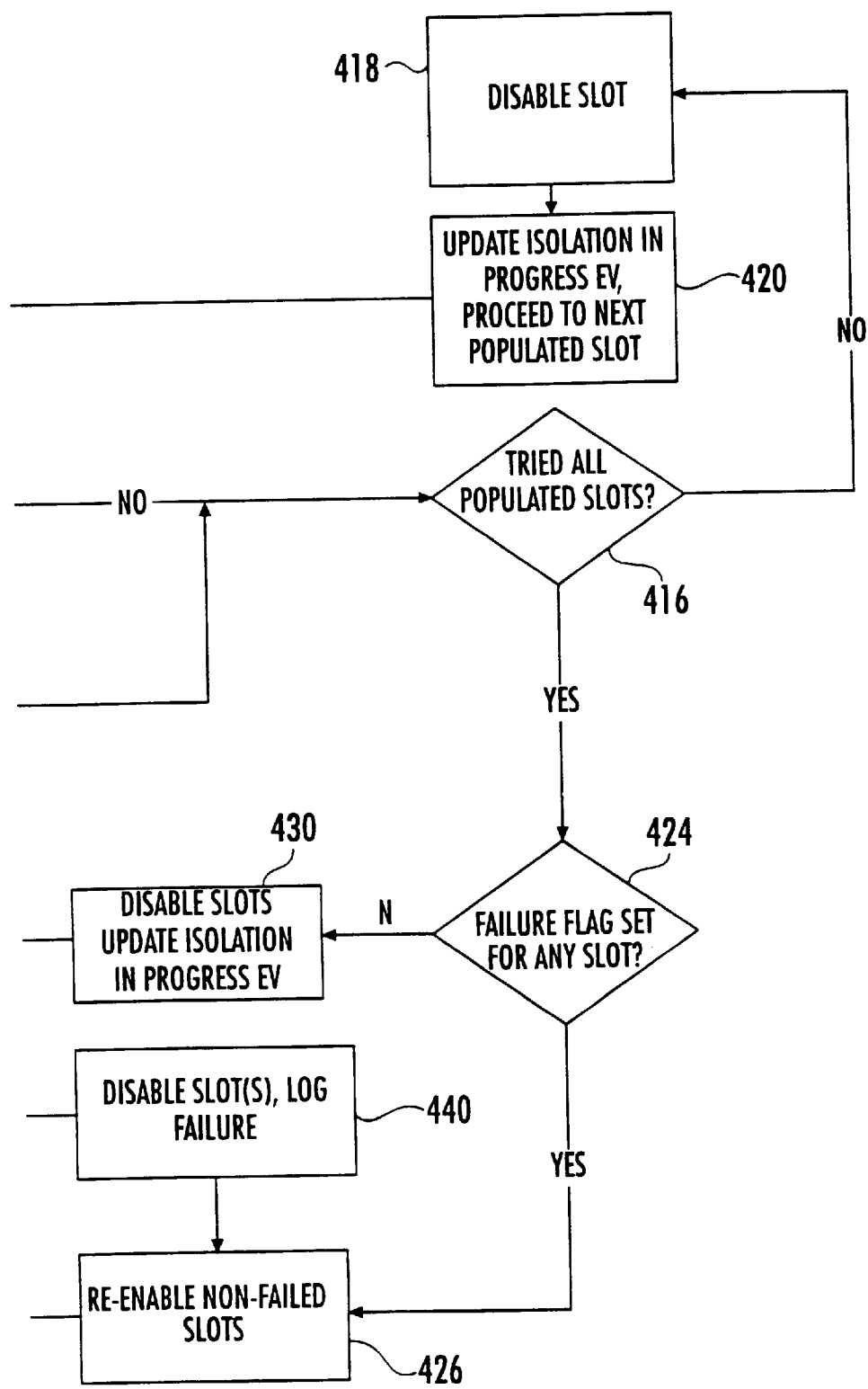

FIG. 39 is a flow diagram of a BIOS isolate routine invoked in response to a bus-hang condition or the computer lock-up event.

Figure 40:
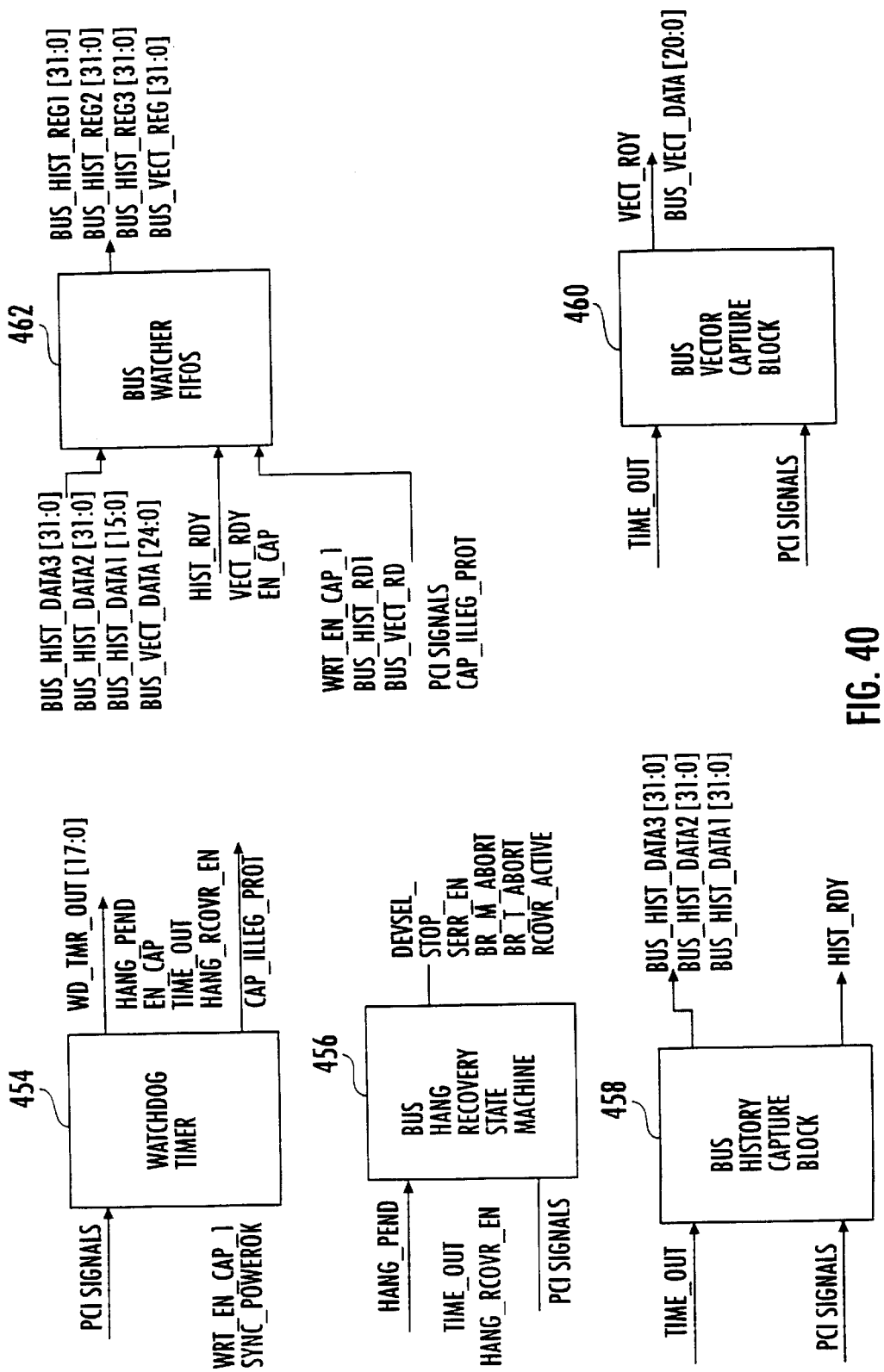

FIG. 40 is a block diagram of a bus watcher in each of the bridge chips.

FIG. 41 is a state diagram of logic in the bus watcher for returning the bus to an idle state.

Figure 42B:
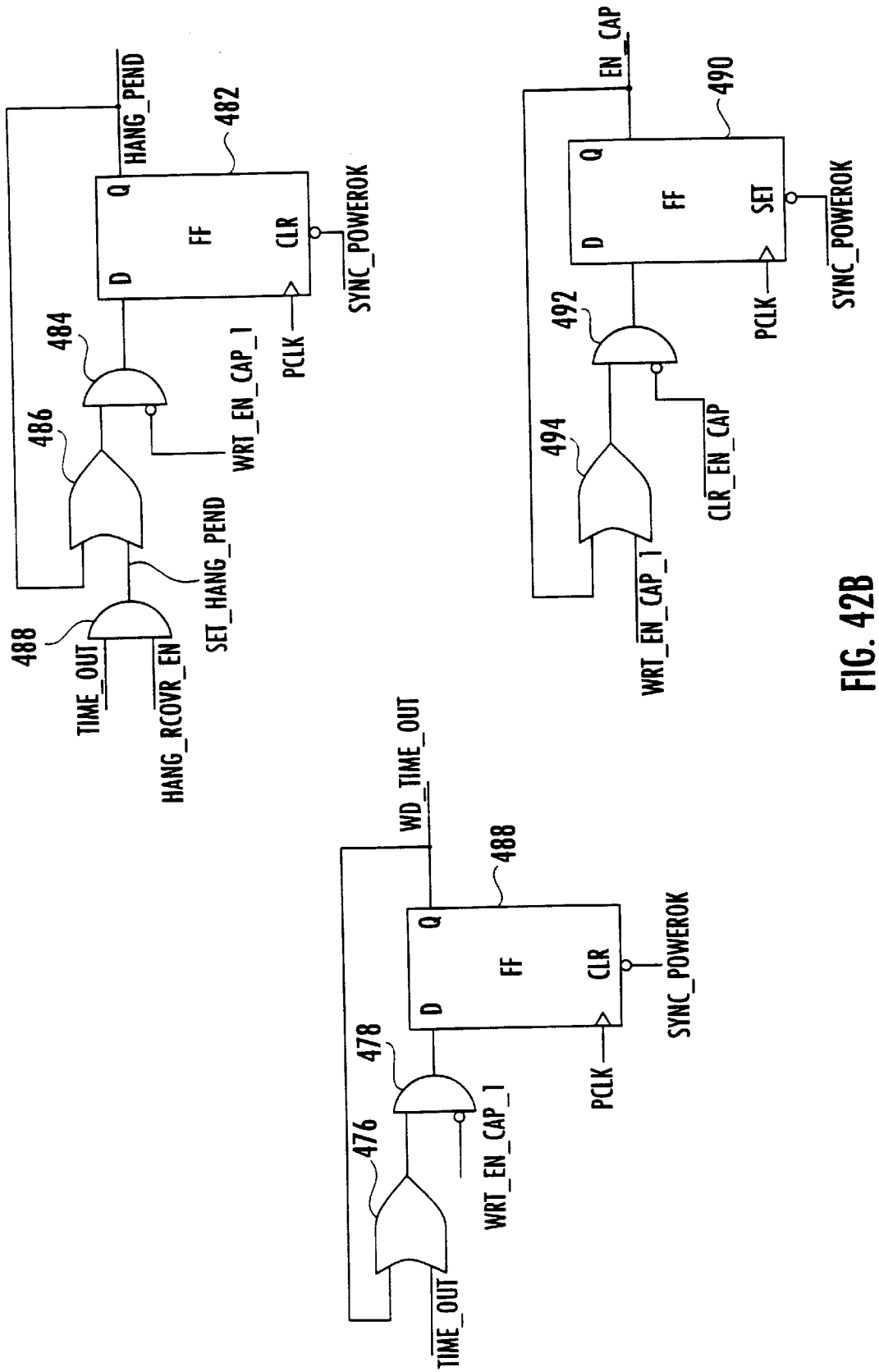

FIG. 42 is a logic diagram of status signals in the bus watcher.

Figure 43:
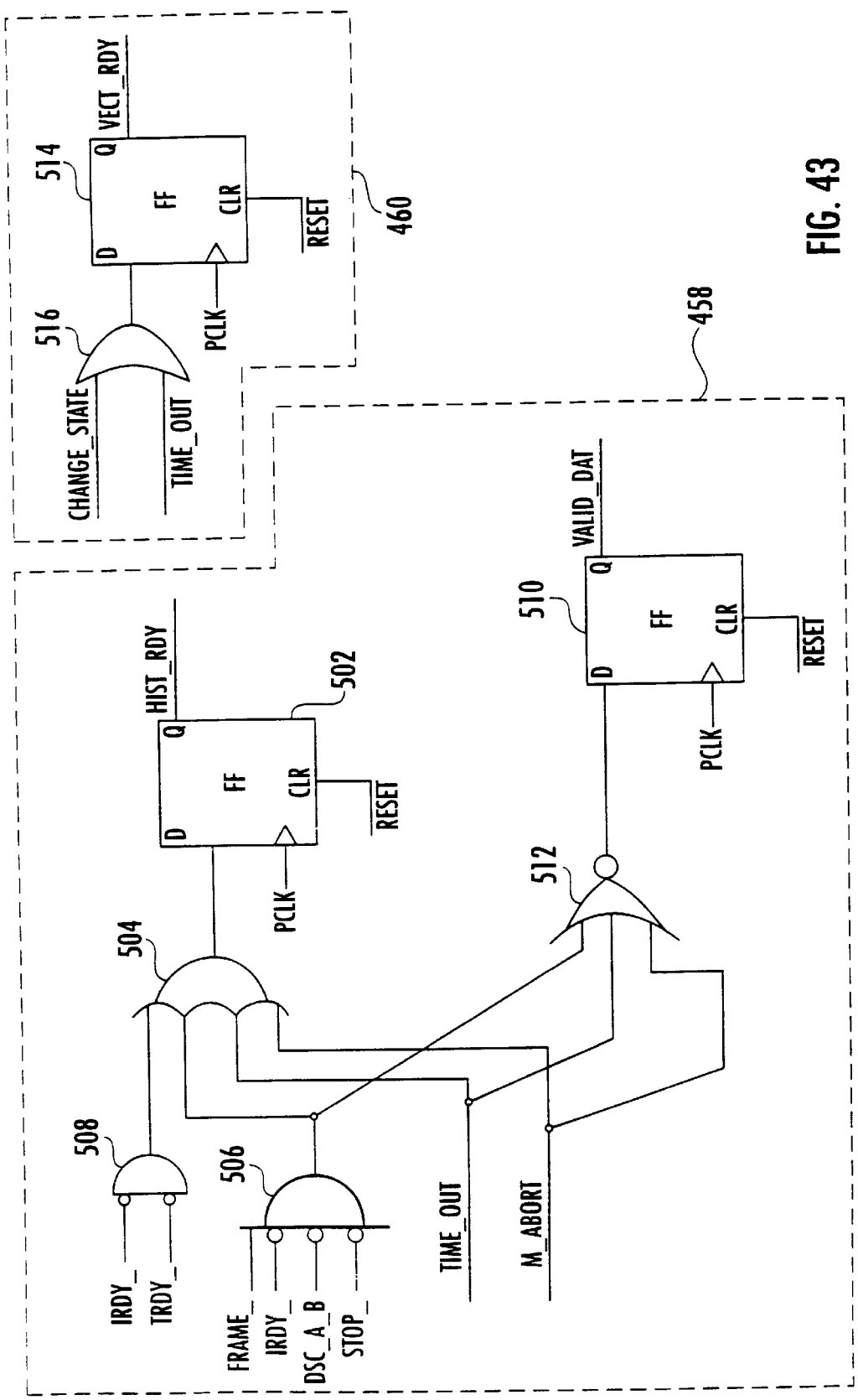

FIG. 43 is a logic diagram of bus history FIFOs and bus state vector FIFOs in the fault isolation circuit.

Figure 44:
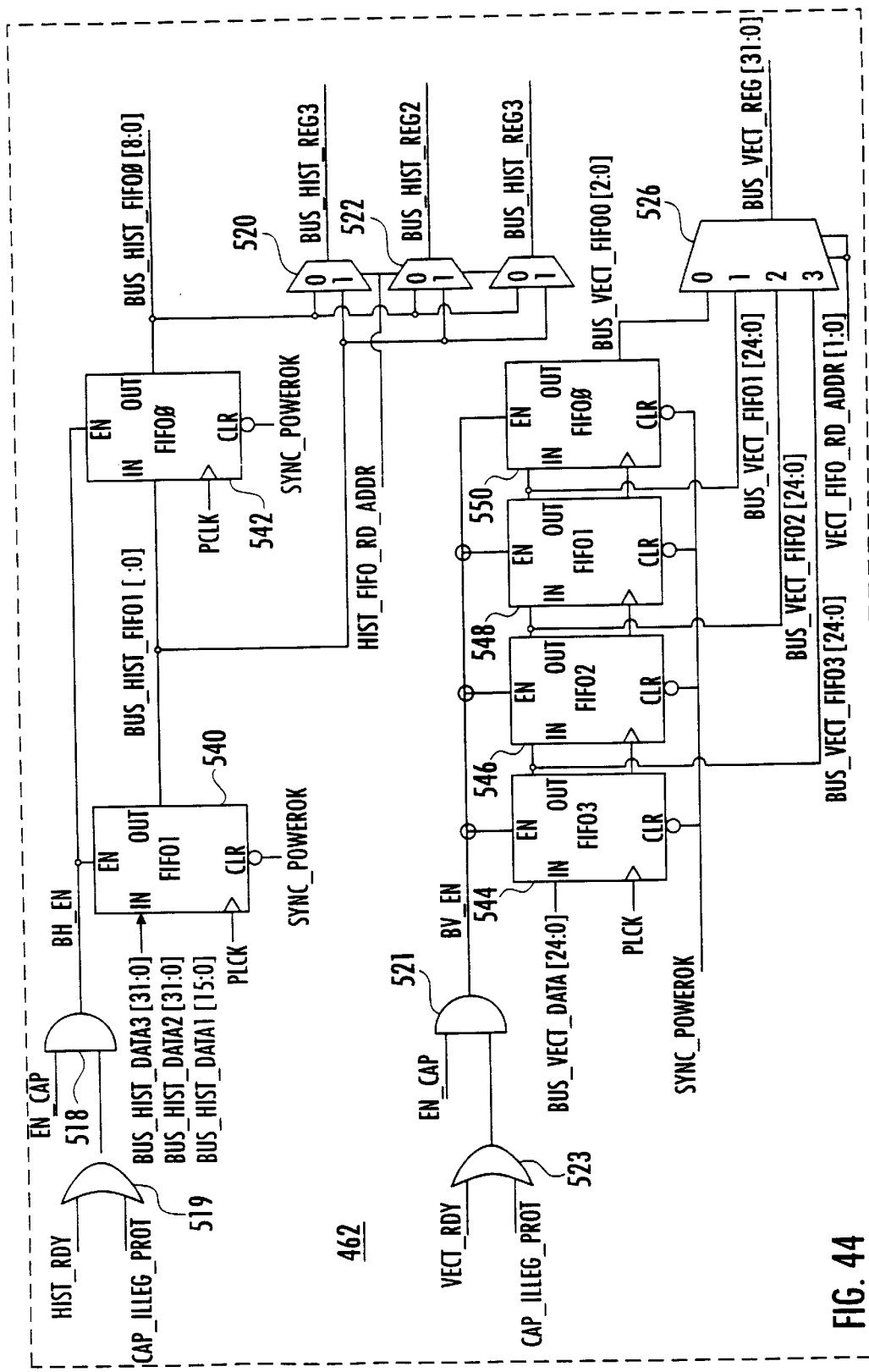

FIG. 44 is a logic diagram of circuitry for generating ready signals for indicating when the bus history and state vector information are available.

Figure 45:
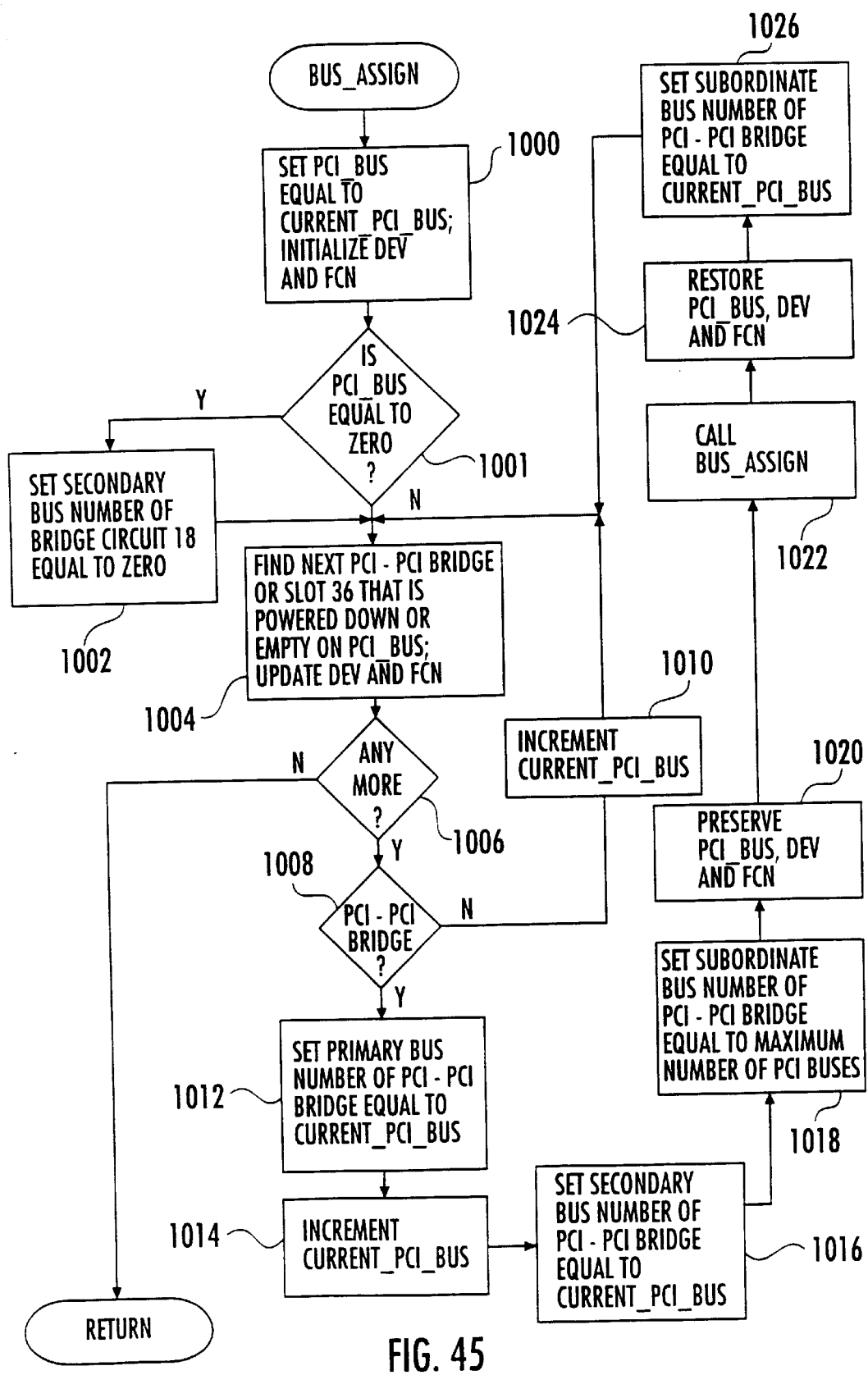

FIG. 45 is a flow diagram of a routine for assigning a bus number to a powered down or empty slot.

Figure 46:
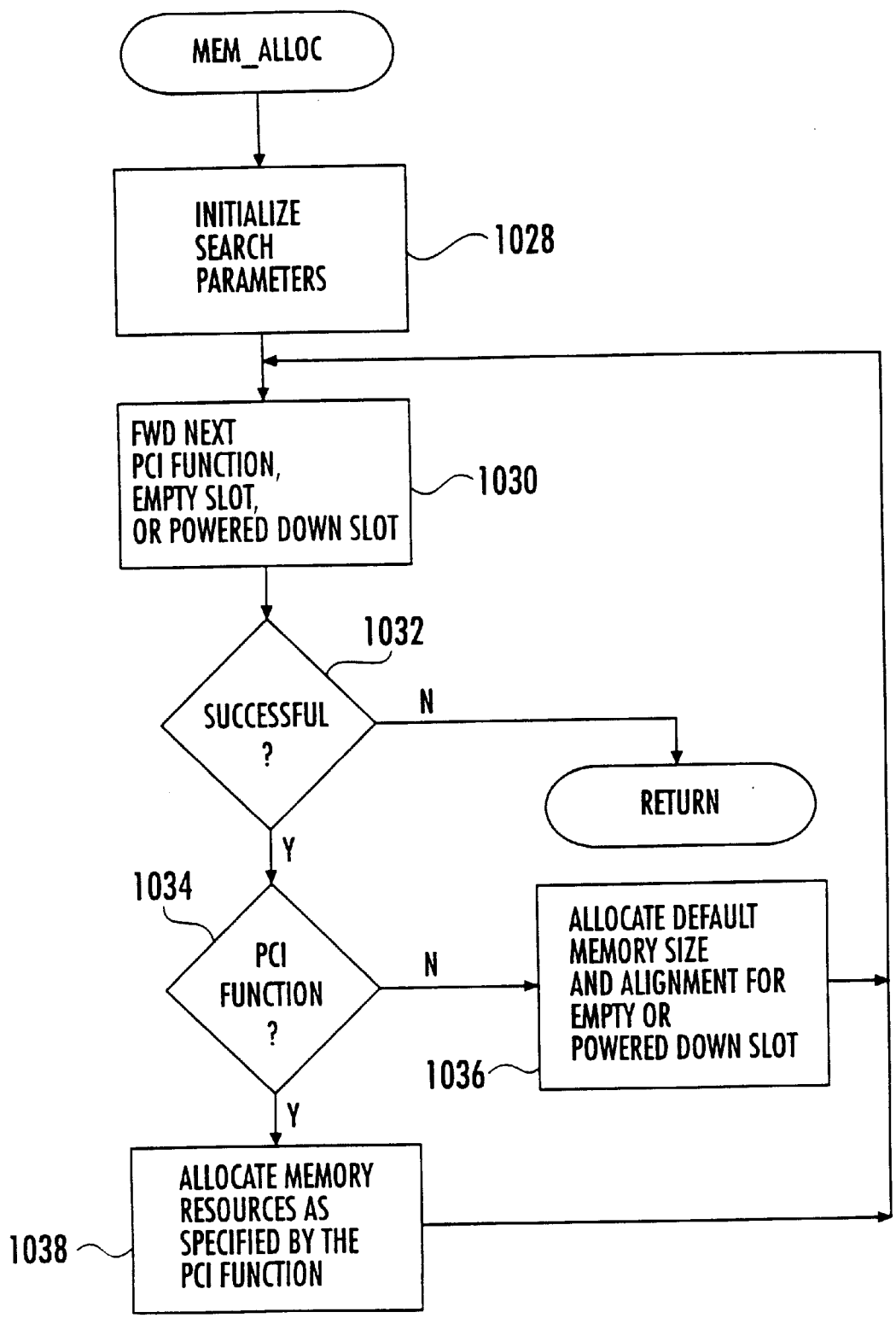

FIG. 46 is a flow diagram of a routine for allocating memory space for the computer system.

Figure 47:
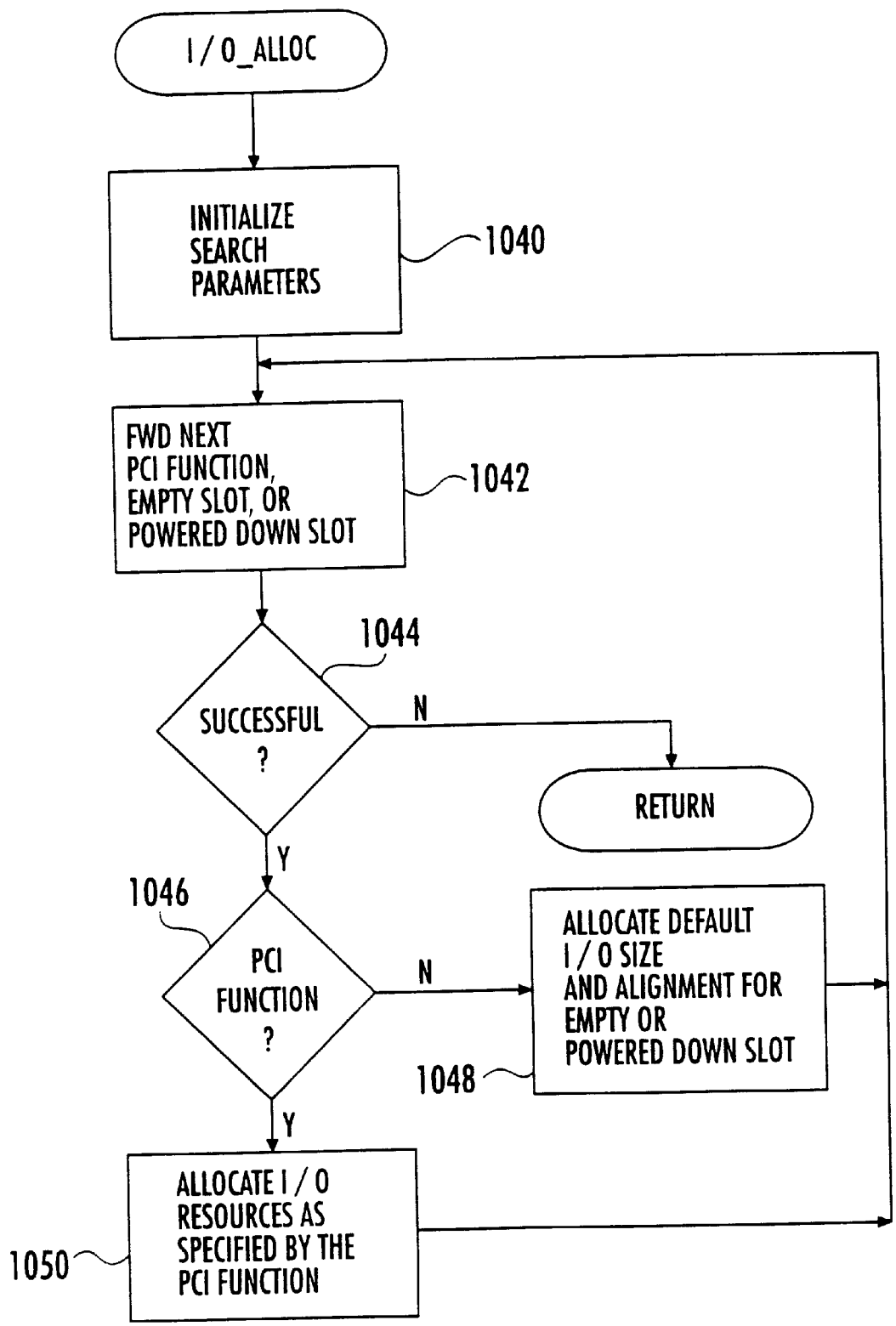

FIG. 47 is a flow diagram of a routine for allocating I/O space for the computer system.

Figure 48:
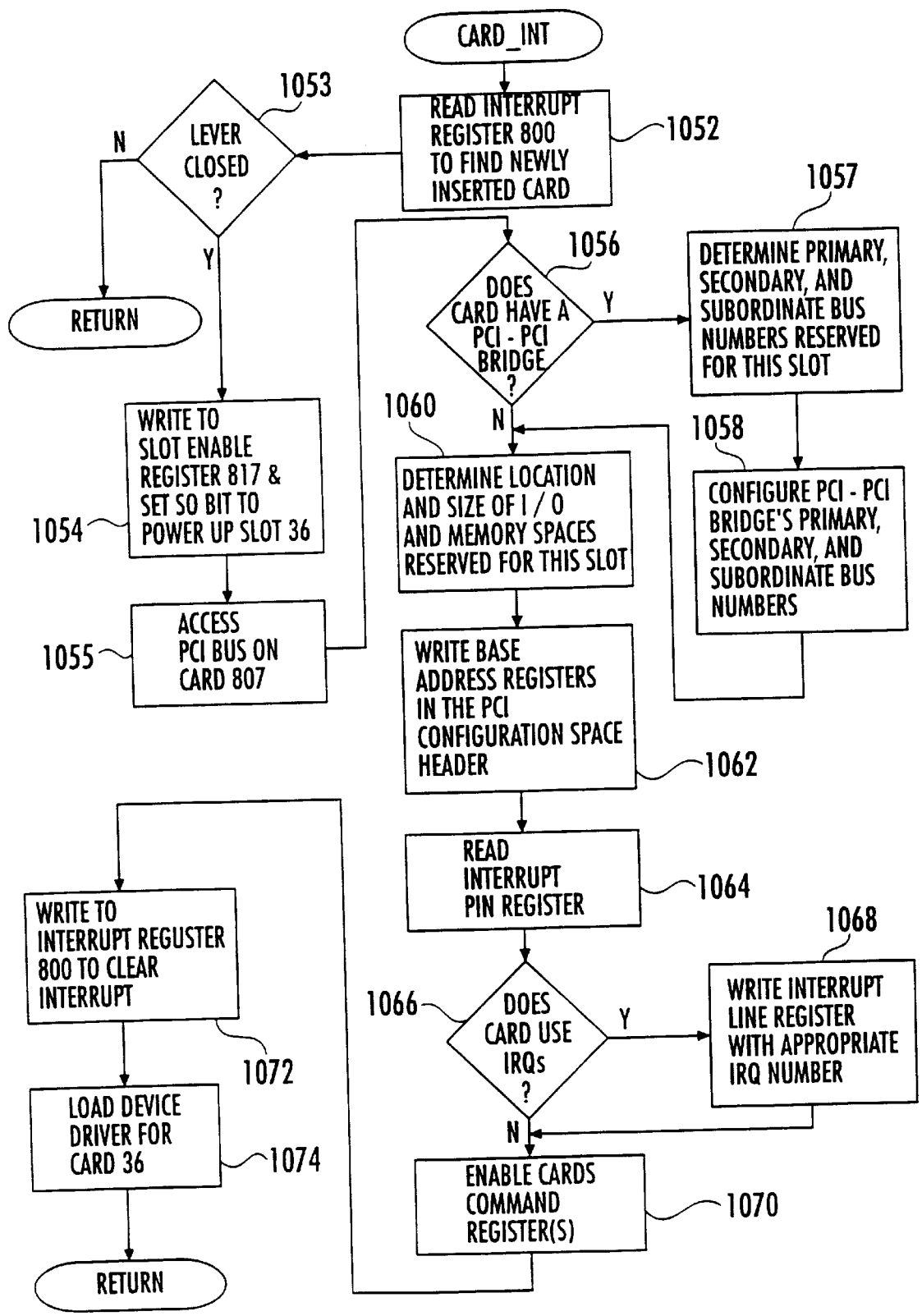

FIG. 48 is a flow diagram of a routine for handling a recently powered up card.

Figure 49:
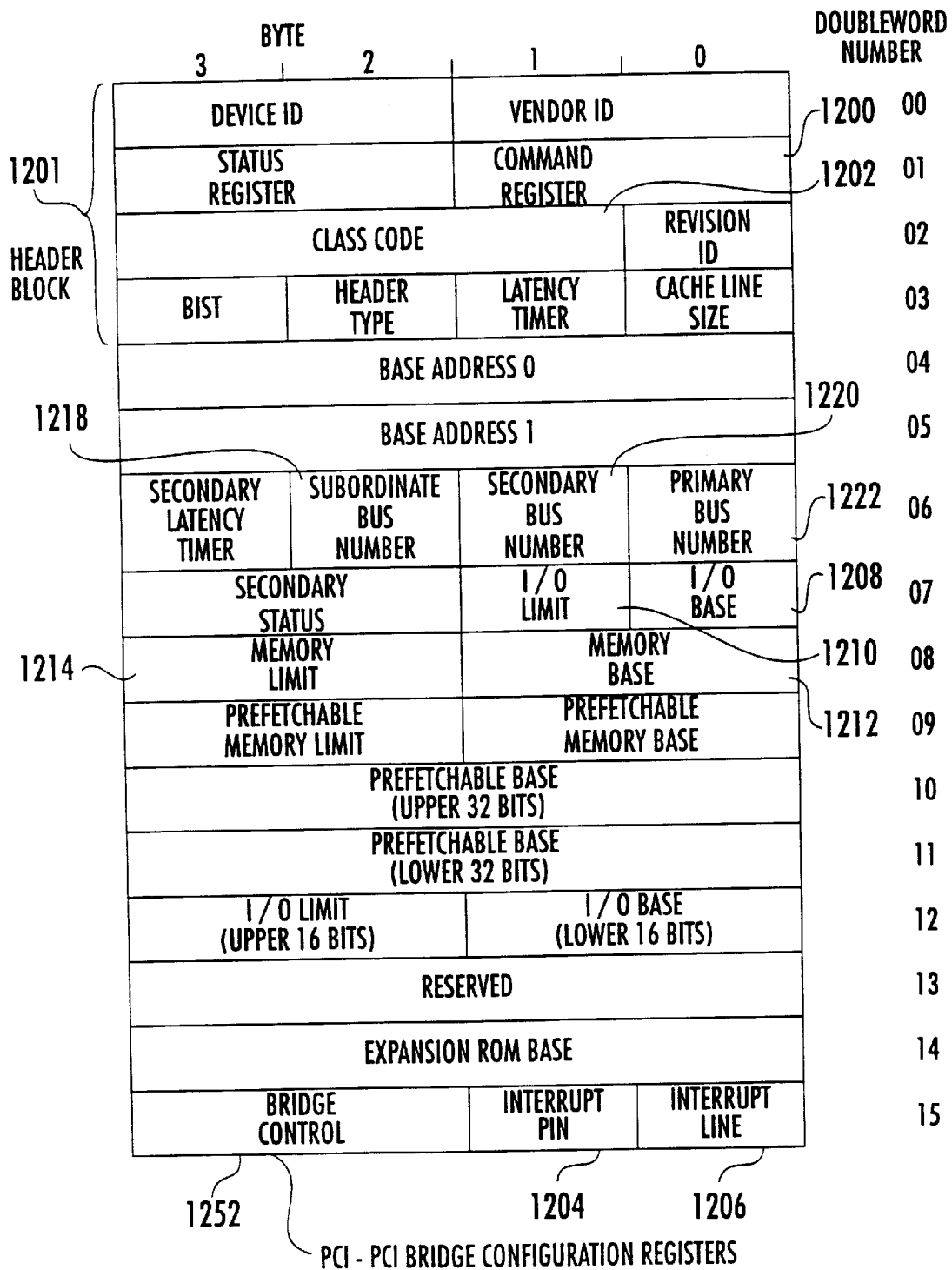

FIG. 49 is a block diagram of configuration space for a PCI—PCI bridge circuit.

Figures 50A, 50B:
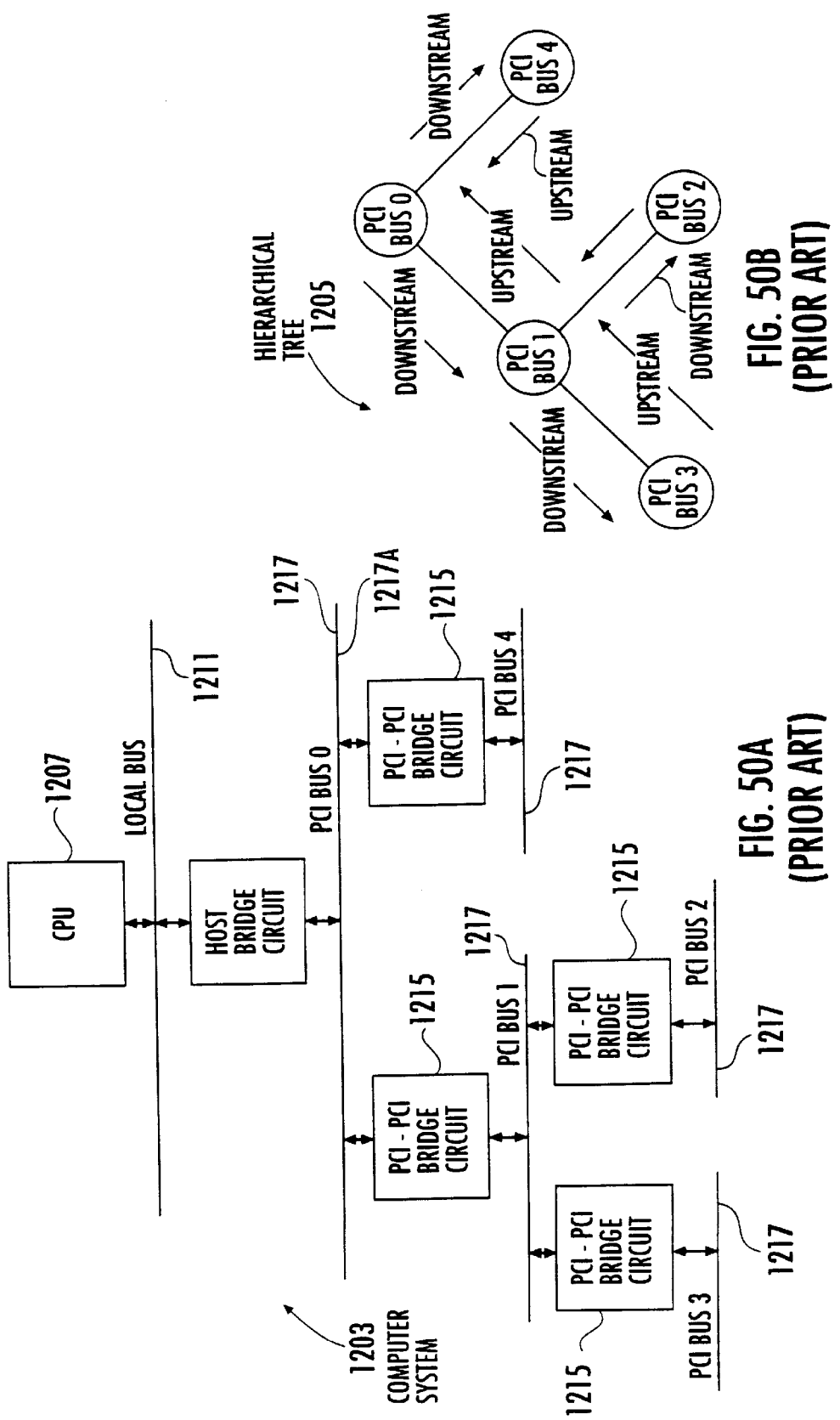

FIG. 50A is a block diagram of a computer system.

FIG. 50B is a bus number assignment tree.

Figure 51:
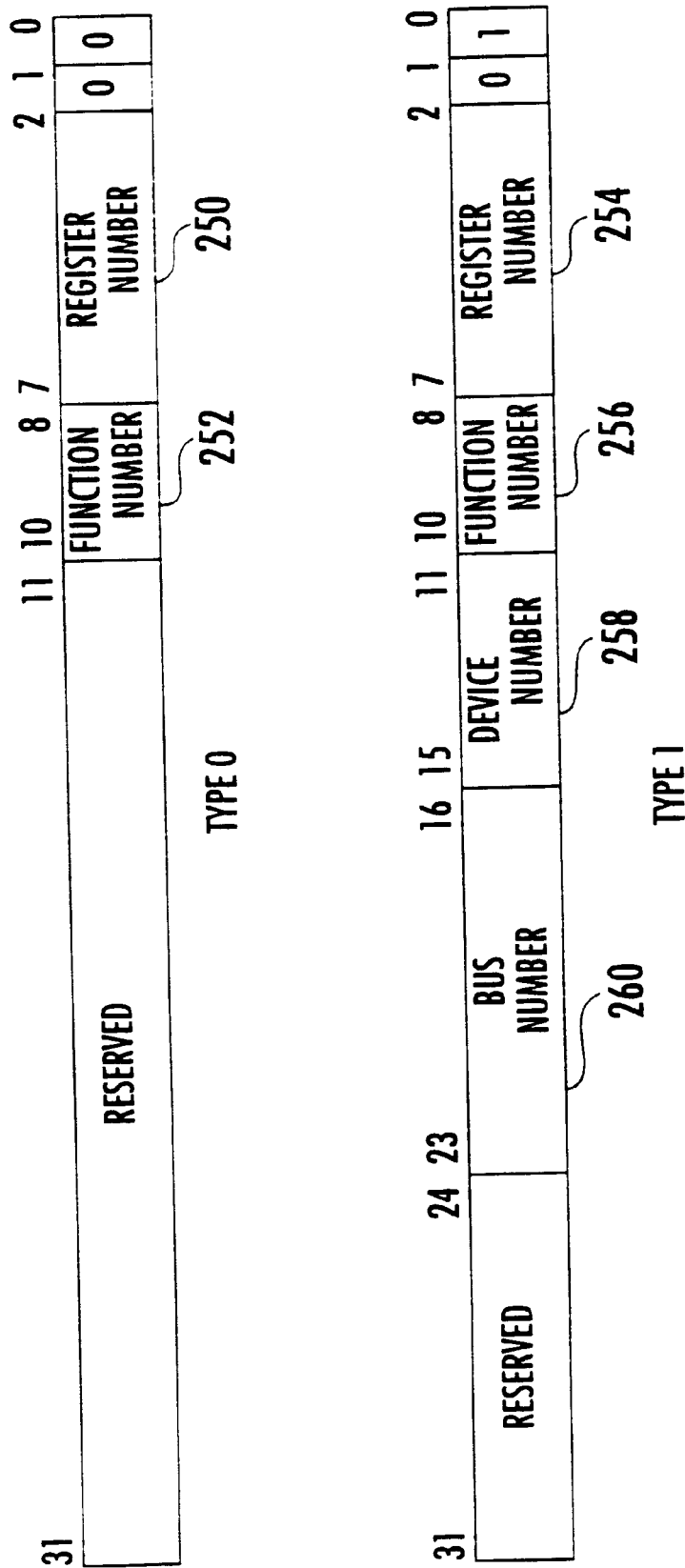

FIG. 51 is a block diagram showing type 0 and type 1 configuration transactions.

FIG. 52 is a table showing mapping of address from a primary bus to a secondary bus.

Figure 53A:
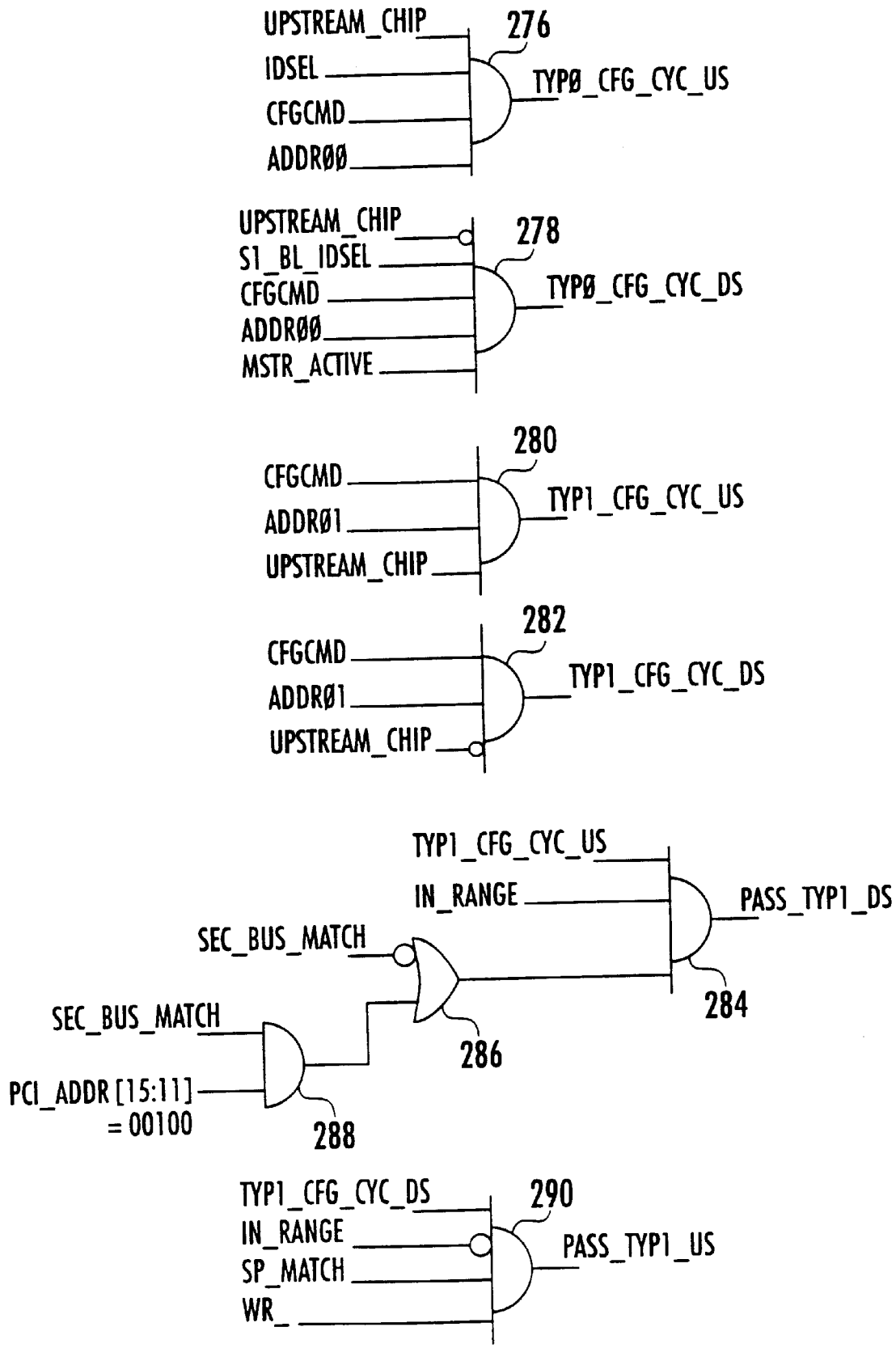
Figure 53B:
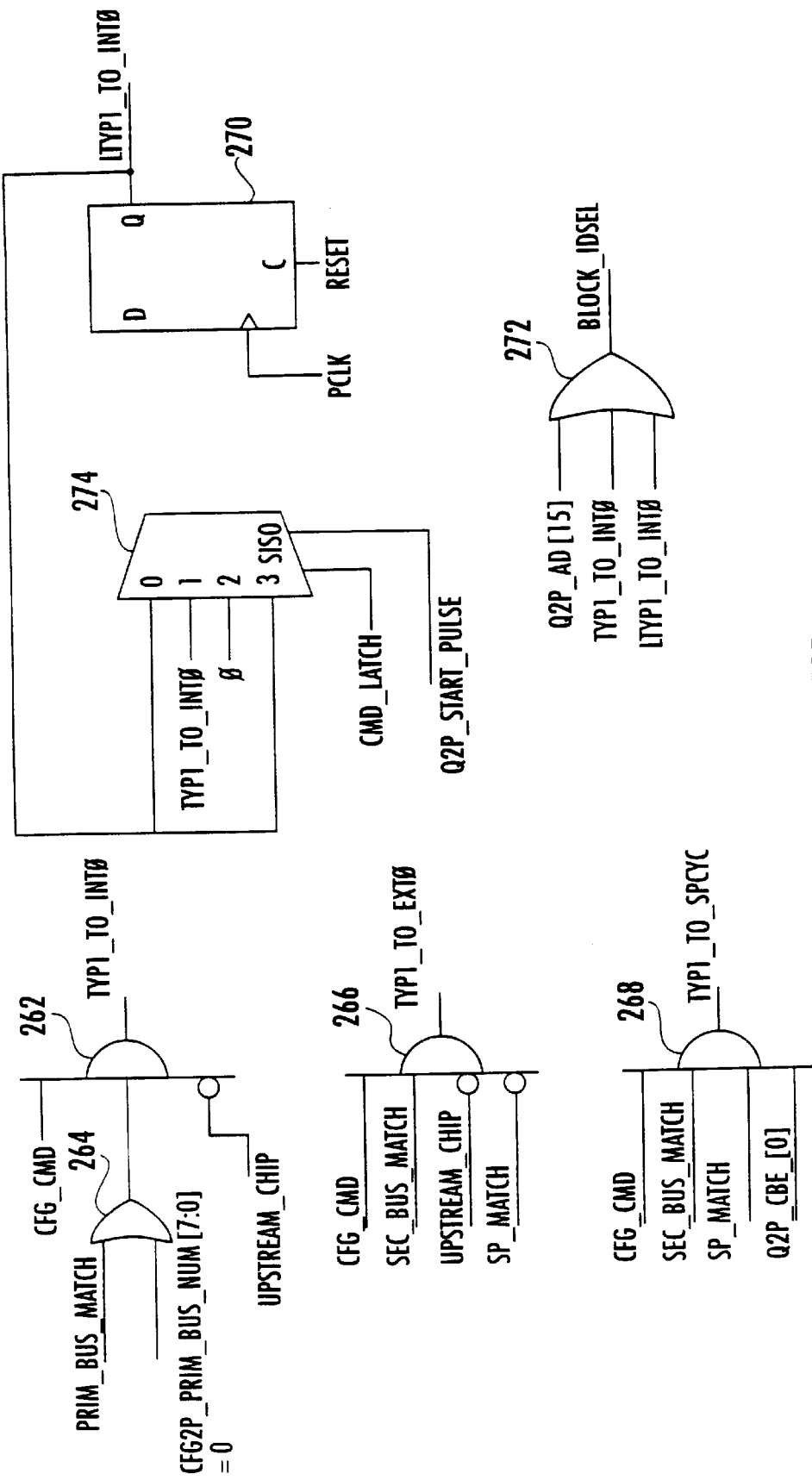

FIGS. 53A and 53B are a logic diagram of circuitry for handling type 0 and type 1 configuration cycles.

Figure 54A:
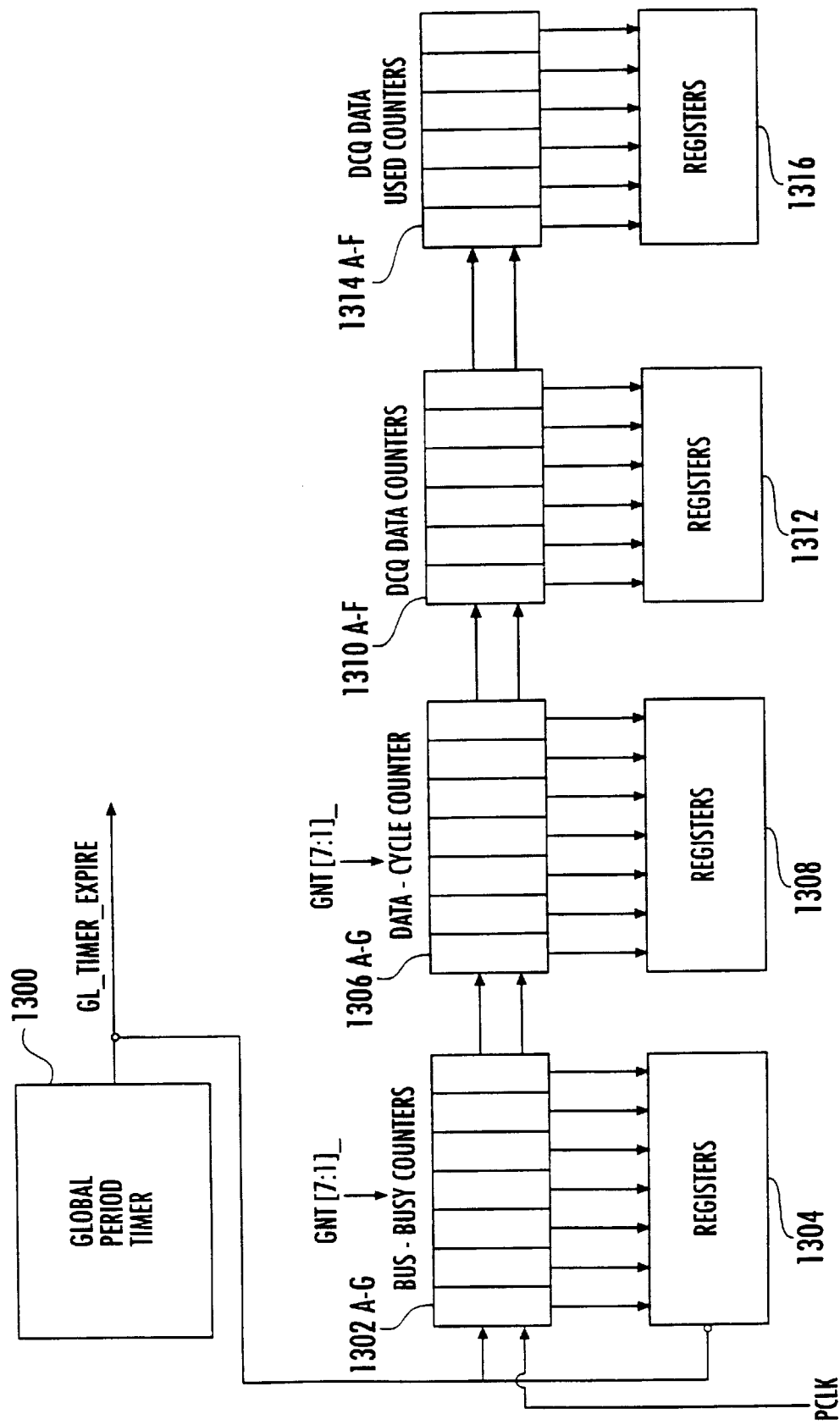

FIG. 54A is a block diagram of circuitry for storing information to allow calculation of bus performance parameters.

Figure 54B:
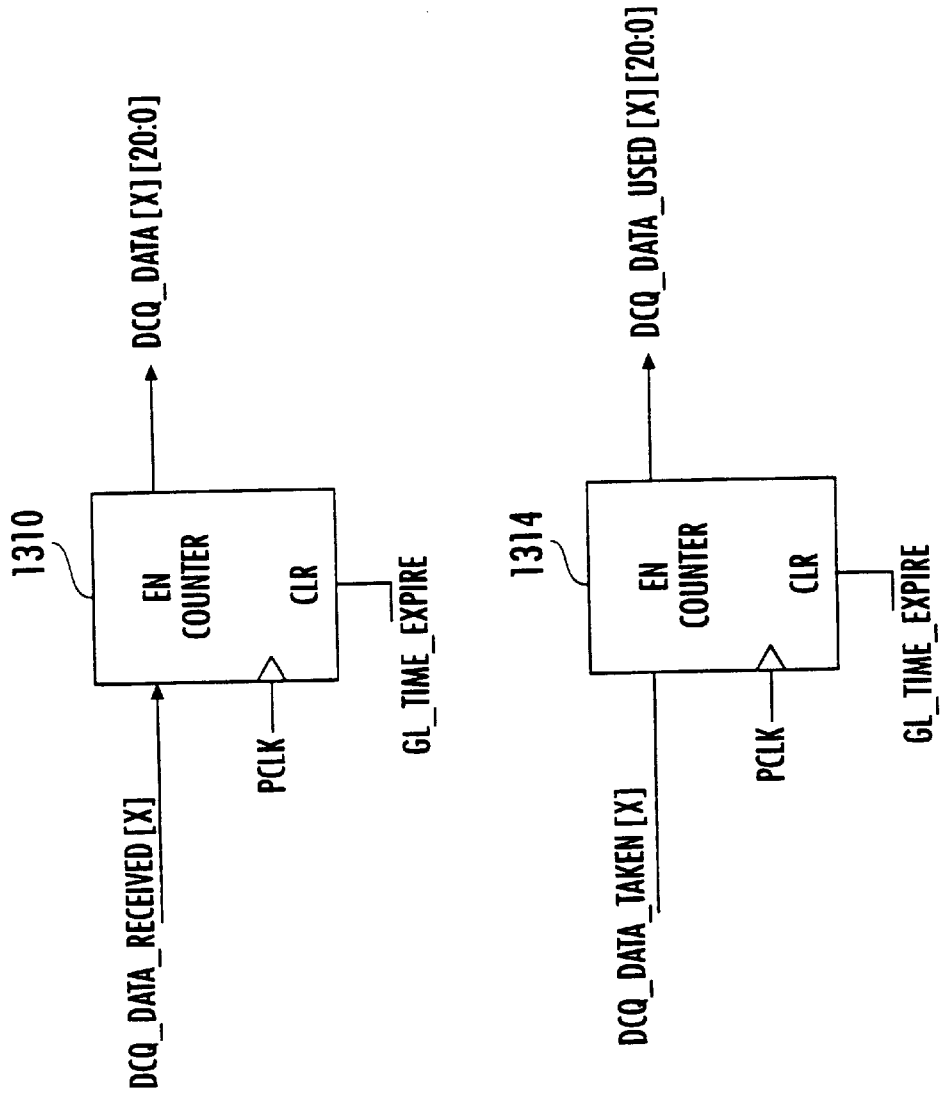

FIG. 54B is a block diagram of prefetch counters.

Figure 55:
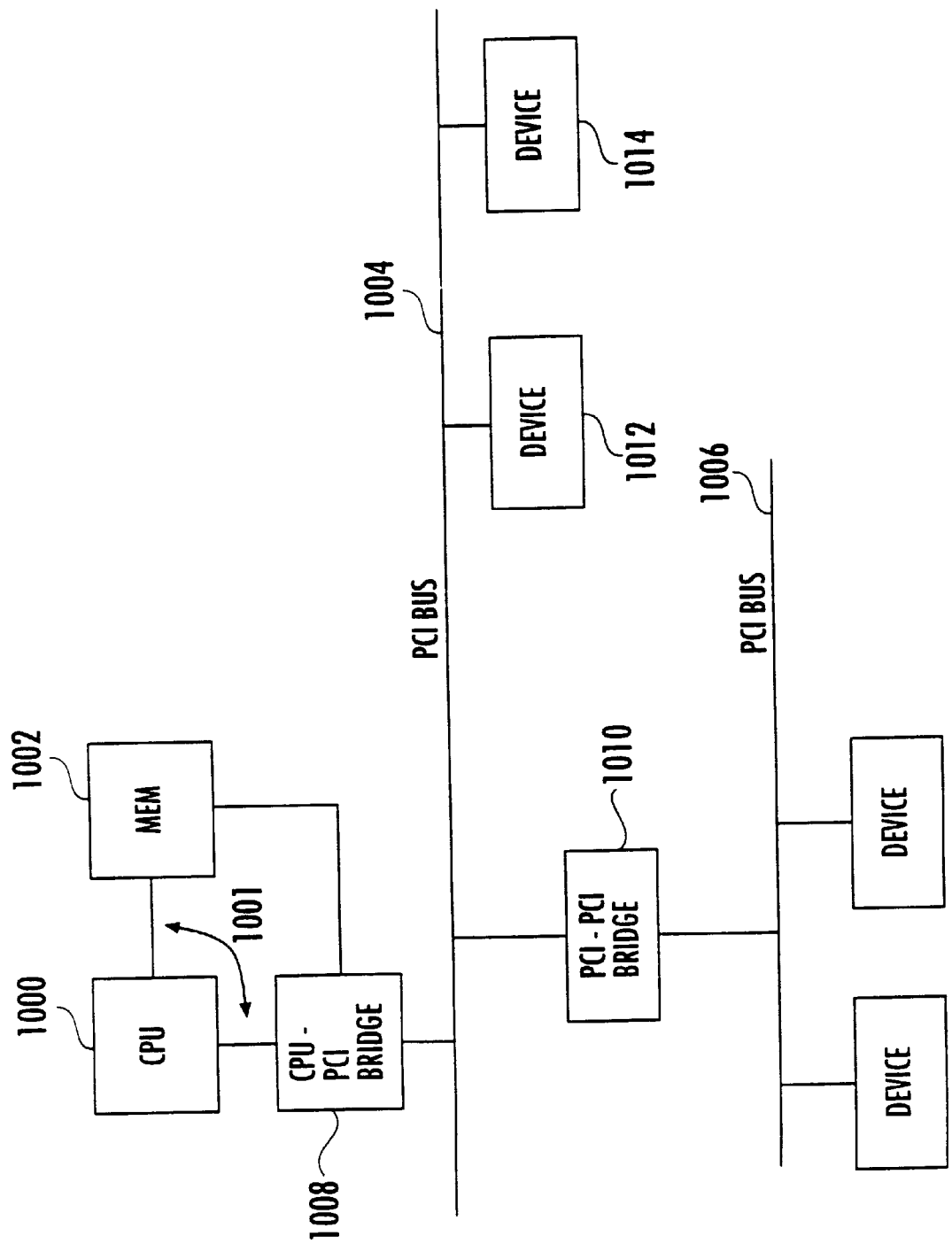

FIG. 55 is a block diagram of a computer system.

Figure 56:
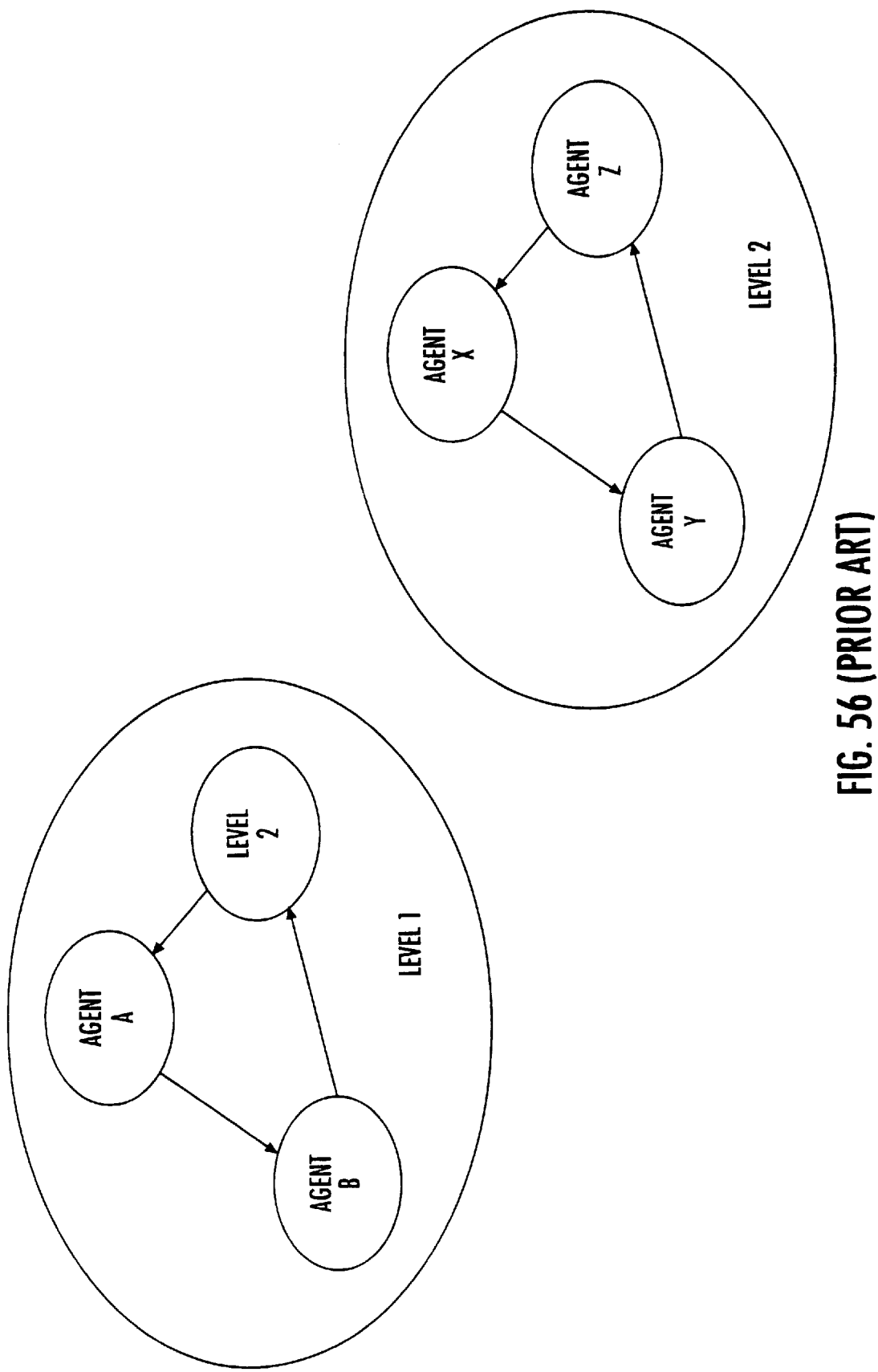

FIG. 56 is a block diagram of a PCI arbitration scheme.

Figure 57:
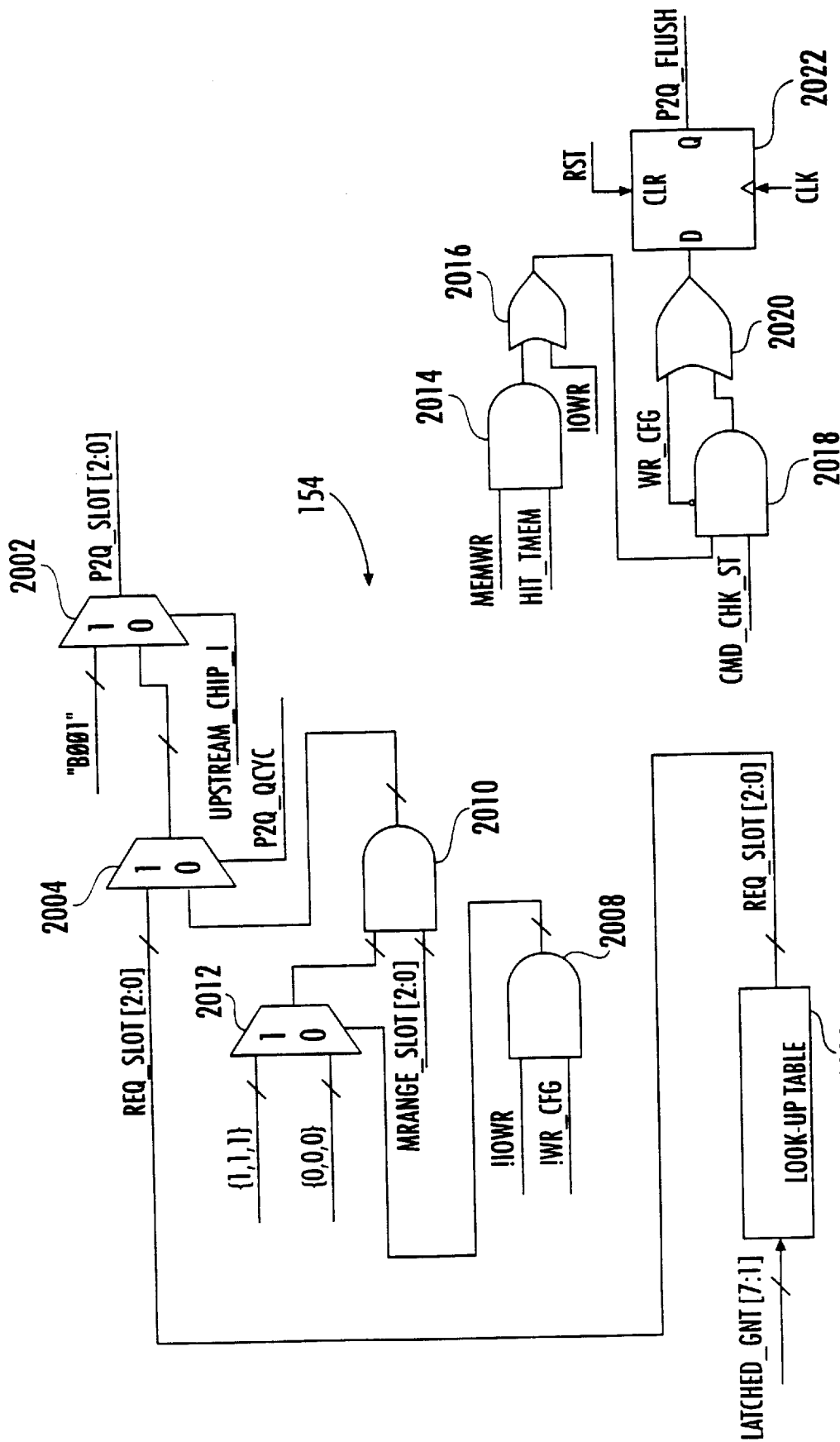

FIG. 57 is a schematic diagram of a buffer flush logic block.

Figure 58:
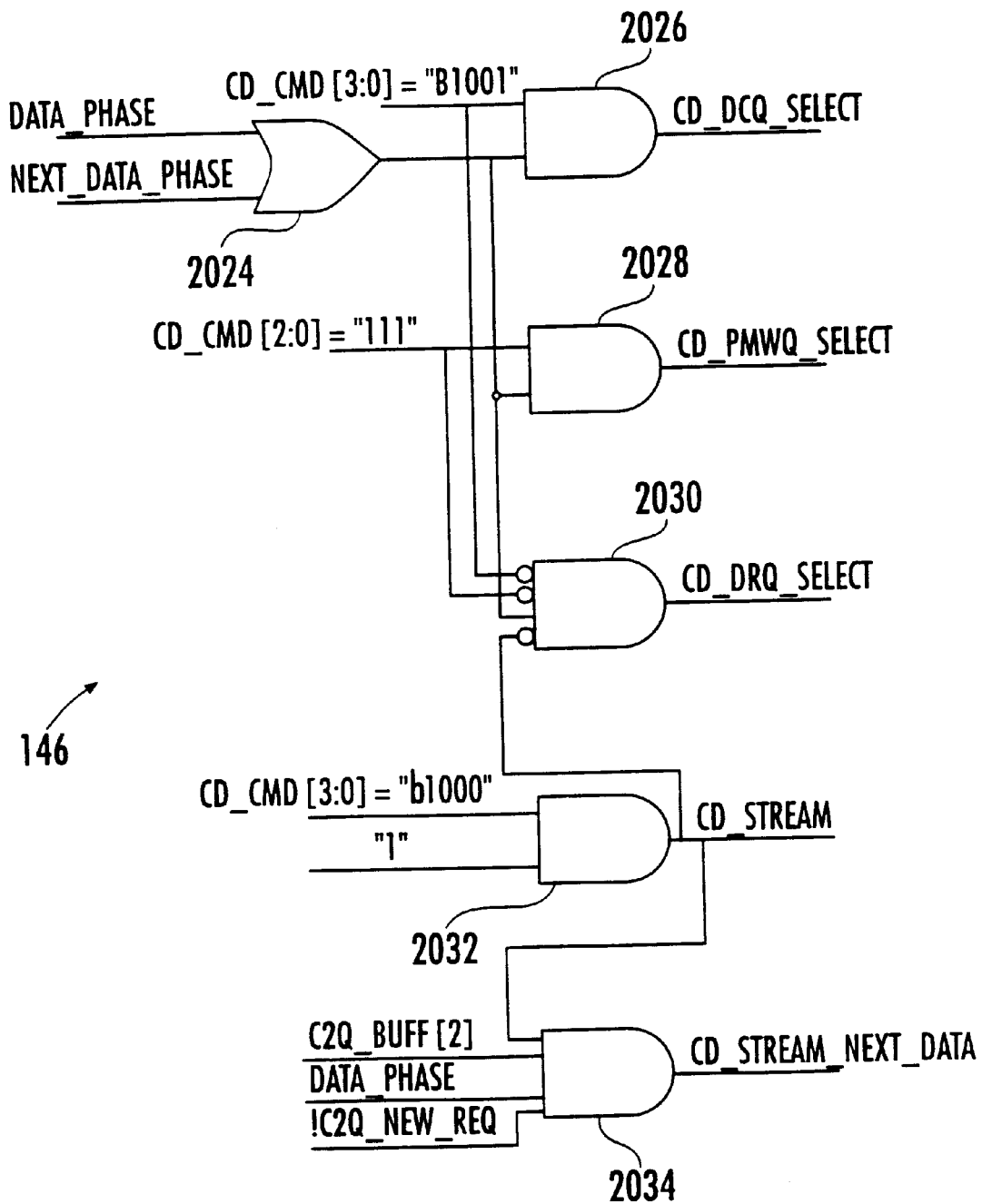

FIG. 58 is a schematic diagram of a cable decoder.

FIGS. 59–62 are schematic diagrams of a posted memory write queue, including control logic.

Figure 63:
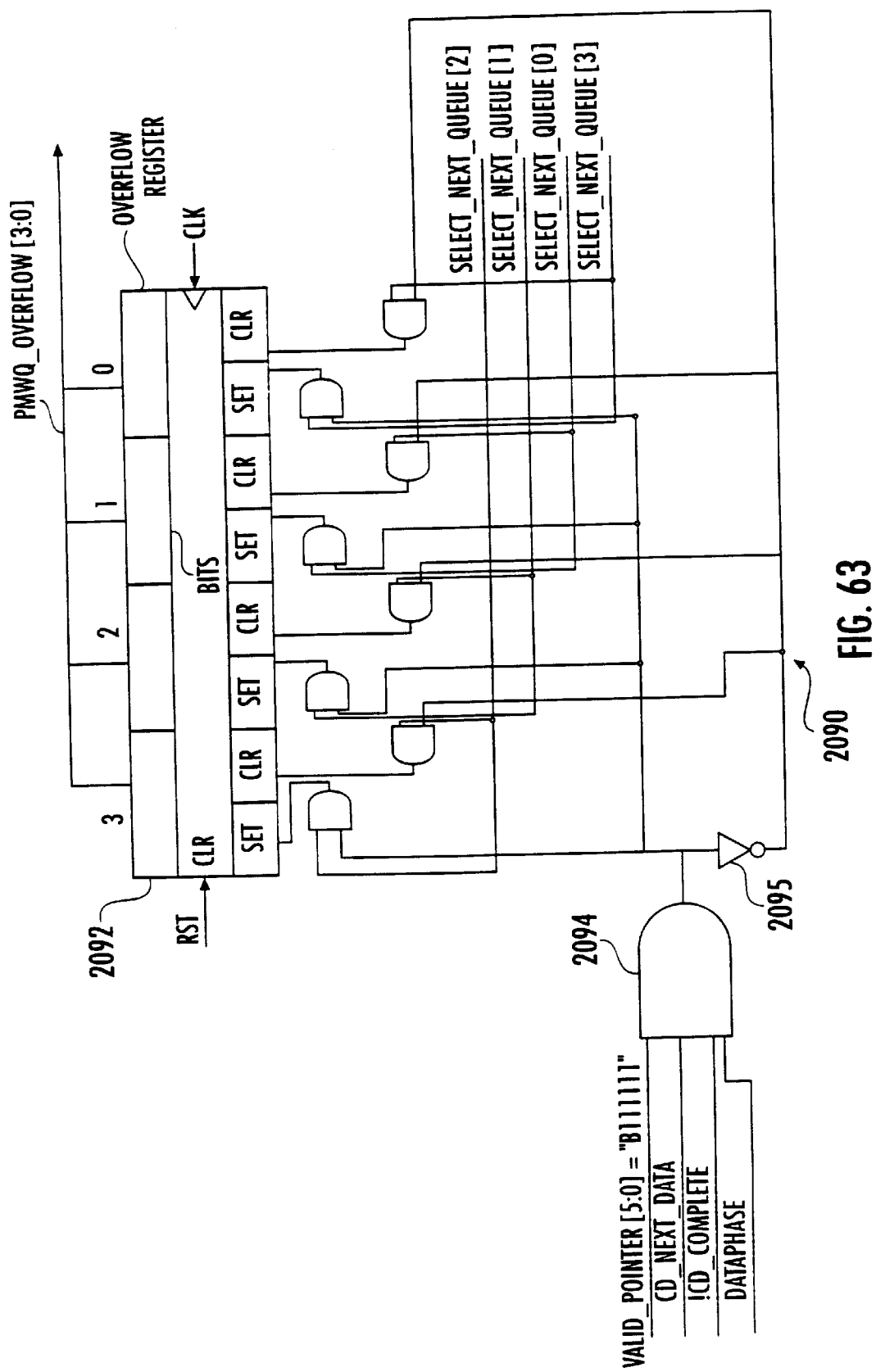
Figure 64:
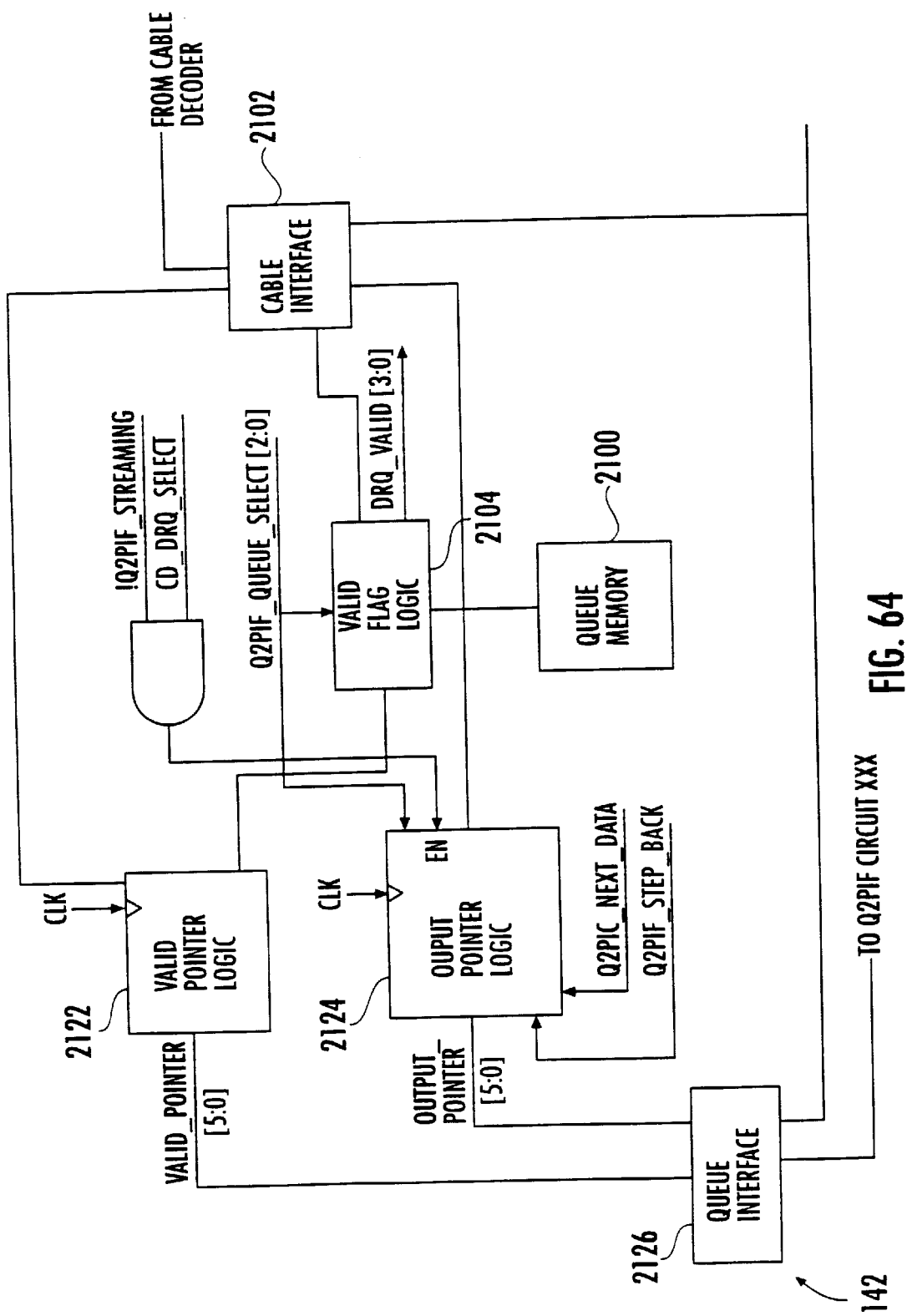
Figure 65:
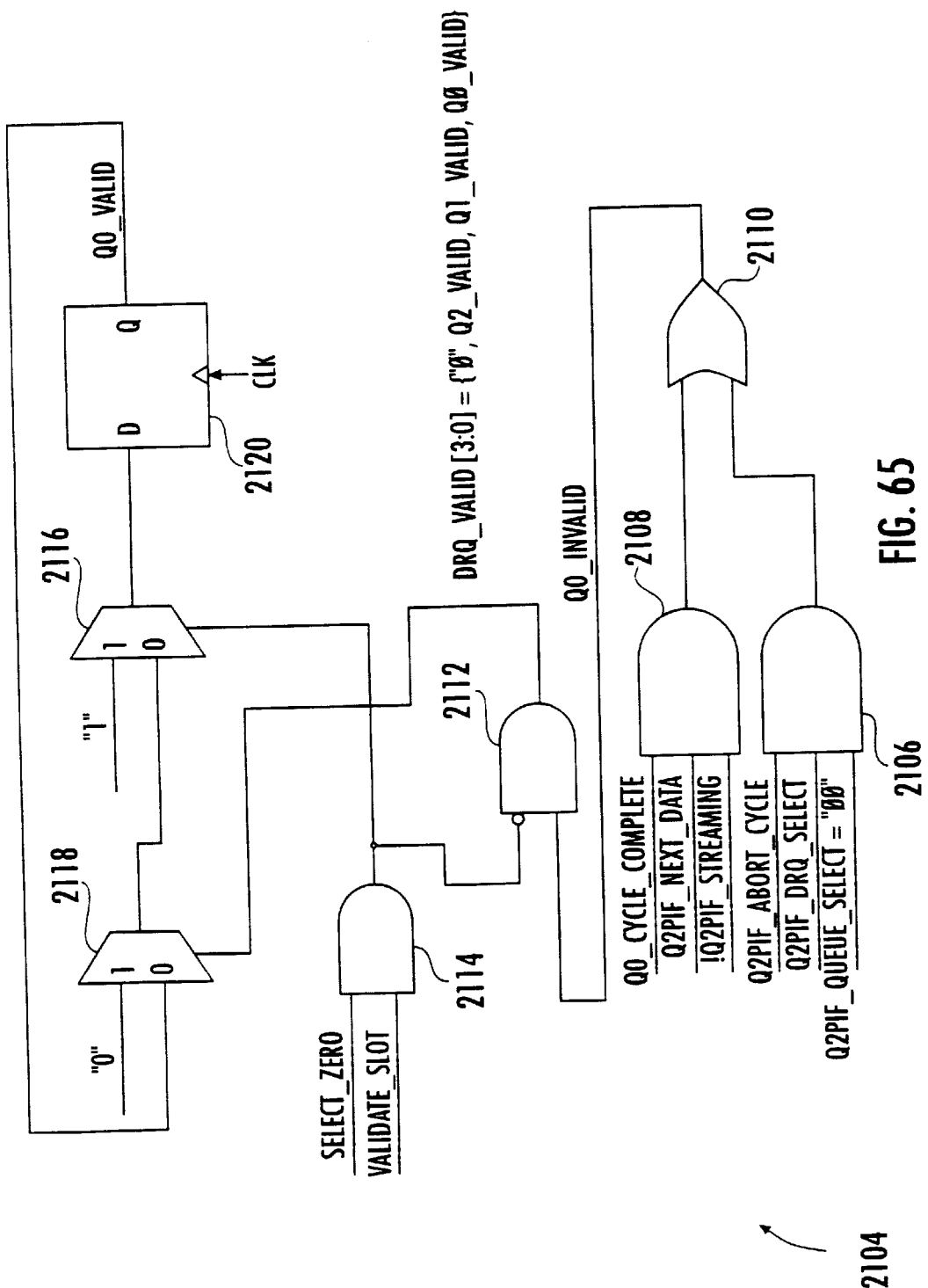

FIGS. 63–65 are schematic diagrams of a delayed request queue, including control logic.

FIGS. 66–69b are schematic diagrams of a delayed completion queue, including control logic.

FIGS. 70–74 are schematic diagrams and a table of a master cycle arbiter.

FIGS. 75–87 are schematic and state transition diagrams of a queue-block-to-PCI-bus interface.

Figure 88:
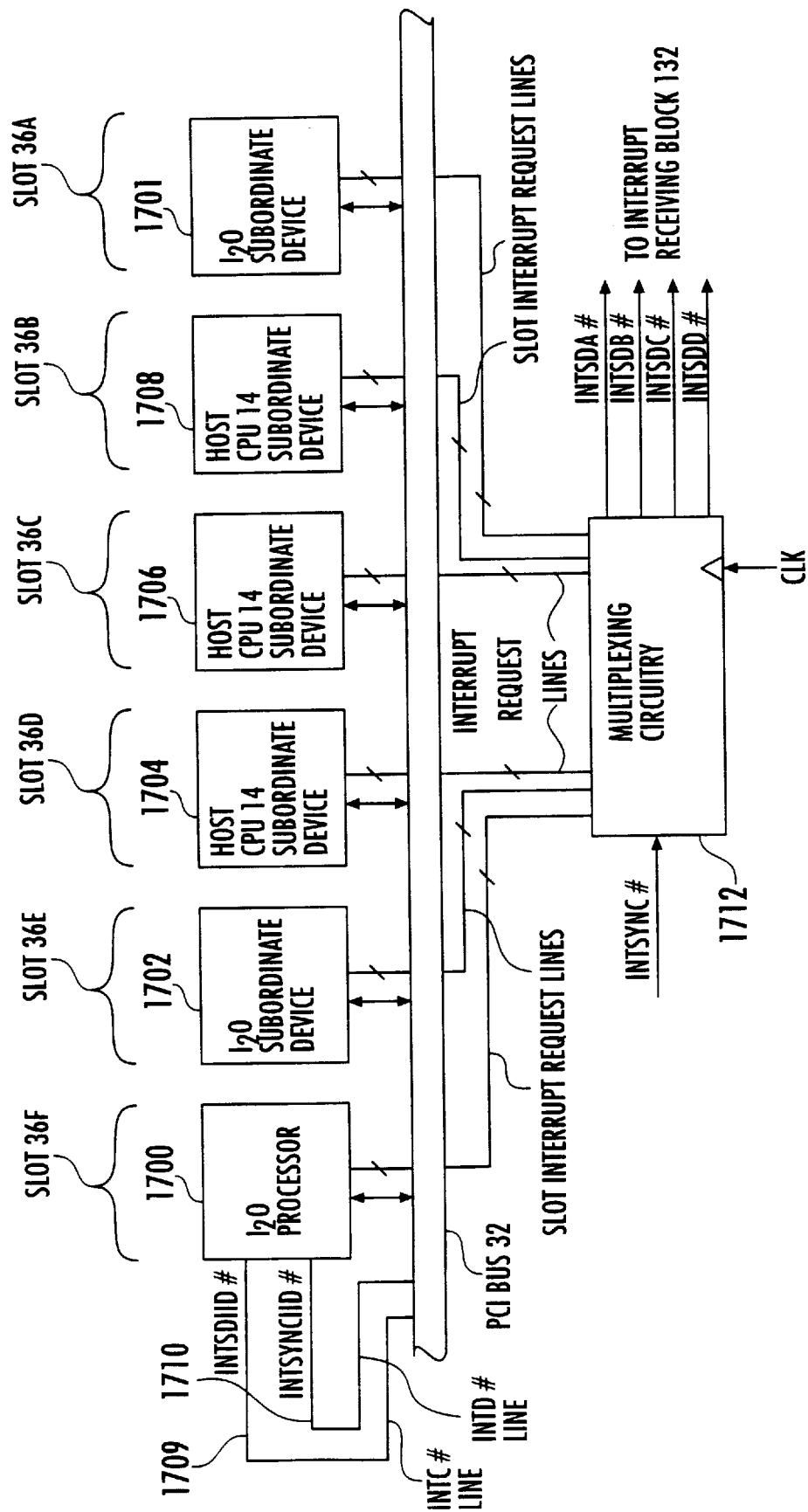

FIG. 88 is a schematic block diagram showing bus devices connected to an expansion bus.

Figure 89:
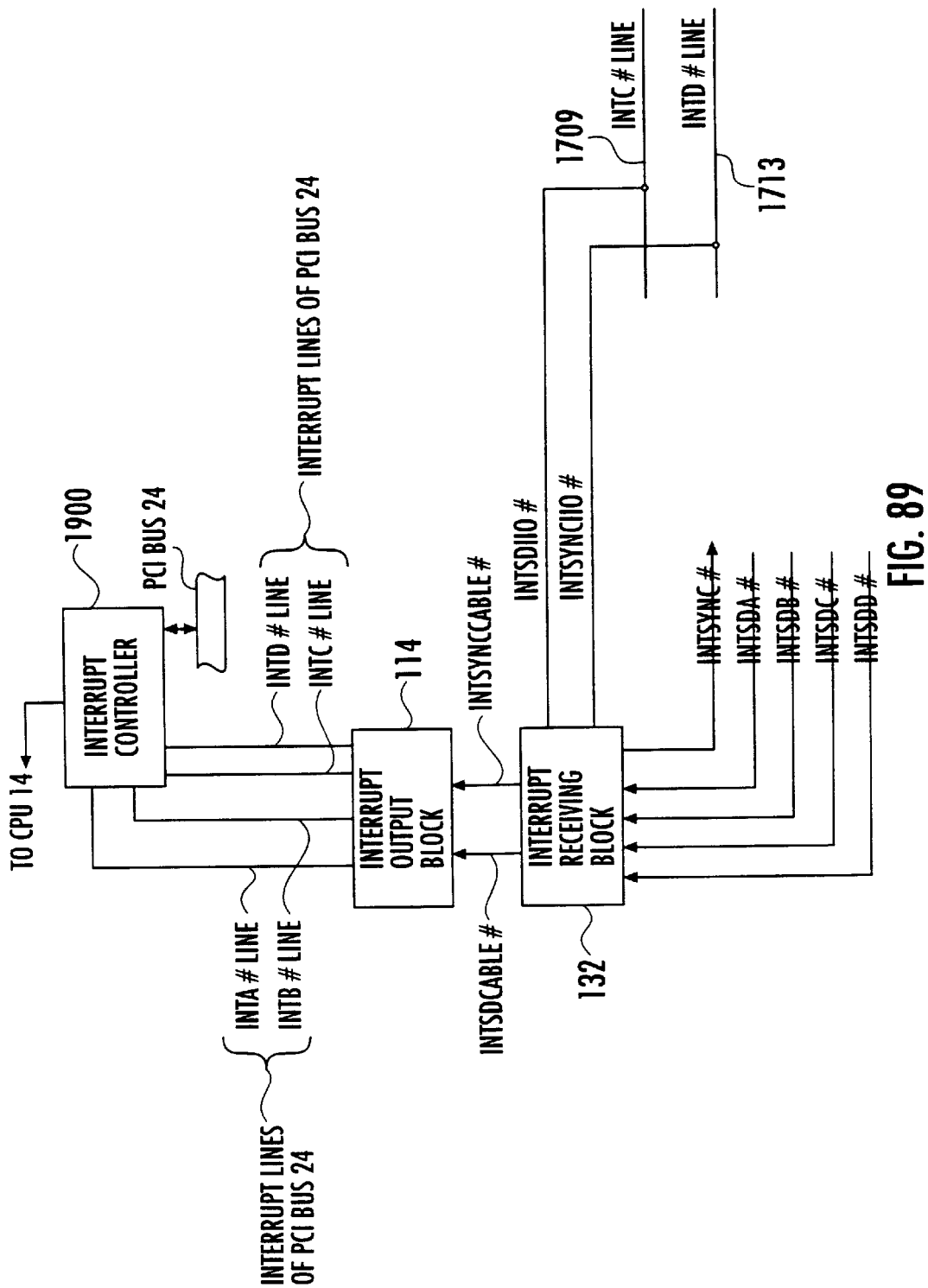

FIG. 89 is a schematic block diagram showing circuitry to route interrupt requests.

Figure 90:
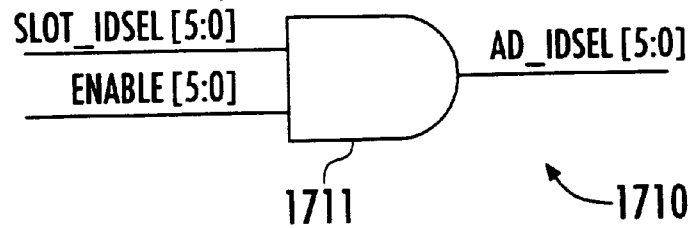
Figure 91:
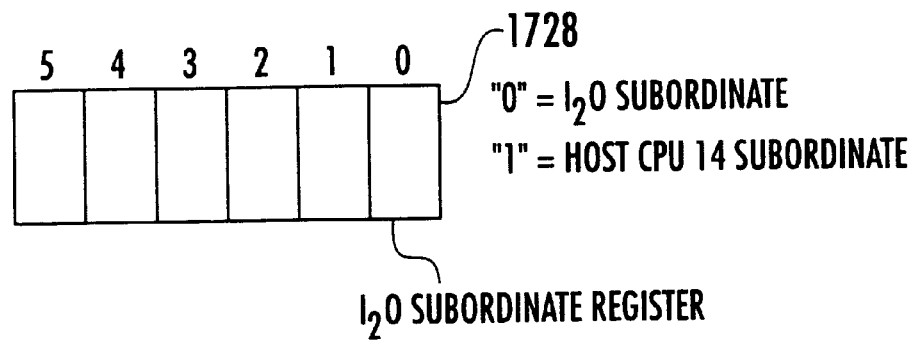
Figure 92:
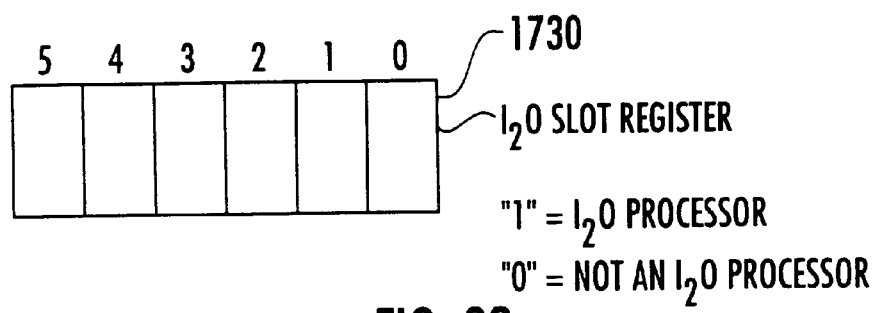
Figure 93:
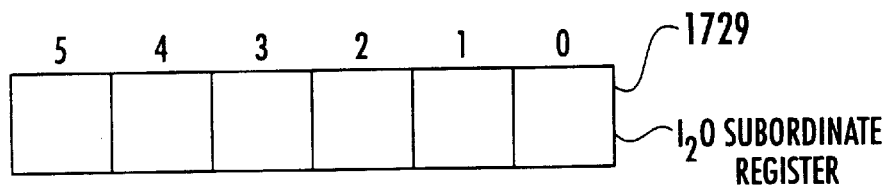
Figure 94:

FIG. 90 is a schematic diagram of device select logic.

FIGS. 91–94 are schematic block diagrams of registers.

Figure 95A:
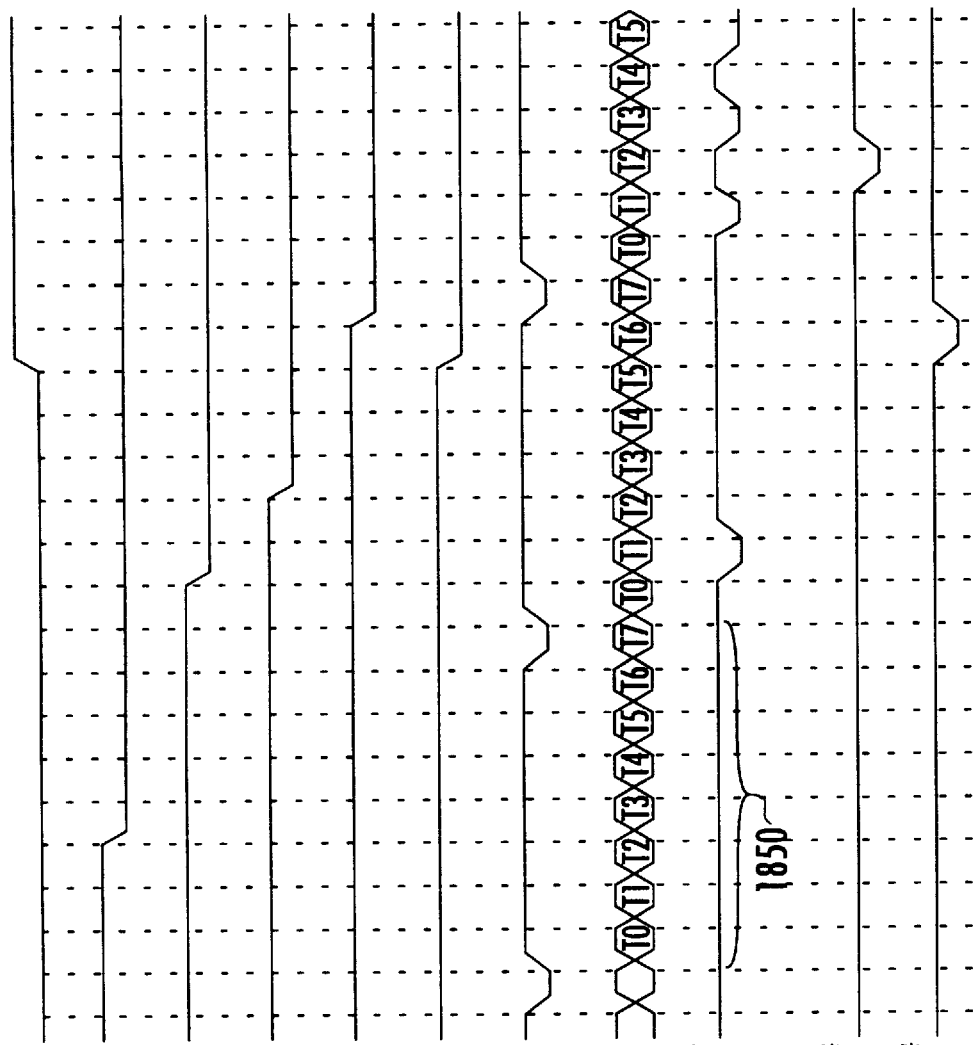
Figure 95B:
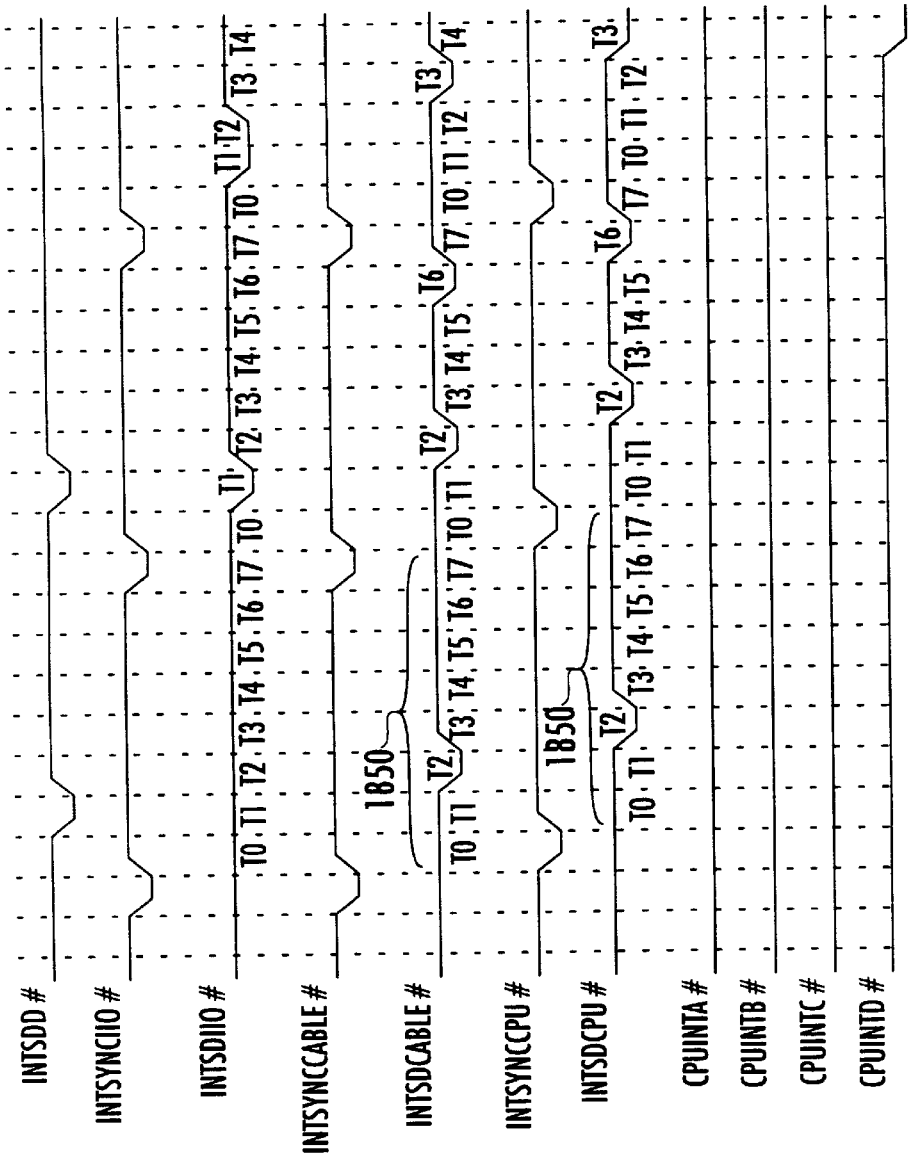

FIG. 95 is a graph showing waveforms for the computer system.

Figure 96:
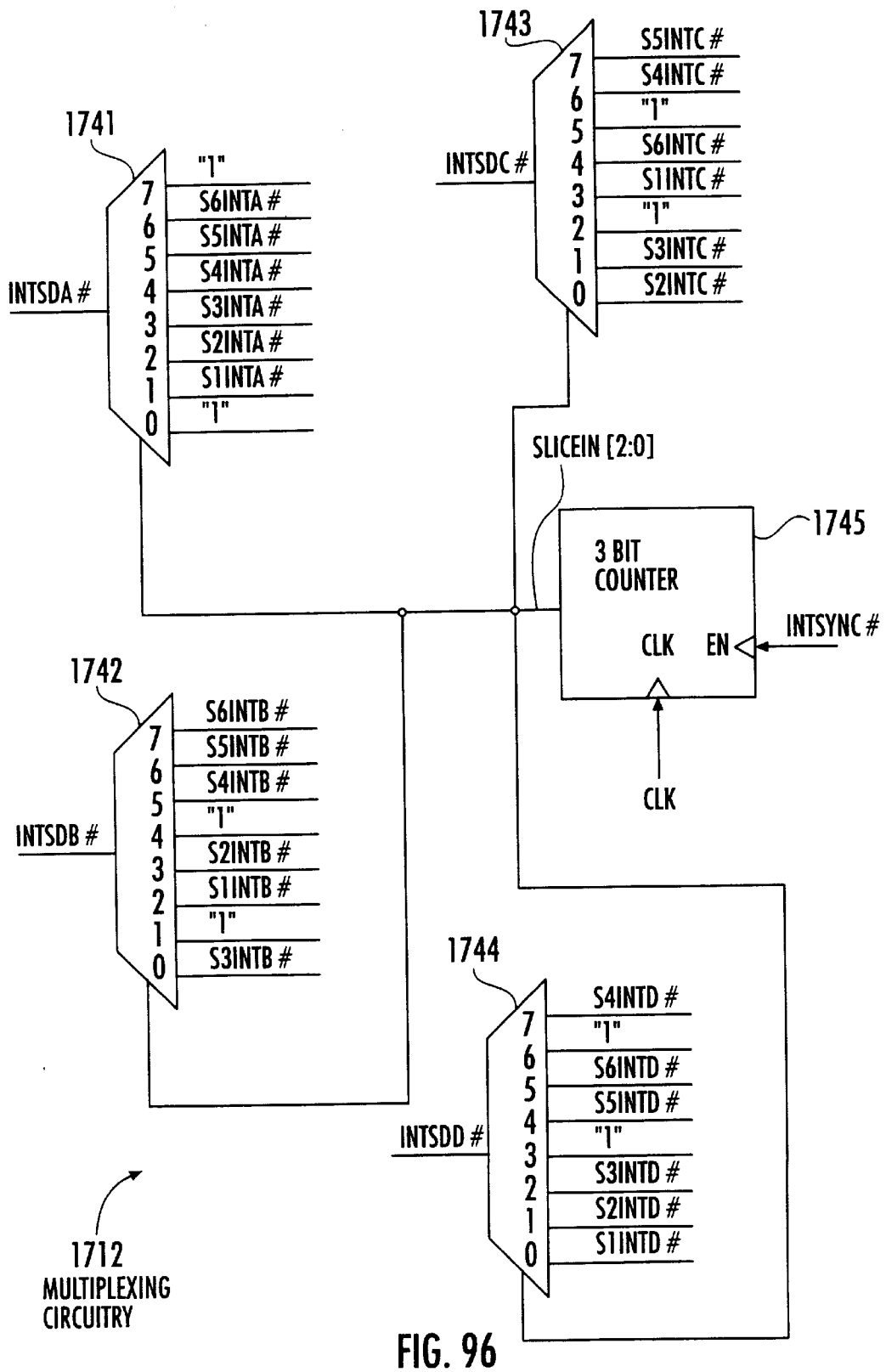

FIG. 96 is a schematic diagram of the multiplexing circuitry.

FIGS. 97A–D are schematic diagrams of the interrupt receiving block.

Figure 98:
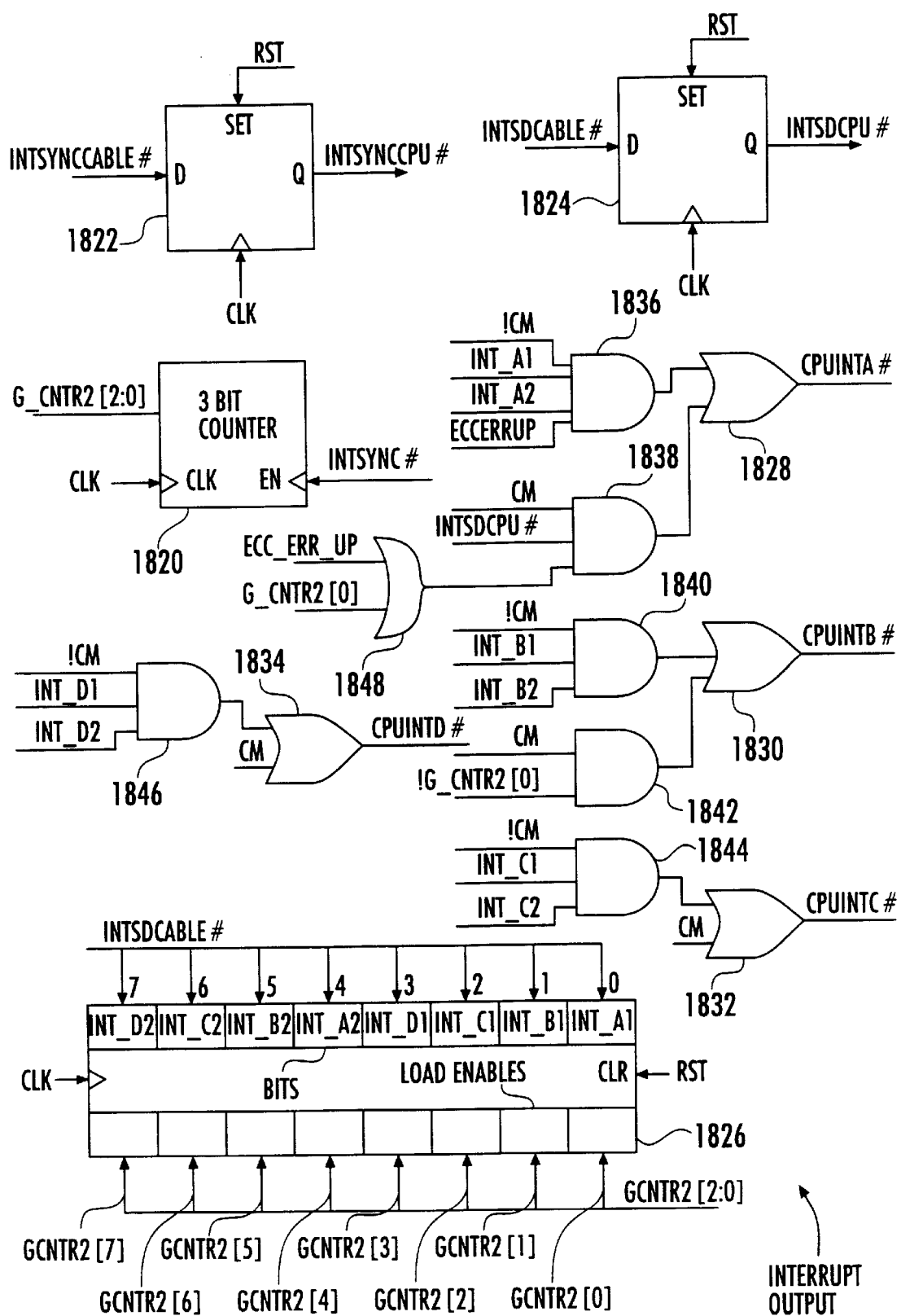

FIG. 98 is a schematic diagram of the interrupt output block.

FIG. 99 is a chart showing the time multiplexing of interrupt request signals.

FIG. 100 is a chart showing interrupt request mapping.

Figure 101:
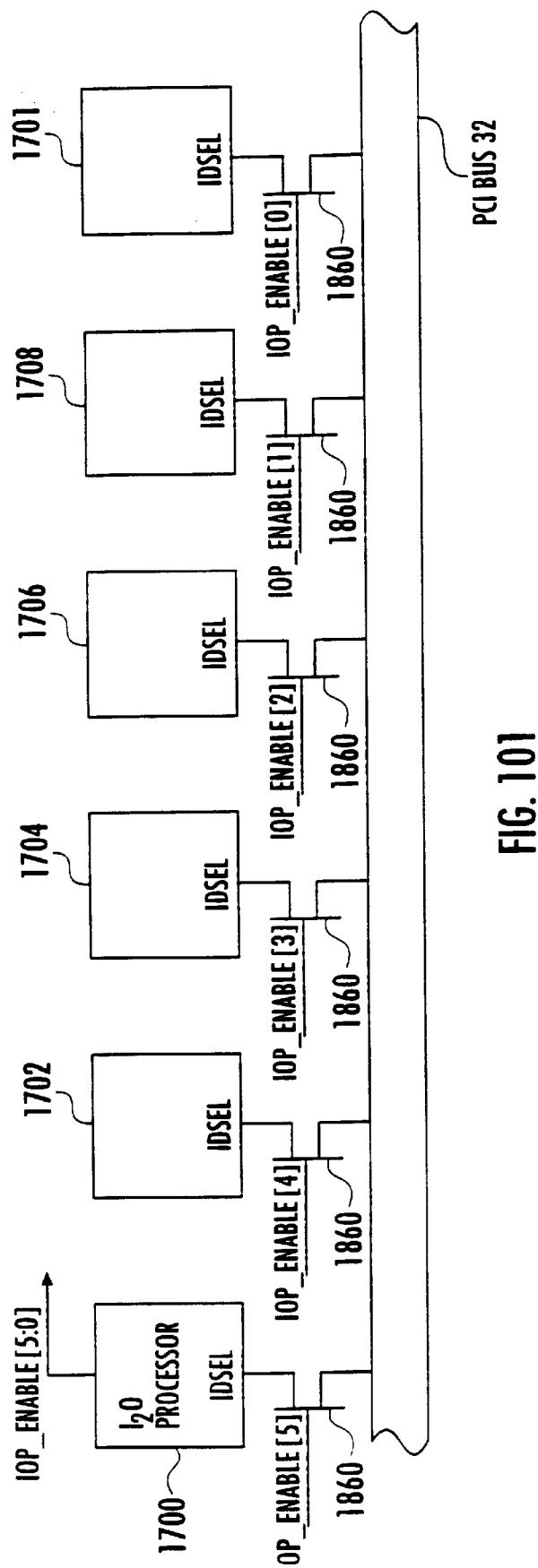

FIG. 101 is a schematic block diagram showing bus devices connected to an expansion bus.

OVERVIEW

In the ensuing description, all signal mnemonics followed or preceded by a "#", "_", or "!" signify inverted logic states.

Figure 1:
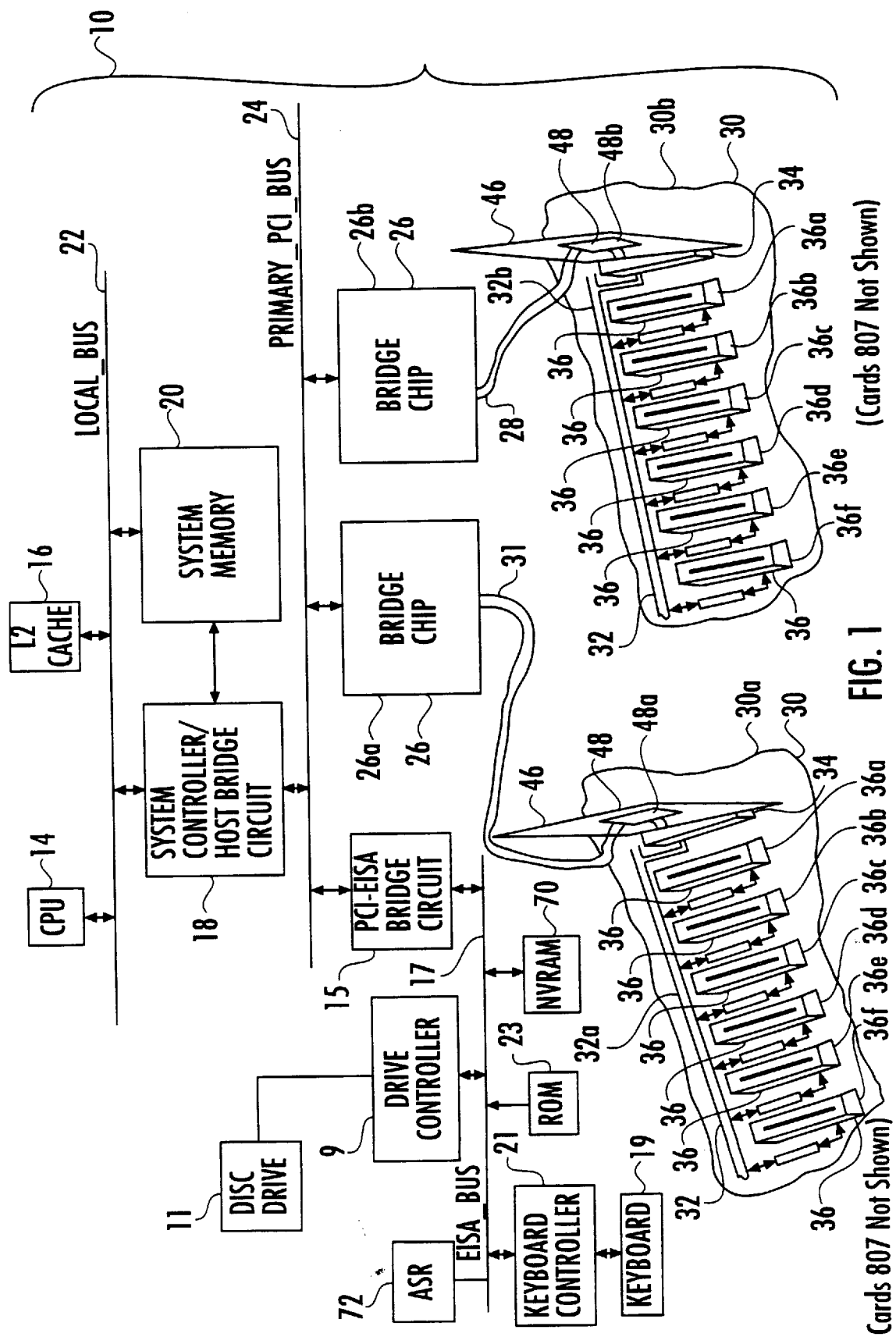
FIG. 1 is a block diagram of a computer system.

As shown in FIG. 1, a computer system 10 includes a primary PCI bus 24 that is coupled to a bridge chip 26a and a bridge chip 26b, both of common design 26. The bridge chip 26a is coupled to a bridge chip 48a through a cable 31, and the bridge chip 26b is coupled to the bridge chip 48b through a cable 28. The bridge chips 48a and 48b are of common design 48, which is common to design 26 except that design 26 is in an upstream mode and design 48 is in a downstream mode.

The PCI bus 24 is interfaced to a local bus 22 through a system controller/host bridge circuit 18. The system controller/host bridge circuit 18 also controls access to a system memory 20 which is also coupled to the local bus 22 along with the CPU 14 and a level two (L2) cache 16.

A PCI-Extended Industry Standard Architecture (EISA) bridge 15 interfaces the PCI bus 24 to an EISA bus 17. Both a keyboard controller 21 and a Read Only Memory (ROM) 23 are coupled to the EISA bus 17. A non-volatile random access memory (NVRAM) 70 connected to the EISA bus 17 stores information which should survive the computer system shutting off. An automatic server recovery timer 72 monitors the computer system for inactivity. If the system locks up, the ASR timer 72 will expire after about 10 minutes. A keyboard 19 is monitored by the keyboard controller 21 for detection of depressed keys.

Figure 2:
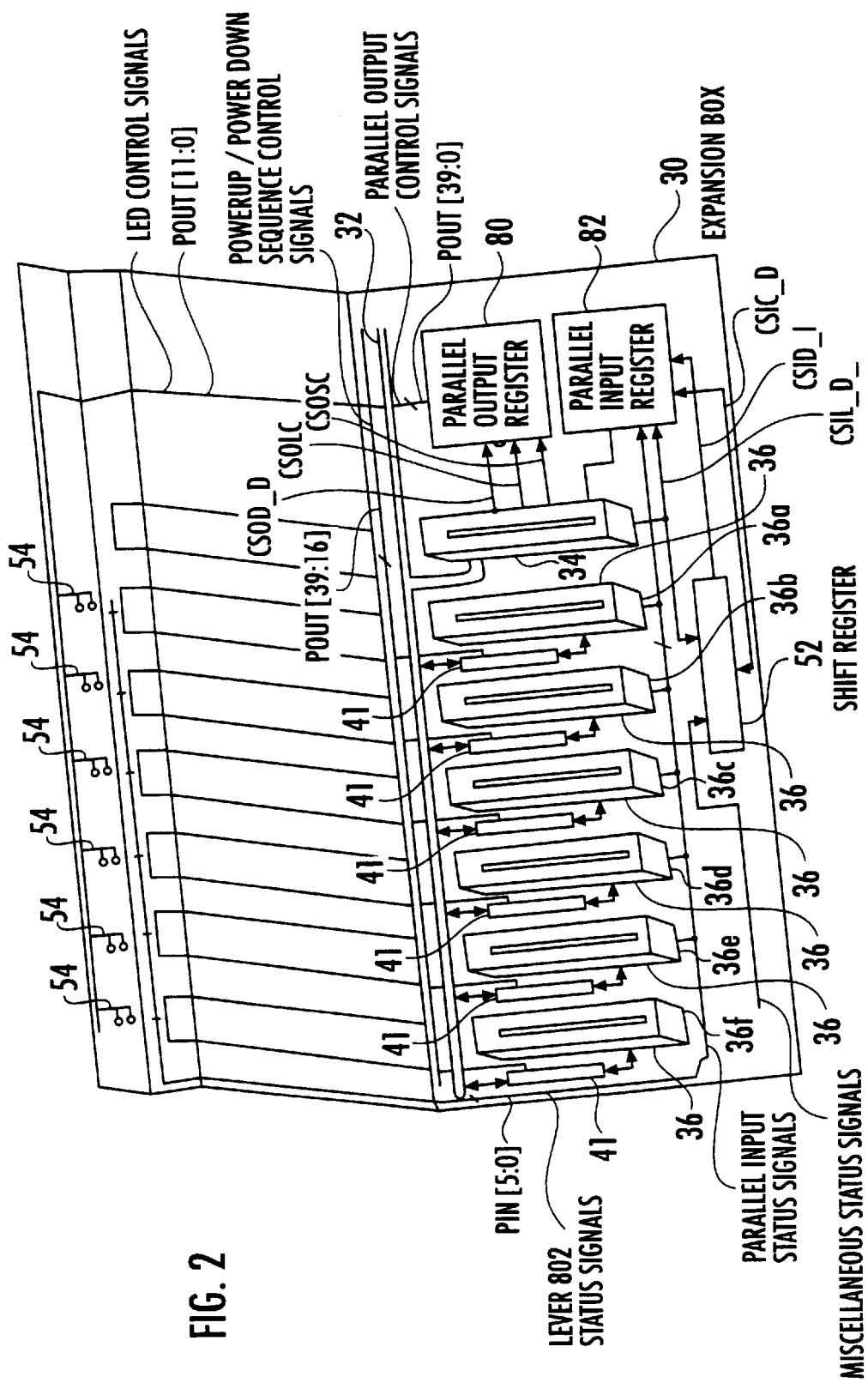
FIG. 2 is a block diagram of an expansion box of the computer system of FIG. 1.

Referring to FIG. 2, the bridge chip 48a furnishes an interface to a PCI bus 32a, and the bridge chip 48b furnishes an interface to a PCI bus 32b. The PCI buses 32a and 32b are located on two expansion boxes 30a and 30b, of common design 30, and each expansion box 30 has six hot-plug slots 36 (36a–f) which are capable of receiving conventional expansion cards 807 (FIG. 27A). One slot 34 on the expansion box receives a card 46 which has the bridge chip 26. Each hot-plug slot 36 has associated switch circuitry 41 for connecting and disconnecting the slot 36 to and from the PCI bus 32. Six mechanical levers 802 are used to selectively secure (when closed or latched) the cards 807 to corresponding slots, as further described in U.S. patent application Ser. No. 08/658,385, now U.S. Pat. No. 5,822,196 entitled "Securing a Card in an Electronic Device,n filed on the same date as this application and incorporated by reference. Each expansion box 30 includes registers 52 and 82 for monitoring the levers 802 and status signals of the expansion box 30 and a register 80 for controlling connection and disconnection of slots 36 to the PCI bus 32.

Figure 3:
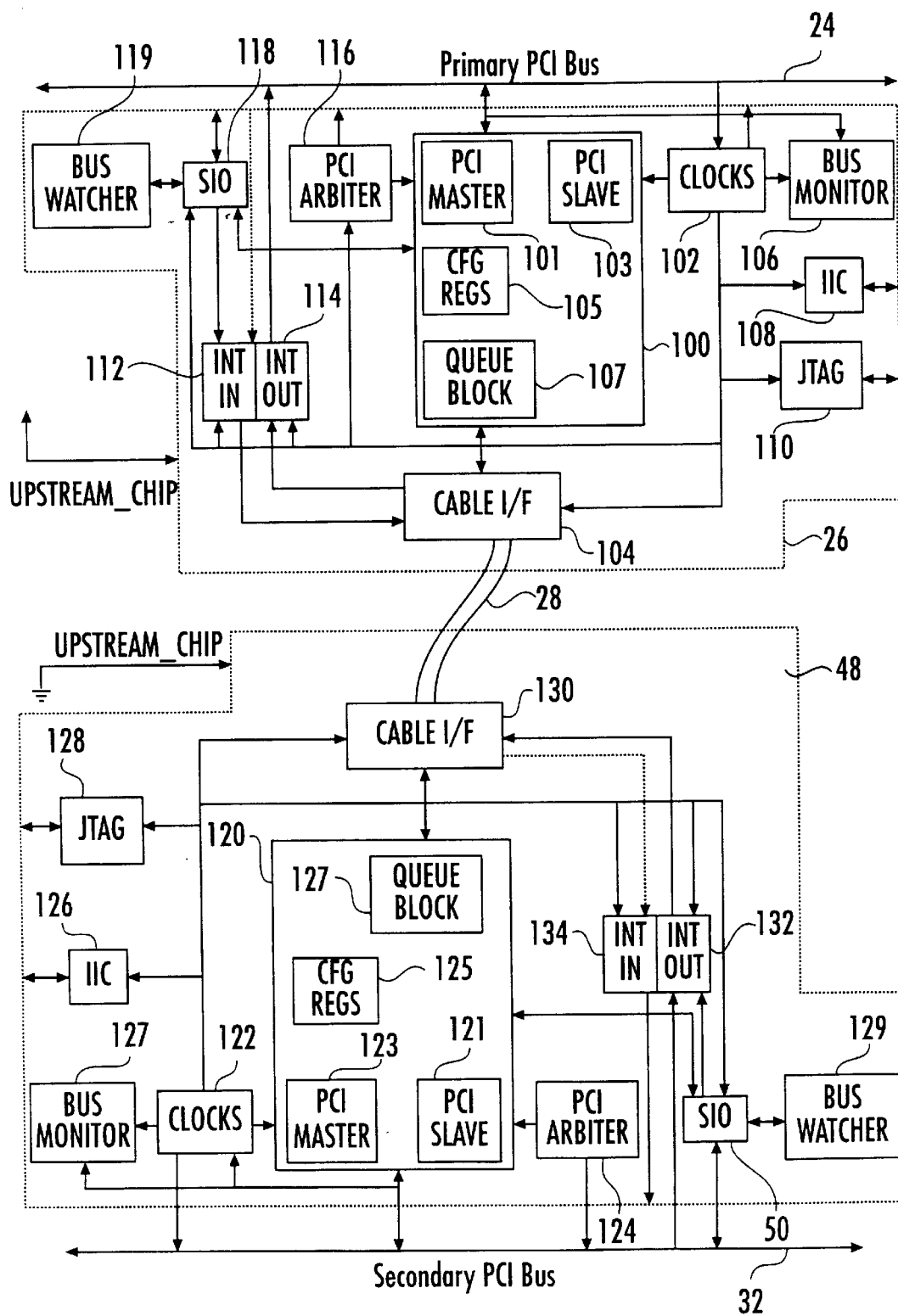
FIG. 3 is a block diagram of the bridge chips in the computer system.

Referring to FIG. 3, the bridge chip is designed to be used in pairs 26 and 48 to form a PCI—PCI bridge between the primary PCI bus 24 and the secondary PCI bus 32. The programming model is that of two hierarchical bridges. To the system software, the cable 28 appears as a PCI bus which contains exactly one device, the downstream bridge chip 48. This greatly simplifies the configuration of the 2-chip PCI—PCI bridge joining the primary and secondary buses. The bridge chip 26, which is closer to the CPU 14, joins the primary PCI bus 24 to the cable 28. The second PCI—PCI bridge 48 resides in the expansion box 30 and joins the cable 28 to the secondary PCI bus 32. A mode pin UPSTREAM_CHIP determines whether the bridge chip operates in the upstream mode or the downstream mode. Some non-bridge functions such as a bus monitor 106 and hot plug logic in an SIO 50 are used only in the expansion box 30, and are non-functional in the upstream mode chip 26.

A clock generator 102 in the bridge chip 26 generates clocks based on the clock PCICLK1 on the primary PCI bus 24, with one of the generated clocks being provided through the cable 28 to a clock generator 122 in the downstream bridge chip 48. The clock generator 122 generates and drives the PCI clocks in the expansion box 30 at the same frequency of the primary PCI bus 24, which results in both bridge chips 26 and 48 being run at the same frequency. The downstream bridge chip 48 lags the upstream bridge chip 26 in phase by the delay of the cable 28. An asynchronous boundary in the upstream bridge chip 26 at the point where data is taken off of the cable 28 allows the phase delay to be any value (and therefore the cable to be of any length), with the only requirement only being that the frequency of the two bridge chips be the same.

The core logic of each bridge chip is the bridge logic block (100 or 120), which includes a PCI master (101 or 123) for acting as a master on the respective PCI bus, a PCI target or slave (103 or 121) for acting as a slave device on the respective PCI bus, configuration registers (105 or 125) which contain the configuration information of the corresponding bridge chip, and a queue block (107 or 127) containing several queues in which data associated with transactions between the primary PCI bus and the secondary PCI bus 32 are queued and managed. The data transferred between the upstream bridge chip 26 and the downstream bridge chip 48 are buffered by cable interfaces 104 and 130 in the bridge chips 26 and 48, respectively.

Interrupt routing logic is also included in each bridge chip. There are 8 interrupts, 6 from the secondary bus slots, 1 from an SIO circuit 50, and 1 from the downstream bridge chip 48. In the downstream chip 48, the interrupts are received by an interrupt receiving block 132 and sent up the cable 28 as a serial stream in sequential time slices. In the upstream bridge chip 26, the interrupts are received by an interrupt output block 114, which routes the interrupts to an interrupt controller.

The SIO circuit 50 furnishes control signals for lighting LEDs, for controlling reset, and for selectively connecting the slots 36 to the bus 32. It also includes logic for reading the engagement status of the levers 802, and the status of the cards 807 in each slot 36.

The bridge circuit 26 also includes support for interrupts in the expansion box 30, and, when installed in a slot in the host system with a proprietary interface to a multichannel interrupt controller, it sends the states of each interrupt in a serial stream. The bridge circuit 26 also can be configured to drive standard PCI INTA, INTB, INTC, and INTD signals if it is installed in a standard slot in the host system.

Each bridge chip also includes a PCI arbiter (116 or 124) for controlling access to up to seven bus masters. As the upstream bridge 26 is installed in a slot, the PCI arbiter 116 in the upstream bridge chip 26 is disabled. Each bridge chip also includes an I²C controller (108 or 126) for communication with devices such as EEPROMS, temperature sensors, and so forth, a JTAG master (110 or 128) for performing test cycles, a bus monitor (106 or 127) for measuring bus utilization and efficiency and the efficiency of the bridge chip's prefetch algorithm, and a bus watcher (119 or 129) for storing bus history and state vector information and for notifying the CPU 14 of a bus hang condition. Certain blocks are disabled in each bridge chip as they are not used. In the upstream bridge chip 26, the bus watcher 119, the SIO 118, the PCI arbiter 116, and the bus monitor 106 are disabled. In addition, the interrupt receiving block 112 in the upstream chip 26 and the interrupt output block 134 in the downstream chip 48 are disabled.

QUEUE BLOCK OVERVIEW

Figure 4:
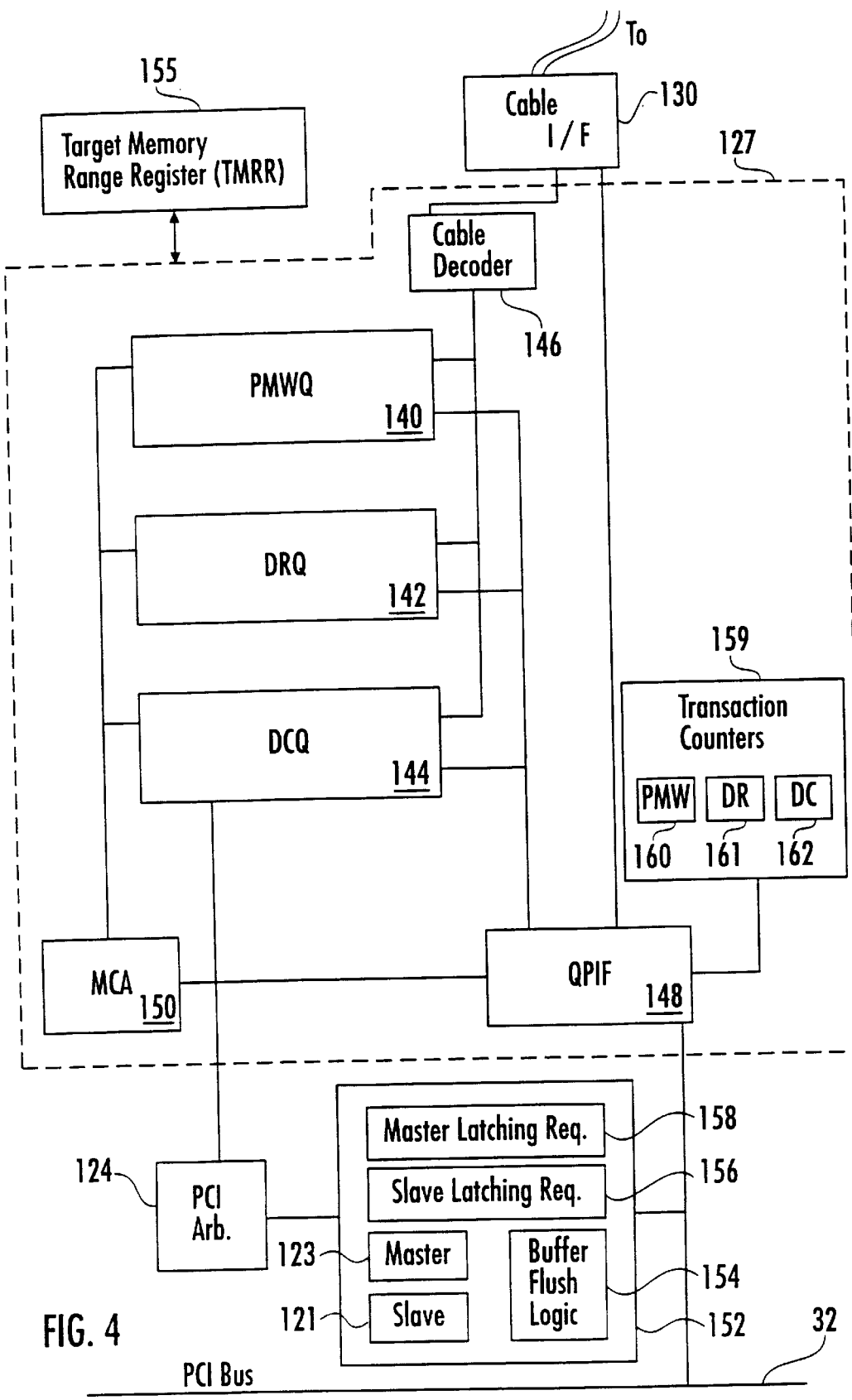
FIG. 4 is a block diagram of a queue block in each of the bridge chips.

Referring to FIG. 4, the queue blocks 107 and 127 manage transactions flowing between the primary PCI bus 24 (in the upstream chip) or the secondary PCI bus 32 (in the downstream chip) and the cable interface 130. (From here on, the downstream bridge chip will be referred to with the assumption that upstream chip works identically, unless otherwise noted). The queue block 127 includes a cable decoder 146 that receives from the cable interface 130 transactions to be completed on the secondary PCI bus 32. After decoding a transaction, the decoder 146 places the transaction, along with all information included in the transaction, into one of three queues 140, 142, and 144. Each queue contains several transaction buffers, each of which stores a single transaction and therefore is able to handle several transactions simultaneously.

The first queue, a posted memory write queue (PMWQ) 140, stores posted memory write cycles issued by the CPU on the primary bus along with all information required to execute each cycle on the secondary bus 32. The PMWQ 140 has four transaction buffers, each of which holds one posted memory write transaction containing up to eight cache lines (256 bytes) of data. Under some circumstances, a posted memory write transaction having more than eight cache lines of data may overflow into one or more subsequent buffers, as described below.

The second queue, a delayed request queue (DRQ) 142, stores delayed request transactions (i.e., delayed read requests (DRR), such as memory read (MR), memory read line (MRL), and memory read multiple (MRM) requests; and, in the downstream chip, input/output (I/O) read/writes and configuration (config) read/writes) issued by the CPU on the primary bus along with all information required to execute each transaction on the secondary bus 32. The DRQ 142 has three transaction buffers, each of which is capable of holding one double-word, or "dword", of data for delayed writes.

The third queue, a delayed completion queue (DCQ) 144, stores delayed completion information provided by the upstream chip in response to delayed request transactions generated on the secondary bus 32. For a delayed read request, the corresponding completion information contains the read data requested by the initiating device and the read status (i.e., an indication of whether a parity error on target abort occurred). The delayed completion information returned for a delayed write transaction is the same as that returned for a delayed read request, except that no data is returned for delayed writes. Since I/O and config read/writes occur only on the downstream bus, only the upstream DCQ will contain delayed completion information corresponding to one of these transactions. The DCQ 144 has eight completion buffers, each of which can hold up to eight cache lines of completion information for a single delayed request. In addition to the completion information, each completion buffer also contains a copy of the delayed request that generated the information. For delayed read transactions, a data "stream" can be established between the primary bus 24 and the secondary bus 32 if the requesting device begins retrieving the requested data before the target device stops providing it to the DCQ 144. Under some circumstances, the DCQ 144 automatically will retrieve, or "prefetch," additional data when a requesting device retrieves all of the requested data from the corresponding buffer in the DCQ 144. Both streaming and automatic prefetching are discussed in more detail below.

A queue-to-PCI interface (QPIF) 148 manages transactions flowing from the queues 140, 142, and 144 to the PCI bus 32, and from the PCI bus 32 to the DCQ 144 and to the upstream chip through the cable interface 130. The QPIF 148 enters a "master" mode to run posted memory write and delayed request transactions from the PMWQ 140 and the DRQ 142 on the secondary bus. For both posted memory write and delayed read transactions, the QPIF 148 can "promote" a transaction that may involve less than a cache line of data (i.e., a memory write (MW) or a memory read (MR) transaction) to one that requires one or more cache lines (i.e., a memory write and invalidate (MWI) transaction or a memory read line (MRL) or memory read multiple (MRM) transaction) if certain conditions are met. The QPIF 148 also may convert a read transaction involving a single cache line of data (i.e., a MRL transaction) into one involving several cache lines of data (i.e., a MRM transaction). The QPIF 148 also may "correct" a MRL or MRM transaction that begins in the middle of a cache line by reading the entire cache line and then throwing away the unrequested portion of the data. Transaction promotion and read correction, both of which are described in more detail below, improve system efficiency by reducing the time required to retrieve data from a memory device.

The QPIF 148 enters a "slave" mode to provide data from the DCQ 144 to a requesting PCI device or to send transactions from the PCI bus 32 to the DCQ 144 and to the upstream chip through the cable. When the QPIF 148 receives a posted write transaction from the bus 32, it forwards the transaction to the upstream chip if a corresponding one of a group of transaction counters 159 indicate that the PMWQ in the other bridge chip is not full, as discussed below. When the QPIF 148 receives a delayed request, it first forwards the request to the DCQ 144 to determine whether the transaction already has been placed in the DCQ and, if so, whether the corresponding delayed completion information has been returned to the DCQ 144. If the delayed completion information is in the DCQ, the information is provided to the requesting device and the transaction is terminated. If the request already is enqueued but the delay completion information has not been returned, the requesting device is retried and the transaction is terminated on the PCI bus 32. If the transaction is not yet enqueued, the DCQ 144 reserves a completion buffer for the transaction and the QPIF 148 forwards the transaction to the upstream chip through the cable interface 130, as long as the corresponding transaction counter 159 indicates that the other bridge chip is not full.

If the DCQ 144 determines that one of its buffers contains data intended for a requesting device but different than the data requested in the current transaction, the buffer may be flushed to prevent the requesting master from receiving stale data. The buffer is flushed when it contains prefetch data (i.e., data left in the buffer after the requesting device has retrieved some of the data, or data that was not specifically requested by the device), but is not flushed when it contains completion data (i.e., specifically requested by a device that has not yet returned to retrieve it). If the buffer contains completion data and the requesting device has issued a request that does not "hit" the buffer, the DCQ 144 tags the device as a "multi-threaded" device (i.e., one that is capable of maintaining more than one transaction at once) and allocates another completion buffer for the new request. The buffer flushing and multiple buffer allocation schemes are described in more detail below.

A master cycle arbiter (MCA) 150 in the queue block 127 maintains standard ordering constraints between posted memory write, delayed request, and delayed completion transactions, as set forth in the PCI Bridge Architecture Specification, Version 2.1. These constraints require that bus cycles maintain strong write ordering and that deadlocks do not occur. Therefore, the MCA 150 determines the order in which posted memory write transactions in the PMWQ 140 and delayed request transactions in the DRQ 142 are run on the PCI bus 32. The MCA 150 also controls the availability of delayed completion information stored in the DCQ 144. To ensure compliance with these rules, the downstream MCA 150 gives each posted memory write cycle an opportunity to bypass earlier-issued delayed request cycles, while both the downstream and the upstream MCAs 150 do not allow delayed request and delayed completion cycles to bypass earlier-issued posted memory write cycles. Transaction ordering by the MCA 150 is described in more detail below.

The transaction counters 159 in the downstream queue block 127 maintain a count of the number of transactions enqueued in the upstream bridge chip. A posted memory write (PMW) counter 160 indicates the number of PMW transactions held in the upstream posted memory write queue. The PMW counter 160 is incremented each time a PMW transaction is sent to the cable interface 130. The counter 160 is decremented each time the QPIF 148 receives a signal from the cable decoder 146 indicating that a PMW cycle has been completed on the upstream PCI bus 24. When the upstream PMWQ has enqueued the maximum number (four) of PMW transactions, the PMW counter 160 asserts a PMK full signal (tc_pmw_full) that tells the QPIF 148 to retry additional PMW cycles from the PCI bus 32. Likewise, a delayed request (DR) counter 161 counts the number of DR transactions held in the upstream delayed request queue. When the DRQ is holding the maximum number (three) of DR transactions, the DR counter 161 asserts a DR full signal (tc_dr_full) indicating that the QPIF 148 must retry all subsequent DR transactions from the PCI bus 32. A delayed completion (DC) counter 162 counts the number of delayed completions that are enqueued in the upstream master cycle arbiter. When the MCA is holding the maximum number (four) of delayed completions, the DC counter 162 asserts a DC full signal (tc_dc_full) that prevents the downstream QPIF 148 from running delayed request transactions on the secondary PCI bus 32. As soon as the full condition disappears, delayed completion information may be sent to downstream DCQ.

A PCI interface block 152 resides between the PCI bus 32 and the queue block 127. The PCI interface 152 includes a master block 123 and a slave (target) block 121. The slave block 121 allows PCI devices on the bus 32 to access the bridge chip's internal registers (e.g., target memory range registers 155 and configuration registers), to claim completion information stored in the DCQ 144, and to initiate transactions that are passed through the QPIF 148 and the cable interface 130 to the primary bus. The slave block 121 controls the availability of the PCI bus 32 to the PCI devices on the bus 32 by recognizing when each device asserts its REQ# line and forwarding the REQ# signals to the PCI arbiter 124. When the PCI arbiter 124 selects a requesting device to receive control of the bus, the slave block 121 grants the bus to the device by asserting the device's GNT# line. As soon as the bus 32 is granted to the requesting device and the device asserts its FRAME# signal indicating the beginning of a transaction, the slave block 121 latches the transaction information (e.g., address, coinmand, data, byte enables, parity, etc.) into a slave latching register 156. The queue block 127 then is able to retrieve the transaction information from the latching register 156 and provide it to the DCQ 144 and/or the cable interface 130.

Transactions supported by the PCI slave block 121 are shown in the following table.

| PCI Interface Slave Transactions | | |
|---|---|---|
| Transaction Type | Primary Interface | Secondary Interface |
| Interrupt Acknowledge | Not supported | Not supported |
| Special Cycle | Delayed | Delayed |
| I/O Read | Delayed | Delayed |
| I/O Write | Delayed | Delayed |
| Memory Read | Delayed | Delayed |
| Memory Write | Posted | Posted |
| Configuration Read (type 0) | Immediate | Not supported |
| Configuration Write (type 0) | Immediate | Not supported |
| Configuration Read (type 1) | Delayed | Not supported |
| Configuration Write (type 1) | Delayed | Not supported |
| Memory Read Multiple | Delayed (Streaming) | Delayed (Streaming) |
| Dual Address Cycle | Not supported | Immediate |
| Memory Read Line | Delayed | Delayed |
| Memory Write and Invalidate | Posted | Posted |

The master block 123 of the PCI interface 152 runs only cycles initiated by the queue block 127 (i.e., transactions held in the PMWQ 140 and DRQ 142). The queue block 127 requests the PCI bus by sending a request signal (q2p_req) to the PCI master 123, which then determines whether to assert a corresponding request signal (blreq_) to the PCI arbiter 124. The master block 123 asserts blreq_ if the queue block 127 is not running a locked cycle and the PCI bus 32 is not locked by another PCI device. When the PCI arbiter 124 selects the queue block 127, the master block 123 sends an acknowledge signal (p2q_ack) to let the queue block 127 know it has control of the bus 32. If the PCI arbiter 124 has no outstanding requests from other devices on the bus 32, the master block 123 automatically sends the p2q_ack grant signal to queue block 127, even if the queue block 127 has not asserted the q2p_req signal. As soon as the queue block 127 wins arbitration (i.e., the arbiter 124 asserts the blgnt_ signal) and asserts its q2p_frame signal to indicate the beginning of a transaction, the PCI master 123 latches outgoing transaction information (i.e., address, command, data, byte enables, parity, etc.) into a master latching register 158 in the PCI interface 152. The transaction information then is used to complete the transaction on the PCI bus 32.

Transactions supported by the master block 123 are shown in the following table.

| PCI Interface Master Transactions | | |
|---|---|---|
| Transaction Type | Primary Interface | Secondary Interface |
| Interrupt Acknowledge | Not supported | Not supported |
| Special Cycle | Supported | Supported |
| I/O Read | Supported | Supported |
| I/O Write | Supported | Supported |
| Memory Read | Supported | Supported |
| Memory Write | Supported | Supported |
| Configuration Read | Not Supported | Supported |
| Configuration write | Not Supported | Supported |
| Memory Read Multiple | Supported | Supported |
| Dual Address Cycle | Supported | Not Supported |
| Memory Read Line | Supported | Supported |
| Memory Write and Invalidate | Supported | Supported |

In general, the master block 123 operates as a standard PCI master. However, unlike standard PCI bridges, the master block will not terminate a MRL, MRM, or MWI transaction until a cache line boundary is reached, even after the master latency timer (MLT) expires. Also, the master block 123 does not assert "initiator ready" (IRDY) wait states. The master block 123 runs a locked cycle on the PCI bus 32 if the queue block 127 asserts its "lock" signal (q2p_lock) and releases its lock on the bus 32 when the queue block 127 asserts its "unlock" signal (q2p_unlock).

Referring also to FIG. 57, the PCI interface 152 contains buffer flushing logic 154 that determines when one or all of the DCQ completion buffers should be flushed by the queue block 127. The PCI slave 121 generates two signals that are used by the queue block 127 to flush the completion buffers: a flush signal (p2q_flush) that indicates when a buffer should be flushed, and a slot selection signal (p2q_slot[2:0]) that indicates which PCI device (i.e., which slot on the PCI bus) should have data flushed. The following table shows the relationship between p2q_slot[2:0] and the PCI slot number.

| Creation of p2q_slot[2:0] | |
|---|---|
| p2q_slot[2:0] | slot number |
| 000 | all |
| 001 | 1 |
| 010 | 2 |
| 011 | 3 |
| 100 | 4 |
| 101 | 5 |
| 110 | 6 |
| 111 | 7 |

When p2q_flush is asserted, the queue block 127 will flush either all of the completion buffers in the DCQ 144 if p2q_slot[2:0] is equal to "000" or the corresponding one of the eight completion buffers if p2q_slot[2:0] has any other value. The queue block 127 keeps track of which completion buffers, if any, correspond to each PCI slot at any given time.

The p2q_flush signal is asserted at the rising edge of the first PCI clock (CLK) cycle after a config write (wr_cfg) cycle occurs or after an I/O write (iowr) cycle occurs or a memory write (memwr) cycle hits a downstream target (hit_tmem) during a command check state (cmd_chk_st). Gates 2014, 2016, 2018, and 2020, and flip-flop 2022 are arranged to produce p2q_flush in this way.

In the upstream bridge chip (i.e., when the upstream_chip_i signal is asserted), p2q_slot[2:0] always has a value of "001" since the CPU is the only master on the primary PCI bus. In the downstream chip, the value of p2q_slot depends upon whether the cycle leading to a flush condition is a cycle from the secondary bus 32 to the queue block 127 (i.e., if p2q_qcyc is asserted). If the p2q_qcyc signal is asserted, p2q_slot[2:0] takes on the value of the req_slot[2:0] signal produced by the PCI slave 121. The req_slot[2:0] signal indicates which of the seven devices on the secondary PCI bus 32 has been granted control of the bus 32. The PCI slave 121 generates the req_slot[2:0] signal by latching the value of the GNT# line for each of the seven slots on the bus 32 to form a seven bit latched grant signal (latched_gnt_[7:1]; the eighth grant line, which belongs to the queue block, is ignored) and encoding latched_gnt[7:1] according to look-up table 2006, as follows.

| Creation of req_slot[2:0] | |
|---|---|
| latched_gnt_[7:1] | req_slot[2;0] |
| 1111111 | 000 |
| 1111110 | 001 |
| 1111101 | 010 |
| 1111011 | 011 |
| 1110111 | 100 |
| 1101111 | 101 |
| 1011111 | 110 |
| 0111111 | 111 |

If the cycle leading to the flush is not a secondary-PCI-to-queue-block cycle, it must be an I/O read or config read to the target memory range of one of the slots on the secondary bus 32. When the cycle is an I/O read or config read (i.e., !iowr AND !wr_cfg), p2q_slot[2:0] takes on the value of the PCI slot whose memory range has been hit (mrange_slot[2:0]). Otherwise, the cycle is an I/O write or a config write, and p2q_slot[2:0] is set equal to "000" so that all completion buffers are flushed. Gates 2008 and 2010 and multiplexers 2002 and 2004 are arranged to generate p2q_flush[2:0] in this way.

CABLE DECODER

Referring to FIG. 58, the cable decoder 146 receives transactions from the cable interface and selects the appropriate queue to receive each transaction. When the cable decoder is in the data phase (i.e., when data_phase or next_data_phase, an asynchronous signal that sets the value of data_phase at the next CLK cycle, is asserted), the cable decoder 146 looks at the command code (cd_cmd [3:0]) sent across the cable to determine which queue should receive the transaction. As shown in the table below, when cd_cmd[3:0] has a value of "1001", the transaction is a delayed completion, so the cable decoder asserts a cd_dcq_ select signal that tells the DCQ to claim the transaction. When the three LSB of the command code signal (cd_cmd [2:0]) are "111", the transaction is a posted memory write, so the cable decoder generates a cd_pmwq_select signal to alert the PMWQ of the incoming transaction. When the transaction is neither a posted memory write nor a delayed completion and the command code does not represent a streaming signal, the cable decoder asserts a cd_drq_ select_signal that tells the DRQ to claim the transaction. Gates 2024, 2026, 2028, and 2030 are configured to generate the cd_dcq_select, cd_pmwq_select, and cd_drq_select signals in this way.

The following table shows the four bit command codes associated with each type of transaction.

| Transaction Command Codes | |
|---|---|
| Transaction Type | Command Code |
| I/O Read | 0010 |
| I/O Write | 0011 |
| Config read | 1010 |
| Config write | 1011 |
| Memory read | 0110 |
| MRL | 1110 |
| MRM | 1100 |
| Memory write | 0111 |
| MWI | 1111 |
| Delayed completion | 1001 |
| Stream established | 1000 |

When the downstream bridge chip has established a data stream between the primary bus and a secondary bus master, the upstream cable decoder receives a command code of "1000". This code represents a streaming signal generated by the downstream chip to inform the upstream chip that a stream has been established. When the cable decoder receives this command code, it asserts a cd_stream signal that tells the QPIF in the upstream device to continue the transaction. The cable decoder also generates a cd_stream_ next_data signal that instructs the upstream chip to provide another piece of data to the secondary bus. The cd_stream_ next_data signal is asserted when cd_stream signal is asserted, the transaction is in the data phase (i.e., data_ phase is asserted), and a next_data signal has been received from the downstream chip through the cable interface (the next_data signal appears on one of the lines of the c2q_ buff[3:0] signal, which, when no stream is occurring, tells the queue block which downstream DCQ buffer is associated with the current transaction). The cd_stream_next_ data signal is deasserted when either the cd_stream signal is deasserted or when a new request is received from the cable interface (i.e., c2q_new_req is asserted). Gates 2032 and 2034 are configured to generate the cd_stream and cd_stream_next_data signals in this way.

POSTED MEMORY WRITE QUEUE

Figure 59:
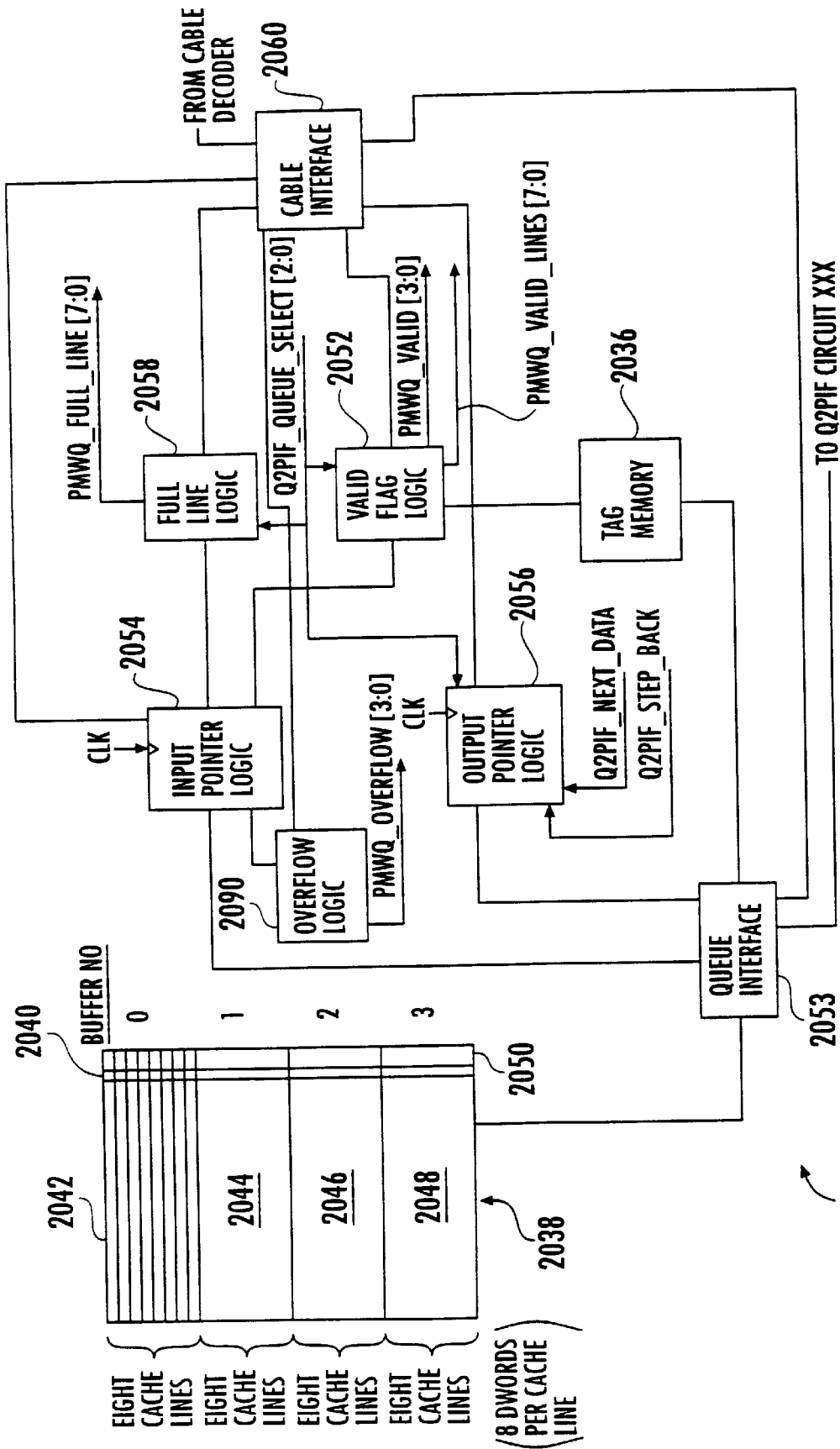

Referring to FIG. 59, the posted memory write queue (PMWQ) 140 is a storage element that contains all of the command information needed to execute posted write transactions on the target bus. The PMWQ includes a tag memory portion 2036 that holds information identifying each transaction, a data RAM 2038 that holds the write data associated with each transaction in the PMWQ, and various control blocks to manage the flow of transactions into and out of the PMWQ. For each transaction in the PMWQ, the tag memory 2036 maintains information such as the address to be written to, the PCI command code (MW or MWI), an address parity bit, and "locked cycle" and "dual address cycle" indication bits, as shown in the following table. The tag memory 2036 also stores a pointer to the data RAM location of the data corresponding to each of the transactions in the PMWQ.

| Contents of PMWQ | | |
|---|---|---|
| Field | Bits | Comments |
| Address | 64 | Upstream Transactions support Dual Address Cycles |
| PCI Command | 1 | Memory Write 0111<br>Memory Write and Invalidate 1111<br>(only necessary to store cbe[3]) |
| Byte Enables | 0 | Store BEs on every valid transfer clock in the data RAM. |
| Parity | 1/address | Must store PAR with each transfer along with 32-bit addr/data. |
|  | 0 | Must store data parity bits on every valid data transfer in data RAM. |
| Data | 0 | Stored in data RAM up to 8 cache lines |
| Lock | 1 |  |
| DAC Indication | 1 | Indicates whether address is 32 or 64 bits |

Because the PCI Spec 2.1 requires posted memory write transactions to be executed in the order in which they are received, the tag memory 2036 is a circular FIFO device. The PMWQ, and therefore the tag memory 2036, can handle up to four posted memory write transactions simultaneously.

The data RAM 2038 includes four data buffers 2042, 2044, 2046, and 2048, one for each transaction in the PMWQ. Each buffer can store up to eight cache lines, or 256 bytes, of data (eight words per cache line). For each cache line in a buffer, the buffer stores eight data parity bits 2040 (one per dword) and thirty-two enable bits 2050 (one per byte).

A cable interface block 2060 receives each transaction and the corresponding data from the cable decoder and places the transaction in the tag memory 2036. A queue interface block 2053 receives the data from the cable interface block 2060 and places it in the appropriate location in the data RAM 2038. The queue interface 2053 also retrieves data from the data RAM 2038 and provides it to the QPIF when the QPIF is running the corresponding transaction on the PCI bus. An input pointer logic block 2054 generates four input pointers, one for each buffer, that tell the queue interface 2053 where to place the next word of data. A valid (output) pointer block 2056 generates four output pointers, one for each buffer, that indicate the position of the next word to be taken.

Figure 60:
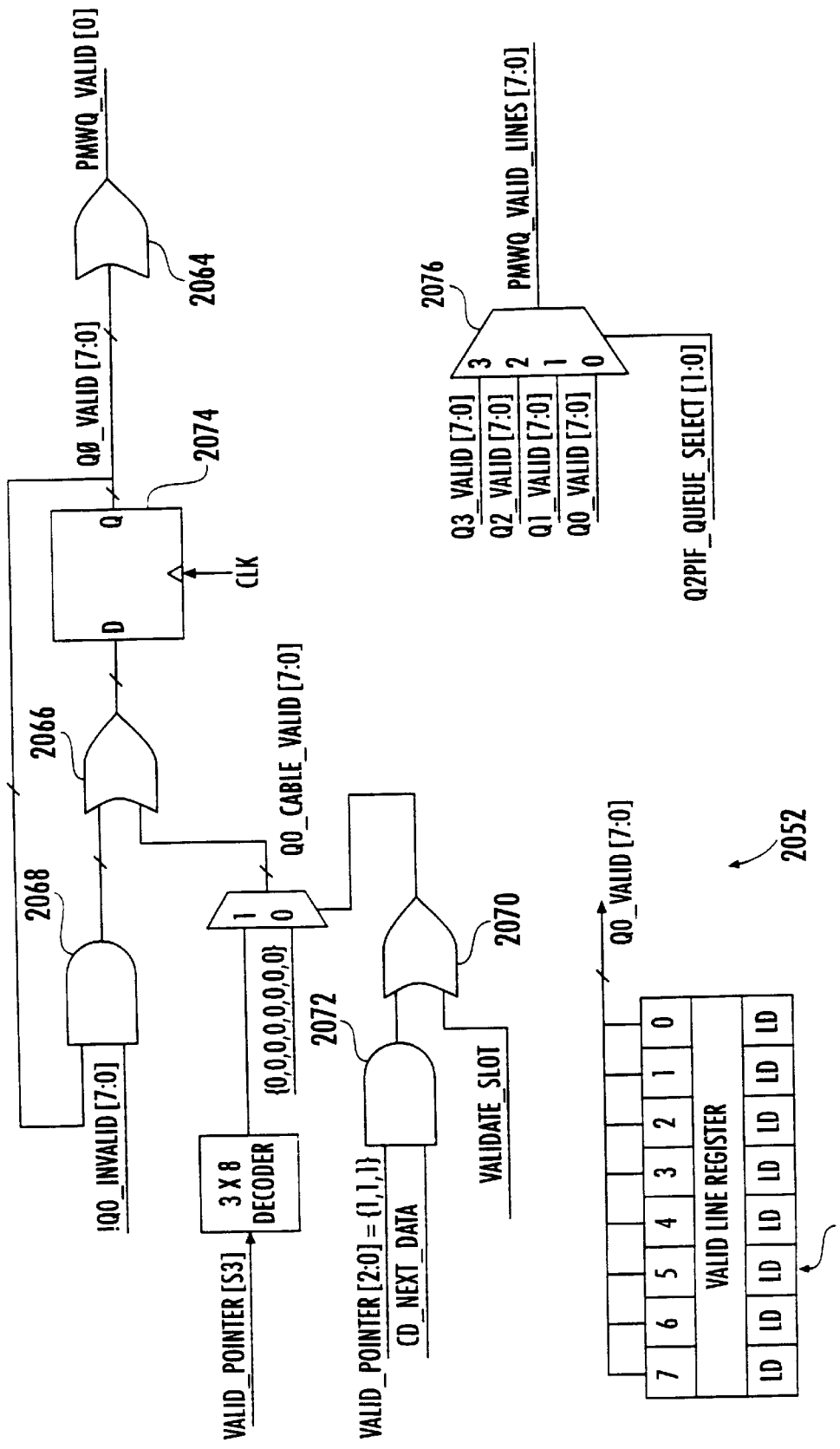

Referring also to FIG. 60, a valid flag logic block 2052 maintains an eight bit valid line register 2062 for each of the four buffers in the data RAM 2038. The valid line register 2062 indicates which of the eight cache lines in each buffer contain valid data. When the last word in a cache line has been filled with data (i.e., valid_pointer[2:0] equals "111" and cd_next_data is asserted, indicating that the word has been filled), the corresponding bit in an eight bit cable valid signal (i.e., q0_cable_valid[7:0], q1_cable_valid[7:0], etc.) is set. The bit to be set is determined by the three most significant bits of the valid pointer (valid pointer[5:3]), which indicate the cache line being filled. The corresponding bit in the cable valid signal also is set when a slot validation signal (validate_slot) is received from the cable decoder at the end of a transaction. The cable valid signal is latched into the valid line register 2062 corresponding to the selected data buffer at the rising edge of the first PCI clock cycle (CLK) after the last word is filled or the validate_slot signal is received. Otherwise, the valid line register maintains its current value. The bits in the valid line registers 2062 are cleared when the corresponding bits of an eight bit invalidate signal (i.e., q0_invalid[7:0], q1_invalid[7:0], etc.) is asserted.

The valid flag logic block 2052 generates a pmwq_valid[3:0] signal that indicates which, if any, of the four data buffers contains at least one valid line of data. The valid block 2052 also generates a pmwq_valid_lines[7:0] signal that indicates which of the eight cache lines of a selected data buffer are valid. A queue select signal from the QPIF (q2pif_queue_select[1:0]) is used to select which data buffer's valid line register 2062 is used to generate the pmwq_valid_lines[7:0] signal. When the queue block gains control of the bus to run a posted memory write cycle from a selected data buffer, the queue block transfers all data in each line whose corresponding bit is set in the pmwq_valid_lines[7:0] signal. Gates 2064, 2066, 2068, 2070, and 2072, and flip-flop 2074 are arranged to set the values in the valid line register 2062 for the first data buffer (q0_valid[7:0]). Similar circuitry determines the contents of the valid registers for the other three data buffers. Multiplexer 2076 selects the value of the pmwq_valid_lines[7:0] signal.

Figure 61:
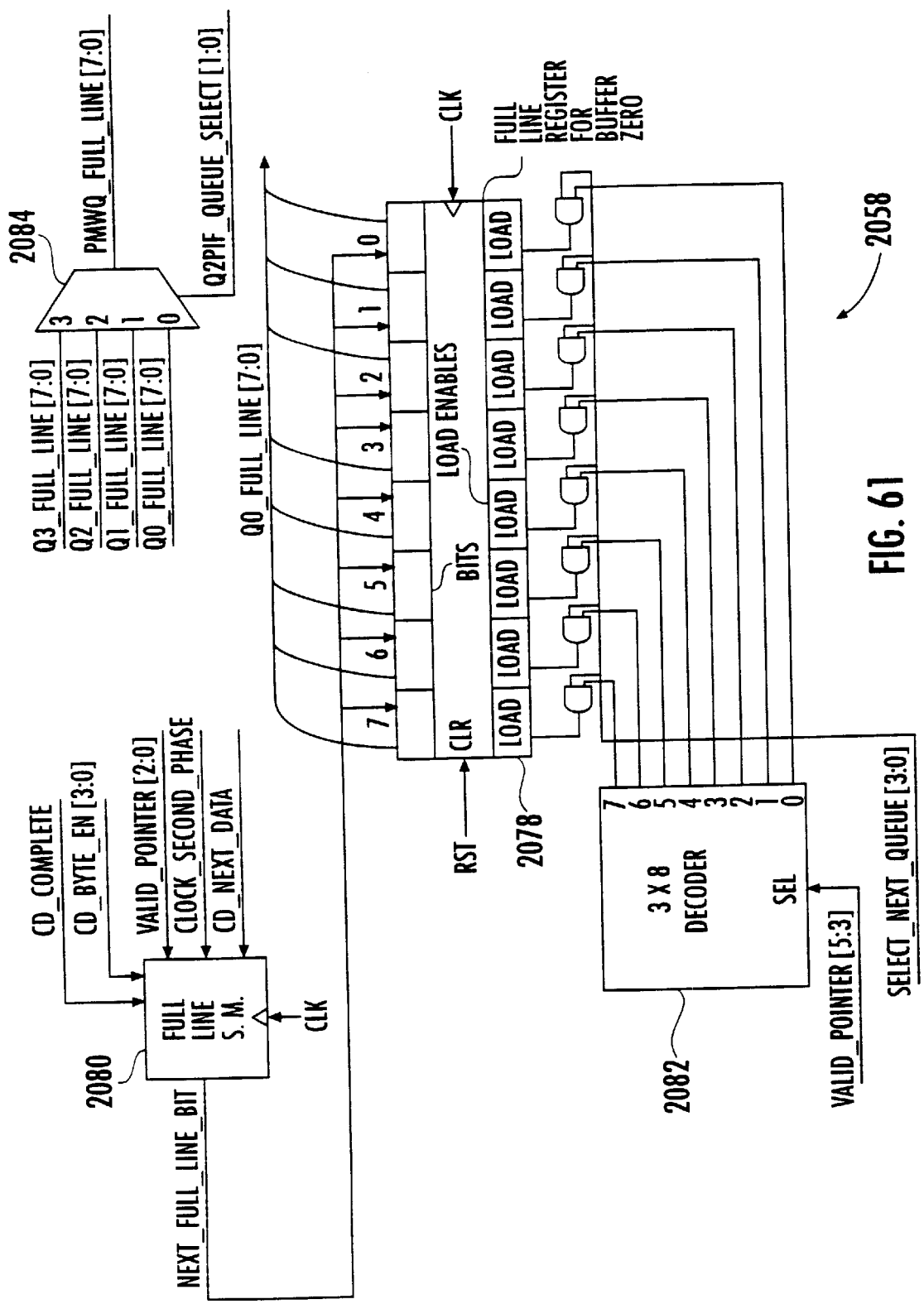

Referring now to FIG. 61, a full line logic block 2058 maintains an eight bit full line register 2078 for each of the four data buffers. The contents of each full line register 2078 indicate which of the eight cache lines in the corresponding data buffer are full. The bits in each full line register 2078 are set by an asynchronous next_full_line_bit signal generated by full line state machine 2080, described below. When a queue selection signal from the QPIF (select_next_queue[3:0]) selects one of the data buffers and the next_full_line_bit signal is asserted, the bit in the full line register 2078 corresponding to the cache line indicated by the three most significant bits of the valid pointer (valid_pointer[5:3]) is set. A 3×8 decoder 2082 converts the three bit valid pointer into an eight bit signal that determines which bit to set. An eight bit full line signal (q0_full_line) is generated for each data buffer from the contents of the corresponding full line register 2078. The full line signal indicates which lines in the corresponding data buffer are full. The full line logic block 2058 also generates a pmwq_full_line[7:0] signal that indicates which cache lines of a selected data buffer are full. Multiplexer 2084 and the q2pif_queue_select[1:0] signal are used to generate the pmwq_full_line[7:0] signal.

Figure 62:
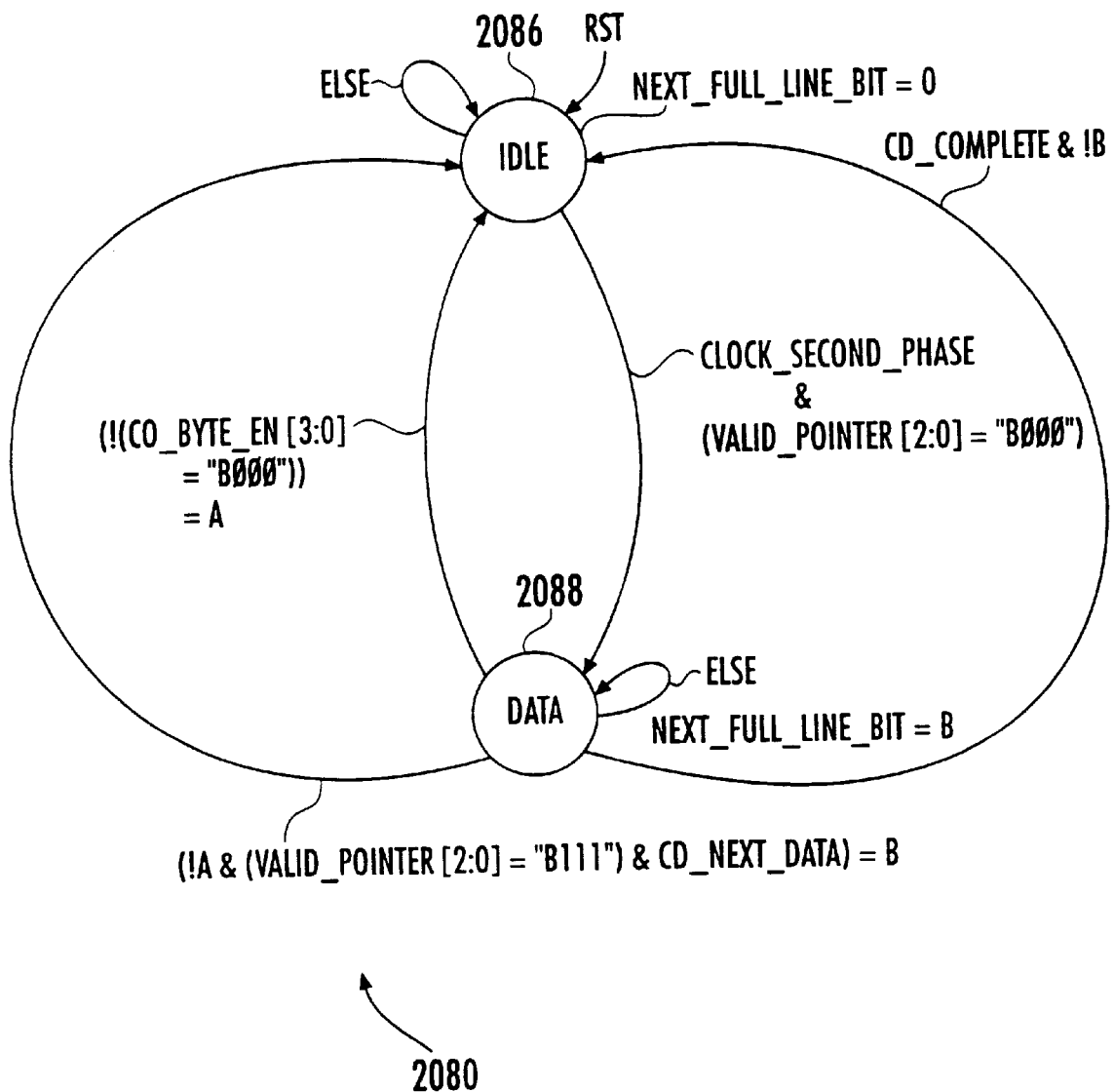

Referring also to FIG. 62, the full line state machine 2080 is placed in an IDLE state 2086 at reset. In the IDLE state 2086, the next_full_line_bit is set to zero. When a transaction is placed in the PMWQ, the transaction occurs in two phases, an address phase and a data phase. When the data phase begins (i.e., a clock_second phase signal is asserted) and the valid pointer points to the first word in a cache line (valid_pointer[2:0]="000"), the state machine 2080 transitions to a DATA state 2088. In the data state, the next_full_line_bit signal is asserted only if the valid pointer points to the last word in the cache line (valid_pointer[2:0]="111"), the cd_next_data signal is asserted by the cable decoder (indicating that the last word was filled with data), and the byte enable signal from the cable decoder (cd_byte_en[3:0]) equals "0000". The state machine also transitions back to the IDLE state 2086 when these conditions occur. If these conditions do not occur before the transaction terminates (i.e., cd_complete is asserted), the next_full_line_bit signal remains deasserted and the state machine 2080 transitions back to the IDLE state 2086. The state machine 2080 also transitions to the IDLE state 2086 without asserting the next_fullline_bit signal when the cd_byte_en[3:0] signal takes on a value other than "0000".

Referring again to FIG. 59 and also to FIG. 63, the PMWQ normally must terminate a transaction from the cable decoder when the data buffer receiving the corresponding data is full. However, when the cable decoder continues to send data after the buffer is full, an overflow logic block 2090 allows the data to overflow into the next empty buffer. The overflow logic block 2090 maintains an overflow register 2092 that indicates which, if any, of the four data buffers are being used as overflow buffers. The contents of the overflow register 2092 are used to produce a four bit overflow signal (pmwq_overflow[3:0]). When the transaction is in the data phase (i.e., data_phase is asserted), the valid pointer reaches the last word of a data buffer (i.e., valid_pointer[5:0]="111111"), the cable decoder indicates that more data is coming (i.e., cd_next_data is asserted), and the cable decoder has not indicated that the transaction is complete (i.e., cd_complete is not asserted), the select_next_queue[3:0] signal, which points to the recently filled data buffer, is used to set the overflow register bit corresponding to the next data buffer. If the conditions are not met, the overflow bit is cleared. Gates 2094 and 2095 are used in conjunction with the select_next_queue[3:0] signal to set and clear the appropriate overflow register bits when these conditions are met.

A single transaction may continue to overflow into additional buffers until the last unused buffer is full. If more than one buffer is used as an overflow buffer, multiple overflow register bits will be set. Consecutive set bits in the overflow register indicate that a single transaction has overflowed into more than one buffer. The overflow bits are either set or cleared when the posted write transaction is placed into the PMWQ. Also, if the QPIF begins to run the PMW transaction on the target bus and empty the original buffer while the data is still entering the PMWQ, the original buffer may be reused to continue the overflow transaction. The overflow can continue until all of the available buffers are full.

DELAYED REQUEST QUEUE

Referring to FIG. 64, the DRQ 142 stores all of the information needed to complete delayed read request (DRR) and delayed write request (DWR) transactions on the target bus. The DRQ includes a queue memory 2100 that holds information such as the address to be read from or written to, the PCI command code, byte enables, address and data parity bits, "locked cycle" and "dual address cycle" indication bits, and the buffer number of the delayed completion buffer reserved in the initiating bridge chip for the completion information. The queue memory 2100 also holds up to thirty-two bits (one word) of data to be written to the target bus in a delayed write cycle. Because delayed write cycles never involve more than one word of data, no data RAM is needed in the DRQ. The DRQ, and therefore the queue memory 2100, is capable of holding up to three delayed request transactions at once. A cable interface block 2102 claims delayed request transactions from the cable decoder and places them into the queue memory 2100. The following table shows the information maintained in the DRQ queue memory.

| Contents of DRQ | | |
|---|---|---|
| Field | Bits | Comments |
| Address | 64 | Upstream Transactions support Dual Address Cycles |
| PCI Command | 4 | I/O Read<br>I/O Write<br>Config Read<br>Config Write<br>Memory Read<br>Memory Read Line<br>Memory Read Multiple |
| Byte Enables | 4 | Byte Enables not necessary on MRL, MRM |
| Parity | 1/address<br>1/data transfer | Send data par with delayed write transactions |
| Data | 32 | Data queued on delayed write transactions. |
| Lock | 1 | |
| DAC Indication | 1 | Indicates whether address is 32 or 64 bits |
| Buff Num | 3 | Indicates DCQ buffer allocated for completion data |

Referring also to FIG. 65, a valid flag logic block 2104 determines when the DRQ has received all of the information necessary to run the transactions in the queue memory 2100. When one of the DRQ slots is selected by a corresponding slot select signal (i.e., select_zero for the first slot, select_one for the second slot, and select_two for the third slot) and the slot is validated by a validate_slot signal, indicating that the cable decoder has finished delivering the transaction to the DRQ, a valid signal corresponding to the slot (i.e., q0_valid, q1_valid, or q2_valid) is asserted at the rising edge of the next PCI clock (CLK) cycle. If a slot is not selected and validated by the validate_slot signal, the slot's valid signal is deasserted if the QPIF has selected the slot by asserting a DRQ select signal (q2pif_drq_select) and identifying the slot (q2pif_queue_select=slot number) but has aborted the transaction by asserting a cycle abort signal (q2pif_abort_cycle). The valid signal also is deasserted if the DRQ ends the transaction by asserting a cycle complete signal (e.g., q0_cycle_complete) while the QPIF is waiting for more data (i.e., q2pif_next_data is asserted). However, the cycle complete signal is ignored if the QPIF is currently streaming data to the other bridge chip (i.e., q2pif_streaming is asserted). Otherwise, if the slot's valid signal is not specifically asserted or deasserted on a clock cycle, it retains its current value. The valid flag logic block 2104 also generates a DRQ valid signal (drq_valid[3:0]) that indicates which, if any, of the three DRQ slots contains a valid transaction, by combining the valid signals for each individual slot (i.e., drq_valid={0, q2_valid, q1_valid, q0_valid}). Gates 2106, 2108, 2110, 2112, and 2114, multiplexers 2116 and 2118, and flip-flop 2120 are arranged to generate the slot valid signals and the DRQ valid signals in this manner.

The DRQ also includes pointer logic blocks that maintain pointers to the memory locations from which data is to be read during a delayed read request transactions. When the address at which the delayed read transaction will begin is loaded into the queue memory 2100, a valid pointer logic block 2122 generates a six bit valid pointer that indicates where the transaction will end. If the transaction involves a single word (e.g., a memory read), the valid pointer logic 2122 sets the valid pointer equal to the address loaded into the queue memory 2100. For a memory read line transaction, the valid pointer logic 2122 gives the valid pointer a value of "000111", which indicates that the last valid piece of data is eight dwords (i.e., one cache line) beyond the starting point. For a memory read multiple transaction, the valid pointer is set to "111111", which indicates that the last valid piece of data is sixty-four dwords (i.e., eight cache lines) beyond the starting point. The valid pointer logic 2122 maintains one valid pointer for each slot in the DRQ (valid_pointer_0[5:0], valid_pointer_1[5:0], and valid_pointer_2[5:0]). The location of the valid pointer is ignored by the DRQ when it receives a streaming signal from the QPIF (q2pif_streaming), as described in more detail below.

An output pointer logic block 2124 maintains three output pointers (output_pointer_0[5:0], output_pointer_1[5:0], and output pointer_2[5:0]), one for each slot in the DRQ, that indicate the next word of data to be read from memory and delivered to the other bridge chip. The pointer is incremented when the QPIF indicates that it is ready to read the next piece of data (i.e., it asserts the q2pif_next_data signal), once for every word read. Except in streaming situations, a transaction is terminated (completed) when the output pointer reaches the valid pointer. If a transaction terminates before all of the data is read (i.e., before the output pointer reaches the input pointer), the QPIF will pick up at the location indicated by the output pointer when the transaction resumes. If the output pointer is incremented but the output pointer logic 2124 receives a stepback signal (q2pif_step_back), indicating that the transaction was terminated on the PCI bus before the QPIF was able to read the last piece of data, the output pointer logic 2124 decrements the counter once so that the last unread piece of data can be read when the transaction resumes. A queue interface block 2126 provides transaction information and the valid and output pointers to the QPIF.

DELAYED COMPLETION QUEUE

Figure 66:
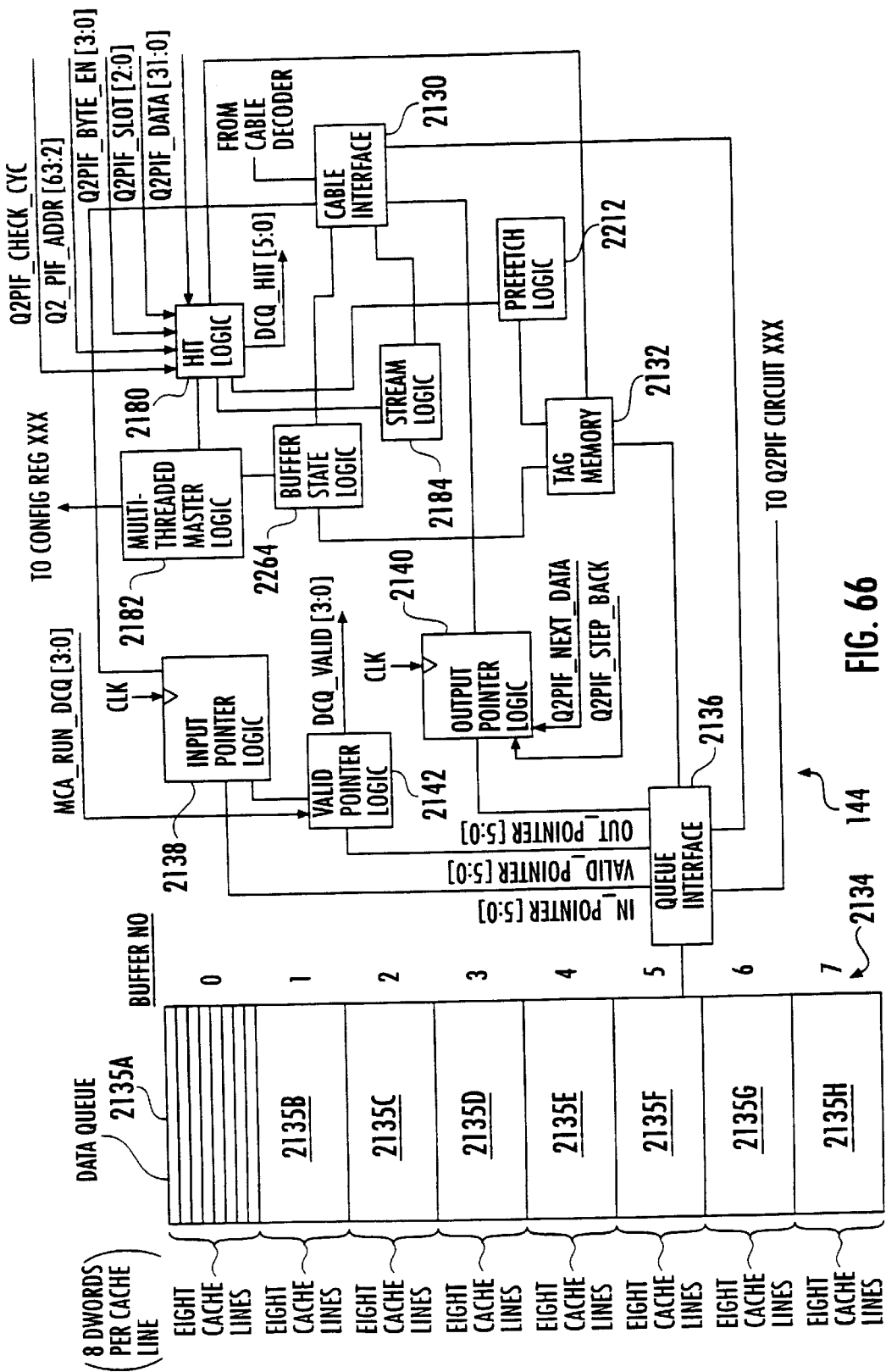

Referring to FIG. 66, the DCQ 144 stores delayed completion messages containing the response of the target bus to each delayed request issued on the initiating bus. Delayed completion messages corresponding to delayed read requests include the requested data, while delayed completion messages corresponding to delayed write requests include no data. A cable interface block 2130 claims delayed completion messages from the cable decoder and provides the delayed completion information to a tag memory 2132. The DCQ, and therefore the tag memory 2132, is capable of storing up to eight delayed completion messages at once. The tag memory 2132 stores information such as the PCI command and the address contained in the original request leading to the delayed completion message, byte enable bits, address and data parity bits, and "locked cycle" and "dual address cycle" bits. For delayed write transactions, which always involve only in a single word of data, the tag memory 2132 stores a copy of the written data. Each of the eight slots in the tag memory 2132 includes an implied pointer to one of eight corresponding data buffers in a DCQ data RAM 2134. For delayed read transactions, the returned data is stored in a corresponding data buffer 2135a–h in the data RAM 2134. The following table shows the information stored in the tag memory 2132 for each transaction held in the DCQ.

| Contents of DCQ | | |
|---|---|---|
| Field | Bits | Comments |
| Address | 64 | Upstream Transactions support Dual Address Cycles |
| PCI Command | 4 | I/O Read<br>I/O Write<br>Config Read<br>Config Write<br>Memory Read<br>Memory Read Line<br>Memory Read Multiple |
| Byte Enables | 4 | Byte Enables not necessary on MRL, MRM |
| Parity | 1/data transfer | Send data par with delayed write transactions |
| Data | 32 | Data queued on delayed write transactions. |
| Lock | 1 | |
| DAC Indication | 1 | Indicates whether address is 32 or 64 bits |

Each of the eight data buffers in the DCQ data RAM 2134 may store up to eight cache lines (256 bytes) of delayed completion data. Therefore, the buffers are large enough to store all completion data for even the largest delayed request transactions (memory read multiple transactions). However, the capacity of each data buffer may be reduced to four cache lines by setting a configuration bit (cfg2q_eight_line_) in the bridge chip's configuration registers. Each data buffer may be filled by data provided in a single delayed completion transaction, or if not all requested data is returned in a single delayed completion transaction, by multiple delayed completion transactions. However, each data buffer may contain data corresponding to only one original delayed request, regardless of how many delayed completion transactions it takes to provide the requested data.

A queue interface block 2136 controls the flow of completion data from the DCQ cable interface 2130 into the data RAM 2134 and out of the data RAM 2134 to the QPIF. Three logic blocks generate pointers that govern the input and output of data stored in the eight data buffers. The first block, an input pointer logic block 2138, maintains a six bit input pointer for each of the eight data buffers (in_pointer_0[5:0], in_pointer_1[5:0], etc.). Each input pointer points to the location in the corresponding data buffer to place the next word of data. The second block, an output pointer logic block 2140, maintains a six bit output pointer for each of the eight buffers (out_pointer_0[5:0], out_pointer_1[5:0], etc.). Each output pointer points to the location of the word of data immediately following the word last removed by the QPIF. The output pointer for a selected data buffer is incremented when the QPIF indicates that it is ready for the next piece of data (i.e, when q2pif_next_data is asserted). If the output pointer is incremented but the last piece of data does not reach the requesting device because the transaction was terminated by a device other than the QPIF, the QPIF asserts a stepback signal (q2pif_step_back) that causes the output pointer logic block 2140 to decrement the output pointer by one word.

The third pointer block, a valid pointer logic block 2142, maintains for each of the eight data buffers a six bit valid pointer (valid_pointer_0[5:0], valid_pointer_1[5:0], etc.) that indicates the next word of data in the corresponding data buffer that is available to the QPIF. Because the PCI Spec 2.1 requires that read completion data not be returned before an earlier-initiated posted memory write transaction, delayed completion data placed into the DCQ while a posted memory write is pending in the PMWQ cannot be made available to the requesting device until the posted memory write is completed on the PCI bus and removed from the PMWQ. Therefore, as long as any earlier-enqueued posted memory write transactions remain in the PMWQ, the valid pointer must remain at its current position. Then, when all earlier-enqueued posted memory writes have been removed from the PMWQ, the valid pointer may be moved to the same position as the in pointer. When the PMWQ is empty, all delayed completion data is valid (i.e., available to the requesting device) as soon as it is stored in the DCQ.

Figure 67A:
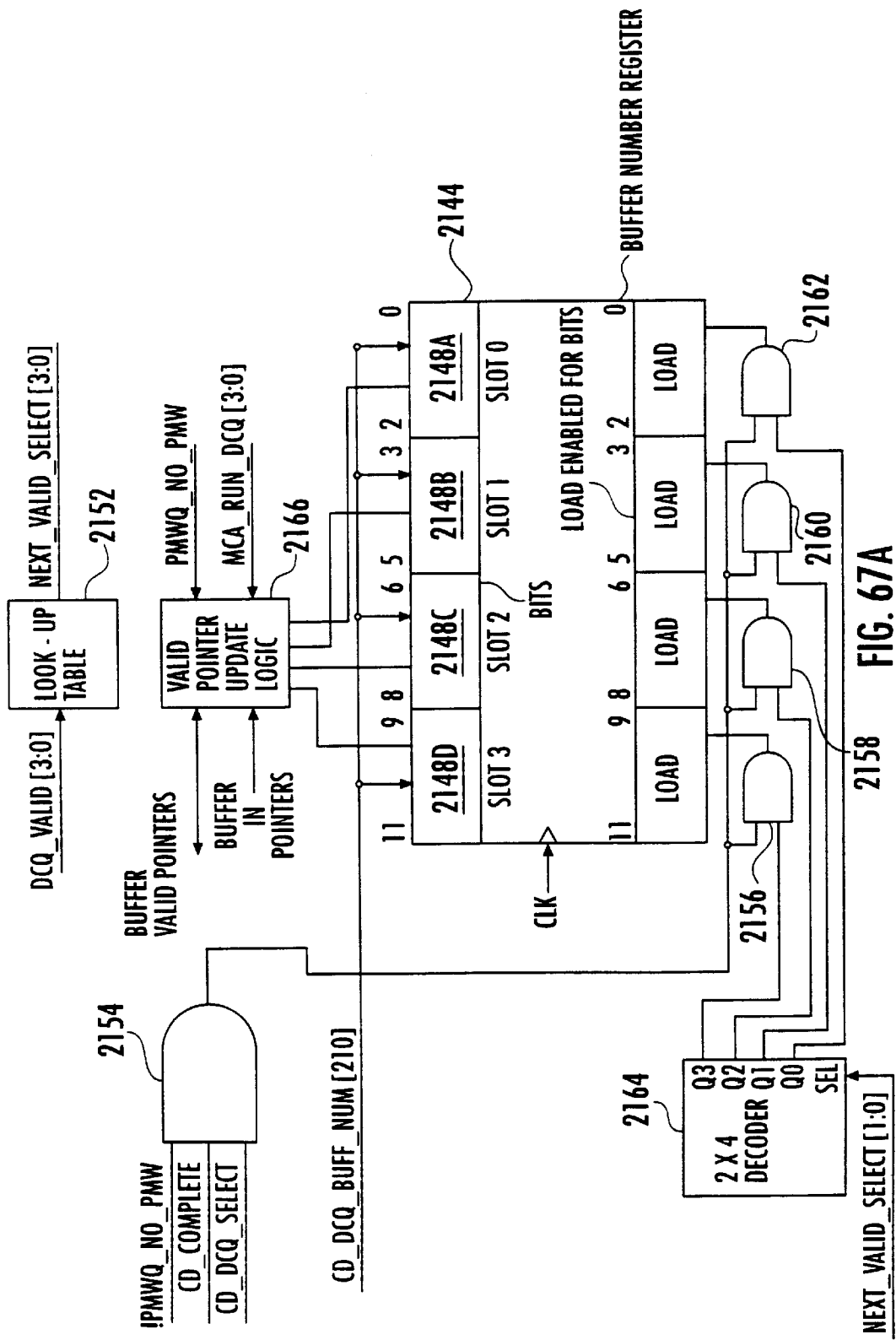
Figure 67B:
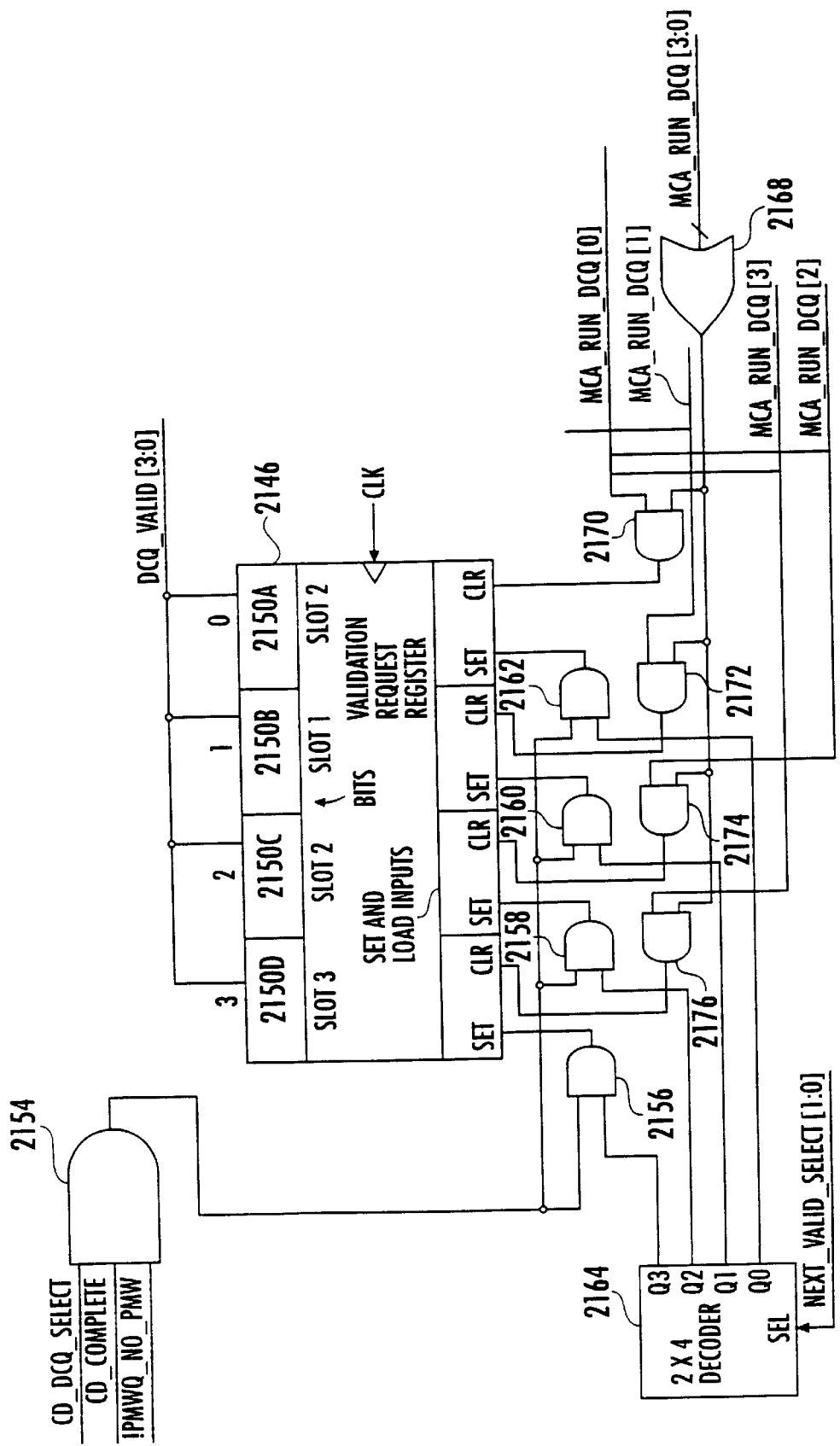

Referring also to FIGS. 67A and 67B, the valid pointer logic block 2142 must ask the master cycle arbiter (MCA) to validate all delayed completion transactions that enter the delayed completion queue while a posted memory write is pending in the PMWQ. But because the MCA can enqueue no more than four delayed completion transactions at once, as discussed below, the valid pointer logic block 2142 may request validation of no more than four delayed completion data buffers at once. The valid pointer logic block 2142 also must keep track of which four delayed completions transactions are enqueued in the MCA at any given time. To do so, the valid pointer logic block 2142 maintains two four-slot registers: a DCQ buffer number register 2144 and a validation request register 2146. The buffer number register 2144 maintains the three-bit DCQ buffer number, as determined by the DCQ buffer number signal (cd_dcq_buff_num[2:0]) provided by the cable decoder, of each delayed completion transaction enqueued in the MCA. The validation request register 2146 maintains one transaction validation request bit for each of the DCQ buffers whose numbers are stored in the four slots 2148a–d of the buffer number register 2144. The request bit in each slot 2150a–d of the validation request register 2146 is asserted if a corresponding delayed completion transaction is enqueued in the MCA. The values of the bits in the four validation request slots 2150a–d are provided together to the MCA as a four bit validation request signal (dcq_valid[3:0]).

When a delayed completion transaction is to be enqueued in the MCA, its corresponding DCQ buffer number is loaded into one of the buffer number slots 2148a–d by the cd_dcq_buff_num[2:0] signal. The slot 2148a–d to be loaded is selected by a two bit selection signal (next_valid_select[1:0]). The value of the selection signal depends upon the value of the dcq_valid[3:0] signal generated by the validation request register 2146 and look-up table 2152, the contents of which are shown in the table below. The slot is loaded when it is selected by next_valid_select[1:0], when the cable decoder has selected the DCQ and has completed the transaction (i.e., cd_dcq_select and cd_complete are asserted), and when at least one posted memory write transaction is pending in the PMWQ (i.e., pmwq_no_pmw is not asserted). Gates 2154, 2156, 2158, 2160, and 2162 and 2×4 decoder 2164 are arranged to load the buffer number register 2144 in this manner. Likewise, the corresponding bit in the validation request register 2146 is set by the output of gates 2154, 2156, 2158, 2160, and 2162 and 2×4 decoder 2164.

| Buffer number register slot selection | | |
|---|---|---|
| dcq_valid[3:0] | next_valid_select[1:0] | slot # |
| xxx0 | 00 | 0 |
| xx01 | 01 | 1 |
| x011 | 10 | 2 |
| 0111 | 11 | 3 |

In response to the dcq_valid[3:0] signal, the MCA outputs a four bit DCQ run signal (mca_run_dcq[3:0]) that indicates which of the DCQ buffers pointed to by the buffer number register may have its valid pointer updated. The mca_run_dcq[3:0] signal is provided to a valid pointer update logic block 2166, along with the pmwq_no_pmw signal and the in pointers for each of the eight data buffers. If a posted memory write transaction remains in the PMWQ after the MCA asserts one of the mca_run_dcq[3:0] bits (which will happen when a posted memory write transaction was enqueued after the delayed completion transaction was enqueued but before the MCA asserted the corresponding mca_run_dcq bit), the corresponding valid pointer is updated as long as no other delayed completion transactions corresponding to the same DCQ buffer are still enqueued in the MCA. If a delayed completion transaction for the same DCQ buffer is still enqueued in the MCA, the valid pointer may be updated only when the mca_run_dcq bit corresponding this transaction is asserted. On the other hand, as soon as the pmwq_no_pmw signal is deasserted, all valid pointers are updated to match the corresponding in pointers regardless of whether delayed completions are still enqueued in the MCA. When a mca_run_dcq bit is asserted, the corresponding bit in the validation request register 2146 is cleared. Gates 2168, 2170, 2172, 2174, and 2176 are arranged to clear the validation request register bits in this manner.

Referring again to FIG. 66, a hit logic block 2180 determines when a delayed request transaction from a requesting device on the PCI bus has "hit" one of the delayed completion messages in the DCQ. According to the PCI Spec 2.1, the following attributes must be identical for a delayed completion to be matched with a request: address, PCI command, byte enables, address and data parity, data (if a write request), REQ64# (if a 64-bit data transaction), and LOCK# (if supported). When a request is latched by the PCI slave, the QPIF retrieves the request information, sends it to the DCQ, and asserts a check cycle signal (q2pif_check_cyc) that instructs the DCQ hit logic 2180 to compare the request information to the delayed completion messages stored in the DCQ tag memory 2132. The hit logic 2180 receives the sixty-four bit address signal (q2pif_addr [63:2]), the four bit PCI command signal (q2pif_cmd[3:0]), the four enable bits (q2pif_byte_en[3:0]), the dual address cycle bit (q2pif_dac) (which corresponds to the PCI REQ64# signal), the lock bit (q2pif_lock) from the QPIF, and, if the request is a write request, the data to be written (q2pif_data[31:0]). Though not required by the PCI Spec 2.1, the QPIF also provides the slot number (q2pif_slot [2:0]) of the requesting device to enhance the queue block's buffer flushing routine, described below. The hit logic 2180 then compares each of these signals to the delayed completion information stored in the eight DCQ buffers. If all of the signals match the information of any of the delayed completion messages, the hit logic 2180 identifies the buffer containing the matching completion message by asserting a corresponding bit in an eight bit hit signal (dcq_hit[7:0]). When a hit occurs, the QPIF retrieves the completion message and provides it to the requesting device and, if the request is a read request, begins removing the returned data from the corresponding data buffer in the data RAM 2134. If the request information does not match the completion information of any of the delayed completion messages in the DCQ, the request has "missed" the DCQ and is stored in the next available DCQ buffer and forwarded through the cable to the other bridge chip by the QPIF. A PCI device which initiates a request that misses the DCQ may have its REQ# line masked until its completion message is returned, as described in more detail below.

The hit logic 2180 also interfaces with a multi-threaded master detection block 2182 to detect which PCI slots, if any, contain multi-threaded devices. Multi-threaded devices are capable of maintaining more than one delayed transaction at once and therefore must be treated specially. When a multi-threaded master is detected, a corresponding bit in the configuration registers is set to indicate that the device is able to sustain multiple outstanding delayed transactions and therefore that its REQ# line should not be masked. Multi-threaded master detection is discussed in more detail below.

Another function of the DCQ is to determine when an opportunity to create a stream of read data between the primary and secondary PCI buses exists. A streaming opportunity exists when delayed completion data is being placed into the DCQ by the cable decoder while it is still being placed onto the target bus by the target device. If the PCI device that initiated the transaction resubmits its request while the target device is still placing data on the PCI bus, a read stream is established. Because read streaming is an efficient way to transfer data between the primary and secondary PCI buses, the PCI bridge chip not only gives higher priority in the bus arbitration process to a device whose completion data is arriving, it also will attempt to terminate a non-streaming transaction to improve the possibility that a stream will be established. However, while in theory streaming can occur during any read cycle, in practice it is likely to occur only during transactions that involve a large amount of data (i.e., memory read multiple transactions). Therefore, the queue block will attempt to terminate transactions in favor of potential streaming opportunities only when the potential streaming transaction is a memory read multiple transaction.

Figure 68:
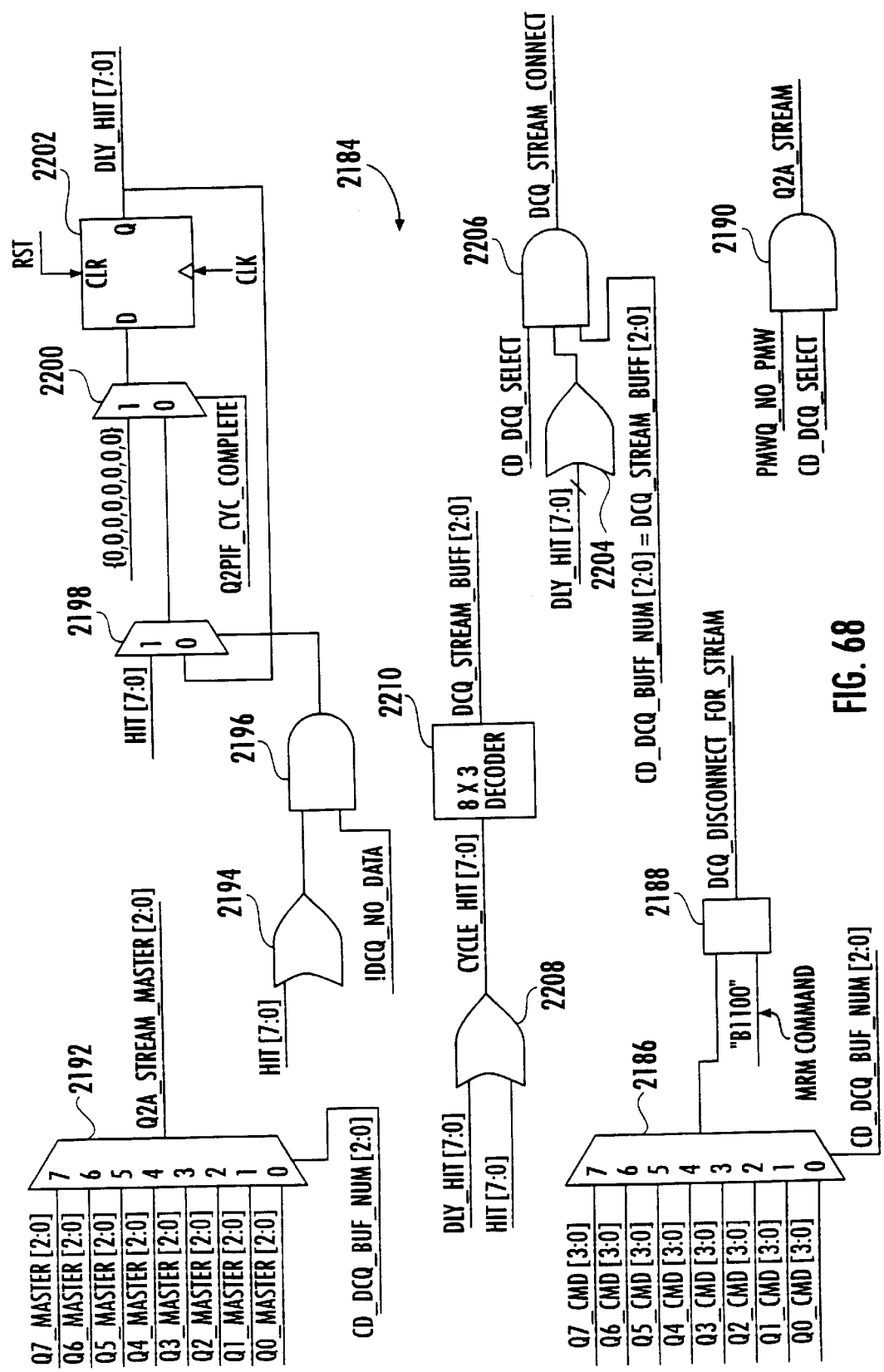

Referring also to FIG. 68, a stream logic block 2184 in the DCQ determines whether a streaming opportunity exists and, if so, generates the signals required to support the stream. The stream logic block 2184 generates the signals required to disconnect a current transaction in favor of a potential stream. When the cable decoder is placing a delayed completion transaction in the DCQ, the stream logic 2184 uses the DCQ buffer number signal provided by the cable decoder (cd_dcq_buff_num) to retrieve the PCI command code stored in the corresponding DCQ buffer (q0_cmd[3:0], q1_cmd[3:1], etc.). If the command code represents a memory read multiple request (i.e., "1100"), the stream logic 2184 asserts a disconnect-for-stream signal (dcq_disconnect_for_stream) that instructs the QPIF and the PCI interface to terminate the current transaction due to a potential streaming opportunity. Multiplexer 2186 and comparator 2188 are arranged to generate the dcq_disconnect_for_stream signal. Then, as long as the cable decoder continues to provide the completion data to the DCQ (i.e., the cd_dcq_select signal remains asserted) and no posted memory writes appear in the PMWQ (i.e., pmwq_no_pmw remains asserted), the stream logic 2184 provides a streaming request signal (q2a_stream) directly to the PCI arbiter. The stream logic 2184 also provides the slot number of the potential streaming device (q2a_stream_master[2:0]) to the PCI arbiter by using the cd_dcq_buff_num[2:0] signal to select the PCI slot number stored in the selected DCQ buffer (q0_master[2:0] for DCQ buffer zero 2135a, q1_master[2:0] for DCQ buffer one 2135b, etc.). The PCI arbiter then elevates the bus arbitration priority of the potential streaming device, as discussed in more detail below. If the potential streaming master is not granted the bus before the streaming opportunity disappears, its priority is returned to normal. Because the upstream bus has only one master device (the CPU), this feature is disabled in the upstream chip. Gate 2190 and multiplexer 2192 are arranged to generate the q2a_stream and q2a_stream_master signals.

When a requesting device hits a delayed completion message stored in the DCQ, the corresponding bit of an eight bit hit signal (hit[7:0]) is asserted. The hit[7:0] signal indicates which of the eight DCQ buffers was hit by the current request. When this happens, if the corresponding DCQ buffer contains data (i.e., dcq_no_data is not asserted), the stream logic 2180 latches the value of the hit signal for the duration of the transaction (i.e., as long as q2pif_cyc_complete is asserted). The latched version of the hit signal forms a "delayed" hit signal (dly_hit[7:0]). When either the hit signal or the delayed hit signal indicates that a DCQ buffer has been hit, a three bit DCQ stream buffer signal (dcq_stream_buff[2:0]) provides the buffer number of the hit DCQ buffer. Then, if the cable decoder places delayed completion data into the buffer while the cycle that hit the buffer is in progress (i.e., cd_dcq_select is asserted and cd_dcq_buff_num[2:0] equals dcq_stream_buff[2:0]), the stream logic block 2180 asserts a stream connect signal (dcq_stream_connect) that tells the QPIF that a stream has been established. The QPIF then informs the bridge chip on the target bus that a stream has been established. If certain conditions are met, the target QPIF will continue to stream until it is told to stop by the initiating QPIF, as discussed in more detail below. Gates 2194 and 2196, multiplexers 2198 and 2200, and flip-flop 2202 are arranged to generate the delayed hit signal. Gates 2204, 2206, and 2208 and encoder 2210 are arranged as shown to generate the dcq_stream_connect and dcq_stream_buff[2:0] signals.

Referring again to FIG. 66, the DCQ will, under certain circumstances, automatically prefetch data from the target bus on behalf of a PCI master in anticipation that the master will come back and request the data. A prefetch logic block 2212 in the DCQ prefetches data when the reading master consumes all of the data in its DCQ buffer and the prefetch logic 2212 anticipates that the requesting device will return with a sequential read request (i.e., a request that picks up with data located at the next sequential location in memory). Because some devices, such as multi-threaded masters, routinely read all of the data requested in one transaction and then return with a different, non-sequential request, the prefetch logic 2212 includes prediction circuitry that disables the prefetch capabilities for each device on the PCI bus until the device has shown a tendency to issue sequential read requests. As soon as a device that has been receiving prefetched data returns with a non-sequential read request, the prediction circuitry will disable the prefetching function for that master.

Figure 69A:
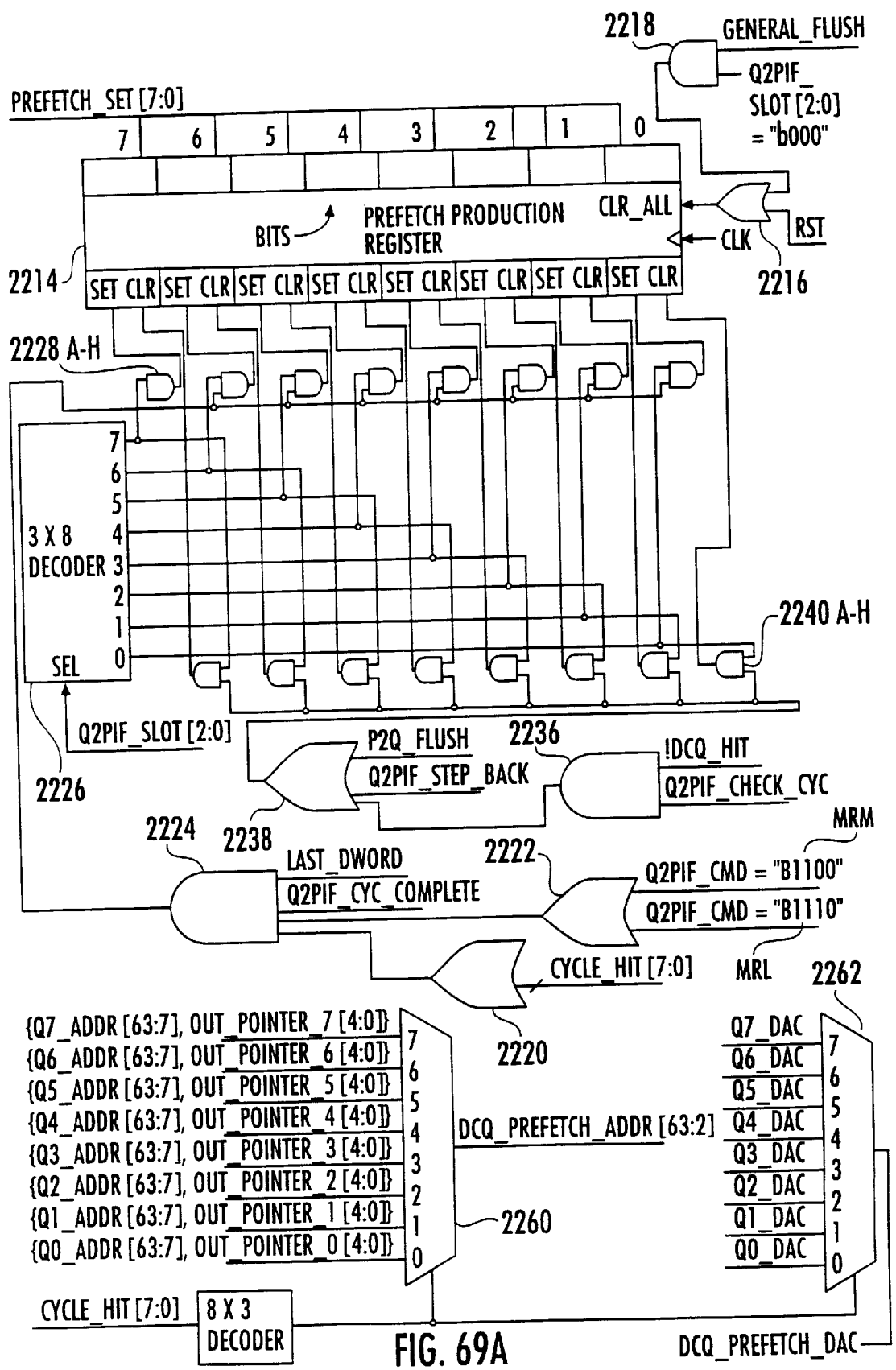
Figure 69B:
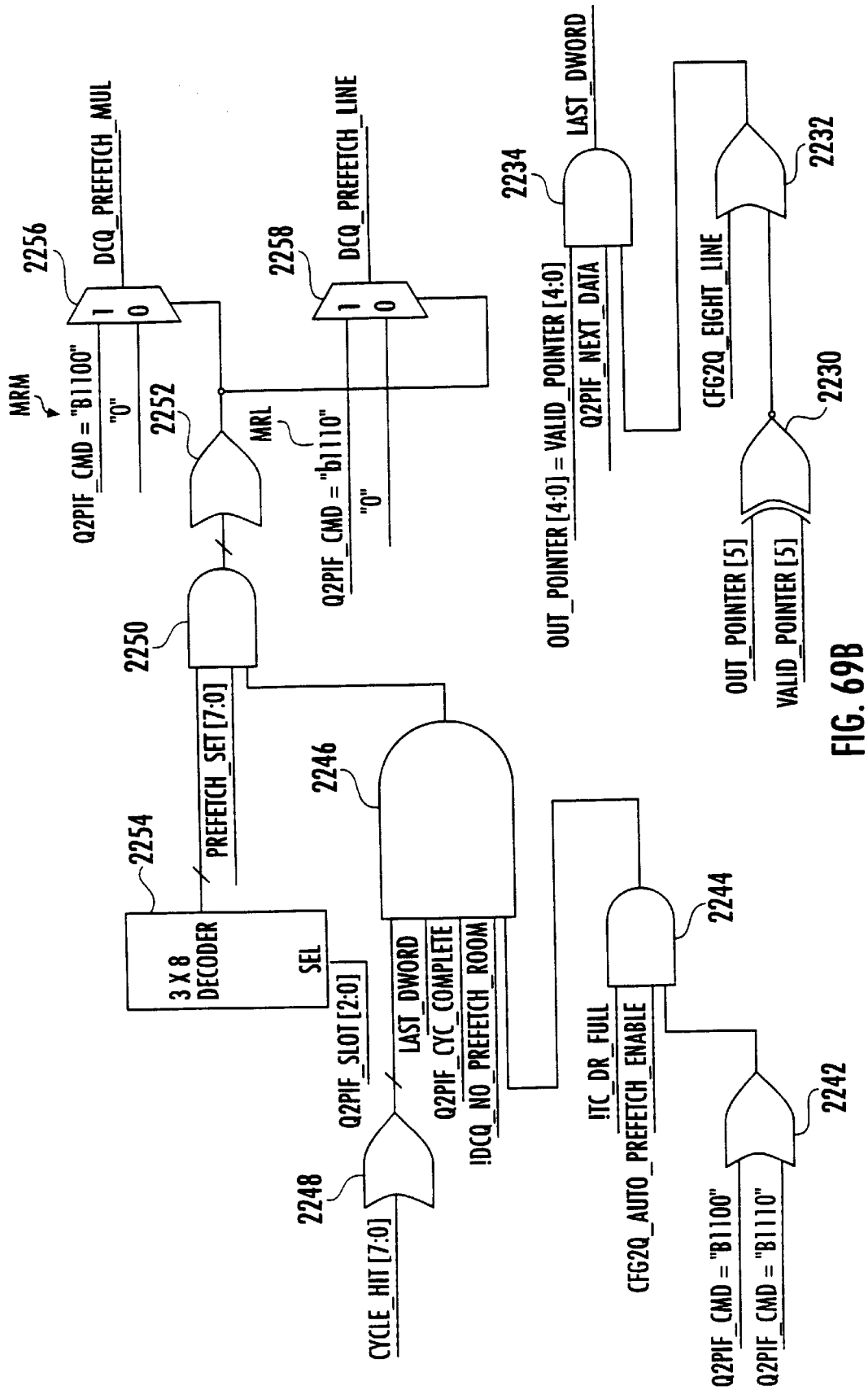

Referring also to FIGS. 69A and 69B, the prefetch logic block 2212 includes a prefetch prediction register 2214, the output of which is an eight bit prefetch enable signal (prefetch_set[7:0]) that governs whether the prefetch function is available for each of the devices on the PCI bus. All bits in the prefetch enable signal are cleared at reset (RST) and when the QPIF orders a general_flush of all of the DCQ registers (i.e., general_flush is asserted and q2pif_slot[2:0] equals "000"). The general_flush signal is discussed in more detail below. Gates 2216 and 2218 generate the signal that resets the prefetch_set bits.

An individual bit in the prefetch enable signal is set when the corresponding PCI slot is selected by the q2pif_slot signal and the following conditions occur: the requesting device hits a delayed completion buffer in the DCQ (i.e., one of the bits in the cycle_hit[7:0] signal is asserted), the current transaction is a memory read line or memory read multiple cycle (i.e., q2pif_cmd[3:0] equals "1100" or "11110"), the QPIF has indicated that the cycle is complete (i.e., q2pif_cyc_complete is asserted), and the last word of data was taken from the DCQ buffer (i.e., last_word is asserted). Gates 2220, 2222, 2224 and 2228a–h and decoder 2226 are arranged to set the prediction bits in this manner. The last_word signal is asserted by the prefetch logic 2212 when the requesting device tries to read past the end of the DCQ buffer. This occurs when the out pointer and in pointer are equal, indicating that the end of the DCQ buffer has been reached (i.e., for a four cache line buffer, out_pointer_x[4:0] equals valid_pointer_x[4:0] or, for an eight cache line buffer, out_pointer_x[5:0] equals valid_pointer_x[5:0]) and when the requesting device tries to read another piece of data (i.e., q2pif_next_data is asserted). Gates 2230, 2232, and 2234 are arranged to generate the last_word signal.

An individual bit in the prefetch enable signal is cleared when the corresponding PCI slot is selected and either a PCI flush condition occurs (p2q_flush is asserted), the QPIF tells the DCQ to step back the buffer's valid pointer (q2p_step_back is asserted), or the requesting device initiates a transaction that misses all of the DCQ buffers (q2pif_check_cyc is asserted and dcq_hit is deasserted). Gates 2236, 2238, and 2240a–h and decoder 2226 are arranged to clear the prediction enable bits in this manner.

When the prefetching function is enabled for a device on the PCI bus, the prefetch logic 2212 can generate two types of prefetch signals for the device: a prefetch line signal (dcq_prefetch_line) and a prefetch multiple signal (dcq_prefetch_mul). The prefetch line signal is generated when the current PCI command from the requesting device is a memory read line signal, and the prefetch multiple signal is generated when the current PCI command is a memory read multiple signal. In either case, the corresponding prefetch signal is generated when the following conditions occur: the prefetch_set bit for the requesting PCI slot is set; a corresponding prefetch enable bit in the configuration registers is set (cfg2q_auto_prefetch_enable); the DRQ in the upstream chip is not full (!tc_dc_full); the DCQ buffer has room for the corresponding amount of prefetch data (!dcq_no_prefetch_room); the current cycle hit the DCQ buffer; and the requesting master has tried to read past the end of the DCQ buffer (last_word and q2pif_cyc_complete). Gates 2242, 2244, 2246, 2248, 2250, and 2252, decoder 2254, and multiplexers 2256 and 2258 are arranged to generate the prefetch signals in this manner.

When the prefetch logic 2212 generates a prefetch signal, it generates a corresponding prefetch address signal (dcq_prefetch_addr[63:2]) by concatenating the upper fifty-seven bits of the address stored in the corresponding DCQ buffer (q0_addr[63:7] for buffer zero, q1_addr[63:7] for buffer one, etc.) with the lower five bits of the buffer's output pointer (out_pointer_0[4:0], etc.). A dual address cycle signal (dcq_prefetch_dac) indicates whether the prefetch transaction is a dual or single address cycle. The dcq_prefetch_cycle signal takes on the value of the dual address bit stored in the DCQ buffer (q0_dac, q1_dac, etc.). For both the prefetch address and dual address cycle signals, the appropriate value is output from a multiplexer 2260 or 2262 and selected by the three bit DCQ buffer number signal indicating which DCQ buffer was hit by the current request.

Referring again to FIG. 66, each DCQ data buffer has several possible states, each of which is determined by a buffer state logic block 2264 in the DCQ. The following are the possible buffer states.

1. Empty. Available for allocation. A buffer is Empty after power up and after it is flushed.
2. Complete. The buffer contains completion information for a delayed completion from a real delayed request from a device on the PCI bus (i.e., not a prefetch request). The PCI device has not yet reconnected and taken data from the buffer. The delayed completion transaction is complete.
3. Prefetch. The buffer contains completion data for a prefetch request or requested data that was left in the buffer after the requesting master disconnected from the buffer. All of the completion data has arrived from the target.
4. PartComplete. The buffer is reserved for and may contain completion information for a real delayed request (i.e., not a prefetch request). The master has not yet reconnected and taken data from the buffer, and not all of the completion information has arrived from the target.
5. PartPrefetch. The buffer is reserved for or contains completion information for a prefetch request, or the buffer contains requested data that was left in the buffer after the requesting master disconnected from the buffer. Not all of the completion information has arrived from the target.
6. Discard. The buffer was flushed while in the PartPrefetch state, but the last completion data has not yet arrived from the target. The buffer is placed in the Discard state to prevent it from being used until the transaction completes on the target bus and the last data arrives.

When the QPIF requests a DCQ buffer for a delayed request transaction, the buffer state logic 2264 allocates the buffers in the following order. If no buffer is in the Empty state or Prefetch state, the requesting master must be retried.

| DCQ Buffer Allocation | |
|---|---|
| Buffer Number | Buffer State |
| Q0 | Empty |
| Q1 | Empty |
| Q2 | Empty |
| Q3 | Empty |
| Q4 | Empty |
| Q5 | Empty |
| Q6 | Empty |
| Q7 | Empty |
| Q0 | Prefetch |
| Q1 | Prefetch |
| Q2 | Prefetch |
| Q3 | Prefetch |
| Q4 | Prefetch |
| Q5 | Prefetch |
| Q6 | Prefetch |
| Q7 | Prefetch |

When a device on the PCI bus initiates a delayed read request and a DCQ completion buffer is set aside, the buffer state logic 2264 changes the buffer's state to PartComplete. If the DCQ initiates a prefetch read, the buffer state is changed to PartPrefetch. When the last piece of completion data arrives, the buffer's state is changed from PartComplete or PartPrefetch to Complete or Prefetch, respectively. When the requesting device resubmits a retried read request and hits the buffer, any valid completion data is given to the master if the buffer is in the Complete, Prefetch, PartComplete, or PartPrefetch state. If the master does not take all of the data before disconnecting, the buffer's state is changed to Prefetch or PartPrefetch to indicate that the unclaimed data is considered to be prefetch data. If the master takes the last piece of data when the buffer is in the Complete or Prefetch state, the buffer's state is changed to Empty.

If a flush signal is received while a buffer is in the Prefetch state, the prefetch data in the buffer is discarded and the buffer state is changed to Empty. If a flush event occurs while the buffer is in the PartPrefetch state and completion data is still arriving, the buffer is changed to the Discard state until all of the prefetch data arrives. When the transaction is complete, the prefetch data is discarded and the buffer state is changed to Empty. If the buffer is in the Complete or PartComplete state when a flush signal is received, the completion data is left in the buffer and the buffer state remains unchanged. If the flush signal occurs because the corresponding PCI device has issued a new request (i.e., a request that is not currently enqueued and that "misses" all of the completion buffers), as discussed below, the DCQ allocates a new buffer for the transaction, as discussed above. Therefore, a PCI device may have more than one completion buffer allocated. Multiple buffers may be allocated to a PCI device when the device has a buffer containing or awaiting completion data (i.e., the buffer is in the Complete or PartComplete state) and the device issues a new request. Because multi-threaded devices are the only devices that can maintain multiple transactions at once, only multi-threaded devices can have multiple completion buffers reserved simultaneously.

MASTER CYCLE ARBITER

The Master Cycle Arbiter (MCA) determines the execution order of posted memory write and delayed request transactions while maintaining the ordering constraints between posted memory write, delayed request, and delayed completion cycles set forth in the PCI Spec 2.1. According to the PCI Spec 2.1, the MCA must guarantee that executed cycles maintain strong write ordering and that no deadlocks occur. To ensure that no deadlocks will occur, posted memory write cycles must be allowed to pass earlier enqueued delayed request cycles, and to maintain the required ordering constraints, delayed request cycles and delayed completion cycles must never be allowed to pass earlier-enqueued posted memory write cycles.

Figure 70:
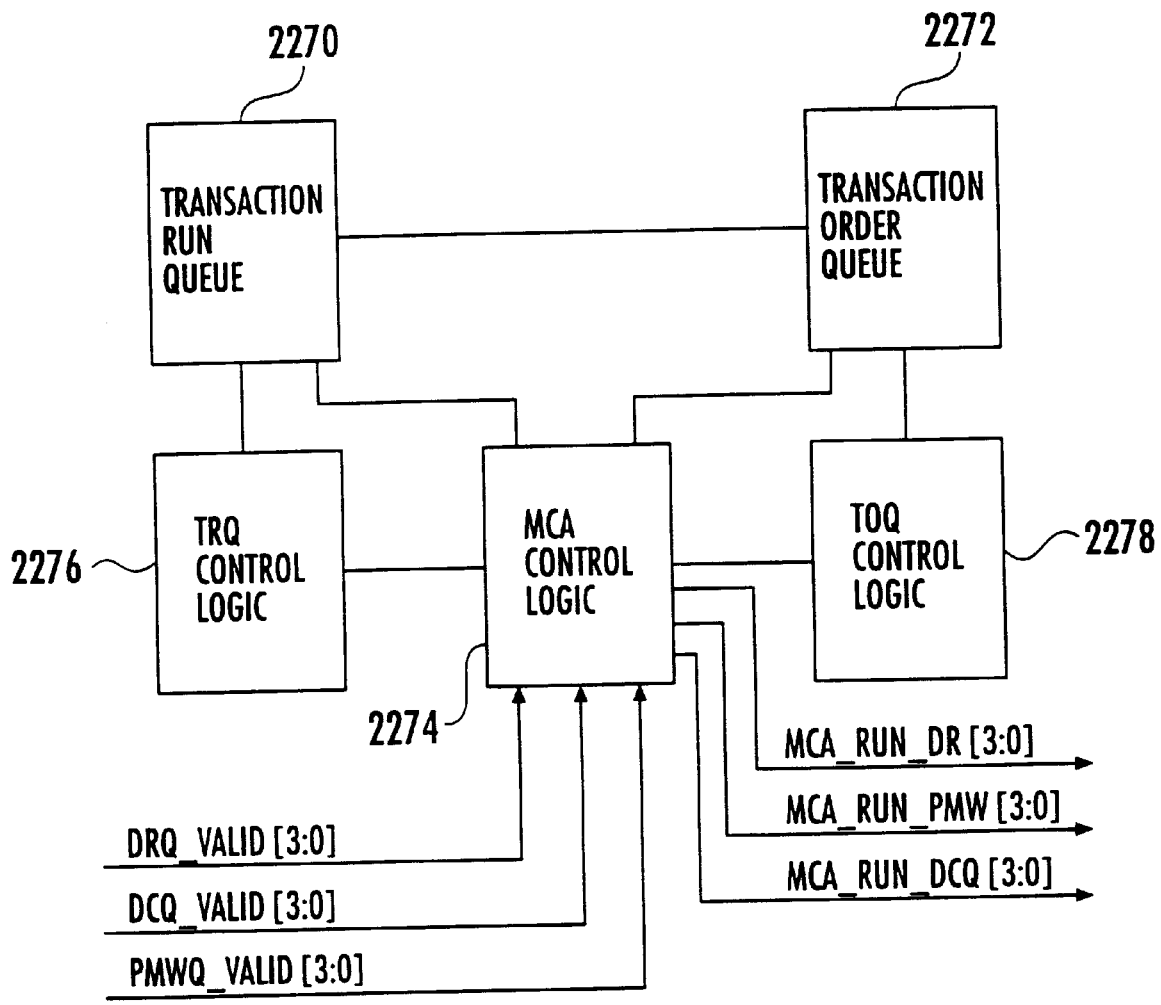

Referring to FIG. 70, the MCA uses two transaction queues, a transaction run queue (TRQ) (or transaction execution queue) 2270 and a transaction order queue (TOQ) 2272, to manage cycles enqueued in the PMWQ, DRQ, and DCQ. An MCA control block 2274 receives transactions from the PMWQ, DRQ, and DCQ in the form of four bit validation request signals (pmwq_valid[3:0], drq_valid [3:0], and dcq_valid[3:0]) and outputs run commands in the form of four bit run signals (mca_run_pmwq[3:0], mca_run_drq[3:0], and mca_run_dcq[3:0]). The transactions are moved into and out of the TRQ 2270 and TOQ 2272 by a TRQ control block 2276 and a TOQ control block 2278, respectively.

Figure 71:
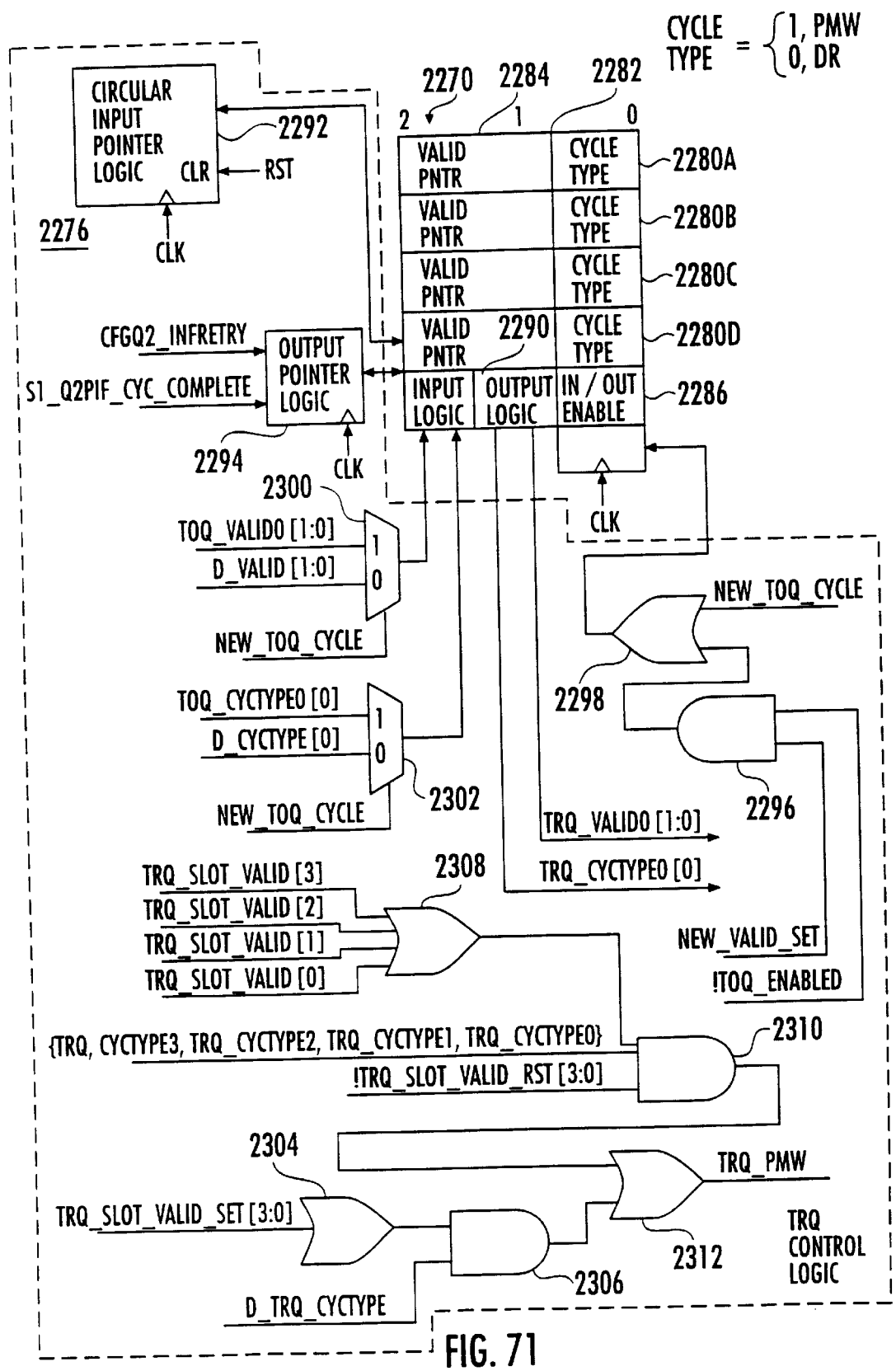

Referring also to FIG. 71, the TRQ 2270 is the queue from which the MCA determines the transaction execution order. Transactions in the TRQ 2270 can be executed in any order without violating the transaction ordering rules, but once a posted memory write cycle is placed in the TRQ 2270, no other cycle can be placed in the TRQ 2270 until the posted memory write is removed. Transactions in the TRQ 270 are tried in circular order and generally are completed in the order they were received. However, if a transaction in the TRQ 2270 is retried on the PCI bus, the MCA may select the next transaction in the TRQ 2270 to be tried on the PCI bus. Because delayed completion transactions are slave cycles rather than master cycles, they are never placed in the TRQ 2270. Furthermore, because delayed completion information may be made available to the requesting device as soon as it enters the DCQ if no posted memory write cycles are pending in the PMWQ, delayed completion transactions are placed in the TOQ 2272 only when a posted memory write cycle is pending in the TRQ 2270, as discussed in more detail below.

The TRQ 2270 is a circular queue that holds up to four transactions at once. Because the MCA must always be able to run at least one posted memory write transaction to preserve the required ordering constraints, the TRQ 2270 can never hold more than three delayed request transactions at once. Furthermore the TRQ can hold only one posted write transaction at a time because posted writes cannot be passed by any later-initiated transaction, including other posted writes. Each slot 2280*a–d* in the TRQ 2270 contains three bits of information: a one bit cycle type indicator 2282 (which equals "1" for posted memory write transactions and "0" for delayed request transactions), and a two bit valid pointer 2284, the four possible values of which identify which of the buffers in the PMWQ or the DRQ the enqueued transactions occupy. The TRQ 2270 also includes an input/output enable block 2286 that determines when a transaction may be moved into or out of the TRQ 2270, an input logic block 2288 that controls the placement of a transaction into the TRQ 2270, and an output logic block 2290 that controls removal of a transaction from the TRQ 2270. These logic blocks contain standard queue management circuitry.

A circular input pointer 2292 selects the next available slot for placement of an incoming transaction. The input pointer is circular to maintain, as much as possible, historical order of the incoming transactions.

A circular output pointer 2294 arbitrates between the transactions in the TRQ 2270 and determines their order of execution. The output pointer 2294 always begins with the top slot 2286*a* in the TRQ 2270 at startup and progresses circularly through the TRQ 2270. The output pointer 2294 may be configured to operate in either infinite retry or zero retry mode by setting or clearing, respectively, an infinite retry bit in the configuration registers (cfg2q_infretry). In infinite retry mode, the output pointer 2294 remains on a transaction until the transaction is run successfully on the PCI bus. In zero retry mode, the output pointer 2294 is incremented each time a transaction is tried on the bus (i.e., q2pif_cyc_complete was asserted on the previous PCI clock cycle), regardless of whether the transaction completes successfully or is retried. Because the PCI Spec 2.1 mandates that posted memory write transactions be allowed to bypass delayed request transactions, the output pointer 2294 in at least one of the bridge chips must be configured to operate in zero retry mode. Here, the downstream chip always is configured to operate in zero retry mode. Alternatively, the output pointer may be configured to operate in finite retry mode, in which each transaction may be attempted on the PCI bus a predetermined number (e.g., three) of times before the output pointer increments. Both the upstream and downstream chips can be configured to operate in finite retry mode with violating the ordering constraints of the PCI Spec 2.1. In any case, the output pointer tries to maintain the historical order of transactions stored in the TRQ 2270, incrementing only when a transaction cannot be completed successfully on the target PCI bus.

When a posted memory write or delayed request cycle is popped out of the TOQ 2272 (new_toq_cycle is asserted), as discussed below, or when the TOQ 2272 is not enabled (!toq_enabled) and a new cycle is received by the MCA (new_valid_set), the cycle type bit and valid bits for the new cycle are loaded into the next empty slot in the TRQ. If the cycle is coming from the TOQ 2272, the valid bits and cycle type bit are provided by TOQ valid and cycle type signals (toq_valid[1:0] and toq_cyctype[0]), respectively. Otherwise, the new cycle information is provided by MCA valid and cycle type signals (d_valido[1:0] and d_cyctype [0]). Gates 2296 and 2298 and multiplexers 2300 and 2302 are arranged to control the selection of cycles to be loaded into the TRQ 2270. When a cycle is successfully run on the PCI bus, the cycle is removed from the transaction order queue and its cycle type bit and valid bits are provided to the MCA control block 2274 as TRQ cycle type and valid signals (trq_cyctype[0] and trq_valido[1:0]), respectively.

The TRQ control block 2276 generates a trq_pmw signal that indicates when a posted memory write transaction is enqueued in the TRQ 2270. When this signal is asserted, subsequently issued delayed request and delayed completion transactions must be enqueued in the TOQ 2272, as discussed below. The trq_pmw signal is asserted when the MCA control block 2274 has instructed the TRQ 2270 to enqueue a new posted memory write cycle (trq_slot_valid_set does not equal "0000" and d_trq_cyctype equals "1"), or, alternatively, when any of the TRQ slots 2280*a–d* contains a cycle (trq_slot_valid[3:0] does not equal "0000"), at least one of the cycles is a posted memory write cycle (trq_cyctype equals "1"), and the posted memory write cycle has not been cleared from the corresponding slot 2280*a–d* (!trq_slot_valid_rst[3:0]). Gates 2304, 2306, 2308, 2310, and 2312 are arranged to generate the trq_pmw signal in this manner.

Figure 72:
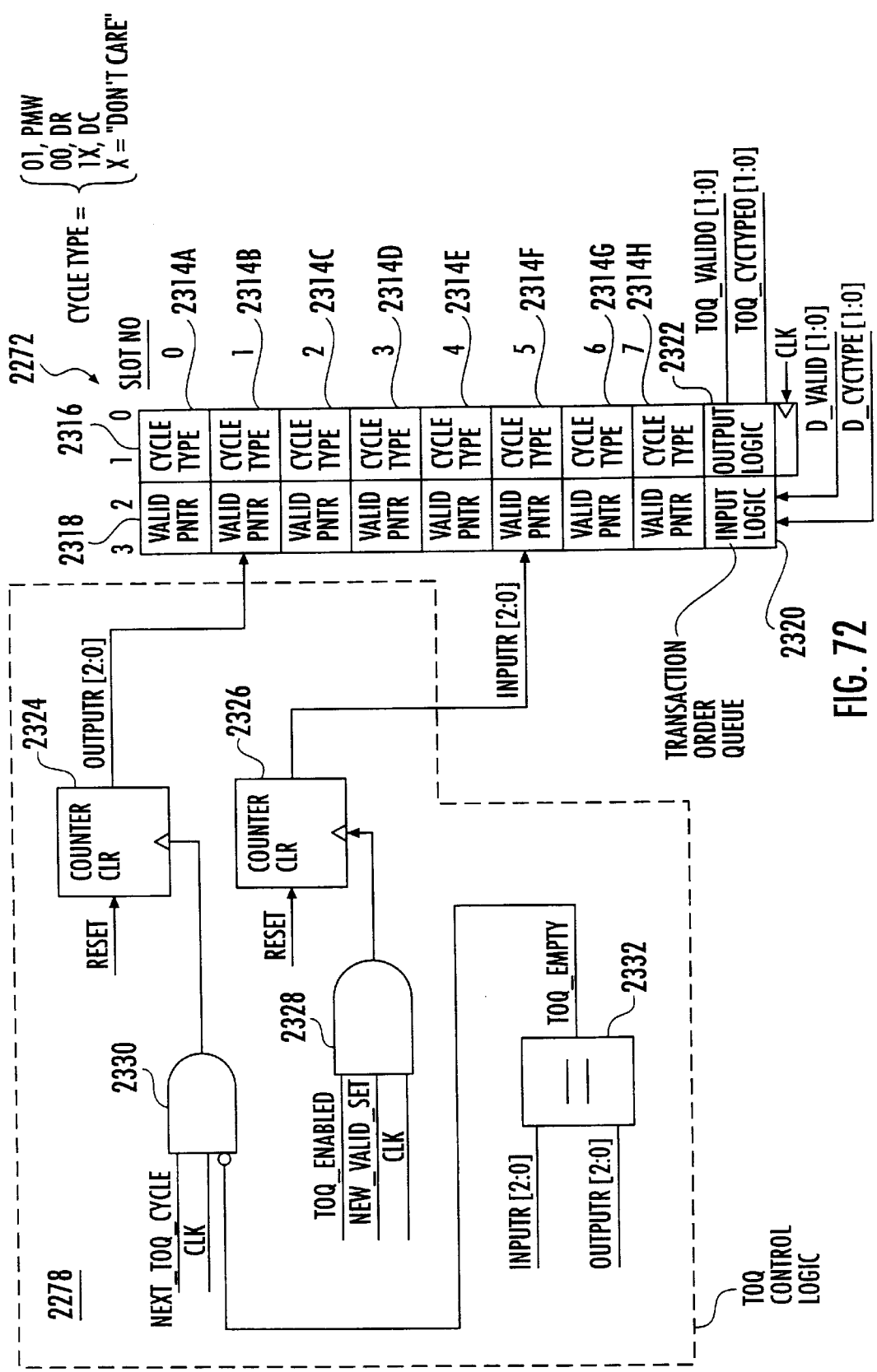
Figure 73A:
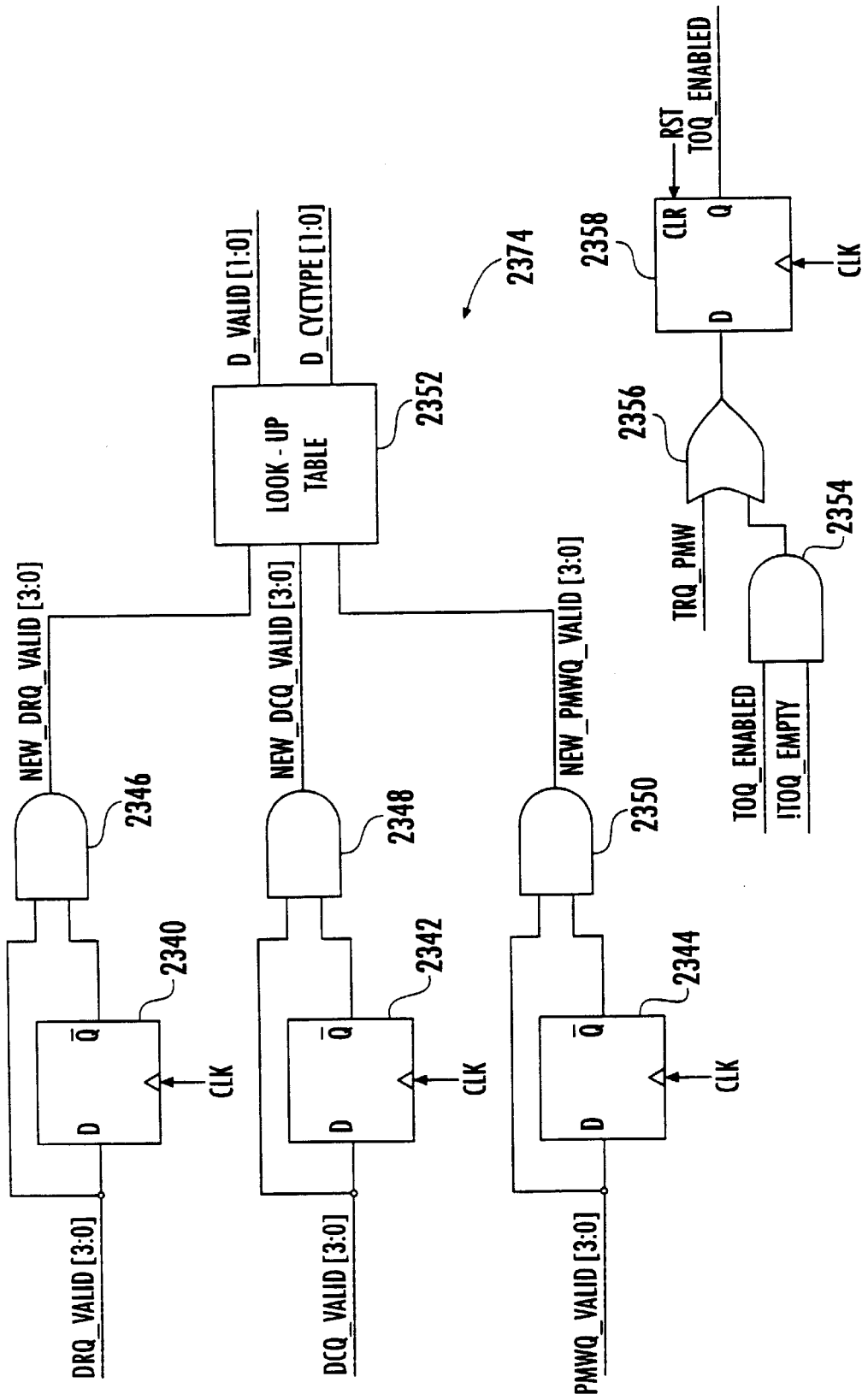
Figure 73B:
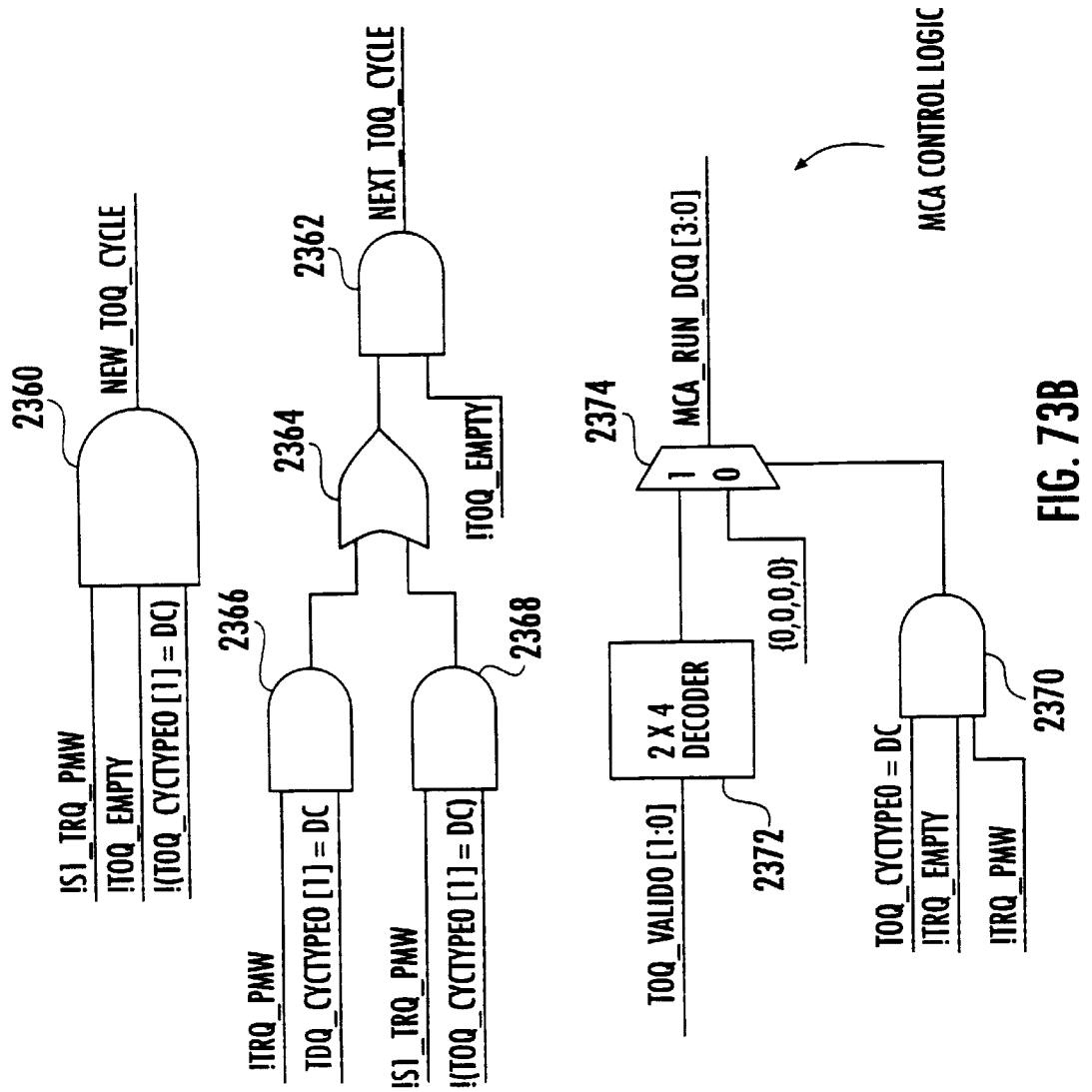
Figure 73C:
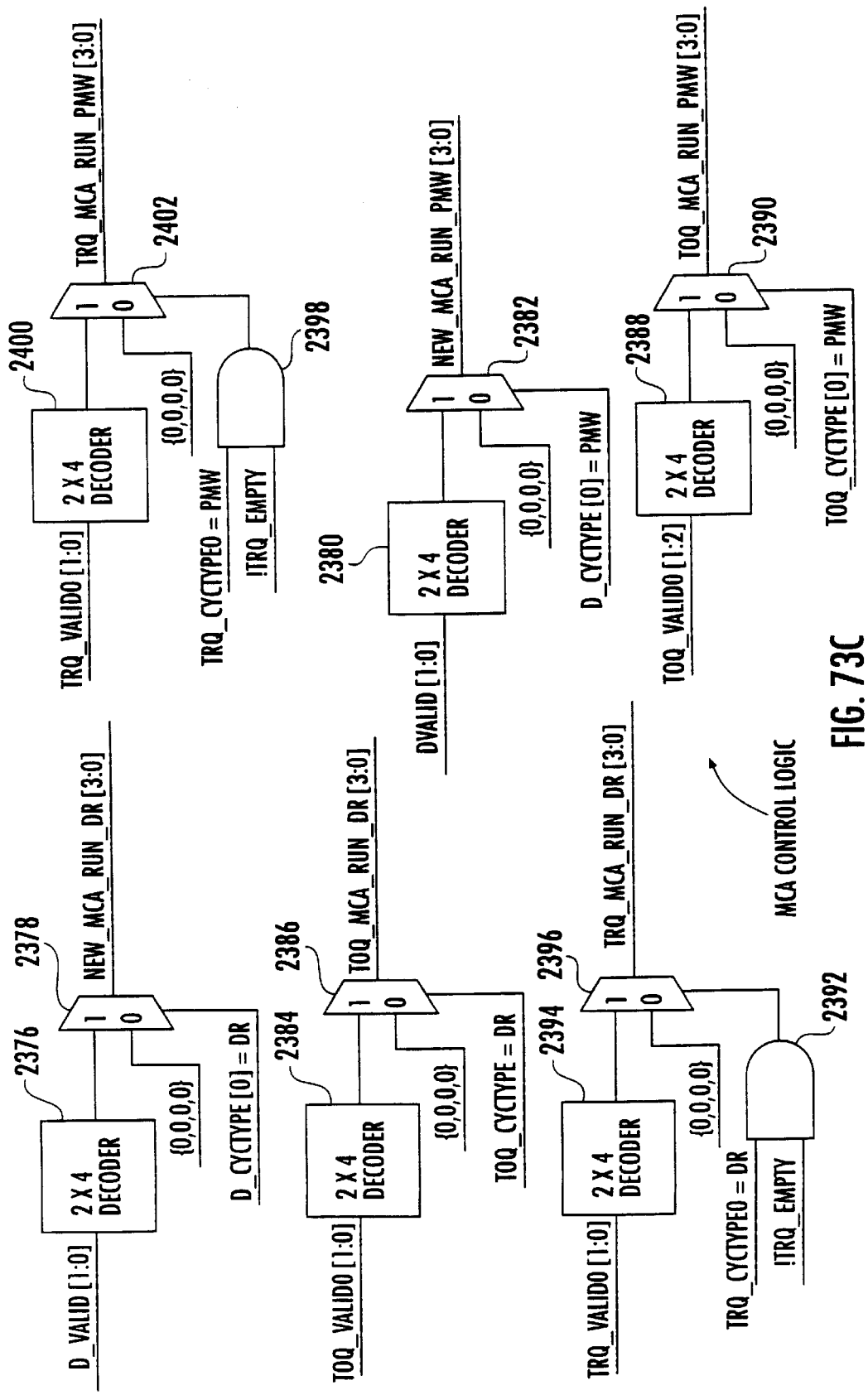
Figure 73D:
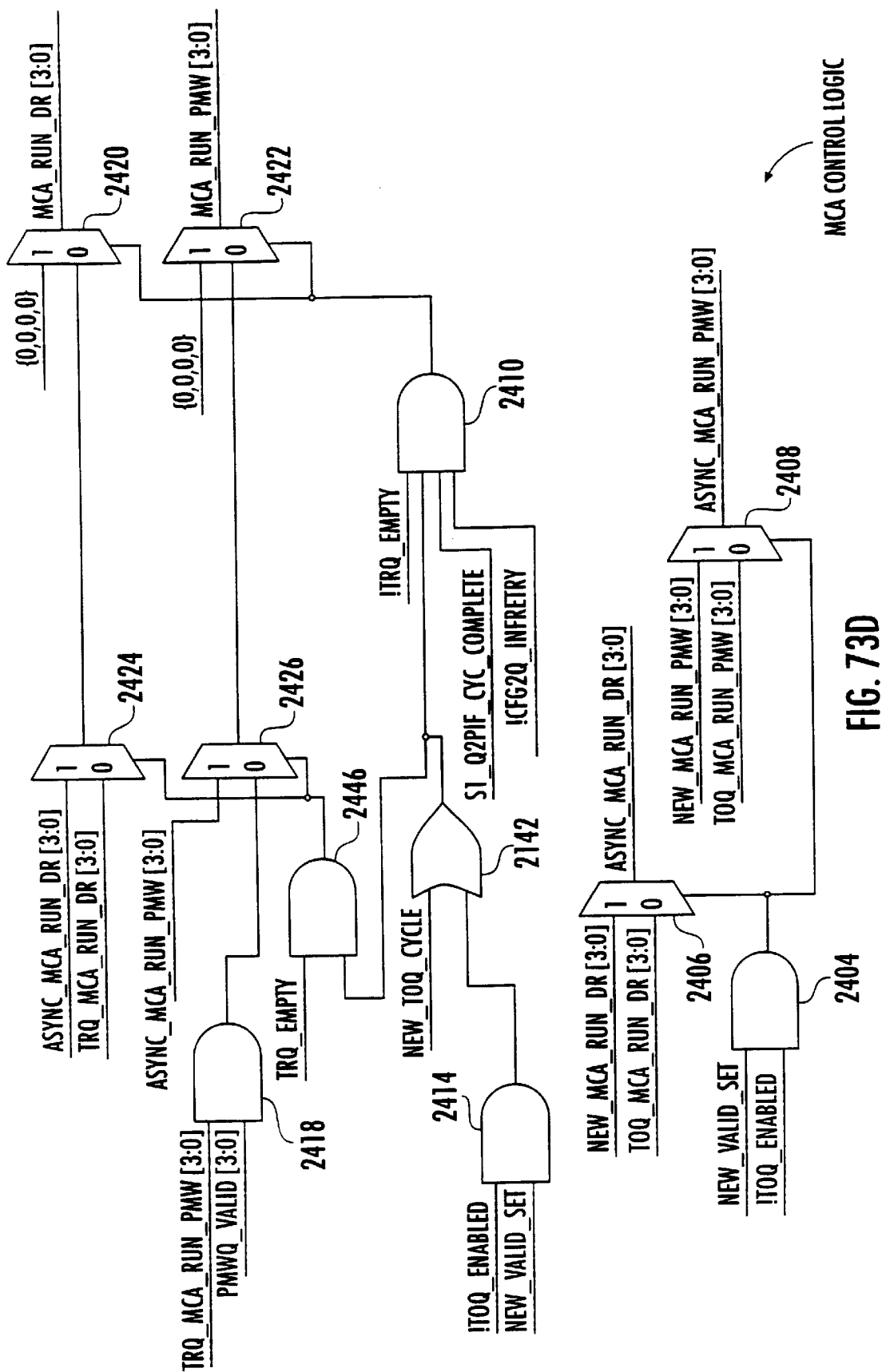

Referring now to FIG. 72, the TOQ 2272 is a first-in-first-out (FIFO) queue that retains the historical order of transactions received by the bridge after a posted memory write transaction is placed in the TRQ 2270. Because all transactions must wait for earlier-issued posted memory writes to run, all transactions including posted memory write, delayed request, and delayed completion transactions, are placed in the TOQ 2270 when a posted memory write is enqueued in the TRQ 2270. Transactions in the TOQ 2272 must remain in the TOQ 2272 until the posted memory write transaction is removed from the TRQ 2270.

The TOQ 2270, which has eight slots 2314*a–h*, can hold up to three posted memory write transactions (the fourth will be stored in the TRQ 2270), three delayed request transactions, and four delayed completion transactions. Each of the slots 2314a–h in the TOQ 2272 contains two cycle type bits 2316 that identify the corresponding transaction ("01" is a posted memory write, "00" is a delayed request, and "1x" is a delayed completion) and two valid bits 2318 that identify which of the buffers in the PMWQ, DRQ, and DCQ the corresponding transaction occupies. The TOQ 2272 also includes standard input and output logic blocks 2320 and 2322, which control the movement of transactions into and out of the TOQ 2272.

The positions at which transactions are placed into and removed from the TOQ 2272 are determined by a three bit input counter 2326 (inputr[2:0]) and a three bit output counter 2324 (outputr[2:0]), respectively. Both counters begin at the first slot 2314a in the TOQ 2272 and increment through the queue as transactions are entered into and removed from the queue. The input counter 2326 increments on the rising edge of every PCI clock cycle at which the TOQ 2272 is enabled (toq_enabled is asserted) and the MCA control block 2274 provides a new cycle to the TOQ 2272 (new_valid_set is asserted). The valid bits and cycle type bits for each new cycle are provided by the MCA valid and cycle type signals (d_valido[1:0] and d_cyctype[1:0]). The output counter 2324 increments on the rising edge of each PCI clock cycle at which the MCA control block 2274 instructs the TOQ 2272 to move to the next cycle (next_toq_cycle is asserted) and the TOQ 2272 is not empty (i.e., inputr[2:0] does not equal outputr[2:0]). Cycles exiting the TOQ 2272 are represented by TOQ valid and cycletype signals (toq_valido[1:0] and toq_cyctypeo[1:0]). Gates 2328 and 2330 and comparator 2332 are arranged to properly clock the input pointer 2326 and output pointer 2324.

When a delayed request transaction or posted memory write transaction is popped out of the TOQ 2272, the transaction is placed in the TRQ 2270 to await arbitration. But because delayed completion transactions are target transactions and not master transactions, delayed completions are not placed in the TRQ 2270. Instead, delayed completions are simply popped out of the TOQ 2272 and used to validate the corresponding data in the DCQ data buffers. However, as long as a posted memory write transaction is enqueued in the TRQ 2270, all delayed completions must be placed in the TOQ 2272, even when two or more delayed completions correspond to the same delayed request and therefore the same delayed completion buffer, as described above.

Figure 74:
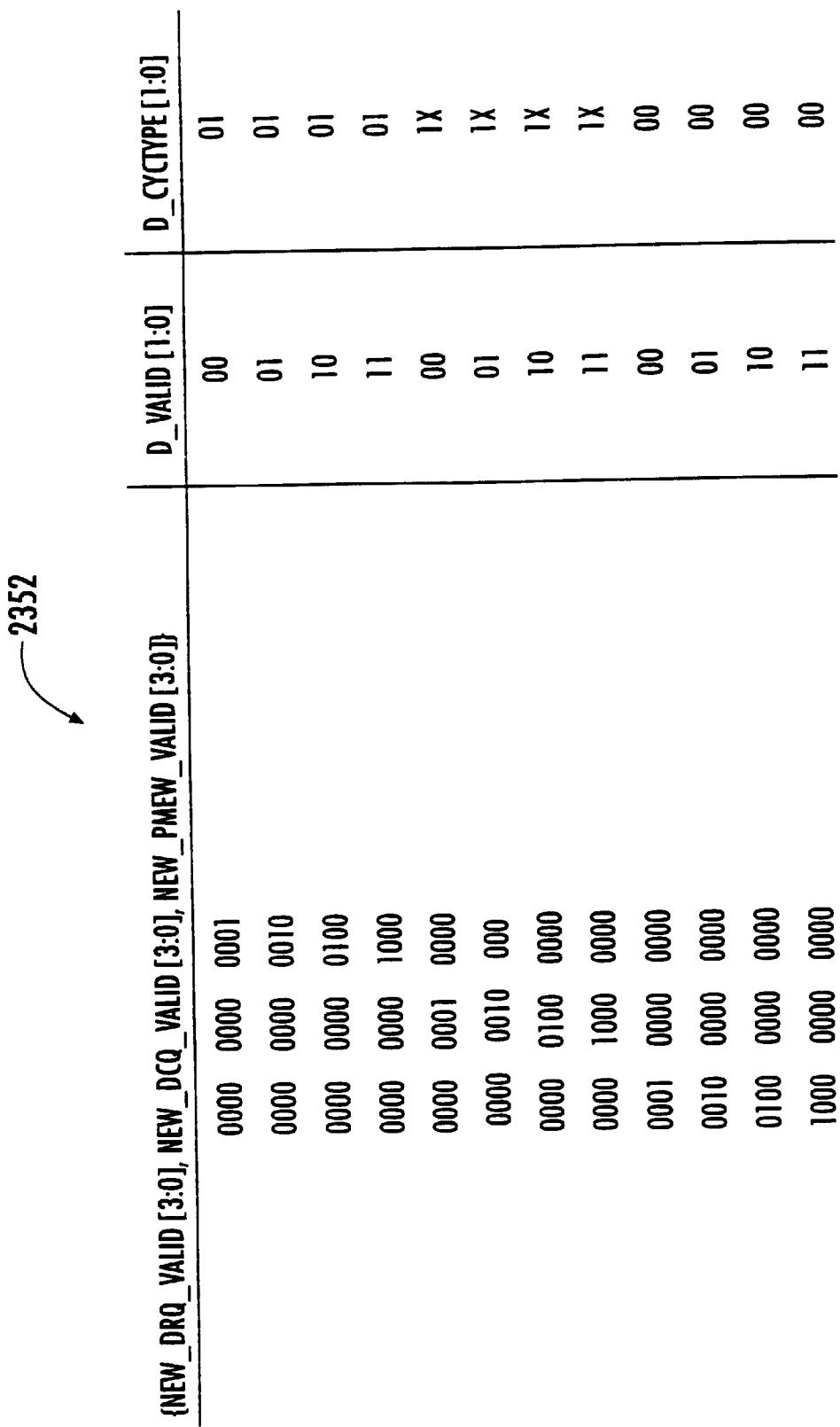

Referring to FIGS. 73A through 73D, the MCA control block 2274 controls the flow of transactions through the MCA. As discussed above, the PMWQ, DRQ, and DCQ request validation of transactions held in the queues by providing four bit validation signals pmwq_valid[3:0], drq_valid[3:0], and dcq_valid[3:0], respectively, to the MCA. Among these signals, only one bit can change during each clock pulse since only a single new transaction can be placed into the queue block on each clock pulse. Therefore, the MCA control block identifies new validation requests by watching for the changing bits in the pmwq_valid, drq_valid, and dcq_valid signals. To do so, the MCA control block latches and inverts each signal at the rising edge of every PCI clock to create a delayed, inverted signal and compares the delayed, inverted signal to the current signal (i.e., the signal at the next clock pulse). Since only a newly changed bit will have the same value as its delayed and inverted counterpart, the MCA control block is able to detect which bit changed. Using flip-flops 2340, 2342, and 2344 and gates 2346, 2348, and 2350, the MCA controller generates new_pmwq_valid[3:0], new_drq_valid[3:0], and new_dcq_valid[3:0] signals which, at each clock pulse, together identify whether the PMWQ, DRQ, or DCQ, if any, submitted a new transaction for validation and which buffer in the corresponding queue contains the new transaction. Referring also to FIG. 74, the MCA control block uses a look-up table 2352 to convert the twelve bits of the new_pmwq_valid, new_drq_valid, and new_dcq_valid signals into the two bit d_valid[1:0] and d_cyctype[1:0] signals provided to the TRQ and TOQ, as discussed above.

The MCA controller enables the TOQ by latching the toq_enabled signal to a value of "1" when either the trq_pmw is asserted, indicating that a posted memory write cycle is enqueued in the TRQ, or when the toq_enable signal already is asserted and the TOQ is not empty (!toq_empty). Gates 2354 and 2356 and flip-flop 2358 are arranged to generate toq_enabled in this manner.

The MCA control block asserts the new_toq_cycle signal, which instructs the TRQ to enqueue the cycle being popped out of the TOQ, when there was not a posted memory write cycle in the TRQ during the previous clock cycle (!s1_trq_pmw), when the TOQ is not empty (!toq_empty), and when the cycle being popped out of the TOQ is not a delayed completion transaction (!(toq_cyctypeo[1]= "DC")). The MCA controller uses gate 2360 to generate the new_toq_cycle signal.

The next_toq_cycle signal, which is used to increment the TOQ output counter to the next cycle in the TOQ, is asserted when the TOQ is not empty (!toq_empty) and either when no posted memory write cycles currently are enqueued in the TRQ (!trq_pmw) and the next cycle in the TOQ is a delayed completion (toq_cyctype[1]="DC") or when the next TOQ cycle is a posted memory write or delayed request transaction (!(toq_cyctype[1]="DC")) and there were no posted memory write transactions during the previous clock cycle (!s1_trq_mw). The control block uses gates 2362, 2364, 2366, and 2368 to generate the next_toq_cycle signal.

The MCA controller generates the mca_run_dcq[3:0] signal to indicate that a delayed completion transaction has been popped out of the TOQ. When the TRQ contains no posted memory write cycles (!trq_pmw), the TOQ is not empty (!toq_empty), and the TOQ cycle is a delayed completion (toq_cyctype[1]="DC"), the mca_run_dcq[3:0] signal takes on the value of the decoded toq_valido[1:0] signal, discussed above. Otherwise, the mca_run_dcq[3:0] signal equals "0000". Gate 2370, decoder 2372, and multiplexer 2374 are arranged to generate mca_run_dcq[3:0] in this manner.

The MCA control block generates new_mca_run_dr[3:0] and new_mca_run_pmw[3:0] signals to indicate that it has a new delayed request transaction and a posted memory write transaction, respectively, to be enqueued. The new_mca_run_dr[3:0] signal takes on the value of the 2×4 decoded d_valido[1:0] signal, discussed above, when the new cycle is a delayed request cycle (d_cyctype[0]="DR"). Otherwise, all bits of the new_mca_run_dr signal are set to zero. Likewise, the new_mca_run_pmw[3:0] signal takes on the value of the 2×4 decoded d_valido[1:0] signal when the new cycle is a posted memory write transaction and is set to "0000" otherwise. Decoders 2376 and 2380 and multiplexers 2378 and 2382 are arranged to generate the new_mca_run_dr and new_mca_run_pmw signals in this manner.

The MCA controller generates toq_mca_run_dr[3:0] and toq_mca_run_pmw[3:0] signals to indicate when a new delayed request transaction or posted memory write transaction, respectively, has popped out of the TOQ. The toq_mca_run_dr[3:0] signal takes on the value of the 2×4 decoded toq_valido[1:0] signal when a delayed request cycle is popped out of the TOQ and a value of "0000" otherwise. Likewise, the toq_mca_run_pmw[3:0] signal takes on the value of the 2×4 decoded toq_valido[1:0] signal when a posted memory write cycle pops out of the TOQ and a value of "0000" otherwise. Decoders 2384 and 2388 and multiplexers 2386 and 2390 are used to generate the toq_mca_run_dr and toq_mca_run_pmw signals in this manner.

The MCA controller generates trq_mca_run_dr[3:0] and trq_mca_run_pmw[3:0] signals to indicate when a new delayed request transaction or posted memory write transaction, respectively, has won the arbitration in the TRQ and is ready to be run on the PCI bus. The trq_mca_run_dr[3:0] signal takes on the value of the 2×4 decoded trq_valido[1:0] signal when a delayed request cycle has won the arbitration and the TRQ is not empty. The trq_mca_run_dr[3:0] takes on a value of "0000" otherwise. Likewise, the trq_mca_run_pmw[3:0] signal takes on the value of the 2×4 decoded trq_valido[1:0] signal when a posted memory write cycle has won the arbitration and the TRQ is not empty. The trq_mca_run_pmw[3:0] signal is set to a value of "0000" otherwise. Gates 2392 and 2398, decoders 2394 and 2400, and multiplexers 2396 and 2402 are used to generate the trq_mca_run_dr and trq_mca_run_pmw signals in this manner.

When the TRQ is empty, the MCA may issue a request to run the next transaction in the TOQ while the transaction is being placed in the TRQ. When both the TRQ and the TOQ are empty, transactions may begin to run even before they have been enqueued into TRQ. Therefore, the MCA control block includes logic that determines when the new_mca_run or toq_mca_run signals may be used asynchronously to indicate that a transaction may be tried on the PCI bus. By converting the new_mca_run and toq_mca_run signals into asynchronous run signals, the MCA controller saves a PCI clock wait state. When the new_valid_set signal is asserted by the MCA control block and the TOQ is not enabled (!toq_enabled), the async_mca_run_dr[3:0] and async_mca_run_pmw[3:0] signals take on the values of the new_mca_run_dr[3:0] and new_mca_run_pmw[3:0] signals, respectively. Otherwise, the asynchronous run signals take on the values of the toq_mca_run_dr[3:0] and toq_mca_run_pmw[3:0] signals. The MCA controller uses gate 2404 and multiplexers 2406 and 2408 to generate the asychronous run signals.

When a PCI bus master has completed a transaction (s1_q2pif_cyc_complete is asserted), the TRQ is not empty (!trq_empty) and is configured for operation in the zero retry mode (!cfg2q_infretry), and either a new transaction has popped out of the TOQ (new_toq_cycle) or the TOQ is not enabled (!toq_enabled) and the MCA has received a new cycle to be validated (new_valid_set), the MCA cannot select a cycle to run on the PCI bus, so both the mca_run_dr[3:0] and mca_run_pmw[3:0] signals are set to "0000". Otherwise, if the TRQ is empty (trq_empty) and either a new transaction has popped out of the TOQ (new_toq_cycle) or the TOQ is not enabled (!toq_enabled) and the MCA has received a new cycle to be validated (new_valid_set), then the mca_run_dr[3:0] and mca_run_pmw[3:0] signals take on the value of the asynchronous run signals, async mca_run_dr[3:0] and async_mca_run_pmw[3:0], respectively. Otherwise, the mca_run_dr[3:0] signal takes on the value of the trq_mca_run_dr[3:0] signal and the mca_run_mw[3:0] signal takes on the value of the trq_run_pmw[3:0] signal ANDed with validation request signal from the PMWQ (pmwq_valid[3:0]). Gates 2410, 2412, 2414, 2416, and 2418 and multiplexers 2420, 2422, 2424, and 2426 are arranged to generate the MCA run signals in this manner.

THE QUEUE-BLOCK-TO-PCI-INTERFACE
(QPIF)

Figure 75:
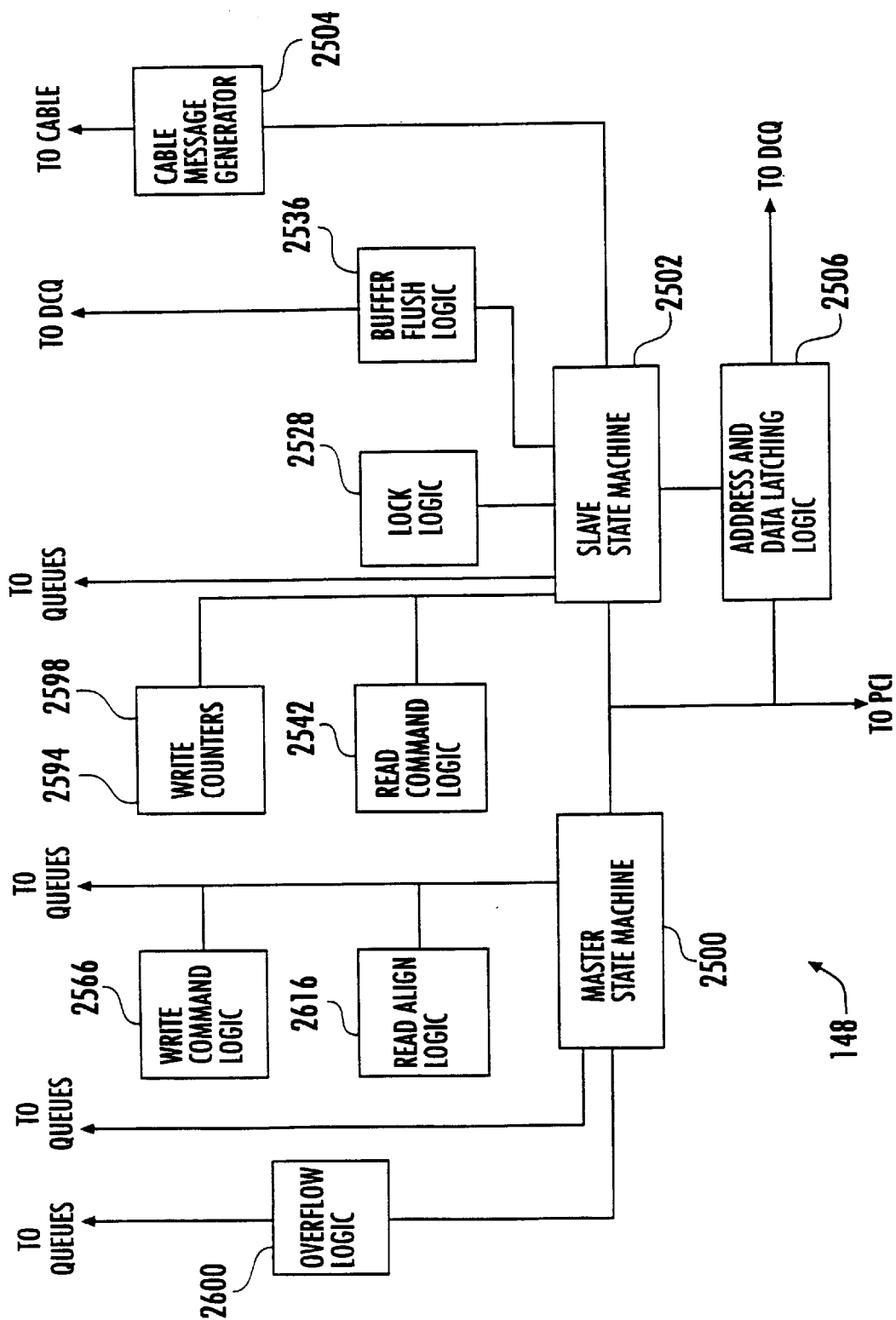

Referring again to FIG. 4 and to FIG. 75, the QPIF 148 governs the flow of transactions between the queue block 127 and the PCI bus 32. The QPIF 148 also delivers transactions initiated on the PCI bus 32 to the cable interface 130. The QPIF 148 operates in two modes: master mode and slave mode. In the master mode, the QPIF 148 has control of the PCI bus and therefore executes transactions intended for target devices on the bus. A master state machine 2500 in the QPIF 148 retrieves transactions from the PMWQ and DRQ and executes them on the PCI bus when the QPIF is in the master mode. In the slave mode, the QPIF 148 receives transactions initiated by a device on the PCI bus and either provides the requested information to the initiating device (if the information is available) or retries the initiating device (if the transaction is a delayed request) and forwards the transaction to the upstream chip. The transaction also is retried if the corresponding one of the transaction counters 159 indicates that the other bridge chip is full, as discussed above. A slave state machine 2502 receives an incoming transaction from the PCI bus and then checks the DCQ for a corresponding completion message and/or forwards the transaction to a cable message generator 2504, which in turn forwards the transaction through the cable to the upstream bridge chip.

Figure 76A:
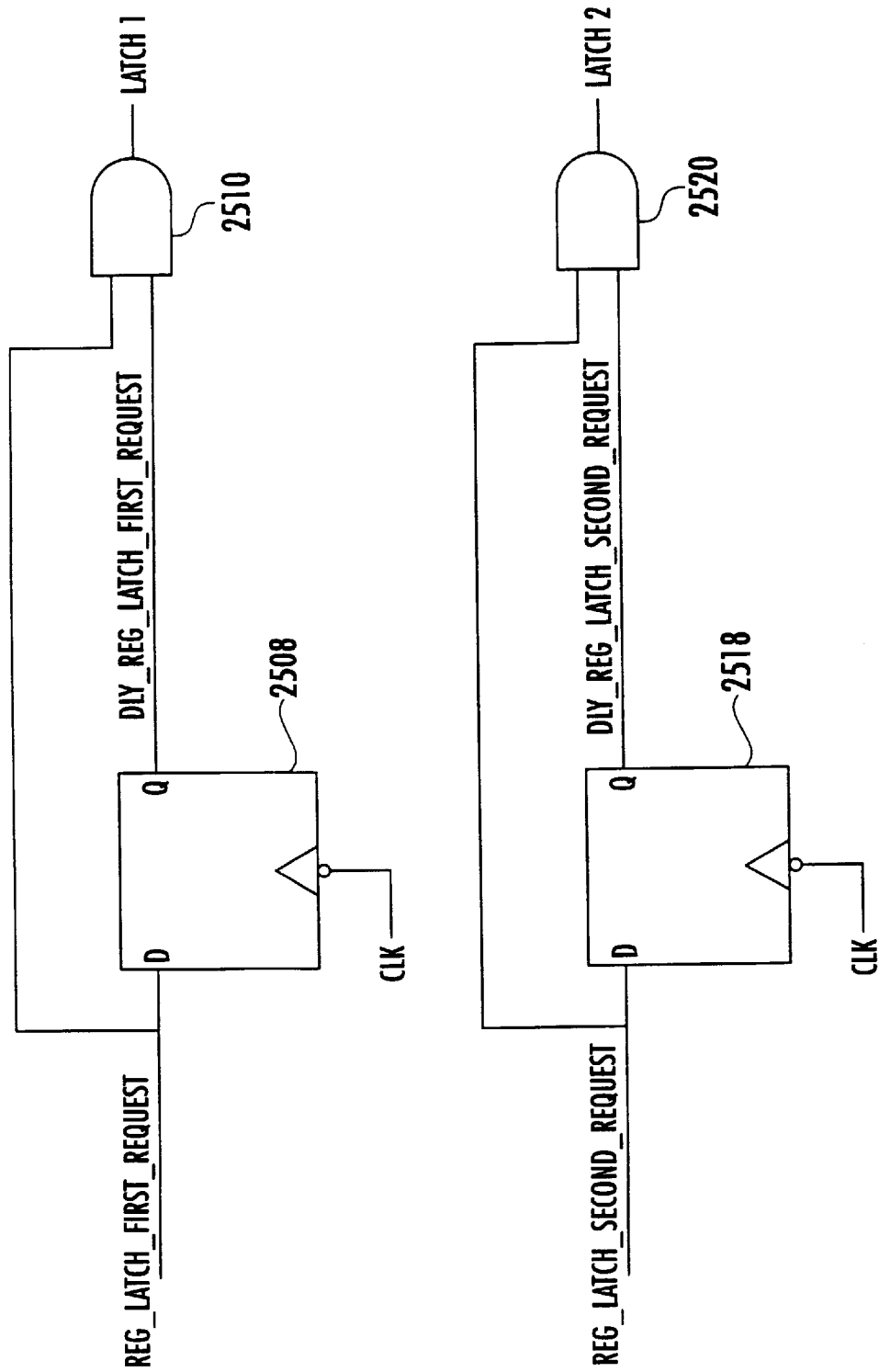
Figure 76B:
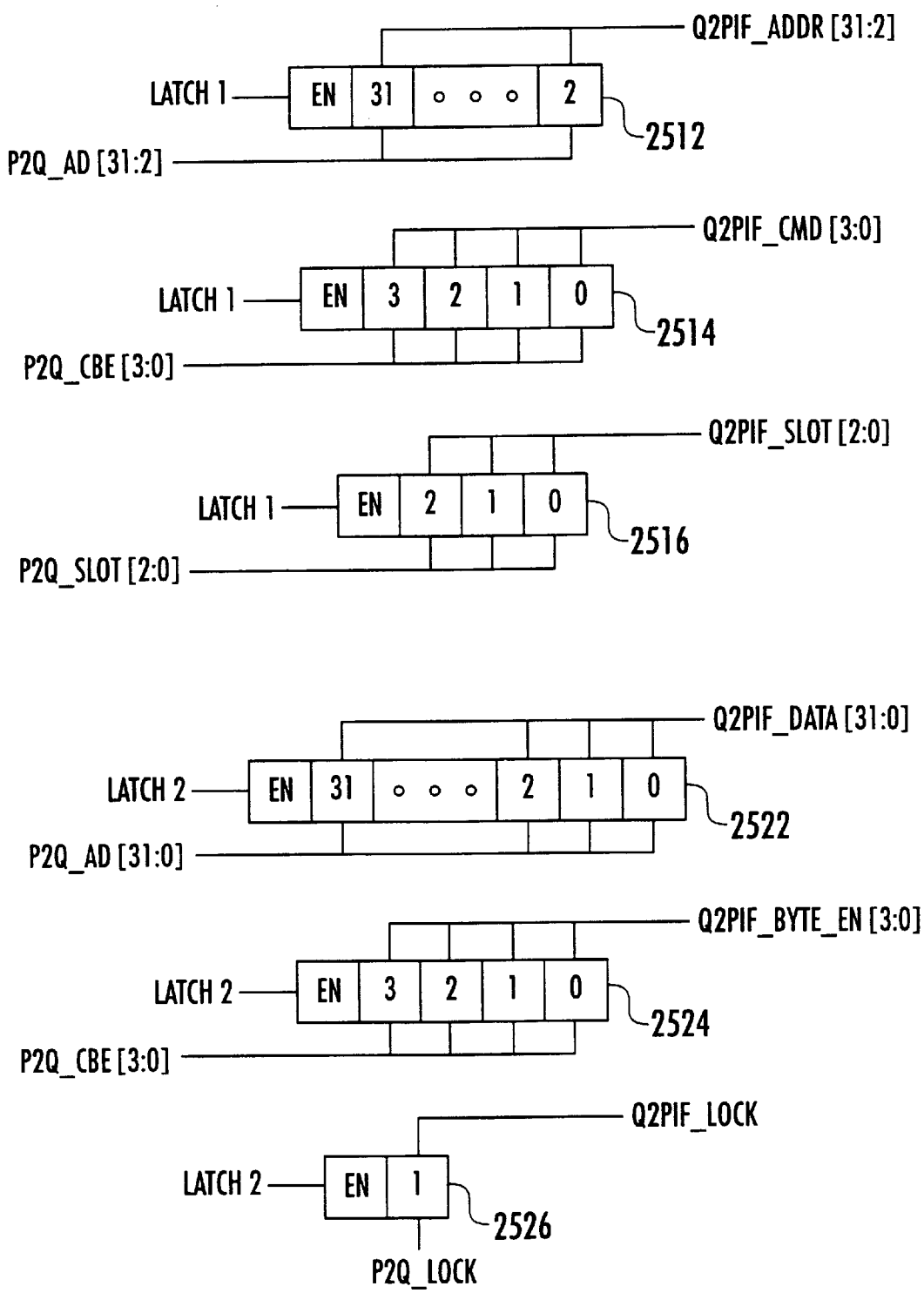

Referring also to FIGS. 76A and 76B, the QPIF includes address and data latching logic 2506 that latches the incoming address phase and data phase information associated with each transaction initiated by a device on the PCI bus. The QPIF slave state machine 2502 controls operation of the address and data latching logic 2506. When a new transaction initiated on the PCI bus is intended for the QPIF, the slave state machine 2502 asserts an address phase latching signal (reg_latch_first_request) indicating that the address phase information should be latched from the PCI bus. At the next falling edge of the PCI clock signal, the assertion of the reg_latch_first_request signal causes a delayed address phase latching signal (dly_reg_latch_first_request) to be asserted. When both the original and the delayed address phase latching signals are asserted, the latching logic 2506 generates a first latching signal (latch1). Flip-flop 2508 and gate 2510 are arranged to generate the first latching signal in this manner.

The latching logic 2506 loads the address phase information from the PCI bus (via the PCI interface) into three address phase registers when the first latching signal is asserted. The first register is a thirty-bit address register 2512 that indicates the starting address of the current transaction. When the first latching signal is asserted, the address signal from the PCI interface (p2q_ad[31:2]) is loaded into the address register 2512. The address register 2512 outputs the address signal used by the QPIF (q2pif_addr[31:2]). The second register is a four bit command register 2514 that receives the PCI command code from the PCI bus (p2q_cmd[3:0]) and outputs the QPIF command signal (q2pif_cmd[3:0]). The third register is a three bit slot selection register 2516 that receives the p2q_slot[2:0] signal indicating which PCI device is the current bus master and outputs the QPIF slot selection signal (q2pif_slot[2:0]).

When the address phase of the PCI transaction ends, the slave state machine 2502 asserts a data phase latching signal (reg__latch__second__request) indicating that the data phase information should be latched from the PCI bus. At the next falling edge of the PCI clock signal, the asserted reg__latch__first__request signal causes a delayed data phase latching signal (dly__reg__latch__second__request) to be asserted. When both the original and the delayed data phase latching signals are asserted, the latching logic 2506 generates a second latching signal (latch2). Flip-flop 2518 and gate 2520 are arranged to generate the second latching signal in this manner.

The latching logic 2506 then loads the data phase information from the PCI bus (via the PCI interface) into three data phase registers when the second latching signal is asserted. The first data phase register is a thirty-two bit data register 2522 that receives the data associated with the current transaction on the PCI address/data lines (p2q__ad[31:0]) and outputs the QPIF data signal (q2pif__data[31:0]). The second data phase register is a four bit enable register 2524 that receives enable bits from the PCI bus (p2q__cbe[3:0]) and outputs the QPIF byte enable signal (q2pif__byte__en[3:0]). The third register is a three bit lock register 2526 that receives the PCI lock signal (p2q__lock) indicating that the current transaction should be run as a locked transaction and outputs the QPIF lock signal (q2pif__lock).

Figure 77:
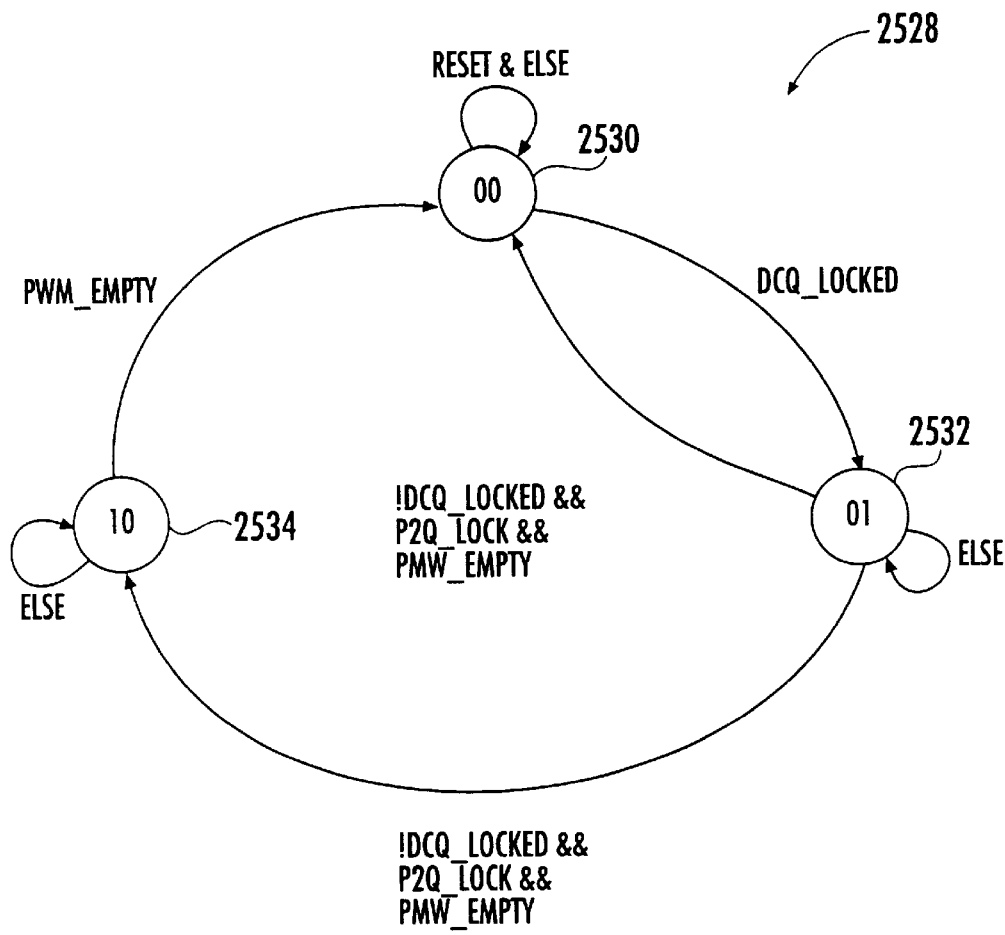

Referring again to FIG. 75 and also to FIG. 77, the QPIF includes a "lock" logic block 2528 that controls the "lock" state of the QPIF. The QPIF has three lock states: an unlocked state 2530 (lock__state[1:0]="00") that indicates that no locked transactions are pending in the DCQ; a locked state 2532 (lock__state[1:0]="01) indicating that a locked transaction has been received in the DCQ or is completing on the PCI bus; and an unlocked-but-retry state 2534 (lock__state[1:0]="10") that indicates that the lock has been removed but that a posted memory write transaction pending in the other bridge chip must be run before the next transaction can be accepted.

At power-up and reset, the lock logic 2528 enters the unlocked state 2530 and waits for a locked transaction to enter the DCQ (indicated by the assertion of the dcq__locked signal). At the first clock pulse after the dcq__locked signal is asserted, the lock logic enters the locked state 2532, which forces the QPIF slave state machine 2502 to retry all transaction requests from the PCI bus. The PCI interface also asserts a lock signal (p2q__lock) that indicates it has locked the PCI bus for the transaction. After the locked transaction has completed and the requesting device has retrieved the locked completion data from the DCQ, the dcq__locked signal is deasserted. At the first clock pulse after the dcq__locked is deasserted, while the p2q__lock signal is still asserted, if no posted memory writes are pending in the other bridge chip (i.e., the pmw__empty signal is asserted by the cable decoder), the lock logic 2528 returns to the unlocked state 2530 and the slave state machine 2502 again is able to accept transaction requests. However, if the pwm__empty signal is not asserted at the first clock pulse after the dcq__lock signal is deasserted, the lock logic 2528 enters the unlocked-but-retry state 2534, which forces the slave state machine 2502 to retry all transactions until the posted memory write cycle is completed on the other PCI bus. After the posted memory write cycle is complete, the pwm__empty signal is asserted, and the lock logic 2528 returns to the unlocked state 2530.

Figure 78:
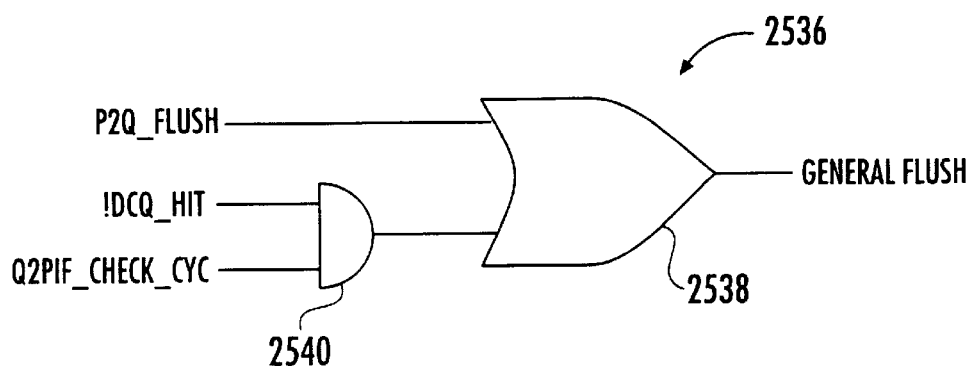

Referring again to FIG. 75 and also to FIG. 78, the QPIF includes buffer flush logic 2536 that determines when the DCQ should flush data from one or all of its data buffers. As discussed above, the PCI interface in the downstream chip generates a p2q__flush signal when the upstream chip issues an I/O or config write or a memory write that hits the target memory range register (TMRR) of a downstream device. The QPIF buffer flush logic 2536 asserts a QPIF flush signal (general__flush) that flushes the corresponding data buffer or all data buffers (depending upon the value of the p2q__slot signal, as discussed above) when the p2q__flush signal is received. Otherwise, the buffer flush logic 2536 asserts the general flush signal only when a device on the secondary bus issues a delayed request that misses all of the DCQ buffers when checked by the DCQ control logic (i.e., !dcq__hit and q2pif__check__cyc are asserted). In either case, the general__flush signal is used to flush only buffers that are in the "prefetch" state, as discussed above. Therefore, prefetch data is held in the DCQ until the PCI interface orders a flush or until the corresponding PCI device issues a non-sequential request (i.e., misses the DCQ). Gates 2538 and 2540 are arranged to generate the general__flush signal in this manner.

When a multi-threaded device has more than one completion buffer allocated, at least one of which contains prefetch data, the prefetch data remains in the corresponding buffer as long as the device does not issue a request that misses all of the DCQ buffers. As soon as the device issues a new request, all of its prefetch buffers are flushed. Alternatively, a prefetch buffer associated with a multi-threaded device could be flushed as soon as the device issues a request that hits another DCQ buffer.

Referring again to FIG. 75, the QPIF includes a read command logic block 2542 that receives read commands from the PCI interface and prefetch commands from the DCQ and provides an outgoing message command signal (message__cmd) to the cable. In non-streaming situations, the outgoing message command may be same as the command received from the PCI bus or the DCQ, or the read command logic 2542 may convert the command into one involving a greater amount of data. Because transactions executed dword-by-dword take longer to complete on the host bus than transactions involving an entire cache line of data, and because single cache line transactions take longer to complete on the host bus than multiple cache line transactions, the read command logic often promotes "smaller" commands into "larger" ones to reduce the number of clock cycles consumed by the transaction ("read promotion"). For example, when a device on the secondary PCI bus issues a memory read command and then asks for every dword of data in a cache line, the read command logic 2542 is able to reduce the host latency by promoting the PCI command to a memory read line, which allows the upstream chip to read the entire cache line of data at once instead of reading each dword individually.

Figure 79:
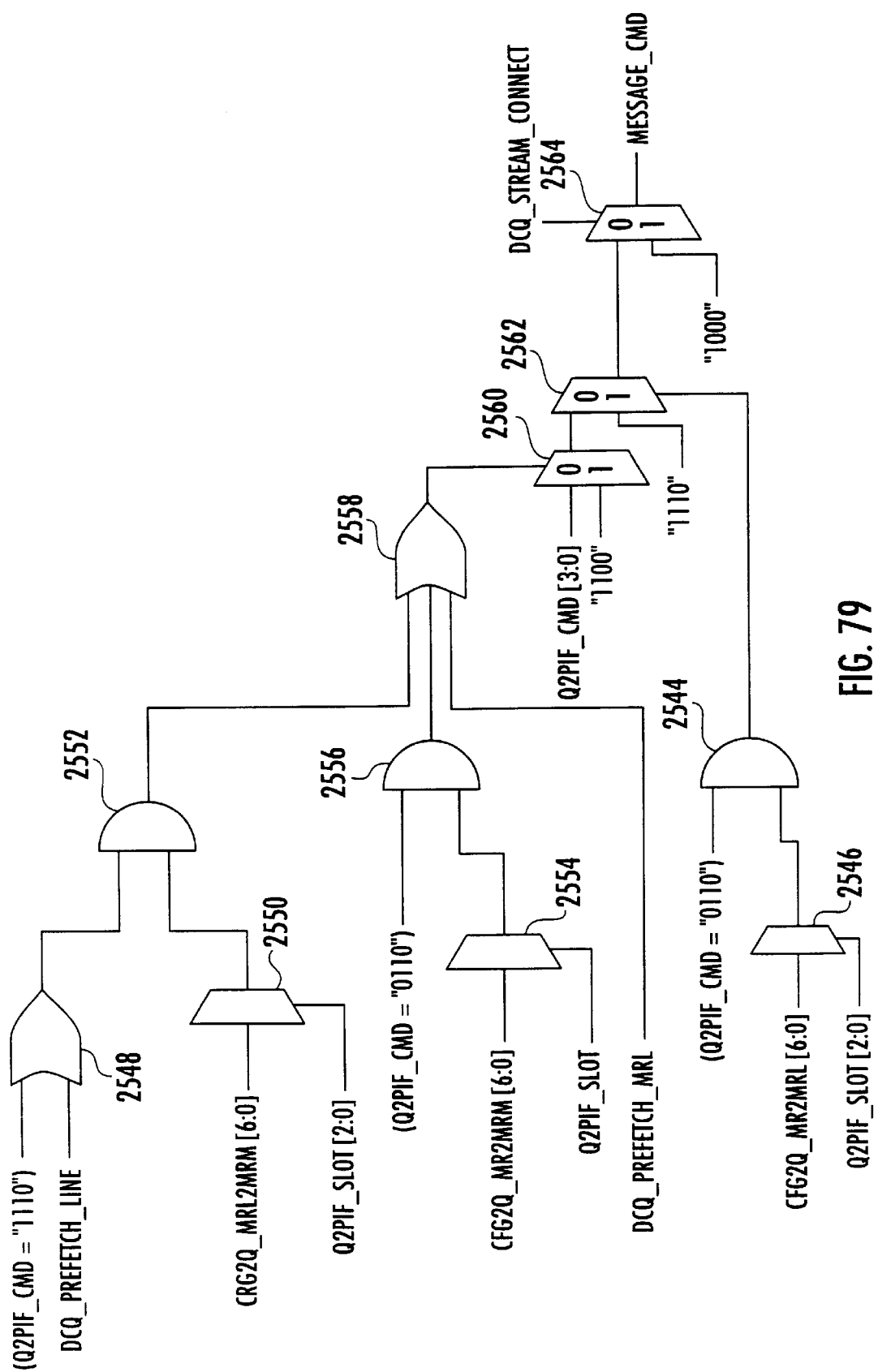

Referring also to FIG. 79, when the DCQ indicates that a read stream has been established (i.e., dcq__stream__connect is asserted), as discussed above, the read command logic 2542 generates a message command of "1000", which informs the upstream chip that a stream is occurring. When no stream has been established, the read command logic 2542 must decide whether to send a memory read, memory read line, or memory read multiple command. If the command received from the PCI bus is a memory read (MR) command (q2p__cmd[2:0] equals "0110") and the corresponding memory-read-to-memory-read-line promotion bit (cfg2q__mr2mrl) in the configuration registers is set, the read command logic 2542 generates a memory read line command ("1110"). On the other hand, if the PCI command is a memory read command and the corresponding memoryread-to-memory-read-multiple bit (cfg2q_mr2mrm) is set, or if the command is a memory read line command (q2pif_cmd[3:0] equals "1110") from the PCI bus or a prefetch line command (dcq_prefetch_line is asserted) from the DCQ and the corresponding memory-read-line-to-memory-read-multiple bit (cfg2q_mrl2mrm) is set, or if the command is a prefetch multiple command (dcq_prefetch_mul) from the DCQ, the read command logic 2542 generates a memory read multiple command (i.e., message_cmd equals "1100"). If the command is a prefetch line command and the corresponding memory-read-line-to-memory-read-multiple bit is not set, the read command logic 2542 generates a MRL command ("1110"). Otherwise, the read command logic 2542 outputs the received PCI command (q2pif_cmd[2:0]) as the message command signal. Gates 2544, 2546, 2548, 2550, 2552, 2554, 2556, and 2558 and multiplexers 2560, 2562, and 2564 are arranged to generate the message_cmd signal in this manner.

Referring again to FIG. 75, when the QPIF is operating in the master mode and has received control of the bus to run a transaction stored in the PMWQ, a write command logic block 2566 generates the command code that is executed on the PCI bus. To reduce transaction time as discussed above, the write command logic can convert memory write (MW) commands, which involve data transfers one dword at a time into memory write and invalidate commands (MWI), which involve transfers of at least one entire cache line of data. The write command logic block 2566 can convert a command midstream when, e.g., the transaction begins as a memory write in the middle of a cache line and contains data crossing the next cache line boundary and including all eight dwords of data in the next cache line. In this situation, the write command logic 2566 terminates the memory write transaction when it reaches the first cache line boundary and initiates a memory write and invalidate transaction to transfer the next full cache line of data. The write command logic 2566 also may terminate a MWI transaction midstream in favor of a MW transaction if less than a cache line of data is to be written to the target bus after a cache line boundary is crossed.

Figure 80:
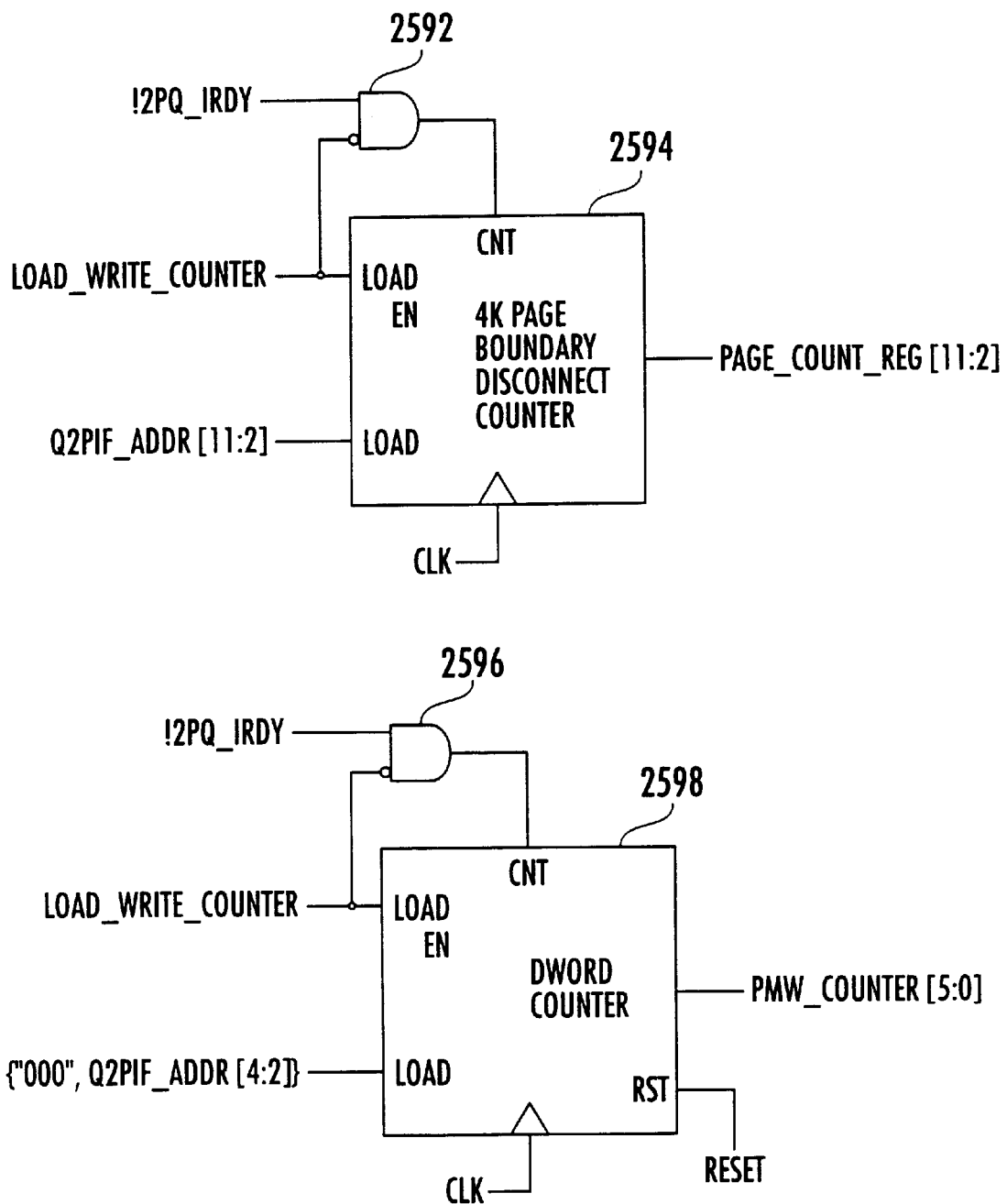

Referring again to FIG. 75 and also to FIG. 80, the slave state machine 2502 also maintains two counters that indicate when a posted write transaction initiated on the PCI bus should be terminated. A 4K page boundary counter 2594 generates a page count signal (page_count_reg[11:2]) that indicates when data transferred from the PCI bus reaches a 4K page boundary. Because a single memory access is not allowed to cross a 4K page boundary, the posted write transaction must be terminated on the initiating bus when a boundary is reached. The 4K page boundary counter 2594 is loaded with the third through twelfth bits of the transaction address (q2pif_addr[11:2]) when the state machine asserts a load_write_counter signal (the circumstances surrounding assertion of this signal are discussed in more detail below). The counter 2594 then increments by one at the rising edge of each clock pulse after the load_write_counter signal is deasserted. The counter 2594 is not incremented on clock pulses during which the initiating device has inserted an initiator wait state (i.e., p2q_irdy asserted). The output of gate 2592 determines when the counter is allowed to increment. When all bits in the page_count_reg[11:2] signal are high, a 4K page boundary has been reached and the slave state machine must terminate the posted write transaction and retry the initiating device.

A dword counter 2598 generates a pmw_counter[5:0] signal that indicates the number of dwords written from the initiating bus during a posted write transaction. The pmw_counter[5:0] signal then is used to indicate when an overflow has occurred or when the last line of the transaction has been reached, as discussed below. When the slave state machine 2503 asserts the load_write_counter signal, the third through fifth bits of the address signal (q2pif_addr[4:2]) are loaded into the lower three bits of the counter 2598, while the upper three bits are set to zero. This address offset indicates at which dword in a cache line the posted write transaction has started. The counter 2598 then increments by one at the rising edge of each clock pulse after the load_write_counter signal is deasserted. The counter 2598 is not incremented on clock pulses during which the initiating device has inserted an initiator wait state (i.e., p2q_irdy asserted). The output of gate 2596 determines when the counter is allowed to increment. When all bits in the pmw_counter[5:0] signal are high, the posted write has reached the end of the eighth cache line.

Figure 81A:
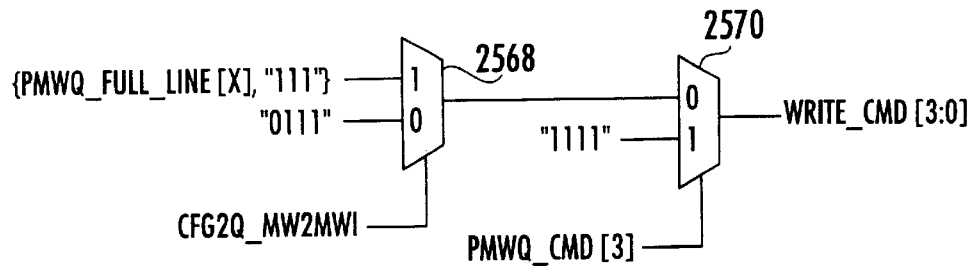
Figure 81B:
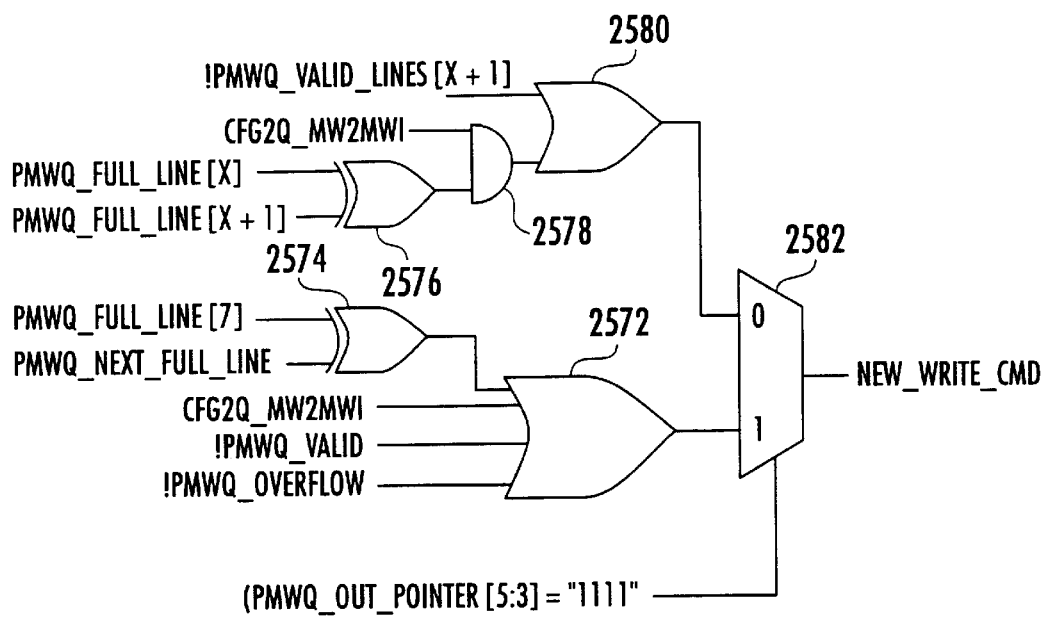
Figure 81C:
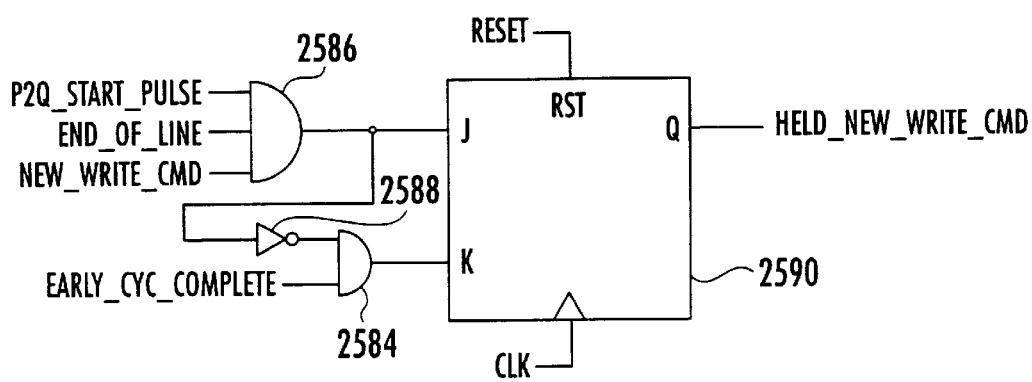

Referring to FIGS. 81A through 81C, the write command logic block 2566 generates a four bit write command signal (write_cmd[3:0]) indicating the command code of the posted write transaction to be executed on the PCI bus. If the command code stored in the PMWQ represents a memory write and invalidate command (pmwq_cmd[3]="1"), the write command logic 2566 generates a write command code of "1111". If the PMWQ command code represents a memory write command, the write command logic 2566 looks at the memory-write-to-memory-write-and-invalidate configuration bit (cfg2q_mw2mwi) corresponding to the target PCI slot. If the cfg2q_mw2mwi bit is not set, the write command logic 2566 produces a memory write command ("0111"). If the configuration bit is set, the write command logic 2566 generates a MWI command if the next line in the PMWQ data buffer is full (pmwq_full_line is asserted) and generates a MW command otherwise. Multiplexers 2568 and 2570 are arranged to generate the write_cmd signal in this manner.

When the QPIF is executing a transaction on the PCI bus and has reached a cache line boundary, the write command logic 2566 may assert a new_write_cmd signal indicating that the current transaction must be terminated in favor of a new write command. If the transaction has reached the last cache line in the PMWQ data buffer (i.e., pmwq_pointer [5:3] equals "111"), the new_write command signal is asserted to indicate that the transaction should be terminated if the next PMWQ buffer is not an overflow buffer containing valid data, if the corresponding cfg2q_mw2mwi bit is not set, or if the full_line bits corresponding to the current cache line and the next cache line are different (i.e., pmwq_full_line[7] does not equal pmwq_next_full_line). If the transaction has not reached the end of the PMWQ buffer, the new_write_cmd signal is asserted either if the next line in the PMWQ buffer does not contain valid data (!pmwq_valid_lines[x+1]) or if the cfg2q_mw2mwi bit is set and the full line bits for the current line and the next line are different (i.e., pmwq_full_line[x] does not equal pmwq_full_line[x+1]). Gates 2572, 2574, 2576, 2578, and 2580 and multiplexer 2582 are arranged to generate the new_write command signal in this manner.

After the new_write_cmd signal is asserted, the transaction is not terminated until the write command logic block 2566 asserts a synchronous new write command signal (held_new_write_cmd). The held_new_write_cmd signal is asserted at the first clock pulse after the new_write_cmd signal is asserted and the end_of_line signal is asserted indicating that the end of the cache line has been reached, as long as the PCI interface has not terminated the transaction (i.e., p2q_start_pulse is asserted). The held_ new_write command is deasserted at reset and at the first clock pulse after the new_write_cmd, end_of_line, and p2q_start_pulse signals are deasserted and the QPIF terminates the transaction (i.e., the asynchronous early_cyc_complete signal is asserted). Otherwise, the held_new_write_cmd signal retains its current value. Gates 2584 and 2586, inverter 2588, and flip-flop 2590 are arranged to generate the held_new_write_cmd signal in this manner.

Figure 82A:
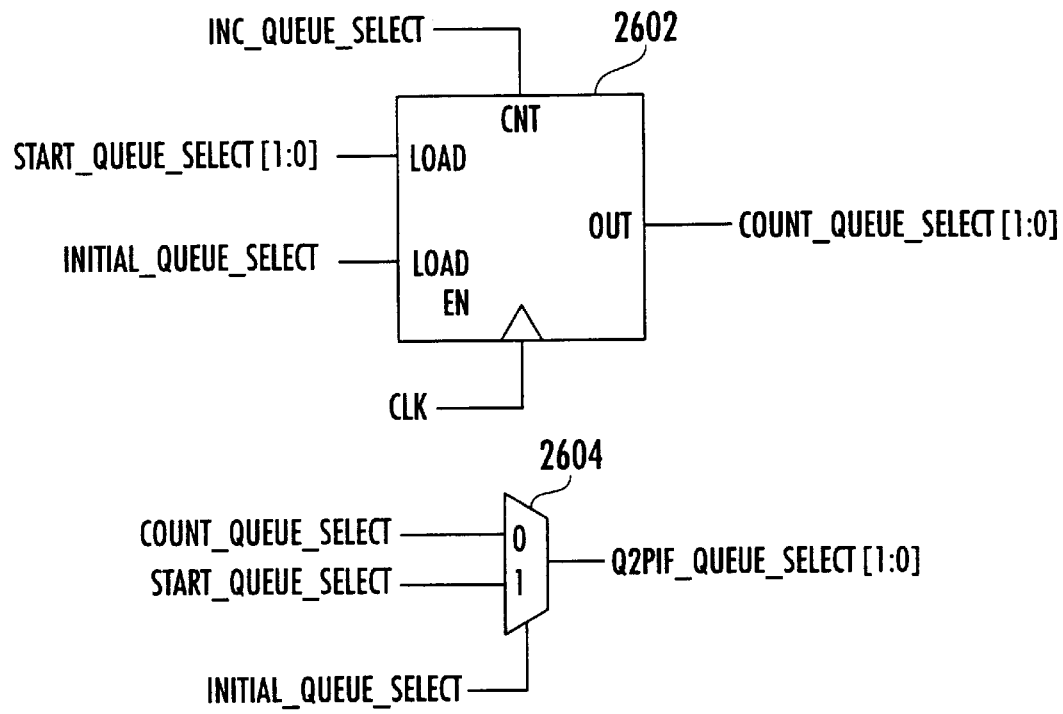

Referring again to FIG. 75 and also to FIG. 82A, the QPIF includes an overflow logic block 2600 that allows the master state machine 2500 to manage overflow data, if any, when executing a posted write transaction on the target bus. When the QPIF receives a transaction run signal (mca_run_pmw or mca_run_dr, discussed above) from the MCA, the overflow logic 2600 generates a two bit initial queue selection signal (start_queue_select[2:0]) indicating which of the buffers in the PMWQ or DRQ should be selected to run the current transaction. The following table shows how the start_queue_select signal is generated.

| Creation of start_queue_select signal | |
|---|---|
| MCA Run Code {mca_run_pmw, mca_run_dr} | start_queue_select |
| 00000001 | 00 |
| 00000010 | 01 |
| 00000100 | 10 |
| 00001000 | 11 |
| 00010000 | 00 |
| 00100000 | 01 |
| 01000000 | 10 |
| 10000000 | 11 |

When the QPIF is executing a posted write transaction on the target bus, a two bit QPIF queue selection signal (q2pif_queue_select[1:0]) is used to select the appropriate buffer in the PMWQ. When the transaction is initiated, the master state machine 2500 asserts a queue selection signal (initial_queue_select) that causes the q2pif_queue_select signal to take on the value of the initial queue selection signal (start_queue_select). At the same time, a queue selection counter 2602 is loaded with the value of the start_queue_select signal. After the initial_queue_select signal is deasserted, the q2pif_queue_select signal takes on the value of the count_queue_select signal generated by the counter 2602. When the posted memory write transaction overflows into the next PMWQ buffer, the master state machine 2500 asserts an increment queue selection signal (inc_queue_select) that causes the counter 2602 to increment by one. As a result, the q2pif_select_signal is incremented and the next buffer in the PMWQ is selected to continue the transaction. Multiplexer 2604 determines the value of the q2pif_queue_select signal.

Figure 82B:
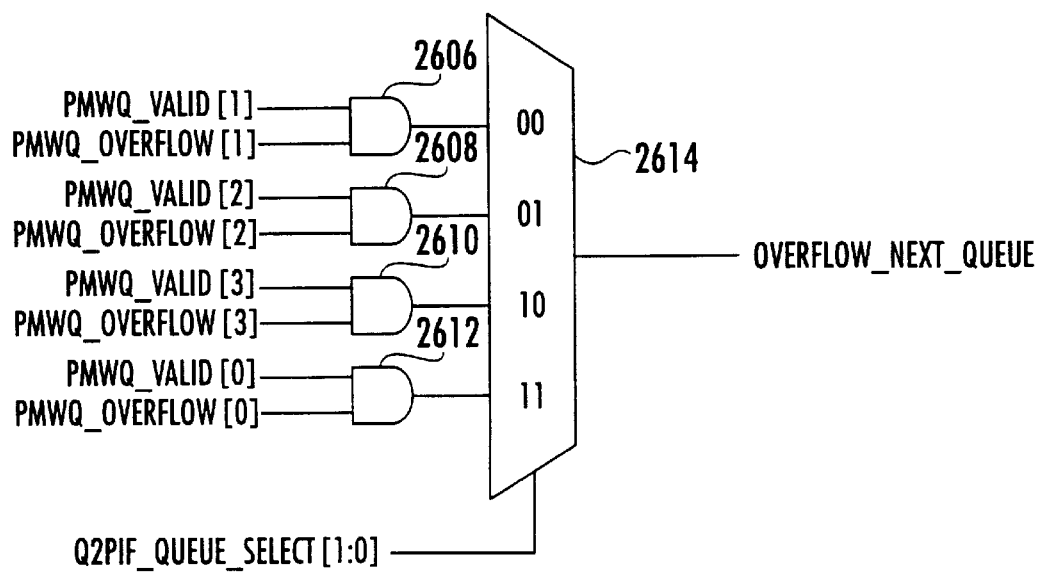

Referring also to FIG. 82B, the overflow logic 2600 assets an overflow_next_queue signal when the master state machine 2500 should continue pulling information from the next PMWQ buffer during a posted memory write transaction. Using the q2pif_queue_select[1:0] signal to determine which PMWQ is currently selected, the overflow logic 2600 asserts the overflow_next_queue signal when the valid bit (pmwq_valid) and the overflow bit (pmwq_overflow) corresponding to the next PMWQ buffer are set. The pmwq_valid and pmwq_overflow flags are discussed above. Gates 2606, 2608, 2610, and 2612 and mulitplexer 2614 are arranged to generate the overflow_next_queue signal in this manner.

Referring again to FIG. 75, the QPIF includes a read align logic block 2616 that allows the QPIF to correct misaligned memory read line and memory read multiple transactions. Read line correction occurs when the QPIF, while operating in the master mode, receives a MRL or MRM transaction that begins in the middle of a cache line. To reduce transaction time, the QPIF begins the read transaction on the cache line boundary and ignores the unrequested dwords instead of individually reading only the requested dwords of data.

Referring also to FIG. 83, the read align logic 2616 activates the read alignment feature by asserting an align_read signal. This signal is asserted when the command stored in the corresponding DRQ buffer is a memory read line or memory read multiple command (i.e., drq_cmd[3:0] equals "1110" or "1100", respectively), and when the read alignment configuration bit (cfg2q_read_align) corresponding to the target PCI device is set. Gates 2618 and 2620 are arranged to produce the align_read signal in this manner.

Referring also to FIGS. 84A through 84C, the read align logic 2616 includes a read alignment down counter 2622 that counts the dwords from the cache line boundary and indicates when the master state machine 2500 reaches the first requested dword. The counter 2622 includes a state machine 2624 that controls the operation of the counter 2622.

At reset, the counter 2622 enters an IDLE_CNT state 2626 in which no counting occurs. When the MCA instructs the QPIF to run a delayed request transaction on the PCI bus (i.e., when any bits in the mca_run_dr[3:0] are asserted), the QPIF asserts a delayed request run signal (any_drq_run) indicating that it is attempting to run a delayed request transaction. While the counter is in the IDLE CNT state 2622, its three bit output signal (throw_cnt[2:0]) is loaded with the dword offset of the transaction address (drq_addr [4:2]) when the any_run_drq signal is asserted and the QPIF gains control of the PCI bus (i.e., p2q_ack is asserted). Gate 2623 generates the load enable signal. Then, at the rising edge of the next PCI clock cycle, the counter 2622 enters the COUNT state 2628. If the transaction begins at a cache line boundary, the dword offset equals "000" and no count is needed. When read alignment is activated, the master state machine 2500 begins each MRL and MRM transaction at the cache line boundary, regardless of the actual starting address.

While in the COUNT state 2628, the counter 2622 decrements by one on every clock pulse as long as the p2q_ack signal is asserted, throw_cnt has not reached zero, the transaction is in the data phase (i.e., the asynchronous signal eary_data_phase is asserted), and the target device has not issued a target ready wait state (!p2q_trdy). Gate 2625 determines when the counter is decremented. If the PCI interface takes the bus away from the QPIF (p2q_ack is deasserted) or if the data phase ends (early_data_phase is deasserted), the counter 2622 stops decrementing and reenters the IDLE_CNT state 2626. If the throw_cnt signal reaches "000" while the p2q_ack signal is still asserted, the counter 2622 stops counting and enters the DONE state 2630. Otherwise, the counter remains in the COUNT state 2628.

When the counter reaches "000", the read align logic 2616 asserts a read_data_start signal that instructs the master state machine 2500 to begin reading data from the target device. Comparator 2632 generates the read_data_start signal. After the read_data_start signal is asserted, the counter 2622 remains in the DONE state 2630 until the data phase ends (early_data_phase is deasserted).

Figure 85:
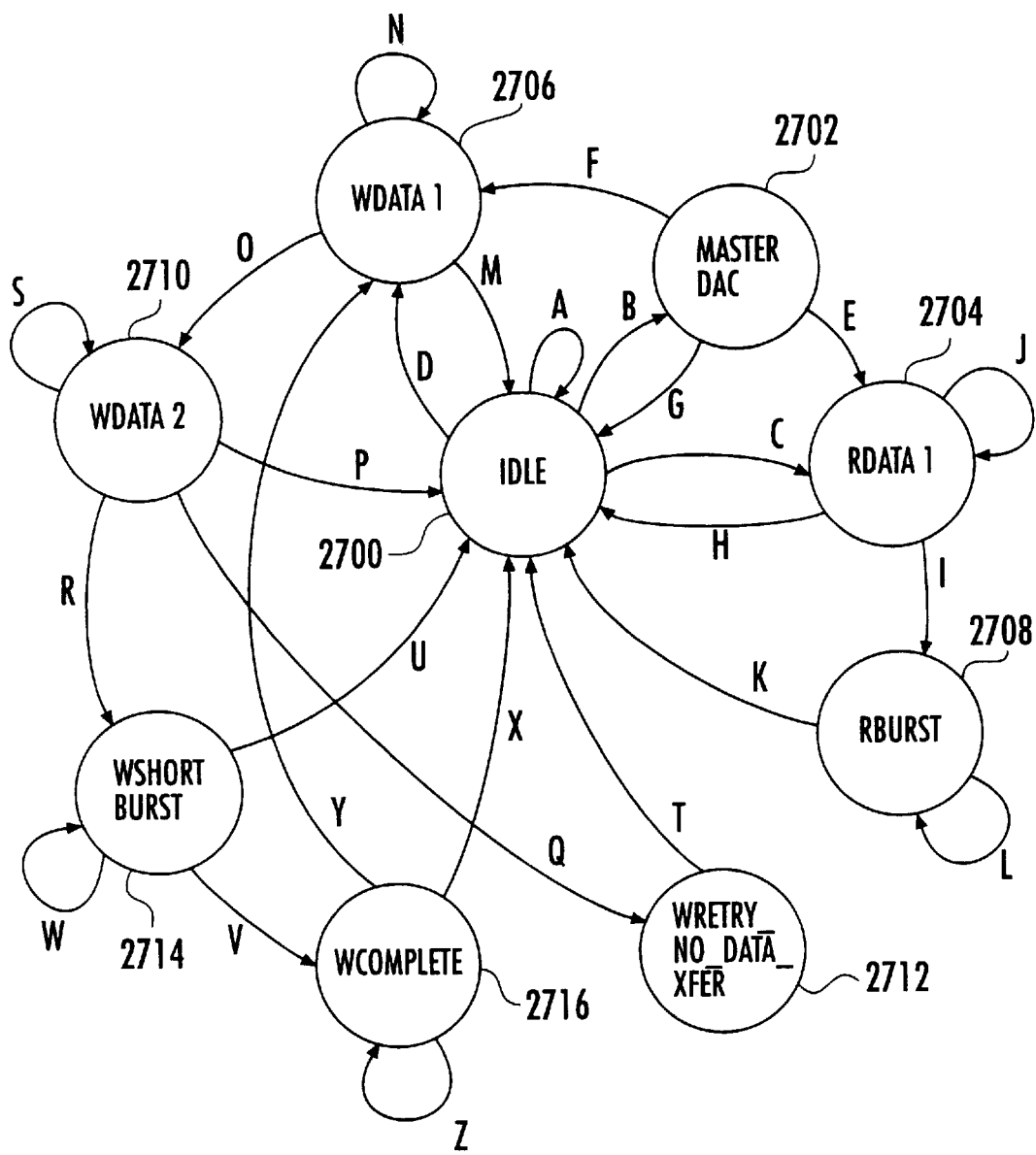

Referring to FIG. 85, the master state machine controls the operation of the QPIF when the QPIF is operating in the master mode. In the master mode, the QPIF executes posted write transactions and delayed request transactions on the PCI bus. The following table shows the events causing state transitions in the master state machine.

MASTER STATE MACHINE

| Current State | Event | Next State |
|---|---|---|
| IDLE | A = (any_run&&!cable_busy&&!p2q_master_dphase) \|\|(any_run_drg && tc_dc_full) | IDLE |
| IDLE | B: p2q_ack && q2p_dac_flag | MASTER_DAC |
| IDLE | C: p2q_ack && any_drg_run | RDATA1 |
| IDLE | D: p2q_ack && !(q2p_dac_flag \|\| any_drq_run) | WDATA1 |
| MASTER_DAC | E: p2q_ack && any_drq_run && p2q_start_pulse | RDATA1 |
|  | F: p2q_ack && p2q_start pulse &&!any_drq_run | WDATA1 |
|  | G: !p2q_ack | IDLE |
| RDATA1 | H: !p2q_ack | IDLE |
|  | I: p2q-ack && p2q_start_pulse | RBURST |
|  | J: p2q_ack && !p2q_start-pulse | RDATA1 |
| RBURST | K: !p2q_ack \|\| p2q_retry \|\| p2q_target_abort \|\| (queue_cyc_complete && !(!p2q_last_dphase && p2q_master_dphase && cd_stream && stream_match && !cfg2q_stream_disable) && !p2q_trdy) \|\| (read_page_disconnect && !p2q_trdy) | IDLE |
|  | L: p2q_ack && !p2q_retry && !p2q_target_abort && ((read_page_disconnect && p2q_trdy) \|\| (queue_cyc_complete && ((!p2q_last_dphase && p2q_master_dphase && cd_stream && stream_match && !cfa2q_stream_disable) \|\| p2q_trdy)) \|\| !p2q_trdy \|\| otherwise) | RBURST |
| WDATA1 | M: !p2q_ack \|\| p2q_retry \|\| p2q_target_abort \|\| ((queue_cyc_complete \|\| held_new_write_cmd \|\| end_of_line && new_write_cmd \|\| p2q_last_dphase \|\| sl_p2q_last_dphase) && !p2q_trdy) | IDLE |
|  | N: p2q_ack && !p2q_retry && !p2q_target_abort && (queue_cyc_complete \|\| held_new_write_cmd \|\| end_of_line && new_write_cmd \|\| p2q_last_dphase \|\| sl_p2q_last_dphase) && p2q_trdy | WDATA1 |
|  | O: otherwise | WDATA2 |
| WDATA2 | P: !p2q_ack \|\| (p2q_retry && !p2q_trdy) \|\| p2q_target_abort | IDLE |
|  | Q: p2q_ack && p2q_retry && p2q_trdy | WRETRY |
|  | R: p2q_ack && !p2q_retry && !p2q_target_abort && (queue_cyc_complete \|\| end_of_line && new_write_cmd) && (!p2q_trdy \|\| p2q_start_pulse) | WSHORT_BURST |
|  | S: otherwise | WDATA2 |
| WRETRY | T: Always | IDLE |
| WSHORT_BURST | U: !p2q_ack \|\| p2q_retry \|\| p2q_target_abort | IDLE |
|  | V: p2q_ack && !p2q_retry && !p2q_target_abort &&((overflow_next_queue && !new_write_cmd && !p2q_trdy) \|\| !p2q_trdy) | WCOMPLETE |
|  | W: otherwise | WSHORT_BURST |
| WCOMPLETE | X: p2q_retry \|\| p2q_target_abort \|\| (!(overflow_next_queue && !new_write_cmd && !p2q_last_dphase) && !p2q_trdy) | IDLE |
|  | Y: !p2q_retry &&!p2q_target_abort && ((overflow_next_queue &&!new_write_cmd && !p2q_last_dphase) &&!p2q_trdy) | WDATA1 |
|  | Z: otherwise | WCOMPLETE |

Master state transitions

At reset, the master state machine enters an IDLE state 2700 in which the QPIF awaits instructions to run a transaction on the PCI bus. When the QPIF receives a run signal from the MCA (any_run is asserted when any bit in the mca_run_pmw signal or mca_run_dr signal is asserted), the cable is not busy delivering a message (!cable_busy), and the PCI interface is not trying to finish the previous transaction (!p2q_master_dphase), the master state machine attempts to run the transaction on the PCI bus. If the transaction is a delayed request transaction (any_run_drq is asserted) and the other chip does not have room for a delayed completion (tc_dc_full is asserted), the master state machine is not able to run the request and steps the MCA to the next transaction. Otherwise, if the PCI interface has given the QPIF control of the bus (p2q_ack is asserted), the master state machine begins to execute the transaction on the PCI bus. In the IDLE state 2700, the master provides the address phase information, discussed above, to the PCI bus. If the transaction to be run is a dual address cycle (q2pif_dac_flag is asserted), the master state machine enters a MASTER_DAC state 2702 in which the second half of the address information is provided. If the transaction is not a dual address cycle and is a delayed request transaction (any_run_drq is asserted), the master state machine then enters an RDATA1 read state 2704, in which the master state machine begins the data phase of the delayed request transaction. If the transaction is not a dual address cycle and is not a delayed request, it is a posted memory write transaction, so the master state machine enters a WDATA1 write state 2706, in which the master state machine enters the data phase of the posted memory write transaction.

In the MASTER_DAC state 2704=2, the master state machine provides the second half of the address phase information. Then, if the p2q_ack signal is still asserted and the transaction is a delayed request, the master state machine enters the RDATA 1 state 2704 when it receives the start signal (p2q_start_pulse) from the PCI interface. If the transaction is not a delayed request, the master state machine enters the WDATA1 state 2706 when it receives the PCI start pulse. The master state machine also initiates a delayed completion message on the cable when the PCI start pulse is received by asserting an asynchronous completion message signal (early_master_send_message). If the p2q_ack signal has been deasserted by the PCI interface, the master state machine returns to the IDLE state 2700 and waits to retry the transaction.

The RDATA1 state 2704 is the initial state for delayed read and delayed write requests. In this state, the master state machine waits for the PCI start pulse before entering an RBURST burst data phase 2708. When the state machine first enters the RDATA1 state 2704, it initiates a completion message on the cable (if not already done in the MASTER_DAC state 2702). Then, if the p2q_ack is deasserted by the PCI interface, the master state machine terminates the transaction, steps the MCA to the next transaction, and reenters the IDLE state 2700. Otherwise, when the PCI start pulse appears, the master state machine prepares to enter the RBURST state 2708. If the QPIF indicates the end of the transaction (queue_cyc_complete) or if the transaction has reached a 4K page boundary (read_page_disconnect is asserted because all bits in the drq_addr[11:2] signal are high), the master state machine deasserts the QPIF's frame_ signal and indicates that the next piece of data is the last piece (asynchronous signal early_last_master_data is asserted) before entering the RBURST state 2708. The master state machine also asserts an asynchronous early_master_lastline signal, indicating that the last line of data has been reached, if the read_page_disconnect_lastline signal is asserted or if the DRQ last line signal (drq_lastline) is asserted and the QPIF has not received a streaming signal from the other bridge chip (cd_stream or stream_match are not asserted or cfq2q_stream_disable is not set). If the PCI start pulse is not asserted, the master state machine remains in the RDATA1 state 2704 until the QPIF terminates the transaction or a 4K page boundary is reached, which will return the state machine to the IDLE state 2700, or until the PCI start pulse appears, which forces the state machine to enter the RBURST state 2708.

In the RBURST state 2708, the master state machine bursts data to the PCI bus. If a completion message has not yet been initiated, the master state machine initiates a completion message upon entering the RBURST state 2708. Then, if the p2q_ack signal is deasserted, or if the QPIF transaction is retried by the PCI interface (p2q_retry is asserted), or if the PCI interface aborts the transaction (p2q_target_abort is asserted), the master state machine terminates the transaction on the PCI bus, aborts the completion message on the cable, and returns to the IDLE state. When the p2q_ack signal is taken away, the master cycle arbiter continues to select the current transaction. But when the transaction is retried or aborted, the master state machine steps the MCA to the next transaction.

While the p2q_ack signal is still asserted and the QPIF transaction is not retried or aborted, the master state machine nevertheless terminates the transaction and returns to the IDLE state 2700 if a 4K page boundary is reached and the PCI interface indicates that the target device has stopped taking data (p2q_trdy is no longer asserted). If the target device took the last piece of data, the master state machine remains in the RBURST state 2708.

If the QPIF asserts the queue_cyc_complete signal indicating that the transaction has completed, the master in general will terminate the transaction and return to the IDLE state 2700 if the p2q_trdy signal is deasserted or remain in the RBURST state 2708 until the last dword of data is transferred if the p2q_trdy signal remains asserted. However, if the transaction is in the data phase and is not in the last data phase (p2q_master_dphase and !p2q_last_dphase) and a stream has been established with the other bridge chip (cd_stream and stream_match and !cfg2q_stream_disable), the master state machine will remain in the RBURST phase indefinitely. When the QPIF is streaming, the master state machine asserts a streaming signal (q2pif_streaming) that forces the QPIF to continue to provide data to the requesting device on the other PCI bus until that device terminates the transaction.

If the p2q_ack signal remains asserted and neither the p2q_retry, p2q_target_abort, or queue_cyc_complete signals are asserted, the master state machine looks at the p2q_trdy signal. If the signal is not asserted, indicating that the target device has taken or provided the last piece of data, the master state machine asserts its next data signal (early_next_data), which indicates that the QPIF is ready to transfer another piece of data. The next data signal is asserted only if the transaction is not a corrected read (align_read is not asserted) or if the transaction is a corrected read and the read_data_start signal has been asserted. If the p2q_trdy signal is asserted, indicating that the target has not performed the last data transfer, the state machine remains in the RBURST state 2708.

In the WDATA1 state 2706, the master state machine begins the data phase of a posted memory write transaction. If the p2q_ack signal is deasserted or the p2q_retry or p2q_target_abort signals are asserted while the master state machine is in this state, the transaction is terminated on the PCI bus and the state machine returns to the IDLE state 2700. When the p2q_ack signal is deasserted, the MCA remains on the current cycle; otherwise, the master state machine steps the MCA to the next transaction.

If the p2q_ack signal remains asserted and the transaction is neither retried nor aborted, the master state machine must determine whether the write involves a single dword or more than one dword. If in the WDATA1 state the queue_cyc_complete signal is asserted, the held new write command signal is asserted, the end_of_line and new_write_cmd signals are asserted, or the transaction has reached the last dword of data, the transaction involves a single dword. In this situation, the transaction terminates and the state machine returns to the IDLE state 2700 only when the target took the last piece of data (!p2q_trdy). Otherwise, the state machine remains in the WDATA2 state 2710. If the transaction involves more than one dword of data, the master state machine enters a WDATA2 burst data phase state 2710. Just before entering the WDATA2 state, the master state machine inserts a q2p_irdy wait state if the overflow_next_queue signal has been asserted.

In the WDATA2 state 2710, the master state machine bursts data to the PCI bus. If the p2q_ack signal is deasserted or the transaction is aborted by the PCI interface, the transaction is terminated in the QPIF and the master state machine reenters the IDLE state 2710. If the transaction is retried by the PCI interface but the PCI interface took the data provided (!p2q_trdy), the master state machine reenters the IDLE state 2700. Otherwise, the state machine enters a WRETRY stepback state 2712 that steps the PMWQ out pointer back to the previous piece of data by generating the stepback signal discussed above. From the WRETRY state 2712, the state machine always reenters the IDLE state 2700.

If the p2q_ack signal remains asserted and the transaction is neither retried nor aborted, the master state machine determines whether the transaction is complete. If the QPIF indicates the end of the transaction (queue_cyc_complete is asserted) or the end of a cache line is reached and a new write command is needed (end of line and new_write_command are asserted), the state machine enters a WSHORT_BURST state 2714 when either the last piece of data was taken (!p2q_trdy) or the PCI start pulse is received. In either case, only two dwords of data must be written to the PCI bus. Otherwise, the state machine remains in the WDATA2 state 2710. When the state machine enters the WSHORT_BURST state 2714, the QPIF frame_ signal remains asserted if the transaction can overflow into the next queue and a new write command is not needed.

In the WSHORT_BURST state 2714, the master state machine prepares to write the final two dwords of data to the PCI bus. If the p2q_ack signal is deasserted or the cycle is retried or aborted by the PCI interface, the state machine terminates the transaction and returns to the IDLE state 2700. When the PCI acknowledge signal disappears or the cycle is aborted, the master state machine asserts the stepback signal to indicate that the PMWQ out pointer should be stepped back to the previous dword. When the transaction is retried by the PCI interface, the out pointer is stepped back only if the target device did not take the last piece of data (p2q_trdy is asserted). When the transaction is not terminated and it can overflow into the next PMWQ buffer (overflow_next_queue is asserted) and a new write command is not needed, the master state machine keeps the QPIF frame signal asserted and then enters a WCOMPLETE state 2716 if the target device has taken the last piece of data or stays in the WSHORT_BURST state 2714 otherwise. If the transaction cannot overflow into the next queue or a new write command is needed, the state machine deasserts the frame signal to indicate the end of the QPIF transaction and then enters the WCOMPLETE state 2716 if the last piece of data was taken by the target device or remains in the WSHORT_BURST state 2714 otherwise.

In the WCOMPLETE state 2716, the master state machine terminates the posted memory write transaction. The state machine enters the IDLE state 2700 if the transaction is retried or aborted by the PCI interface. If the transaction is retried, the PMWQ out pointer is incremented only if the target device took the last piece of data. If the transaction can overflow into the next queue, a new write command is not needed, and the transaction is not in the last data phase, the master state machine increments the queue selection counter and returns to the WDATA1 state 2706 to continue the transaction from the overflow queue, as long as the target device took the last piece of data. If the target device did not take the last piece of data, the master state machine remains in the WCOMPLETE state 2716.

If the transaction will not overflow into the next PMWQ buffer, the master state machine terminates the transaction and returns to the IDLE state 2700 if the target took the last piece of data. Otherwise, the state machine remains in the WCOMPLETE state 2716 until one of the terminating events discussed above occurs.

Figure 86:
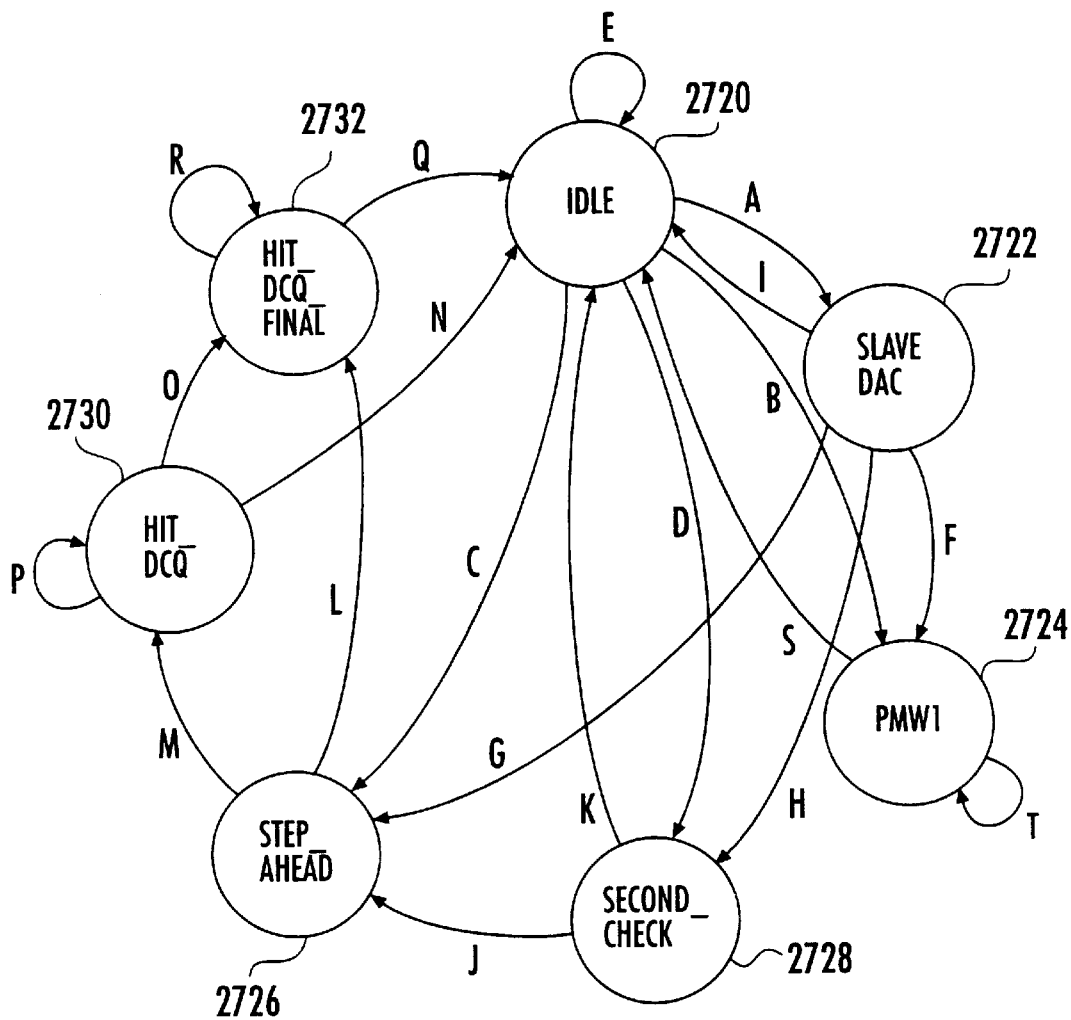

Referring to FIG. 86, the slave state machine controls the operation of the QPIF when the QPIF is operating in the slave mode. In the slave mode, the QPIF receives posted write transactions and delayed request transactions from devices on the PCI bus and forwards the transactions to the target bus through the cable. The following table shows the events causing state transitions in the slave state machine.

SLAVE STATE MACHINE

| CURRENT STATE | EVENT | NEXT STATE |
|---|---|---|
| SLAVE_IDLE | A: p2q_qcyc && p2q_dac_flag && !p2q_perr | SLAVE_DAC |
| | B: p2q_qcyc && !p2q_dac_flag && pmw_request && !p2q_perr &&(!tc_pmw_full && !dcq_locked && !lock_state[1]) | PMW1 |
| | C: p2q_qcyc && !p2q_dac_flag &&!pmw_request && !p2q_perr && (mem_read_line \|\| mem_read_mul) && (dcq_hit &&!dcq_no_data && !lock_state[1]) | STEP_AHEAD |
| | D: p2q_qcyc &&!p2a_dac_flag &&!pmw_request && !p2q_perr &&!(mem_read_line \|\| mem_read_mul) | SECOND_CHECK |
| | E: [p2q_qcyc &&!p2q_dac_flag && pmw_request && !p2q_perr &&!(!tc_pmw_full&&!dcq_locked&&!lock state[1])] \|\| [p2q_qcyc&&p2q_dac_flag&&p2q_perr] \|\| [p2q_qcyc &&!p2q_dac_flag&&!pmw_request&& (p2q_perr) \|\| ((mem_read_line \|\| mem_read_mul)&& !(dcq_hit&&!dcq_no_data&&!lock_state[1]))] \|\| otherwise | SLAVE_IDLE |
| SLAVE_DAC | F: p2q_qcyc&&pmw_request&&!p2q_perr && (!tc_pmw_full&&!dcq_locked&&!lock_state[1]) | PMW1 |
| | G: p2q_qcyc &&!pmw_request && !p2q_perr && (mem_read_line \|\| mem_read_mul)&& (dcq_hit && !dcq_no_data && ! lock_state[1]) | STEP_AHEAD |
| | H: p2q_qcyc&&!pmw_request&& !p2q_perr && !(mem_read_line \|\| mem_read_mul) | SECOND_CHECK |
| | I: otherwise | SLAVE_IDLE |
| SECOND_CHECK | J: !io_write && !config_write && !p2q_perr && (dcq_hit && !dcq_no_data && !lock_state[1] && dwr_check_ok)_ | STEP_AHEAD |
| | K: otherwise | |

-continued

SLAVE STATE MACHINE

| CURRENT STATE | EVENT | NEXT STATE |
|---|---|---|
| STEP_AHEAD | L: dcq_no_data | SLAVE_IDLE |
| | | HIT_DCQ_FINAL |
| | M: otherwise | HIT_DCQ |
| HIT_DCQ | N: !p2q_qcyc | SLAVE_IDLE |
| | O: p2q_qcyc&&(dcq_no_data&& !p2q_irdy \|\| (pmw_counter[2] && pmw_counter[1] && pmw_counter[0] && read_disconnect_for_stream) | HIT_DCQ_FINAL |
| | P: otherwise | HIT_DCQ |
| HIT_DCQ_FINAL | Q: !p2q_qcyc \|\| !p2q_irdy | SLAVE_IDLE |
| | R: otherwise | HIT_DCQ_FINAL |
| PMW1 | S: !p2q_qcyc | SLAVE_IDLE |
| | T: otherwise | PMW1 |

Slave state transitions

At reset, the slave state machine enters an IDLE state 2720, in which the QPIF waits for a transaction be initiated by a device on the PCI bus. If a transaction initiated on the bus does not target the QPIF (q2p_qcyc is not asserted), the slave state machine continues in the IDLE state 2720. When a transaction on the PCI bus does target the QPIF, the slave state machine enters a SLAVE_DAC dual address cycle state 2722 if the p2q_dac_flag is asserted and an address parity error has not occurred (p2q_perr_ is low). If the transaction is not a dual address cycle and is a posted memory write request, and if a parity error has not occurred in the address phase, the slave state machine loads the write counters (i.e., asserts load_write_counter) and determines whether it can accept the transaction. If the PMWQ in the other bridge chip is full (tc_dc_full is asserted by the DC transaction counter) or the DCQ is locked (dcq_locked is asserted) or the QPIF lock logic is in the unlocked-but-retry state (lock_state[1] equals "1"), the slave state machine terminates the transaction by asserting an asynchronous retry signal (early_retry) that is passed to PCI interface as q2pif_retry and remains in the IDLE state 2720. If the QPIF can accept the transaction, the slave state machine initiates the posted memory write message on the cable and enters a PMW1 state 2724, in which the transaction is forwarded up the cable.

If the transaction is not a dual address cycle or a posted memory write request, the slave state machine loads the dword counter (asserts load_write_counter) and, if no parity error has occurred, analyzes the delayed request transaction. If the transaction is a MRL or a MRM transaction and the QPIF lock logic is not in the unlocked-but-retry state, the slave state machine asserts the QPIF check cycle signal (q2pif_check_cyc), which instructs the DCQ to compare the latched request to the delayed completion messages in the DCQ buffers. If the request hits a DCQ buffer that is not empty (dcq_hit and !dcq_no_data), the slave state machine enters a STEP_AHEAD state 2726 in which the QPIF begins delivering the requested information to the PCI bus. If the MRL or MRM request misses all of the DCQ data buffers (!dcq_hit), the DCQ is not full (!dcq_full), the delayed request queue in the other bridge chip is not full (!tc_dr_full), and the DCQ and QPIF are not locked (!dcq_locked and !lock_state[1]), the slave state machine asserts the q2pif_retry signal, forwards the request down the cable, and remains in the IDLE state 2720. If the request misses the DCQ and the request cannot the sent down the cable, the QPIF simply retries the requesting device and remains in the IDLE state 2720.

If the delayed request is not a MRL or MRM transaction, a second clock cycle is needed to check the request because the data or byte enables must be compared to the contents of the DCQ buffers, so the slave state machine enters a SECOND_CHECK state 2728. If a parity error occurs or if the lock logic is in the unlocked-but-retry state, the state machine retries the requesting device and remains in the IDLE state 2720.

In the SLAVE_DAC state 2722, the slave state machine receives the second half of the address phase information. If the requesting device has not targeted the QPIF, the slave state machine ignores the transaction and remains in the IDLE state 2720. When the QPIF is the target device, the state transition events are the same as those in the IDLE state 2720. Specifically, if the transaction is a posted memory write request and a parity error has not occurred, the slave state machine loads the write counters and determines whether it can accept the transaction. If the PMWQ in the other bridge chip is full (tc_pmw_full is asserted), the DCQ is locked, or the QPIF lock logic is in the unlocked-but-retry state, the slave state machine retries the requesting device and returns to the IDLE state 2720. If the QPIF can accept the transaction, the slave state machine initiates the posted memory write message on the cable and enters the PMW1 state 2724.

If the transaction is not a posted memory write request, the slave state machine loads the dword counter and, if no parity error has occurred, analyzes the delayed request transaction. If the transaction is a MRL or a MRM transaction and the QPIF lock logic is not in the unlocked-but-retry state, the slave state machine asserts the QPIF check cycle signal. If the request hits a DCQ buffer that is not empty, the slave state machine enters the STEP_AHEAD state 2726. If the MRL or MRM request misses all of the DCQ data buffers, the DCQ is not full, the delayed request queue in the other bridge chip is not full (tc_dr_full is not asserted), and the DCQ and QPIF are not locked, the slave state machine asserts the q2pif_retry signal, forwards the request down the cable, and returns to the IDLE state 2720. If the request misses the DCQ and the request cannot be sent down the cable, the QPIF simply retries the requesting device and returns to the IDLE state 2720.

If the delayed request is not a MRL or MRM transaction, a second clock cycle is needed to check the request because the data or byte enables must be compared to the contents of the DCQ buffers, so the slave state machine enters the SECOND_CHECK state 2728. If a parity error occurs or if the lock logic is in the unlocked-but-retry state, the state machine retries the requesting device and returns to the IDLE state 2720.

In the PMW1 state 2724, the slave state machine forwards a posted memory write transaction through the cable to the target device. When the state machine first enters the PMW1 state 2724, it deasserts the load_write_counter signal. If the dword counter indicates that the posted memory write transaction is in the last cache line (pmw_counter[5:3] equals "111") and the PMWQ in the other bridge is full (tc_pmw_full) and the write overflow feature is disabled (!cfg2q_write_overflow), or if the write_page_disconnect signal is asserted because the transaction has reached a 4K page boundary, or if the DCQ has asserted the dcq_disconnect_for_stream signal and the write disconnect feature is not disabled (!cfg2q_wr_discnt_disable), the slave state machine asserts the slave_lastline signal indicating that the current cache line will be the last to be transferred. The slave state machine then remains in the PMW1 state 2724 until the p2q_qcyc signal is deasserted, indicating that the transaction has completed on the PCI bus. After leaving the PMW1 state 2724, the slave state machine reenters the IDLE state 2720.

In the SECOND_CHECK state 2728, the slave state machine has the DCQ compare the second phase of request information to the delayed completion information in the DCQ buffers. If the transaction is not a delayed write request (!io_write and !config_write) or there is no parity error (!p2q_perr), and if the DCQ is not locked and the dwr_check_ok signal is asserted, the slave state machine asserts the q2pif_check_cyc. The dwr_check_ok signal is asserted either when the transaction is not a delayed write request or when it is a delayed write request and a p2q_irdy wait state has not been inserted. If the request hits one of the DCQ buffers and the buffer is not empty, the slave state machine enters the STEP_AHEAD state 2726. If the request misses all of the DCQ buffers but the QPIF can send the message down the cable, the slave state machine retries the requesting device, forwards the transaction down the cable, and reenters the IDLE state 2720. Otherwise, if the request missed all of the DCQ buffers and the QPIF could not send the transaction down the cable, or if a parity error occurred on a delayed write request, the state machine will retry the requesting device and reenter the IDLE state 2720.

In the STEP_AHEAD state 2726, the slave state machine increments the DCQ output pointer to the next dword. This state is necessary immediately after a DCQ buffer is hit because the PCI interface latches the first dword of data without asserting the !p2q_trdy signal. From the STEP_AHEAD state 2726, the state machine enters a HIT_DCQ state 2730, in which data is provided from the appropriate DCQ buffer to the requesting device, if the last dword of data has not been taken. Otherwise, the state machine enters a HIT_DCQ_FINAL state 2732, in which the requesting device is retried because the DCQ buffer contains no more data.

From the HIT_DCQ state 2730, when the delayed request transaction terminates on the PCI bus before it terminates in the QPIF (i.e., p2q_qcyc is deasserted), the state machine terminates the transaction in the QPIF and asserts the stepback signal, which indicates that the DCQ out pointer should be decremented because the last piece of data was not taken by the requesting device. The state machine then reenters the IDLE state 2720. If the DCQ buffer runs out of data while the requesting device continues to request it (dcq_no_data and !p2q_irdy), or if the pmw_counter indicates that the last dword has been reached and the read_disconnect_for_stream signal has been asserted, the slave state machine retries the requesting device and enters the HIT_DCQ_FINAL state 2732. If the transaction terminates to establish a stream, the step back signal is asserted and the output pointer of the appropriate DCQ buffer is decremented. In any other situation, the slave state machine continues to provide data in the HIT_DCQ state 2730.

In the HIT_DCQ_FINAL state 2732, the slave state machine has one dword of data left to transfer. If the PCI bus terminates the transaction before the requesting device takes the last piece of data (i.e., p2q_qcyc is deasserted), the slave state machine asserts the stepback signal and returns to the IDLE state 2720. If the p2q_qcyc signal remains asserted and the requesting device has not asserted an initiator wait state (!p2q_irdy), the requesting device is retried because the last piece of data has been taken. The state machine then reenters the IDLE state 2720. Otherwise, the slave state machine remains in the HIT_DCQ_FINAL state 2732.

Figure 87:
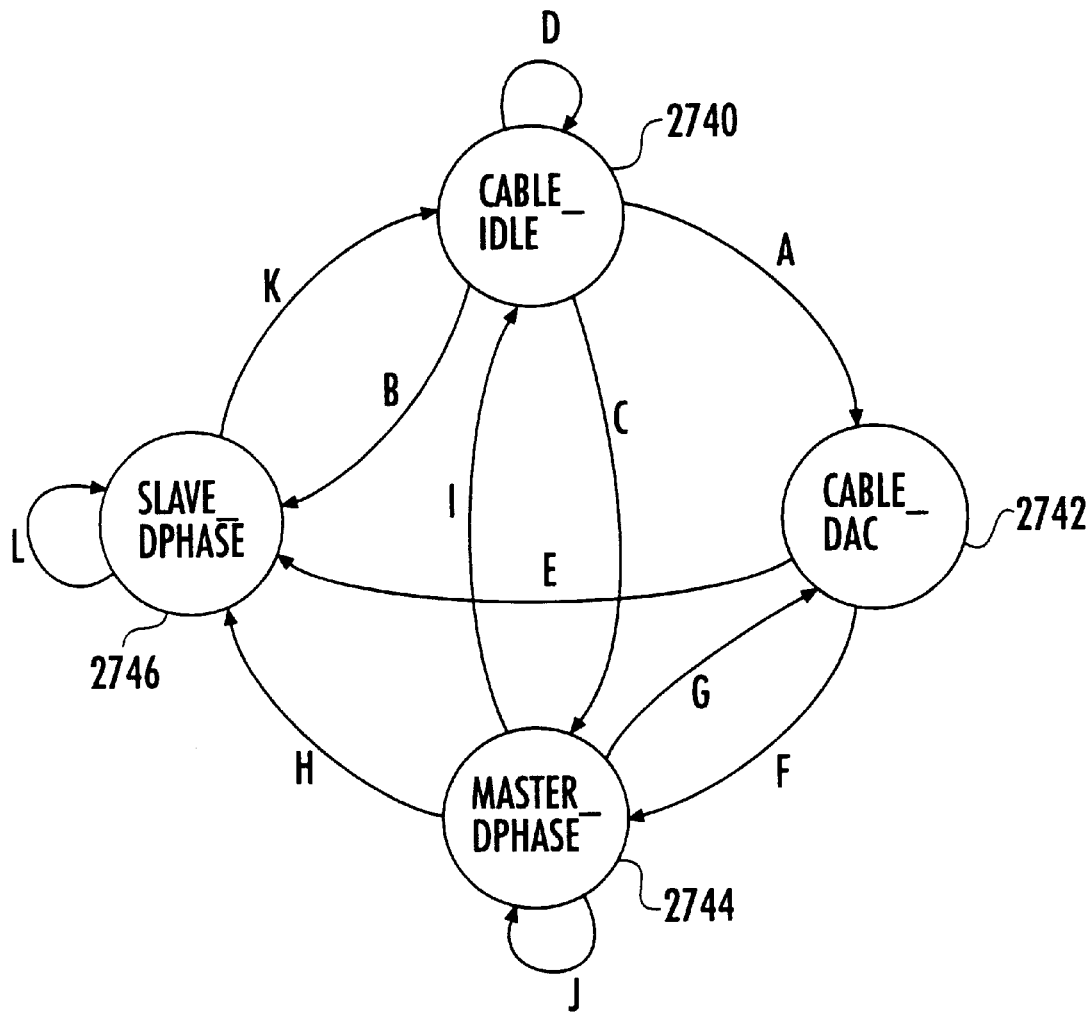

Referring to FIG. 87, the cable message generator is a state machine that creates cable messages from transaction information obtained from the master and slave state machines. In addition to an IDLE state 2740, the cable message generator also includes a dual address cycle (CABLE_DAC) state 2742, a master data phase (MASTER_DPHASE) state 2744, and a slave data phase (SLAVE_DPHASE) state 2746. The following table shows the events causing state transitions in the cable message generator.

CABLE MESSAGE GENERATOR

| CURRENT STATE | EVENT | NEXT STATE |
|---|---|---|
| CABLE_IDLE | A: (send_message && q2pif_dac) \|\| ((dcq_prefetch_mul \|\| dcq_prefetch_line) && dcq_prefetch_dac) | CABLE_DAC |
| | B: (send_message && !q2pif_dac) \|\| ((dcq_prefetch_mul \|\| dcq_prefetch_line) && !dcq_prefetch_dac) \|\| (dcq_stream_connect && !(\|drq_valid[3:0])) && (dcq_stream_connect \|\| !p2q_ack \|\| dcq_prefetch_line \|\| deq_prefetch_mul) | SLAVE_DPHASE |
| | C: (send_message && !q2pif_dac) \|\| ((dcq_prefetch_mul \|\| dcq_prefetch_line) && !dcq_prefetch_dac) \|\| (dcq_stream_connect && !(\|drq_valid[3:0])) && !dcq_stream_connect && !(!p2q_ack \|\| dcq_prefetch_mul \|\| dcq_prefetch_line) | MASTER_DPHASE |
| | D: otherwise | CABLE_IDLE |
| CABLE_DAC | E: !p2q_ack \|\| dcq_prefetch_mul \|\| dcq_prefetch_line | SLAVE_DPHASE |
| | F: otherwise | |

-continued

CABLE MESSAGE GENERATOR

| CURRENT STATE | EVENT | NEXT STATE |
|---|---|---|
| MASTER_DPHASE | G: send_message && q2pif_dac<br>H: send_message && !q2pif_dac<br>I: !send_message && (early_last_master_data && !p2q_trdy \|\|<br>   master_abort_cable)<br>J: otherwise | MASTER_DPHASE<br>CABLE_DAC<br>SLAVE_DPHASE<br>CABLE_IDLE |
| SLAVE_DPHASE | K: [!(drq_stream_connect &&!(\|drq_valid[3:0])&&p2q_qcyc))<br>&& [(dly_read_request \|\| dly_single_write_request \|\|<br>dcq_prefetch_mul \|\| dcq_prefetch_line)] \|\|<br>L: early_last_slave_data \|\|<br>dcq_stream_connect && !(\|drq_valid[3:0])&&p2q_qcyc and<br>otherwise | MASTER_DPHASE<br>CABLE_IDLE<br><br><br>SLAVE_DPHASE |

Cable Message Generator State Transitions

At reset, the cable message generator enters the IDLE state 2740, in which it waits for transaction information to arrive from the master or slave state machines. From the IDLE state 2740, if the cable message generator receives a prefetch multiple signal (dcq_prefetch_mul) or a prefetch line signal (dcq_prefetch_line), the cable address signal (early_cad[31:2]) equals the prefetch address signal (dcq_prefetch_addr[31:2]). Otherwise the early_cad[31:2] signal takes on the value of the QPIF address signal (q2pif_addr [31:2]). When the cable message is initiated by the master state machine, the message is a delayed completion message, so the command code (early_ccbe[3:0]) equals "1001". When the cable message is initiated by the slave state machine, the command code takes on the value of the message_cmd[3:0] signal, discussed above.

If the send_message signal is asserted, indicating that either the master state machine or the slave state machine has initiated a message, and the corresponding transaction is not a dual address cycle, or if the cable message generator receives a prefetch request that is not a dual address cycle, or if the cable message generator receives a stream connect signal and no delayed requests from the CPU are pending in the downstream DRQ, the cable message generator asserts a sent_pmw signal that indicates that a posted memory write request from the PCI bus will be sent down the cable. The sent_pmw signal is not asserted if a stream has been established by the DCQ. The cable message generator asserts a sent_dr signal when a read request or delayed write request is received from the slave state machine or a prefetch signal is received and when a stream has not been established by the DCQ.

If the DCQ has established a stream (dcq_stream_connect is asserted), the buffer number for the cable signal (early_cbuff[2:0]) takes on the value of the DCQ stream buffer (dcq_stream_buff[2:0]), the cable command code (early_ccbe[3:0]) is set equal to "1000", and the cable message generator enters the SLAVE_DPHASE state 2746. Otherwise, if the QPIF is in the slave mode and the cable message generator receives either a prefetch multiple or a prefetch line signal, the cable buffer signal takes on the value of the DCQ buffer number (dcq_buff[2:0]) and the cable message generator enters the SLAVE_DPHASE state 2746. Otherwise, the QPIF is operating in the master mode and the cable message generator enters the MASTER_DPHASE state 2744.

When the cable message generator receives the send_message signal and a transaction that is a dual address cycle, or when it receives a prefetch request that is a dual address cycle, the message generator enters the CABLE_DAC state 2742. For a prefetch signal, the cable address signal is set equal to the upper thirty two bits of the dcq_prefetch_addr [63:0] signal; otherwise, the cable address equals the upper thirty-two bits of the q2pif_addr[63:0] signal. Also, if the cable message generator receives the transaction from the slave state machine, the cable buffer number equals the DCQ buffer number; otherwise, the cable buffer number equals the DRQ buffer number (no completion messages are generated for posted memory write transactions).

In the CABLE_DAC state 2742, the cable message decoder generates the second half of the address phase information. As in the IDLE state 2740, the cable address signal takes on the value of the prefetch address when the received transaction is a prefetch line or prefetch multiple request and takes on the value of the q2pif_addr[31:2] otherwise. The sent_pmw signal is asserted when the message generator receives a posted memory write transaction from the slave state machine, and the sent_dr signal is asserted when it receives a prefetch request or a delayed request from the slave state machine. If a prefetch request or a request from the slave state machine is received, the cable message generator enters the SLAVE_DPHASE state 2746. Otherwise, the message generator enters the MASTER_DPHASE state 2744.

In the MASTER_DPHASE state 2744, the cable message generator attempts to send a delayed completion message down the cable. However, if the PCI interface grants the bus to a device on the PCI bus before the QPIF gets control of the bus, the cable message generator must leave the MASTER_DPHASE state 2744 to send the newly received message. Therefore, if the send_message signal is asserted while the message generator is in the MASTER_DPHASE state 2744, the q2c_new_req signal is asserted to indicate the start of a new message. If the q2pif_dac_flag is asserted, the new transaction is a dual address cycle and the cable message generator enters the CABLE_DAC state 2742. Otherwise, message generator enters the SLAVE_DPHASE state 2746.

If the send_message signal is not asserted, then the cable message generator is sending a delayed completion message from the master state machine. When the master state machine has completed the last data transfer with the PCI bus and the target device has acknowledged the transfer (!p2q_trdy), or when the master has aborted the transaction on the cable, the cable message generator asserts a sent_dc signal indicating that the delayed completion message was sent down the cable and reenters the IDLE state 2740. Otherwise, the message generator remains in the MASTER_DPHASE state 2744 and continues generating the delayed completion message.

From the SLAVE_DPHASE state 2746, as long as a stream is established with the upstream chip, no delayed requests from the CPU are pending in the downstream DRQ, and the requesting device continues to send data to the QPIF (q2p_qcyc is asserted), the cable message generator remains in the SLAVE_DPHASE state 2746 and continues to forward the transaction from the requesting device. Otherwise, if the cable message generator receives a delayed request or a prefetch request, the cable message generator forwards the request and, in the case of a delayed write request, the one dword of data to the upstream device and then enters the IDLE state 2740. Otherwise, the cable message generator has received a posted memory write request. In this situation, the cable message generator stays in the SLAVE_DPHASE state 2746 and continues to forward the posted memory write information down the cable until the early_last_slave_data signal is asserted, indicating the last piece of data has been sent by the slave state machine. The message generator then terminates the cable transaction and reenters the IDLE state 2740.

CABLE INTERFACE

To ensure the valid transfer of data between the two bridge chips, data sent through the cable 28 must be synchronized properly to the clocks from the clock generators 102 and 122. The downstream clock generator 122 bases its clocks on an upstream clock (which in turn is based on the PCI bus clock PCICLK1) transmitted down the cable 28 with the data. As a result, upstream data transmitted downstream is synchronized to the clocks generated in the downstream bridge chip 48. However, the phase delay associated with the cable 28 between the main clocks generated in the upstream chip 26 and the data transferred back upstream from the downstream chip 48 is unknown. The length of the cable 28 range from 10 to as large as 100 feet (if appropriate interface technology is used). The receiving logic in the upstream cable interface 104 is effectively an asynchronous boundary with respect to the upstream clock. Consequently, the receiving logic needs to re-synchronize the downstream-to-upstream data to the clock from the upstream clock generator 102.

Figure 5:
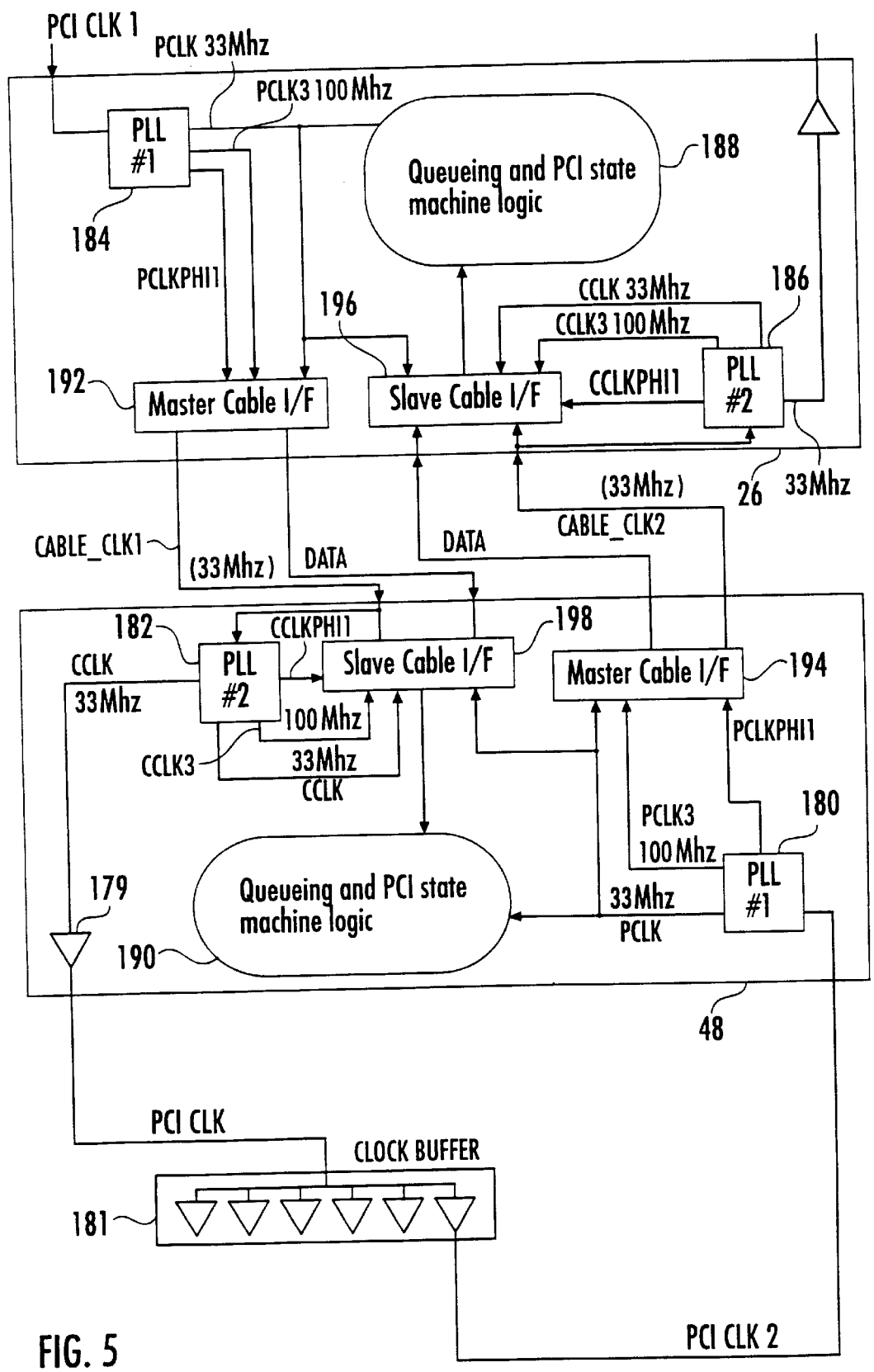
FIG. 5 is a block diagram of the clock routing scheme in the bridge chips.

Referring to FIG. 5, the clock distribution scheme in the 2-chip PCI—PCI bridge is shown. Transactions which are forwarded between the bridge chips 26 and 48 are encoded into multiple time-multiplexed messages. The format of the messages is similar to the PCI transaction format (except for time multiplexing) and includes an address and one or more data phases and modified handshake signals in addition to signals which are added to indicate buffer number and special bridge function commands. Each cable interface 104 or 130 includes a master cable interface (192 or 194) and a slave cable interface (196 or 198). The master cable interface 192 or 194 transmits messages out onto the cable 28, and the slave cable interface 196 or 198 receives messages from the cable 28.

The clock generator 102 or 122 in each bridge chip includes two on-chip PLLs for clock generation. A PLL 184 in the upstream bridge chip 26 locks on the primary PCI bus input clock PCICLK1. In the downstream bridge chip 48, the PLL 180 locks to an incoming clock PCICLK2 from a clock buffer 181.

In the ensuing description, a "1× clock" refers to a clock having the same frequency as the clock PCICLK1, while a "3× clock" refers to a clock having three times the frequency of the clock PCICLK1. A 1× clock PCLK generated by the PLL 184 or 180 (in the bridge chip 26 or 48, respectively) is used for the corresponding bridge chip's PCI bus interface logic 188 or 190, and the 3× clock PCLK3 is used to run the cable message generation logic in the master cable interface 192 or 194. The other PLL 186 or 182 is used to lock to a cable input clock CABLE_CLK1 (from upstream) or CABLE_CLK2 (from downstream) and to generate a 1× clock CCLK and a 3× clock CCLK3 to capture incoming cable data. The clock outputs of the PLL 186 or 182 are routed to the slave cable interface 196 or 198, respectively.

The PLLs are arranged in the layout to balance the 1× and 3× clocks as closely as possible to minimize the skew between them.

The PLL 184 or 180 generates a phase indicator signal PCLKPHI1, which indicates to the master cable interface 192 or 194 when the first phase of data should be presented to the cable 28. On the upstream side, the signal PCLKPHI1 is based on the PCI clock PCICLK1; on the downstream side, the signal PCLKPHI1 is based on the PCI clock PCICLK2. The PLL 186 or 182 generates a phase indicator signal CCLKPHI1, based on the cable clock CABLE_CLK1 or CABLE_CLK2, to indicate to the slave cable interface 196 or 198 when the first phase of data has come down the cable 28.

The PCI clock PCICLK2 for the secondary PCI bus 32 is generated off a 1× clock BUFCLK of the PLL 182 in the downstream bridge chip 48. The clock BUFCLK drives the clock buffer 181 through a driver 179. The buffer 181 outputs a separate clock signal for each of the six slots on the secondary PCI bus 32 as well as the clock PCICLK2, which is routed back as the bus input clock to the downstream bridge chip 48. By basing the clock PCLK on the clock PCICLK2 from the clock buffer 181, the clock schemes of the upstream and downstream chips are made to appear more similar since both are based on an external bus clock.

The cable clock CABLE_CLK1 is a 33% duty cycle clock. The PLL 182 first converts the 33% duty cycle clock to a 50% duty cycle clock for output as BUFCLK.

The PCI Specification, Version 2.1, requires that the PCI bus clock must meet the following requirements: clock cycle time greater than or equal to 30 ns; clock high time greater than 11 ns; clock low time greater than or equal to 11 ns; and clock slew rate between 1 and 4 ns.

When the computer system is powered up, the upstream chip 26 is powered on last, the upstream PLL 184 sends the clock CABLE_CLK1 (through the master interface 192) down the cable 28, which is then locked to by the downstream PLL 182 and PLL 180. The downstream PLL 180 then sends the clock CABLE_CLK2 back upstream to be locked to by the PLL 186. The system is not completely operational until all four PLLs have acquired lock.

If the upstream bridge chip 26 powers up and the downstream bridge chip 48 is not yet turned on, the upstream bridge chip 26 behaves as a PCI—PCI bridge with nothing connected to its downstream bus (the cable 28). As a result, the upstream bridge chip 26 does not accept any cycles until the downstream bridge chip 48 is powered on and the upstream PLL 186 has acquired "lock" from the cable clock CABLE_CLK2.

The upstream bridge chip 26 floats all of its PCI output buffers and state machines asynchronously with assertion of the PCI reset signal PCIRST1_ on the primary bus 24.

During reset, the PLL 184 may be attempting to acquire lock on the PCI bus clock PCICLK1. Since the PCI Specification guarantees that the signal PCIRST1_ will remain active for at least 100 μs after the PCI bus clock becomes stable, the PLL 184 has about 100 μs to acquire a lock.

The downstream bridge chip 48 resets all internal state machines upon detection of the primary bus PCIRST1_ signal. In response, the downstream bridge chip 48 also asserts a slot-specific reset to each slot on the secondary PCI bus 32, as well as a secondary PCI bus reset signal PCIRST2_.

Figure 6:
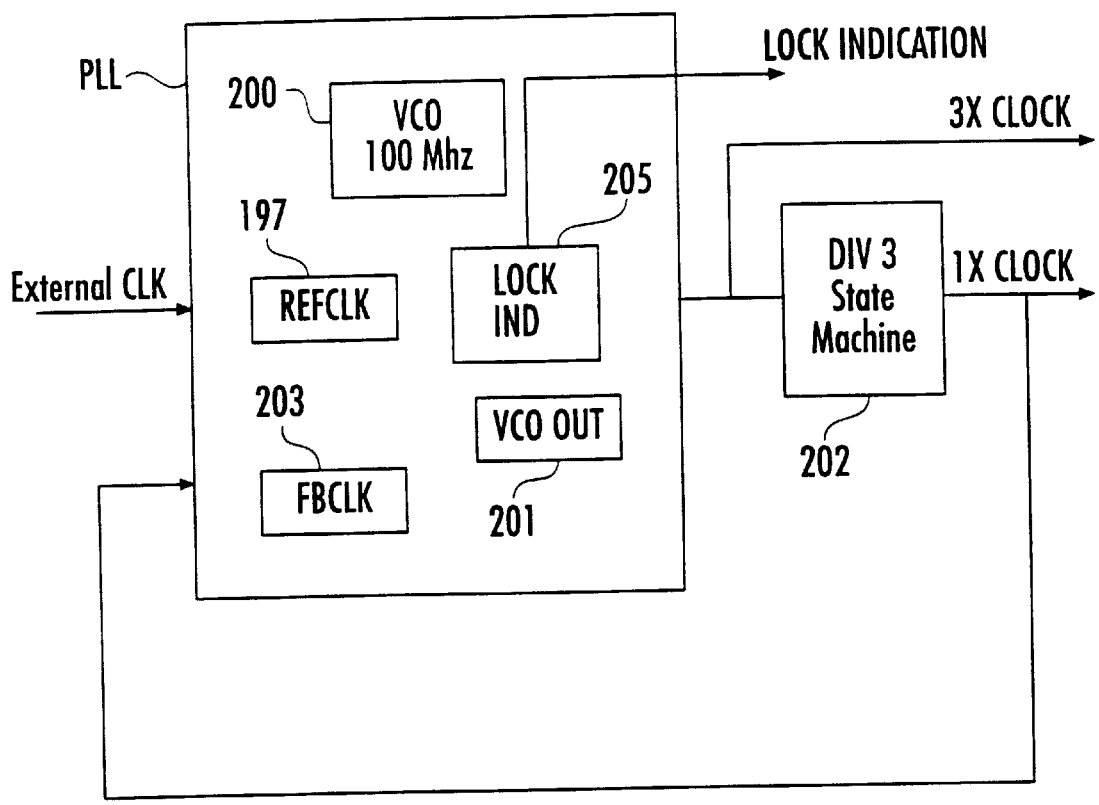
FIG. 6 is a block diagram of a clock generator in each of the bridge chips.

Referring to FIG. 6, each PLL includes a voltage-controlled oscillator (VCO) 200 generating an output 201 (the 3× clock) between 75 Mhz (for a 25-Mhz PCI bus) and 100 Mhz (for a 33-Mhz PCI bus). The VCO 200 receives a reference clock 197, which is the PCI bus clock. Each PLL has a lock detection circuit 205 which indicates by a lock indication bit that the PLL phase is locked to its reference accurately enough to perform its intended function.

The lock indication bits are written to a status register in the configuration space 105 or 125 of each bridge chip. On the downstream side, a power-good/lock status bit is transmitted to the upstream bridge chip 26 to indicate that the main elements of the downstream bridge chip 48 are stable (power is stable) and the downstream PLLs are locked (lock indication bits of the two PLLs are active). The lock indication bit is also gated with the EDC status bits such that EDC errors are not reported as such until the PLLs are locked. Thus, the bridge chip pair can come up to an error-free communication state without software intervention. The lock indication bit also provides some diagnostic information which can distinguish between a PLL lock failure and other data errors. The clock generation circuitry includes a four-state machine 202 to generate a divide-by-3 clock (1× clock) of the VCO output 201. The 1× clock is fed back to the PLL at input 203.

Figure 7:
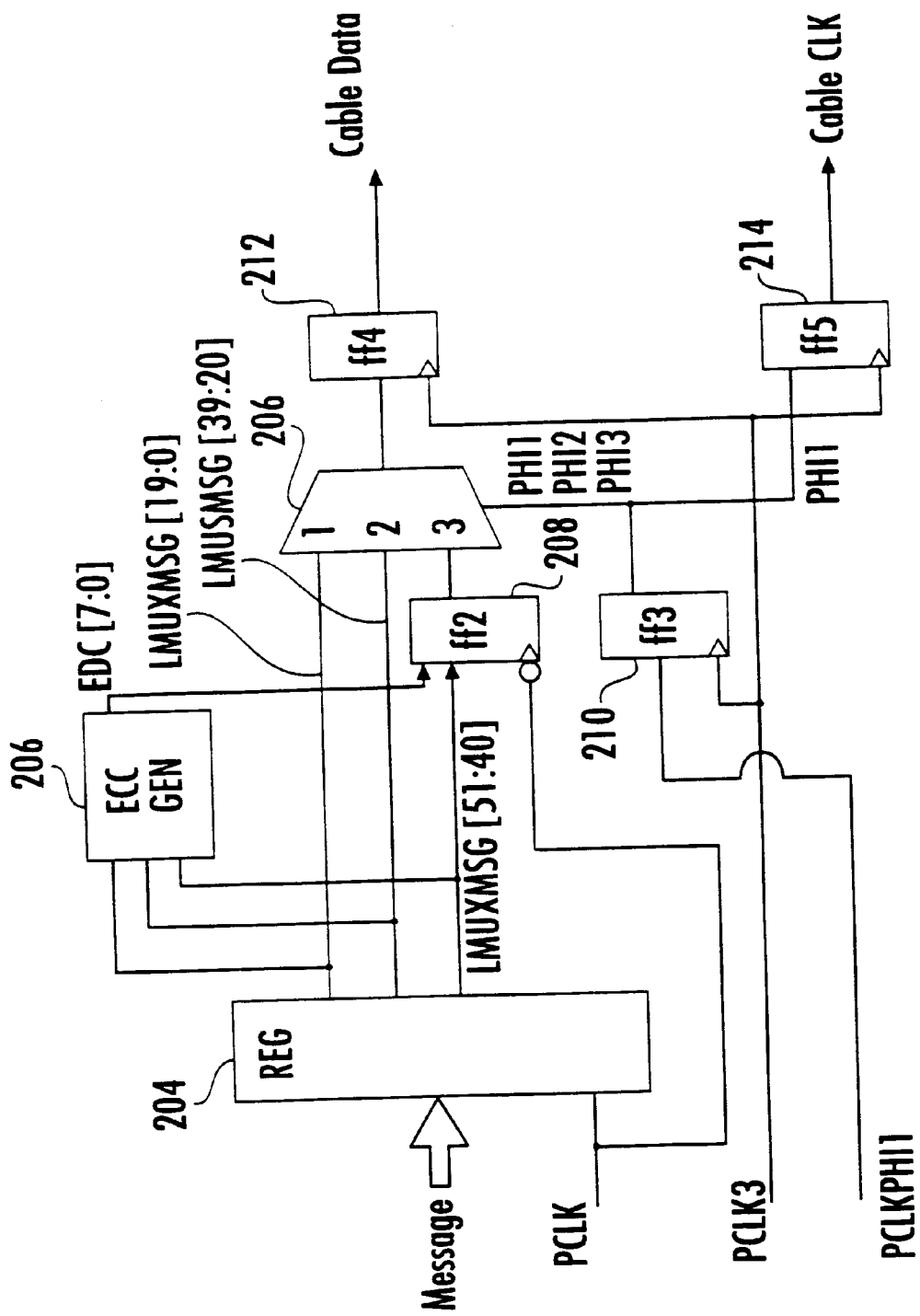
FIG. 7 is a block diagram of a master cable interface in each of the bridge chips for transmitting data over a cable connecting the bridge chips.

Data is moved down the cable 28 at a 3× clock (PCLK3) rate in three time-multiplexed phases to produce a 1× clock message transfer rate. Referring to FIG. 7, the circuitry in the master cable interface 192 or 194 for disassembling and transmitting the cable message includes a register 204, which samples the out-going message at the local PCLK boundary. The flip-flop 208 provides extra margin for hold time on the third phase of the transmitted message by holding this phase for an extra half of a PCLK. Since the output register 212 is clocked with the 3× clock PCLK3, this reduces the need for tight control on the skew between the 1× and 3× clocks. From the phase indication signal PCLKPHI1, a set of three flip-flops 210 generates successive PHI1, PHI2, and PHI3 signals, representing phases 1, 2 and 3, respectively, which in turn control a 60:20 multiplexer 206. The three phases of data (LMUXMSG[19:0], LMUXMSG[39:20], {LMUXMSG[51:40], EDC[7:0]}) are successively multiplexed into the register 212 and driven through the cable 28. The third phase of data includes error correction bits EDC[7:0] generated by an ECC generator 206 (FIG. 17) from the register 204 output bits LMUXMSG [51:0]. The flip-flop 214, clocked by PCLK3, receives the PHI1 signal and clocks it out as the cable clock CABLE_CLK1 or CABLE_CLK2.

Figure 8:
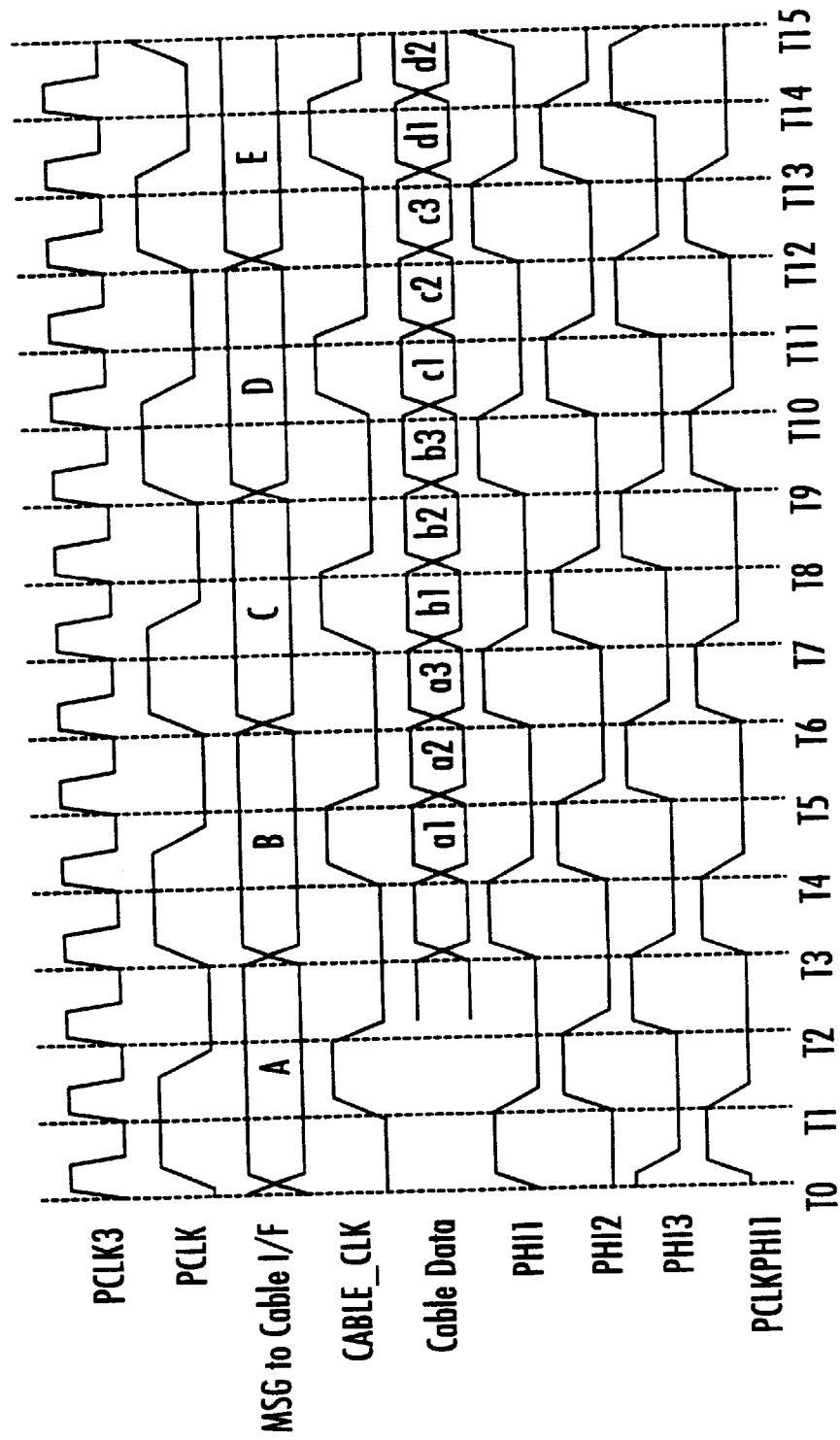
FIG. 8 is a timing diagram of signals in the master cable interface.

Since the master cable interface 192 or 194 is a 1×-to-3× communication interface, a one 3×-clock latency is incurred, resulting in a single 3× clock phase shift of the transmitted cable message from the PCI bus clock as shown in FIG. 8. In period T0, message A is presented to the input of the register 204 and the first phase clock indicator PCLKPHI1 is asserted high. The signal PHI1 is asserted high from a previous cycle. In period T1, the cable clock CABLE_CLK1 or CABLE_CLK2 is driven high in response to the signal PHI1 being high. The PCLKPHI1 pulse causes the signal PHI2 to be pulsed high in period T1. Next, in period T2, the signal PHI3 is pulsed in response to the signal PHI2. In period T3, the signal PHI1 is pulsed high in response to the signal PHI3 being high. Message A is also loaded into the register 204 on the rising edge of the clock PCLK in period T3. Next, in period T4, the signal PHI1 causes the multiplexer 206 to select the first phase data A1 for loading into the register 212. Next, in period T5, the second phase data A2 is selected and loaded into the register 212. Then, in period T6, the third phase data A3 is loaded into the register 212. This process is repeated for messages B, C, D and E in the subsequent clock periods.

As shown in FIG. 8, the cable clock CABLE_CLK has a 33% duty cycle. Alternatively, the cable clock CABLE_CLK can be designed to have an average duty cycle of 50%, which can be accomplished, for example, by sending out the cable clock as 33% high-66% low-66% high-33% low. Having an average 50% duty cycle could result in better pass characteristics in the cable 28.

Figure 9:
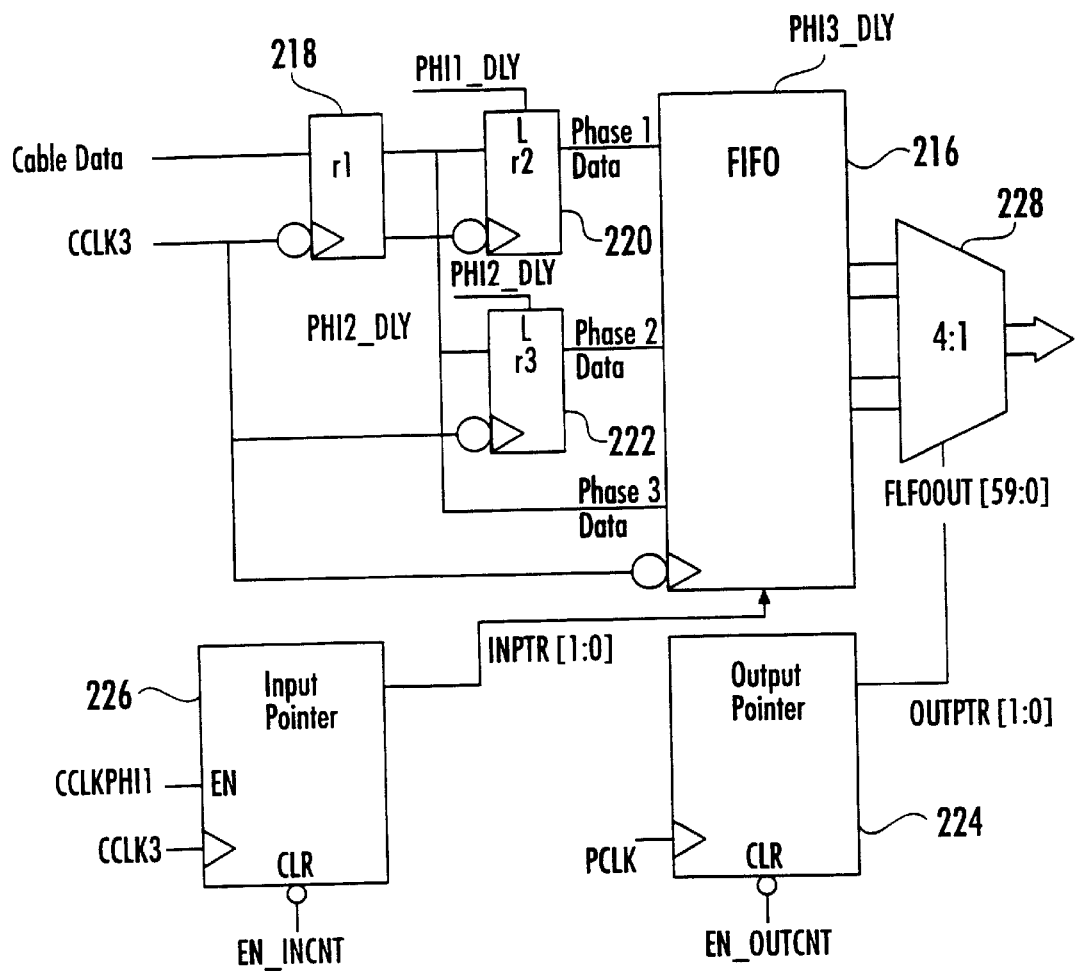
FIG. 9 is a block diagram of a slave cable interface in each of the bridge chips for receiving data transmitted over the cable.

Referring to FIG. 9, a slave cable interface first-in-first-out buffer (FIFO) 216 assembles incoming data from the cable 28 and transmits the assembled data to the queues and PCI state machines in the receiving bridge chip. The FIFO 216 is 4 entries deep, with each entry capable of holding one complete cable message. The depth of the FIFO 216 allows for the cable data to be synchronized to the local bridge chip clock without losing any effective bandwidth in the cable interface. In addition, on the upstream side, the FIFO 216 is an asynchronous boundary for the cable data coming from the downstream bridge chip 48. The FIFO 216 ensures that the cable data is properly synchronized with respect to PCLK before it is outputed to the rest of the chip.

The entries of the FIFO 216 are selected by an input pointer INPTR[1:0] from an input pointer counter 226, which is clocked by the signal CCLK3, cleared when a signal EN_INCNT is low, and enabled by the phase indicator CCLKPHI1. The negative edge of the 3× clock CCLK3 from the PLL 186 or 182 is used to latch incoming data from the cable 28, first into a 20-bit register 218, and then into a register 220 if a phase one indication signal PHI1_DLY is asserted, or into a register 222 if a phase two indication signal PHI2_DLY is asserted. The phase 1 data, phase 2 data and phase 3 data from the registers 220, 222 and 218, respectively, are loaded into the selected entry of the FIFO 216 on the negative edge of CCLK3 when the phase 3 indication signal PHI3_DLY is asserted. The four sets of outputs from the FIFO 216 are received by a 240:60 multiplexer 228, which is selected by an output pointer OUTPTR[1:0] from an output pointer counter 224 clocked by PCLK and cleared when a signal EN_OUTCNT is low.

Figure 10:
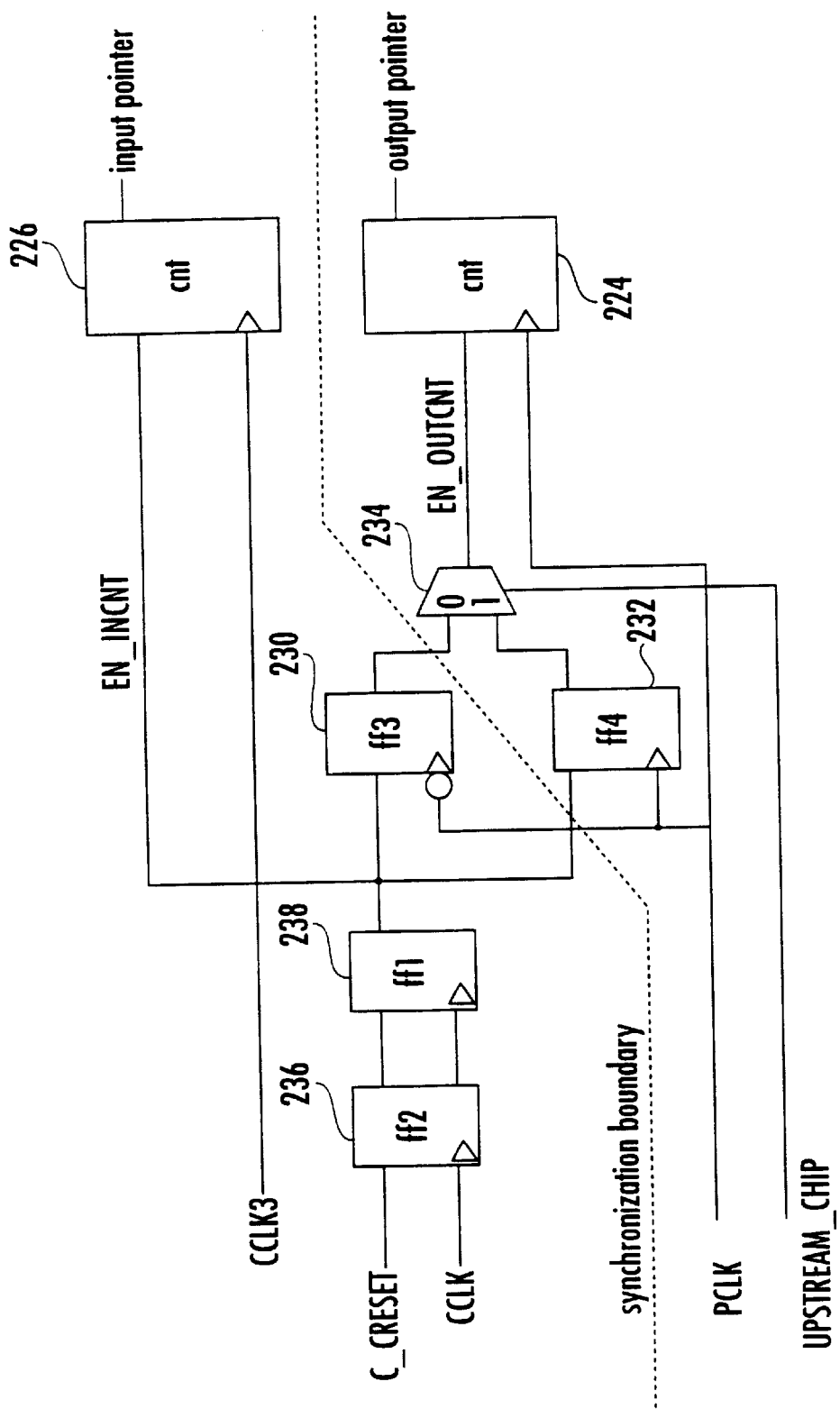
FIG. 10 is a block diagram of logic generating input and output pointers for the receiving logic in the slave cable interface.

Referring to FIG. 10, the input pointer and output pointer counters 226 and 224 continuously traverse through the FIFO 216 filling and emptying data. The counters 226 and 224 are offset in such a way as to guarantee valid data in a location before it is read out. The initialization of the pointers is different for an upstream bridge chip 26 than for a downstream bridge chip 48 due to synchronization uncertainties.

Flip-flops 236 and 238 synchronize the reset signal C_CRESET, which is asynchronous to the clocks in the bridge chip, to the CCLK clock boundary. The signal EN_INCNT is generated by the flip-flop 238. The input pointer is incremented on the rising edge of the clock CCLK3 if the first phase indication signal CCLKPHI1 and the signal EN_INCNT. The output pointer is then started at a later local PCLK clock boundary PCLK when it can be guaranteed that the data will be valid in the FIFO 216. The upstream and downstream bridge chips must handle the starting of the output pointer differently since the phase relationship of the cable clock to the local clock is not known for the upstream bridge chip 26 but is known for the downstream bridge chip 48.

In the downstream bridge chip 48, the phase relationship between the incoming cable clock CABLE_CLK1 and the secondary PCI bus clock PCICLK2 is known since the PCI clock PCICLK2 is generated from the cable clock. As a result, no synchronization penalty exists for the output pointer OUTPTR[1:0] in the downstream bridge chip 48, and the output pointer can track the input pointer INPTR[1:0] as closely as possible. A flip-flop 230, which is clocked on the negative edge of the clock PCLK, is used to avoid any clock skew problems between the clock CCLK generated by the PLL 182 and the clock PCLK generated by the PLL 180. Though these two clocks have identical frequencies and should be in phase with each other, there is an unknown skew between the two clocks since they are generated from two different PLLs. On the downstream side, the signal EN_OUTCNT is the signal EN_INCNT latched on the negative edge of the signal PCLK by the flip-flop 230. A multiplexer 234 selects the output of the flip-flop 230 since the signal UPSTREAM_CHIP is low.

In the upstream bridge chip 26, the cable interface is treated as completely asynchronous. The phase uncertainty is due to the unknown phase shift of the cable 28 itself. Designing for this uncertainty gives complete freedom on the length of cable 28. What is known is that the clocks in the upstream and downstream bridge chips have the same frequency, since they both have their origin in the upstream PCI bus clock PCICLK1. In the upstream bridge chip 26, the signal EN_OUTCNT is the signal EN_INCNT latched on the positive edge of the clock PCLK by a flip-flop 232. The multiplexer 234 selects the output of the flip-flop 232 since the signal UPSTREAM_CHIP is high. The flip-flop 232 guarantees that even for the worst-case lineup of the cable clock CABLE_CLK2 and the local PCI clock PCLK (one complete PCLK period phase shift), there is valid data in the FIFO 216 before the data is transmitted to the rest of the chip.

Figure 11:
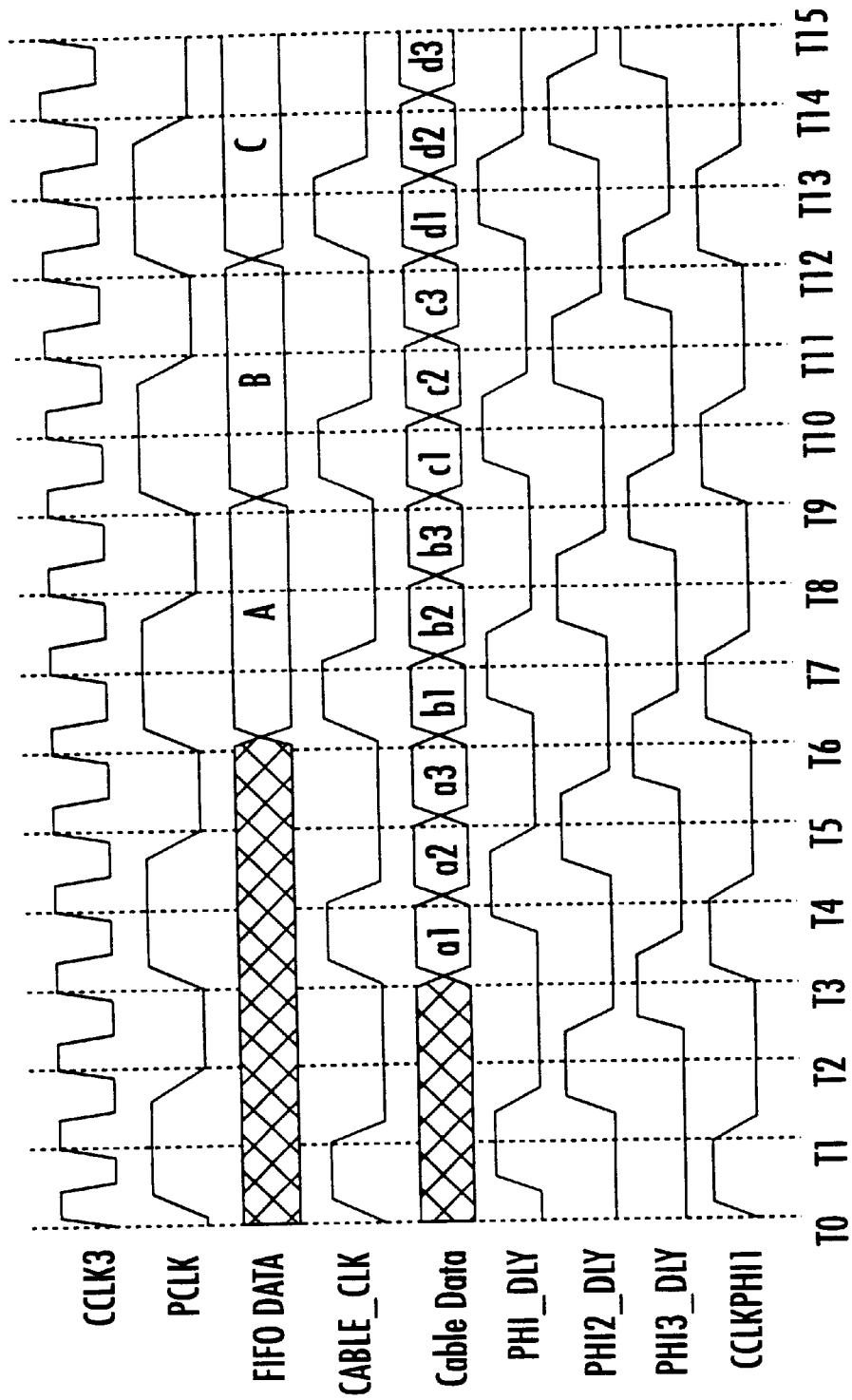
FIG. 11 is a timing diagram of signals in the slave cable interface.

Referring to FIG. 11, the cable data is received by the slave cable interface 196 or 198 as three phase time-multiplexed signals A1, A2 and A3; B1, B2 and B3; C1, C2 and C3; and so forth. A previous transaction is completed in periods T0, T1 and T2. Beginning in period T3, the first phase data A1 is presented to the register 218 and the first phase indicator CCLKPHI1 is pulsed high. On the falling edge of CCLK3 in period T3, the data A1 is loaded into the register 218, and the local phase 1 indication signal PHI_DLY is pulsed high. In period T4, on the falling edge of clock, the phase 1 data A1 is loaded into the register 220, the phase 2 data A2 is loaded into the register 218, and the phase 2 indication signal PHI2_DLY is pulsed high. In period T5, on the falling edge of CCLK3, the phase 2 data is loaded into the register 222, the phase 3 data A3 is loaded into the register 218, and the phase 3 indication signal PHI3_DLY is pulsed high. In period T6, the contents of the registers 220, 222, and 218 are loaded into the selected entry of the FIFO 216 on the following edge of CCLK3. Also in period T6, the data B1 is presented to the register 218 along with the indication signal CCLKPHI1. Messages B and C are loaded into the FIFO 216 in the same manner as message A in subsequent periods.

Figure 12:
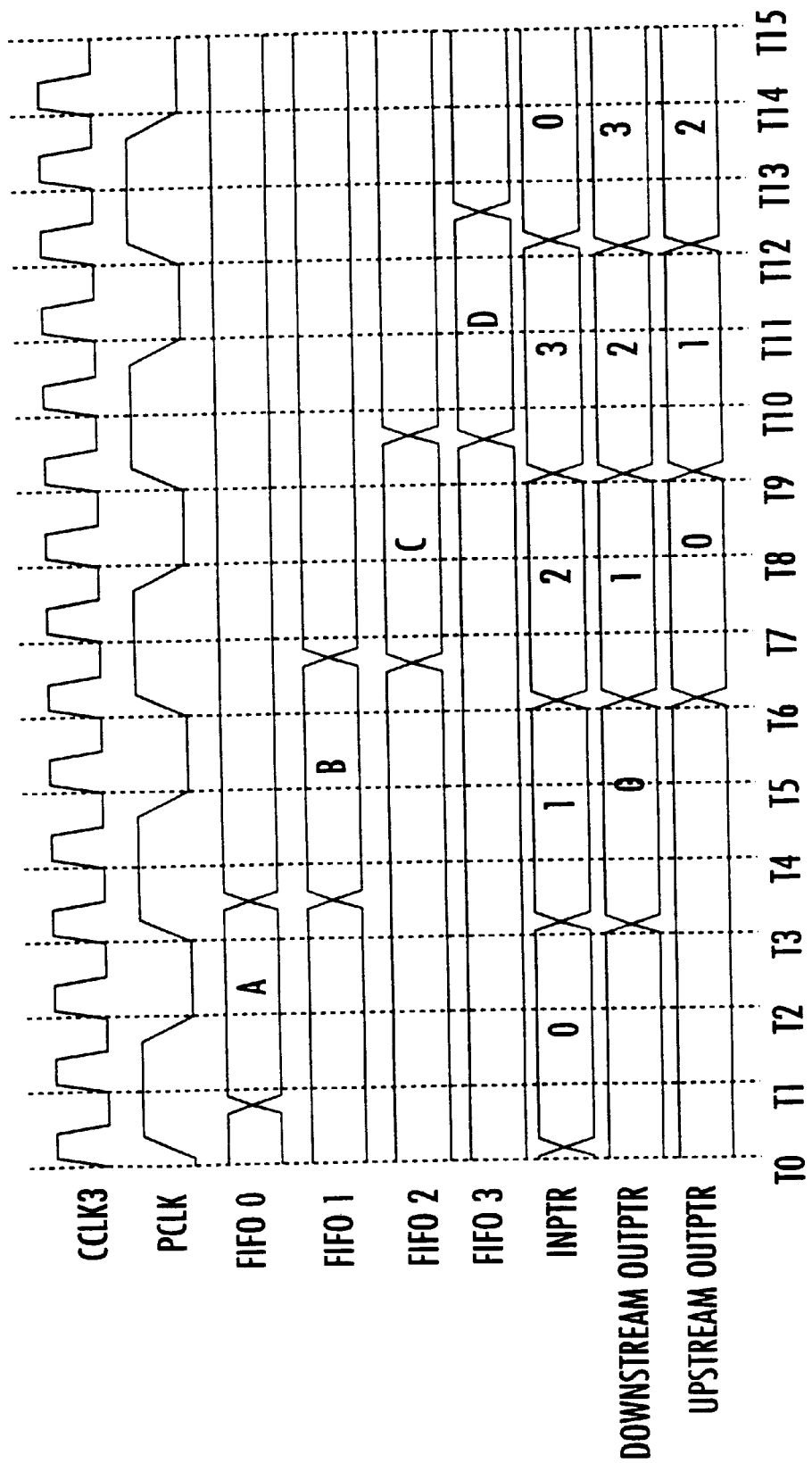
FIG. 12 is a timing diagram of the input and output pointers and their relation to the received cable data.

Referring to FIG. 12, the input pointer INPTR[1:0] starts at the value 0 in period T0 on the rising edge of the clock CCLK3. Also in period T0, message A is loaded into FIFO0 on the falling edge of the clock CCLK3. In the downstream bridge chip 48, the output pointer OUTPTR[1:0] is incremented to the value 0 on the next rising edge of the clock PCLK in period T3. Also in period T3, the input pointer INPTR[1:0] is incremented to the value 1 on the rising edge of the clock CCLK3, and message B is loaded into FIFO1 on the falling edge of CCLK3. Cable data is thus loaded into FIFO0, FIFO1, FIFO2, and FIFO3 in a circular fashion.

On the upstream side, if the input pointer INPTR[1:0] is 0 in period t0, the output pointer OUTPTR[1:0] is incremented to the value 0 in period T6, two PCLK periods after the input pointer INPTR[1:0]. The two PCLK period lag in the upstream bridge chip 26 allows the phase delay in the cable 28 to be of any value, which has the advantage that the cable length need not be of a specific fixed value.

Figure 13:
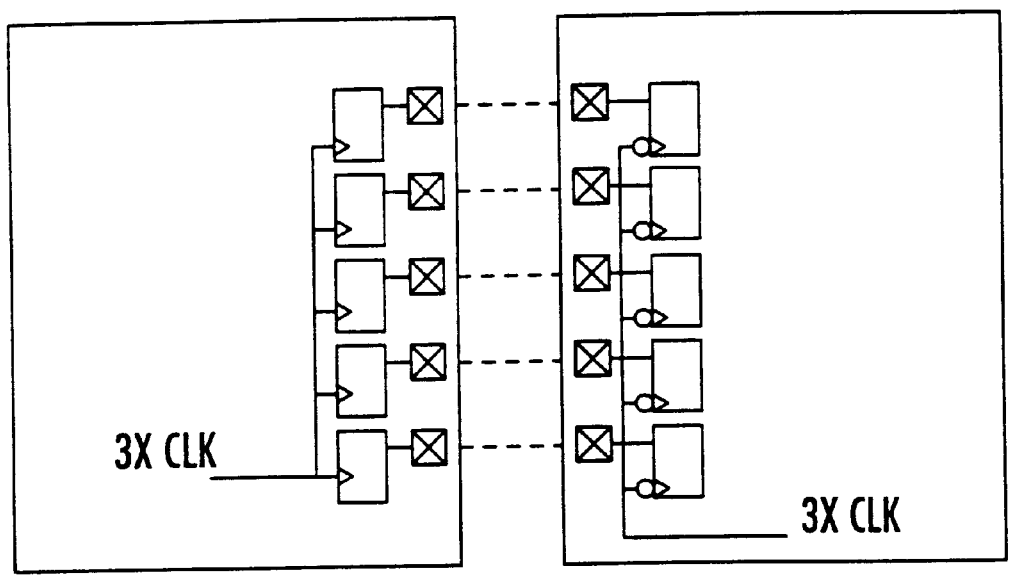
FIG. 13 is a block diagram of the placement of flip flops and input and output pads in each of the bridge chips.

Referring to FIG. 13, the input and output flip flops on the cable interface are custom-placed by the manufacturer of the chips to minimize the skew between the cable data and the clock passed with it. The amount of wire between each flip-flop and the I/O are maintained as consistent as possible between all cable interface signals.

CABLE MESSAGE

Sixty bits of cable data constitute one message. The 60 bits are multiplexed onto 20 cable lines and are transmitted each 10 ns over the cable 28. The table in FIG. 14 shows the bits and the phase each bit is assigned to. The first three columns show the upstream-to-downstream data transfer format, and the last three columns show the downstream-to-upstream data transfer format. The following is a description of the signals.

EDC[7:0]: The signals are the eight syndrome bits used to detect and correct errors encountered in transmitting data over the cable 28.

CAD[31:0]: The signals are the 32 address or data bits.

CFRAME_: The signal is used to signal the start and end of a cable transaction, similar to the PCI FRAME_ signal.

CCBE[3:0]_: The four bits form byte enables in some PCI clock phases and either a PCI command or a message code in other PCI clock phases.

CBUFF[3:0]: In the address phase, the signals indicate a buffer number for initializing the bridge chip delayed completion queue (DCQ) 148 to tie upstream and downstream delayed read completion (DRC) and delayed read request (DRR) transactions. After the address phase, the signals contain the parity bit, parity error indication and the data ready signal.

COMPLETION REMOVED: The bit is used to signal that a delayed completion has been removed from the transaction ordering queue (TOQ) on the other side of the cable 28.

PMW ACKNOWLEDGE: The bit is used to signal that a posted memory write (PMW) has been completed on the other side and has been removed from the transaction run queue (TRQ).

LOCK_: The bit is transmitted downstream (but not upstream) to identify locked cycles.

SERR_: The bit is used to transmit an SERR_ indication upstream, but is not transmitted downstream.

INTSYNC and INTDATA: The bits carry the eight interrupts from downstream to upstream in a serially multiplexed format. The signal INTSYNC is the synchronization signal indicating the start fo the interrupt sequence and the signal INTDATA is the serial data bit. The signals INTSYNC and INTDATA are routed on separate lines over the cable 28.

RESET SECONDARY BUS: The bit is asserted when the CPU 14 writes to the secondary reset bit in a bridge control register in the upstream bridge chip 26. It causes the downstream bridge chip 48 to reset to a power up state. The reset signals for the slots are also asserted. The signal RESET secondary bus is routed on a separate line over the cable 28.

Because the address and data in each PCI transaction is multiplexed over the same lines, each PCI transaction includes an address phase and at least one data phase (more than one for burst transactions). The PCI specification also supports single address transactions (32-bit addressing) and dual-address transactions (64-bit addressing).

Referring to FIG. 15A, a table shows what information appears on each portion of the bus during address and data phases of the single-address transactions. For a single address transaction, the first phase is the address phase and the second and subsequent phases are data phases. In the address phase of a delayed read/write request transaction, the signals CBUFF[3:0] indicate the DCQ buffer number for initializing the bridge chip DCQ 148 to tie upstream and downstream DRC and DRR transactions. After the address phase, the signal CBUFF[0] contains the parity bit. The signals CCBE[3:0]_ contain the PCI command in the address phase and the byte enable bits in the data phases.

For posted memory write transactions, the signals CBUFF [3:0] are "don't care" in the address phase and contain the data-ready indication, parity error indication, and parity bit in the data phases.

In a delayed read/write completion transaction, the signals CBUFF[3:0] contain the DCQ buffer numbers in the address phase and the end-of-completion indication, data-ready indication, parity error indication, and parity bit in the data phases. The signals CCBE[3:0]_ contain a code representing a DRC transaction in the address phase and the status bits of the DRC transaction in the data phases. Delayed completion transactions return the status of the destination bus for each data phase. The data parity bit is transmitted on CCBE[3]_. Other status conditions are encoded on the CCBE[2:0]_ bus, with a binary value 000 indicating normal completion and a binary value 001 indicating a target abort condition. The address/data bits CAD[31:0] are "don't care" in the address phase and contain data during the data phases.

In a stream connect transaction, the signals CBUFF[3:0] contain a buffer number in the address phase and the signal CBUFF[2] contains the data-ready indication in the data phases. The signals CCBE[3:0] contain a code representing a stream connect transaction in the address phase and are "don't care" in the data phases. The address/data bits CAD [31:0] are not used during a stream connect transaction.

The table in FIG. 15B shows the encoding of the signals for dual-address transactions. In delayed read/write request transactions, the signals CBUFF[3:0] contain a buffer number in the first and second address phases and the signal CBUFF[0] contains the parity bit in the data phase. The signals CCBE[3:0]_ contain a code representing a dual-address cycle in the first address phase, the PCI command in the second address phase, and the byte enable bits in the data phase. The signals CAD[31:0] contain the most significant address bits in the first address phase, the least significant address bits in the second address phase, and the data bits in the data phase. In a dual-address posted memory write transaction, the signals CBUFF[3:0] are wdon't care" in the first two address phases, but the signals CBUFF[1:0] contain the parity error indication bit and the parity bit in the data phases. The signals CCBE[3:0]_ contain a code representing a dual-address cycle in the first address phase, the PCI command bits in the second address phase, and the byte enable bits in the data phases. The signals CAD[31:0] contain the most significant address bits in the first address phase, the remaining address bits in the second address phase, and the data bits in the data phases.

There are three possible states for the data transfer: not-last, last-of-cable-transfer, and last-of-request. The not-last state is indicated by asserting the bit CBUFF[2] while FRAME_ is active, which indicates that another word of data is being presented. The last-of-cable-transfer state is indicated by asserting the bit CBUFF[2] while the signal CFRAME_ is inactive. The last-of-request state is indicated by asserting the bits CBUFF[3] and CBUFF[2] while the signal CFRAME_ is inactive.

The following four IEEE 1149.1 Boundary-Scan (JTAG) signals are included in the cable 28 to effect a JTAG test chain: TCK (the test clock), TDI (test data input), TDO (test data output) and TMS (test mode select). The optional TRST_ is not transmitted down the cable, but TRST_ can be generated from power-good.

The JTAG signals are routed from the system PCI connector through the upstream bridge chip 26, including JTAG master 110, down the cable 28 to the downstream bridge chip 48 to the JTAG master 128, which distributes the JTAG signals to each of the six PCI slots on the secondary PCI bus 32. The return path is from the JTAG master 128, up the cable 28 back to the upstream bridge chip 26 and then to the PCI slot on the primary PCI bus 24. The signals TDO, TCK, and TMS are downstream bound signals. The signal TDI is an upstream bound signal.

One type of cable 28 that can be used is a cylindrical 50-pair shielded cable designed to support the High Performance Parallel Interface (HIPPI) standard. A second type of cable is a shielded 50-pair ribbon cable. The advantages of the first are standardization, ruggedness and reliable uniform manufacture. The advantages of the second are greater mechanical flexibility, automatic termination to the connector in assembly and possibly lower cost.

The table of FIG. 16 shows some of the HIPPI cable specifications. The ground shield consists of a braid over aluminum tape and carries only minimum DC currents due to the differential nature of the buffers to be used. The method of signaling is true differential which provides several advantages, with differential buffers used to send and receive signals over the cable 28. First the true differential method is less expensive than fiber optics for this short distance and less complex to interface than other serial methods. Differential signaling provides significant common mode noise immunity and common mode operating range, is available in ASICs and is faster than TTL. When using twisted pair and shielding, it minimizes electromagnetic radiation. When using low voltage swings, it minimizes power dissipation.

The signaling levels chosen as a target are described in the IEEE Draft Standard for Low-Voltage Differential Signals (LVDS) for Scaleable Coherent Interface (SCI), Draft 1.10 (May 5, 1995).

The cable connector is an AMP metallic shell 100-pin connector with two rows of pins. The rows are 100 mils apart and the pins are on 50-mil centers. The metal shell provides EMI shielding and the connection of the ground path from the cable shield to the board connector. The mating right angle board connector just fits a PCI bracket. The connector is to have a bar running between the rows of pins to divert electrostatic discharges from the signal pins when the connector is disconnected. A pair of thumb screws attached to the cable connector will secure the mated connectors.

ERROR DETECTION AND CORRECTION

An error detection and correction (EDC) method is implemented on each bridge chip to protect communication over the cable 28. Since the data is time-multiplexed into three 20-bit groups to be sent over 20 pairs of wires, each triplet of "adjacent" bits (i.e., bits associated with the same wire in the cable 28) is arranged so as to be transmitted on a single wire pair. The EDC method can correct single-bit failures and multi-bit failures occurring in the same bit position in each of the three time-multiplexed phases. The multi-bit failures are typically associated with a hardware failure, e.g., a broken or defective wire or a faulty pin on bridge chips 26, 48.

Twenty wire pairs of the cable 28 are used for downstream communication and 20 more for upstream communication. For the remaining ten pairs in the 50-pair HIPPI cable 28 (which pass such information as the clock signals CABLE_CLK1 and CABLE_CLK2, reset signals, and the power good/PLL-lock signal), error detection and correction is not implemented.

The following are the underlying assumptions for the EDC algorithm. Most errors are single bit errors. The probability of having random multiple-bit errors in the same transaction is extremely remote because the cable 28 is not susceptible to interference from internal or external sources. Errors caused by a defective wire may affect a single bit or a group of bits transmitted on that wire. When a hardware failure occurs, the logic state of the corresponding differential buffer is in a single valid logic state.

Figure 17:
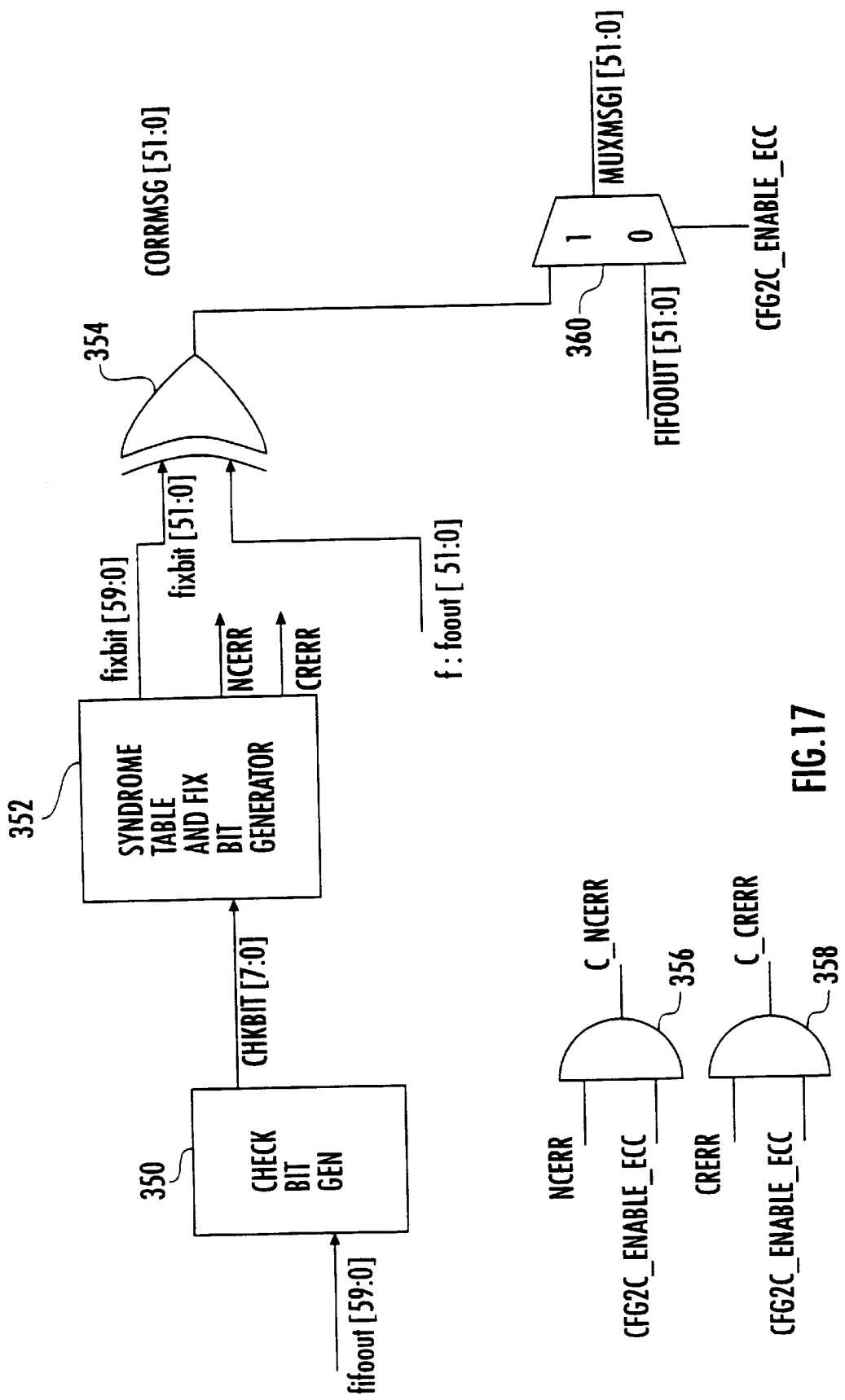
FIG. 17 is a logic diagram of an error detection and correction circuit.

Referring to FIG. 17, the output signals FIFOOUT[59:0] from the multiplexer 228 in the slave cable interface 196 or 198 are provided to the input of a check bit generator 350, which produces check bits CHKBIT[7:0]. The check bits are generated according to the parity-check matrix shown in FIG. 18, in which the first row corresponds to CHKBIT[0], the second row corresponds to CHKBIT[1], and so forth. The bits across a row correspond to data bits FIFOOUT [0:59].

The check bits are generated by an exclusive-OR of all the data bits FIFOOUT[X] (X is equal to 0–59), which have a "1" value in the parity-check matrix. Thus, the check bit CHKBIT[0] is an exclusive-OR of data bits FIFOOUT[7], FIFOOUT[8], FIFOOUT[9], FIFOOUT[12], FIFOOUT[13], FIFOUT[16], FIFOOUT[22], FIFOOUT[23], FIFOOUT[24], FIFOOUT[26], FIFOOUT[32], FIFOOUT[33], FIFOOUT[34], FIFOOUT[35], FIFOOUT[38], FIFOOUT[39], FIFOOUT[45], FIFOOUT[46], FIFOOUT[48], FIFOOUT[49], FIFOOUT[51], and FIFOOUT[52]. Similarly, the check bit CHKBIT[L] is an exclusive-OR of bits 0, 1, 4, 5, 9, 10, 12, 14, 15, 16, 23, 27, 35, 37, 38, 40, 43, 46, 47, 48, 50, and 53. Check bits CHKBIT[2:7] are generated in similar fashion according to the parity-check matrix of FIG. 18. The parity check matrix is based upon the 20 sub-channels or wires per time-multiplexed phase and a probability that multiple errors in the accumulated data are attributable to a faulty sub-channel or wire that affects the same data position in each time-multiplexed phase.

In the master cable interface 192 or 194, the check bits CHKBIT[7:0] are provided as error detection and correction bits EDC[7:0] along with other cable data to allow error correction logic in the slave cable interface 196 or 198 to detect and correct data errors.

The check bits CHKBIT[7:0] are provided to a fix bit generator 352, which generates fix bits FIXBIT[59:0] according to the syndrome table shown in FIG. 19. The check bits CHKBIT[7:0] have 256 ($2^8$) possible values. The syndrome table in FIG. 19 contains 256 possible positions. Each of the 256 positions in the syndrome table contains 2 entries, the first entry being the hexadecimal value of the check bits CHKBIT[7:0], and the second entry indicating the cable data status associated with that position. Thus, for example, a hexadecimal value 00 indicates a no-error condition, a hexadecimal value 01 indicates an error in data bit 52, a hexadecimal value 02 indicates an error in data bit 53, a hexadecimal value 03 indicates an uncorrectable error (UNCER), and so forth.

The EDC logic is capable of detecting up to 3 erroneous bits, as long as those data bits are adjacent, i.e., associated with the same wire. Thus, for example, if the check bits CHKBIT[7:0] contain a hexadecimal value 3D, then data bits 3, 23, and 43 are erroneous. The cable 28 carries cable data CABLE_DATA[19:0]. Thus, data bits FIFOOUT[3], FIFOOUT[23], and FIFOOUT[43] are associated with the fourth position of the cable data, i.e., CABLE_DATA[3]. The EDC method can also correct two-bit errors associated with the same cable wire. Thus, for example, a hexadecimal check bit value of 0F indicates errors in data bits FIFOOUT[4] and FIFOOUT[24], both associated with CABLE_DATA[4].

The fix bit generator 352 also produces signals NCERR (uncorrectable error) and CRERR (correctable error). If no error is indicated by the check bits, then the signals CRERR (correctable error) and NCERR (non-correctable error) are both deasserted low. In those positions in the syndrome table containing the uncorrectable state UNCER, the signal NCERR is asserted high and the signal CRERR is deasserted low. Otherwise, where a correctable data error is indicated, the signal NCERR is deasserted low and the signals CRERR is asserted high.

The lower 52 bits of the fix bits FIXBIT[51:0] are provided to one input of 52 exclusive-OR gates 354, whose other input receives one of each the lower 52 bits of the FIFO data FIFOOUT[51:0]. The upper 8 FIFO bits FIFOOUT[59:52], allocated to the error detection and correction bits EDC[7:0], are used to generate the check bits and the syndrome bits, but are not subject to error correction. The exclusive-OR gates 354 perform a bit-wise exclusive-OR operation of the fix bits FIXBIT[51:0] and the data bits FIFOOUT[51:0]. If the data signals FIFOOUT[51:0] contain correctable, erroneous data bits, those data bits are flipped by the exclusive-OR operation. The exclusive-OR gates 354 provide the corrected data CORRMSG[51:0] to the 1 input of a multiplexer 360. The 0 input of the multiplexer 360 receives the data bits FIFOOUT[51:0], and the multiplexer 360 is selected by a configuration signal CFG2C_ENABLE_ECC. The output of the multiplexer 360 produces signals MUXMSGI[51:0]. If the system software enables error detection and correction by setting the signal CFG2C_ENABLE_ECC high, then the multiplexer 360 selects the corrected data CORRMSG[51:0] for output. Otherwise, if error detection and correction is disabled, the data bits FIFOOUT[51:0] are used.

The non-correctable and correctable error indicators NCERR and CRERR are provided to inputs of AND gates 356 and 358, respectively. The AND gates 356 and 358 are enabled by the signal CFG2C_ENABLE_ECC. The outputs of the AND gates 356 and 358 produce signals C_NLERR and C_CRERR, respectively. The signals C_NLERR and C_CRERR can be asserted only if error detection and correction is enabled. When an error is detected, the fix bits are latched and used for diagnostic purposes.

If a correctable error is indicated (the signal C_CRERR is high), then an interrupt is generated to the interrupt receiving block 132, forwarded up to the interrupt output block 114, and then transmitted to the system interrupt controller and then to the CPU 14 to invoke an interrupt handler. Non-correctable errors indicated by the signal C_NCERR will cause the system error SERR_ to be asserted, which in turn causes the system interrupt controller (not shown) to assert the non-maskable interrupt (NMI) to the CPU 14. In the downstream bridge chip 48, non-correctable errors will also cause the power-good/PLL lock indication bit sent up the cable 28 to be negated so that the upstream bridge chip 26 does not send cycles downstream.

To prevent spurious interrupts during and just after power-up, error detection and correction on both the upstream and downstream bridge chips is disabled during power-up until the upstream PLL 186 and downstream PLL 182 have locked to the clock CABLE_CLK1 or CABLE_CLK2.

System management software responding to the correctable-error interrupt determines the cause by reading the latched fix bits. If a hardware failure is determined (e.g., multiple data error bits associated with the same cable wire), then the system management software can notify the user of the condition to fix the hardware failure. The system management software responds to SERR_ caused by an uncorrectable error by shutting down the system or performing other functions programmed by the user.

SECONDARY BUS ARBITER

Referring to FIG. 3, each bridge chip includes a PCI arbiter 116 or 124. Since the upstream bridge chip 26 is normally installed in a slot, the PCI arbiter 116 is disabled. The PCI arbiter 124 supports 8 masters: 7 generic PCI masters (REQ[7:1]_, GNT[7:1]_) including the six PCI slots and the hot plug controller in the SIO 50, and the bridge chip itself (BLREQ_, BLGNT_). The signals BLREQ_ and BLGNT_ are routed from and to the PCI master block 123. The bridge chip asserts the signal BLREQ_ if a transaction from the CPU 14 targeted for the secondary PCI bus 32 is received by the upstream and downstream bridge chips 26 and 48. The request and grant lines REQ[1]_ and GNT[1]_ for the SIO 50 are routed internally in the downstream bridge chip 48. The PCI arbiter 124 inserts a PCICLK2 delay between negation of a GNT_ signal for one master and the assertion of a GNT_ signal for another master.

In the downstream bridge chip 48, the PCI arbiter 124 is enabled or disabled based on the sampled value of REQ[7]_ at the rising edge of the signal PCIRST2 _. If the bridge chip 48 samples REQ[7]_ low on PCIRST2 _, it will disable the PCI arbiter 124. If the PCI arbiter 124 is disabled, then an external arbiter (not shown) is used and the hot plug request is driven out on the REQ[1]_ pin and hot plug grant is input on the GNT[1]_ pin. The bridge PCI bus request is driven out on the REQ[2]_ pin and its grant is input on the GNT[2]_ pin. If the bridge chip 48 samples REQ[7]_ high on PCIRST2_, it will enable the PCI arbiter 124.

The PCI arbiter 124 negates a master's GNT_ signal either to service a higher priority initiator, or in response to the master's REQ signal being negated. Once its GNT_ signal is negated, the current bus master maintains ownership of the bus until the bus returns to idle.

If no PCI agents are currently using or requesting the bus, the PCI arbiter 124 does one of two things depending on the value of a PARKMSTRSEL configuration register in the configuration space 125. If the register contains the value 0, the PCI arbiter 124 uses the last active master to park on the bus 32; if it contains the value 1, then the bus is parked at the bridge chip 48.

The PCI arbiter 124 includes a PCI minimum grant timer 304 (FIG. 21) which controls the minimum active time of all the GNT_ signals. The default value for the timer 304 is the hexadecimal value 0000 which indicates that there is no minimum grant time requirement. The timer 304 can be programmed with a value from 1 to 255, to indicate the number of PCICLK2 clock periods the GNT_ line is active. Alternatively, an individual minimum grant timer can be assigned to each PCI master on the secondary bus 32 to provide more flexibility. The minimum grant time is applicable only when the current master is asserting its REQ_ signal. Once the REQ_ signal is deasserted, the GNT_ signal can be removed regardless of the minimum grant time value.

Figure 20A:
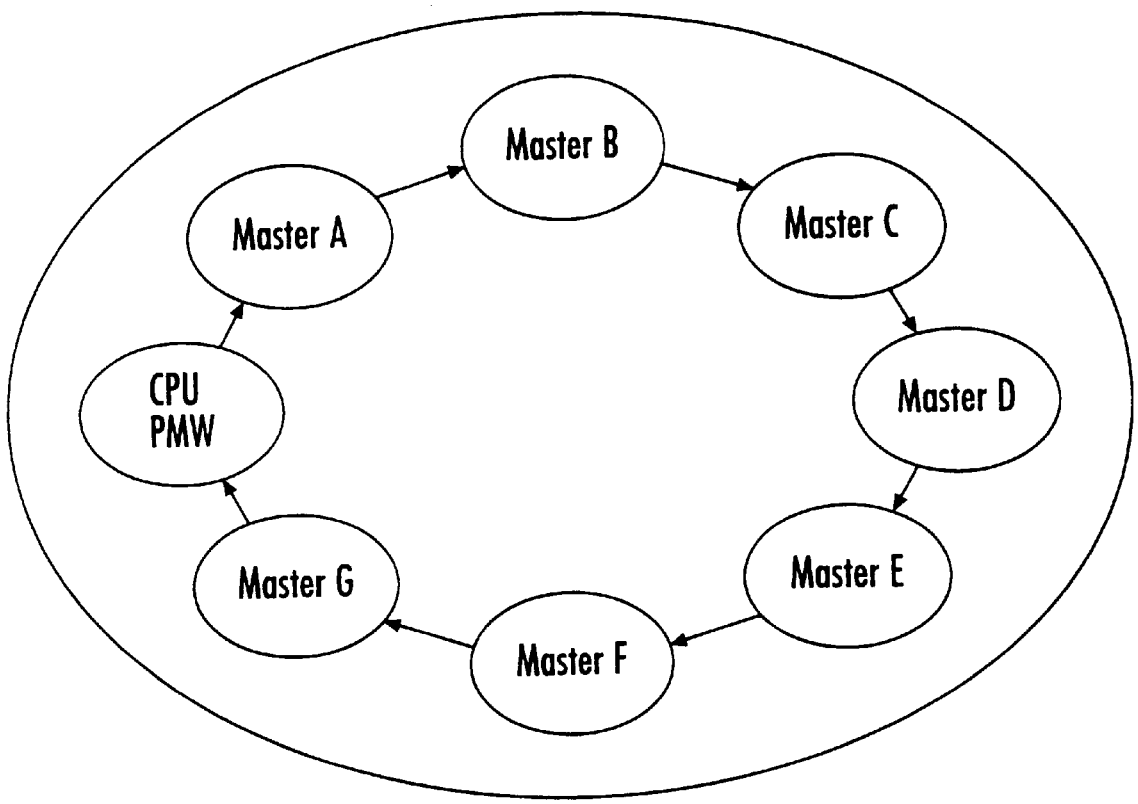
FIG. 20A is a state diagram showing a round-robin arbitration scheme.

Referring to FIG. 20A, in normal operation, the PCI arbiter 124 implements a round-robin priority scheme (second level arbitration scheme). The eight masters in the round-robin scheme include devices connected to the six slots of the expansion box 30, the SIO 50, and a posted memory write (PMW) request from the upstream bridge chip 26. All masters on the PCI bus 32 in this scheme have the same priority as the bridge chip 48. After a master has been granted the secondary PCI bus 32 and the master has asserted the FRAME_ signal, the bus is re-arbitrated and the current master is put on the bottom of the round-robin stack. If the master negates its request or the minimum grant timer 304 expires, the PCI bus 32 is granted to the next highest priority master. Locked cycles are not treated any differently by the PCI arbiter 124.

In response to certain events, the arbitration scheme is modified to optimize system performance. The events include: 1) an upstream-to-downstream delayed read or delayed write request is pending, 2) a downstream-to-upstream delayed read request is pending with no read completion indication provided, and 3) a streaming possibility exists while the bridge chip 26 is the current master on the upstream bus 24.

When a delayed request is detected, the bridge chip 48 becomes the next master to be granted the secondary PCI bus 32. Once the bridge chip 48 is granted the bus 32, it maintains ownership of the bus 32 until it completes all outstanding delayed requests or one of its cycles is retried. If the bridge chip 48 is retried, then a two-level arbitration scheme is implemented by the arbiter 124. One primary cause of the bridge chip read cycle being retried is that the target device is a bridge with a posted write buffer that needs to be flushed. In this case, the optimum operation is to grant the bus 32 to the retrying target to allow it to empty its posted write buffer so it can accept the bridge chip read request.

Figure 20B:
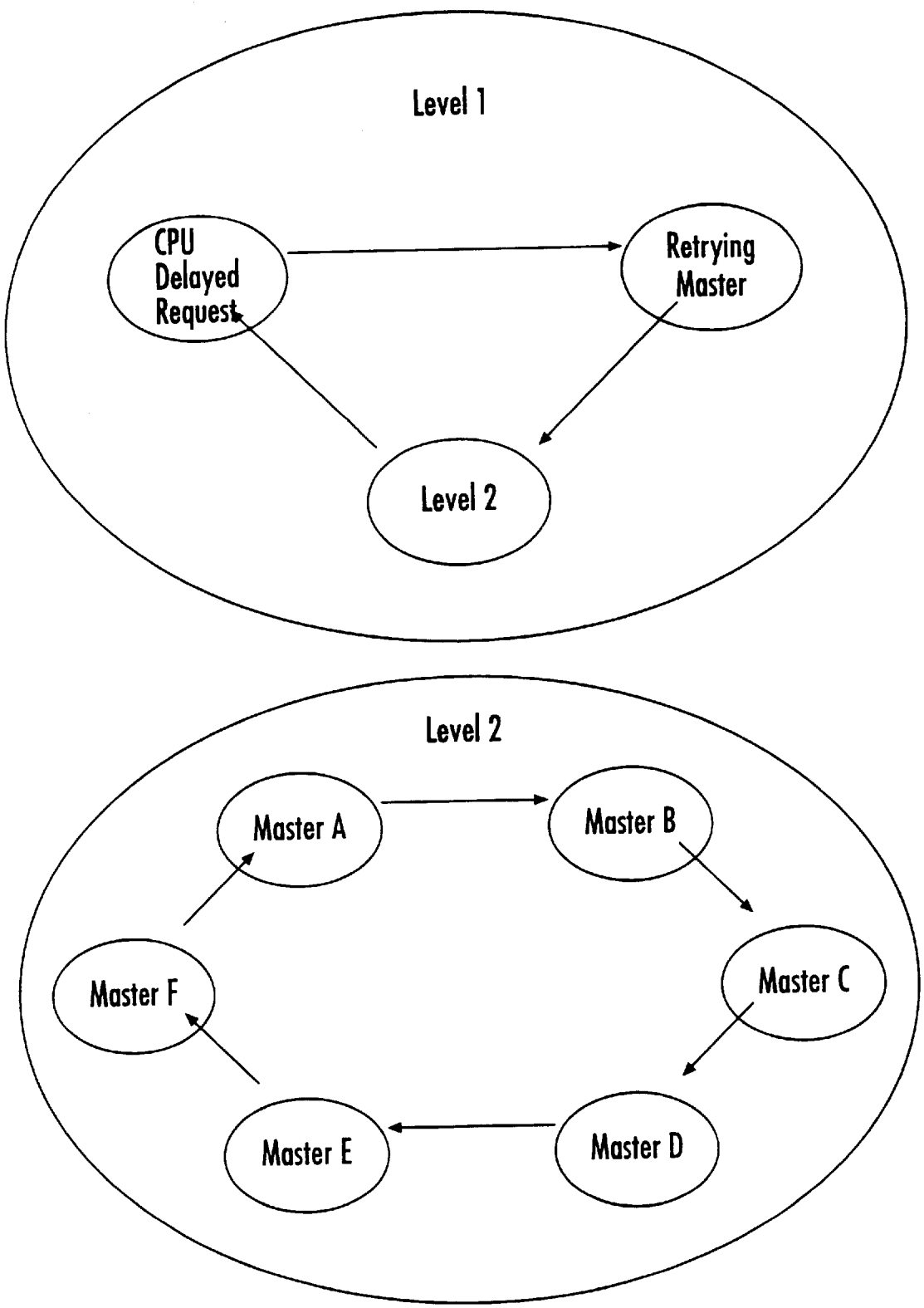
FIG. 20B is a state diagram showing a two-level arbitration scheme.

Referring to FIG. 20B, the two-level arbitration protocol includes a first level arbitration scheme which is a round-robin scheme among three possible masters: the delayed request from the CPU 14, a request from the retrying master, and a master selected by the second-level arbitration scheme. Each of the three masters in the first-level arbitration scheme is guaranteed every third arbitration slot. For memory cycles, the slot associated with the retrying target can be determined from target memory range configuration registers in the configuration space 125 of the bridge chip 48, which store the memory range associated with each PCI device. If the retrying master cannot be determined (as in the case of an I/O read), or if the retrying master is not requesting the secondary bus 32, then the first level arbitration scheme would be between the bridge chip 48 and a level-two master.

The retrying master is not masked from the level-two arbitration. Thus, it is possible for it to have two back-to-back arbitration wins if it is the next master in the level-two arbitration scheme.

For example, if an upstream-to-downstream read is retried and Master C (the retrying master) is requesting the bus 32 as well as Master B and Master E, the order of the bus grants would be as follows in descending order: the bridge chip 48, the retrying master (Master C), Master C, the bridge chip 48, the retrying master C, Master E, the bridge chip 48, and so forth, until the bridge chip 48 is able to complete its transaction and the PCI arbiter 124 reverts back to its level-two arbitration scheme for normal operation.

If, as another example, the bridge chip read is retried and the only other requesting masters are Master A and Master D (i.e., the retrying master is not requesting the bus or it could not be identified because it is accessing I/O space), the order of the bus grants is as follows: the bridge chip 48, Master A, the bridge chip 48, Master D, and so forth.

The two-level arbitration scheme gives delayed requests from the CPU 14 the highest priority. Although this arbitration method favors heavily the CPU 14, every requesting device on the bus 32 is eventually granted the PCI bus 32. By so doing, there is less chance that the other secondary bus masters would be starved when a PCI bridge chip request is retried.

Figure 21:
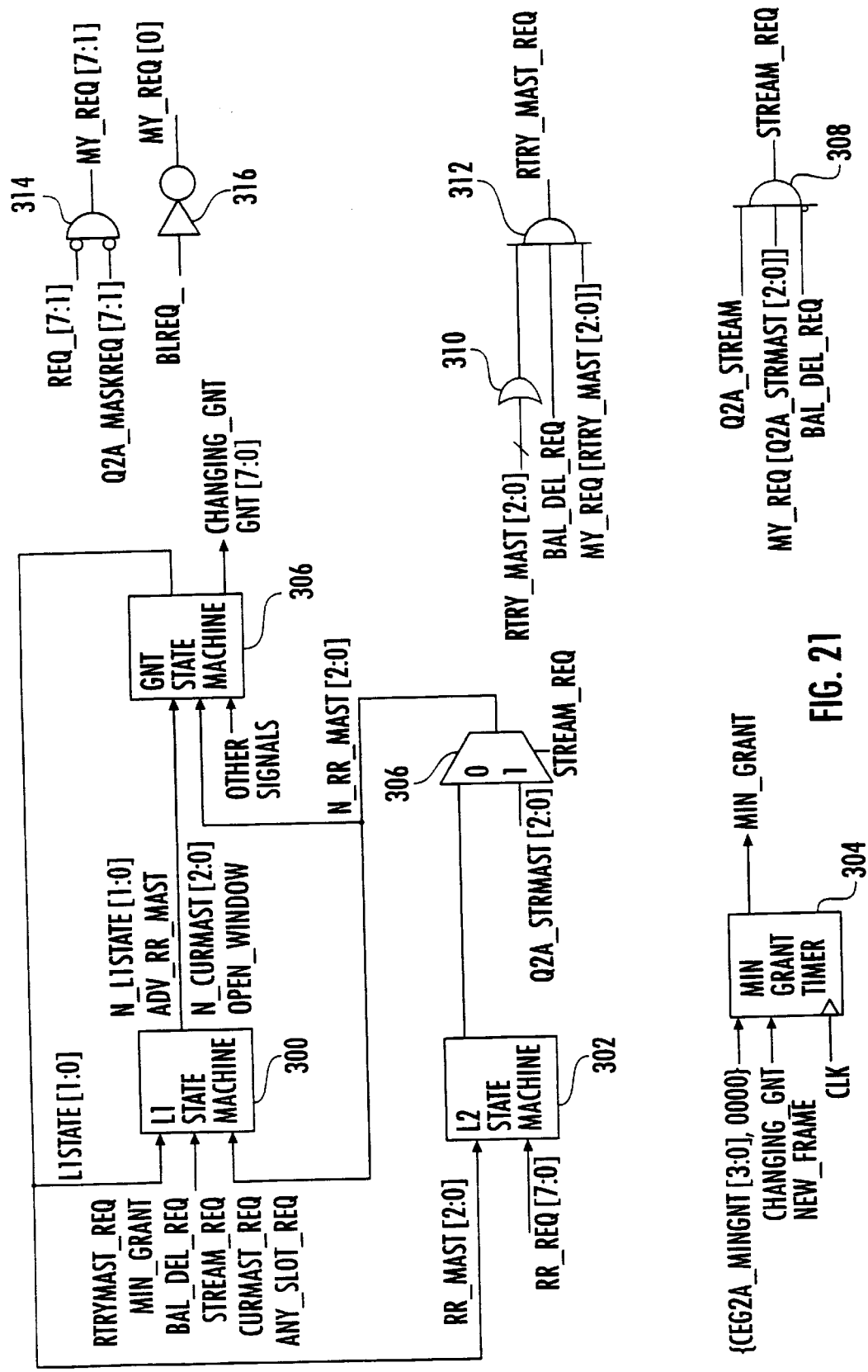
FIG. 21 is a logic diagram of an arbiter in each of the bridge chips.

Referring to FIG. 21, the PCI arbiter 124 includes an L2 state machine 302 to implement the level-two round-robin arbitration scheme. The L2 state machine 302 receives signals RR_MAST[2:0], which indicate the current round-robin master. The L2 state machine 302 also receives request signals RR_REQ[7:0], corresponding to the 8 possible masters of the secondary PCI bus 32. Based on the current master and the state of the request signals, the L2 state machine 302 generates a value representing the next round-robin master. The output of the L2 state machine 302 is provided to the 0 input of a 6:3 multiplexer 306, whose 1 input receives signals Q2A_STRMAST[2:0]. The select input of the multiplexer 306 receives a signal STREAM_REQ, which is asserted high by an AND gate 308 when a streaming opportunity exists (Q2A_STREAM is high), the streaming master on the secondary PCI bus 32 is asserting its request line (MY_REQ[Q2A_STRMAST[2:0]] is high), and a delayed request is not pending (BAL_DEL_REQ is low).

The output of the multiplexer 306 drives signals N_RR_MAST[2:0] which represent the next round-robin master in the level-two arbitration scheme. The signals N_RR_MAST[2:0] are received by an L1 state machine 300, which also receives the following signals: a signal RTRYMAST_REQ (which represents the request of the retrying bus master); a signal MIN_GRANT (which is asserted when the minimum grant timer 304 times out); the delayed request signal BAL_DEL_REQ; the stream request signal STREAM_REQ; a signal CURMAST_REQ (indicating that the current master is maintaining assertion of its request signal); a signal ANY_SLOT_REQ (which is asserted high if any of the request signals REQ[7:1]_, but not including the bridge chip request BLREQ_, is asserted); and signals L1STATE[1:0] (which represent the current state of the L1 state machine 300). The L1 state machine 300 selects one of the three possible L1 masters, including the retrying master (RTRYMAST_REQ), the delayed request from the bridge chip 48 (BAL_DEL_REQ), and the level-two master (ANY_SLOT_REQ).

The retrying master request signal RTRYMAST_REQ is generated by an AND gate 312, which receives the signal BAL_DEL_REQ, the signal MY_REQ[RTRY_MAT[2:0]] (which indicates if the retrying master is asserting its request), and the output of an OR gate 310. The inputs of the OR gate 310 receive the signals RTRY_MAST[2:0]. Thus, if a retrying master has been identified (RTRY_MAST[2:0] is non-zero), a delayed request is present (BAL_DEL_REQ is high), and the retrying master has asserted its request, then the signal RTRYMAST_REQ is asserted.

The L1 state machine 300 generates signals N_L1STATE[1:0] (representing the next state of the L1 state machine 300), as well as signals N_CURMAST[2:0] (representing the next master according to the level-two arbitration scheme). The L1 state machine 300 also generates a signal OPEN_WINDOW, which indicates when a re-arbitration window exists for a grant state machine 306 to change masters on the secondary PCI bus 32. A signal ADV_RR_MAST provided by the L1 state machine 300 indicates to the grant state machine 306 when to load the value of the signals N_RR_MAST[2:0] into the signals RR_MAST[2:0] to advance the next level-two round-robin master.

The grant state machine 306 outputs grant signals GNT[7:0] as well as a signal CHANGING_GNT to indicate that ownership of the bus 32 is changing. The grant signals GNT[7:1]_ are inverted from the GNT[7:1] signals, and the grant signal BLGNT_ is inverted from the GNT[0] signal. The grant state machine 306 also generates signals L1STATE[1:0] and signals RR_MAST[2:0].

The minimum grant timer 304 is clocked by the signal PCLK and generates the signal MIN_GRANT. The minimum grant timer 304 also receives the signal CHANGING_GNT and NEW_FRAME (indicating a new FRAME_signal has been asserted). The initial value of the minimum grant timer 304 is loaded as a value {CFG2A_MINGNT[3:0], 0000}, with the signals CFG2A MINGNT[3:0] being stored configuration bits in the configuration space 125 which define the initial value of the minimum grant timer 304. The minimum grant timer 304 is re-loaded after it has counted down to zero and the signal CHANGING_GNT is asserted high. After the minimum grant timer 304 is loaded with a new value, it begins decrementing when the signal NEW_FRAME is asserted high and the signal CHANGING_GNT is deasserted low by the grant state machine 306, which indicates that a new transaction has started on the PCI bus 32.

Signals MY_REQ[7:1] are generated by a NOR gate 314, whose inputs receive the request signals REQ[7:1]_ and mask signals Q2AMASKREQ[7:1]. Assertion of the mask bit Q2AMASKREQ[X], X=1–7, masks the request REQ[X]_ of the corresponding master, which prevents the PCI arbiter 124 from responding to the request signal. A signal MY_REQ[0] is driven by an inverter 316, which receives the bridge request BLREQ_.

Figure 22:
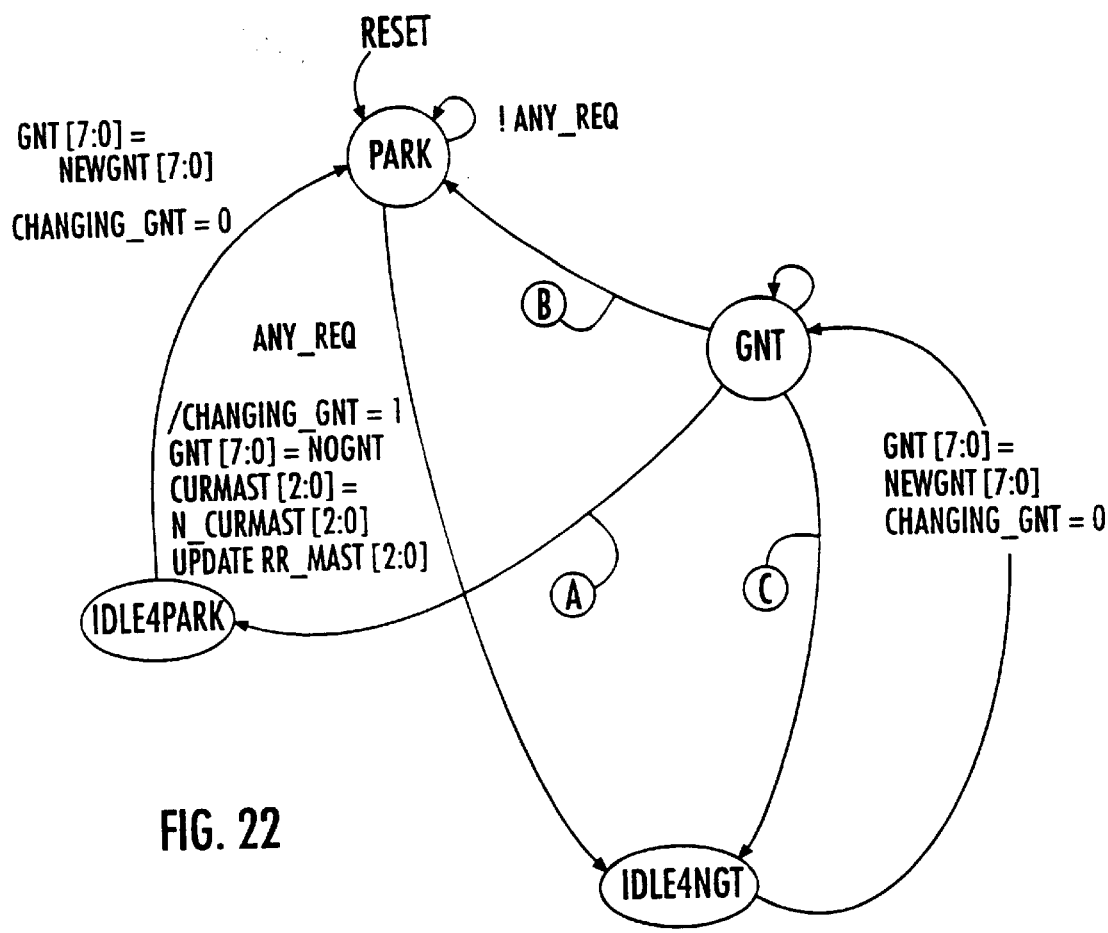
FIG. 22 is a state diagram of a grant state machine in an arbiter.

Referring to FIG. 22 the grant state machine 306 includes four states: PARK, GNT, IDLE4GNT, and IDLE4PARK. On assertion of a reset signal RESET (generated from the PCI reset signal PCIRST2_), the grant state machine 306 enters state PARK, where it remains while a signal ANY_REQ is deasserted. The signal ANY_REQ is asserted high if any of the request lines to the PCI arbiter 124 is asserted. In the PARK state, the PCI—PCI bridge 48 is parked as the owner of the PCI bus 32 when another request is not present.

If the signal ANY_REQ is asserted, the grant state machine 306 transitions from state PARK to state IDLE4GNT, and the signal CHANGING_GNT is asserted high to indicate that the PCI arbiter 124 is changing masters. The grant signals GNT[7:0] are cleared to all zeros, and the signals CURMAST[2:0] are updated with the value of the next master N_CURMAST[2:0]. In addition, the round-robin master signals RR_MAST[2:0] are updated with the next round-robin master value N_RR_MAST[2:0] if the signal ADV_RR_MAST is asserted by the L1 300. The signal ADV_RR_MAST when high indicates that the next L1 master is one of the L2 masters.

From state IDLE4GNT, the grant state machine 306 next transitions to the GNT state, and the signals GNT[7:0] are set to the state of new grant signals NEWGNT[7:0] and the signal CHANGING_GNT is negated low. The signals NEWGNT[7:0] are based on the state of the current master signals CURMAST[2:0], as shown in FIG. 24.

From state GNT, three transitions are possible. The grant state machine 306 returns to the PARK state if an arbitration window is open (OPEN_WINDOW is high), no request is pending (ANY_REQ is low), the PCI bus 32 is idle (BUS_IDLE is high), and the next master is the current master (i.e., the current master is the parking master). In the transition back from the GNT state to the PARK state, the signals L1STATE[1:0] are updated with the signals N_L1STATE [1:0]. However, if no requests are pending and the bus is idle, but the current master is not the parking master (i.e., the signals N_CURMAST[2:0] are not equal to the value of the signals CURMAST[2:0]), an idle state is needed and the grant state machine 306 transitions from the GNT state to the IDLE4PARK state. The L1 state values L1STATE[1:0] are updated. From the IDLE4PARK state, the grant state machine 306 transitions to the PARK state, setting the grant signals GNT[7:0] equal to the new grant signals NEWGNT [7:0] to grant the PCI bus 32 to the new master. The signal CHANGING_GNT is also negated low.

If the arbitration window opens up (OPEN_WINDOW is high), and the next master is not the current master (the signals N_CURMAST[2:0] are not equal to the signals CURMAST[2:0]), then the grant state machine 306 transitions to the idle state IDLE4GNT to change bus master grants. In the transition, the signal CHANGING_GNT is asserted high, the signals GNT[7:0] are cleared to all zeros, the signals CURMAST[2:0] are updated with the next master value N_CURMAST[2:0], and the L1 state signals L1STATE[1:0] are updated with the next state value N_L1STATE[1:0]. In addition, the round-robin master signals RR_MAST[2:0] are updated with the next round-robin master N_RR_MAST[2:0] if the signal ADV_RR_MAST is asserted high. The grant signals GNT[7:0] are then assigned to the value NEWGNT[7:0] in the transition from the IDLE4GNT state to the GNT state.

Figure 23:
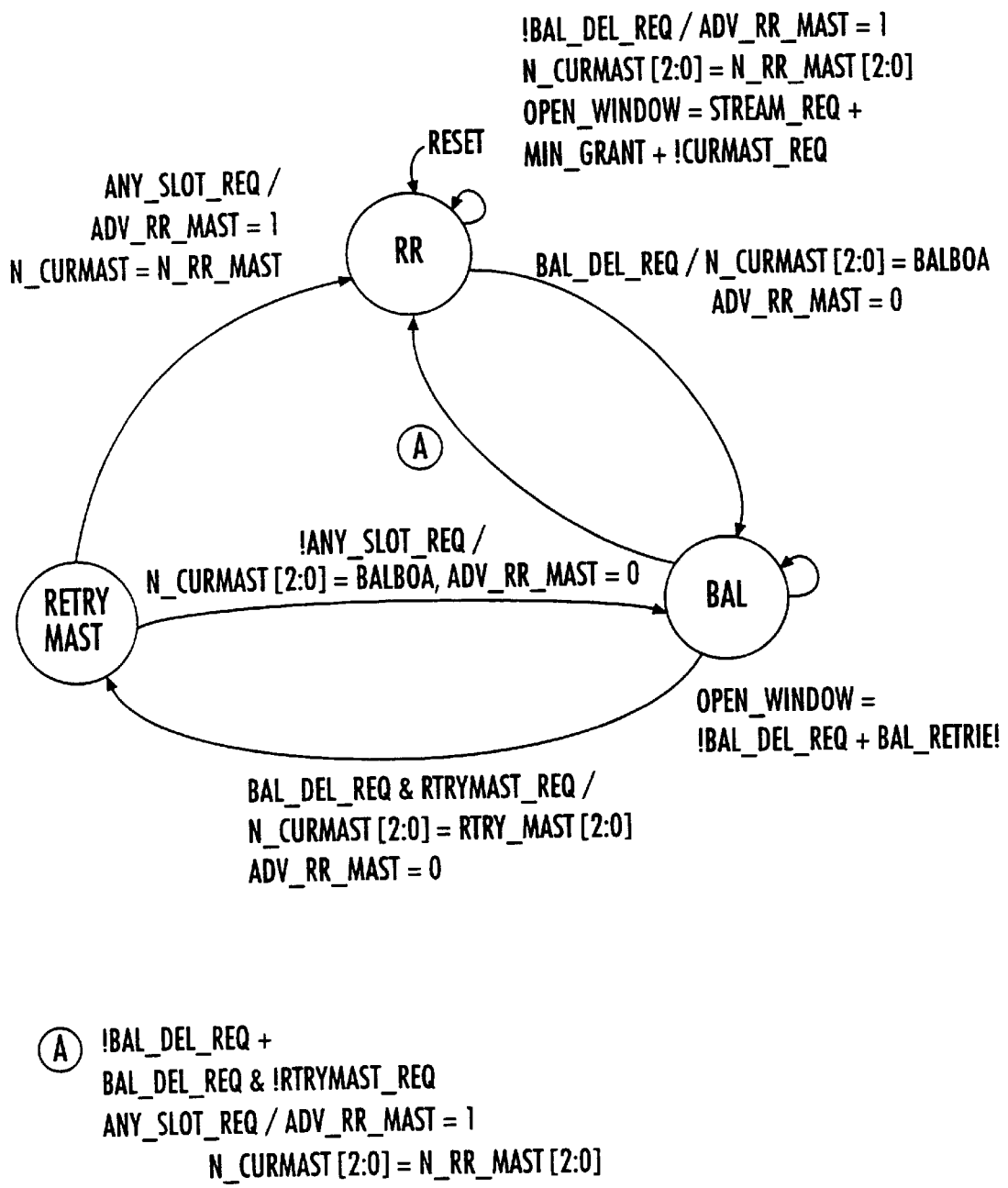
FIG. 23 is a state diagram of a level one arbitration state machine in the arbiter.

Referring to FIG. 23, the L1 state machine 300 (FIG. 21) starts in state RR upon assertion of the RESET signal, where the state machine 300 remains while a delayed request signal BAL_DEL_REQ is negated low (indicating there is no delayed request pending). While in the RR state, the signal ADV_RR_MAST is asserted high to allow the grant state machine 306 to update the round-robin master (i.e., setting signals RR_MAST[2:0] equal to the value N_RR_MAST [2:0]. The RR state is the round-robin state in which the level-two arbitration scheme is used. While in the RR state, the next master signals N_CURMAST[2:0] are set equal to the next round-robin master N_RR_MAST[2:0], and the signal OPEN_WINDOW is set high if a stream request opportunity exists (STREAM_REQ is high), or the minimum grant timer 304 has expired (MIN_GRANT is high), or the current master has negated its request (CURMAST_REQ goes low). When asserted high, the signal OPEN_WINDOW allows a new arbitration to take place.

If a delayed request is detected (BAL_DEL_REQ goes high), the L1 state machine 300 transitions from the RR state to the BAL state, setting the next master state N_CURMAST[2:0] as the bridge chip 48 and deasserting the signal ADV_RR_MAST to disable the level-two round-robin arbitration. In the BAL state, the signal OPEN_WINDOW is asserted high if the delayed request is deasserted (BAL_DEL_REQ goes low) or the delayed request has been retried (BAL_RETRIED goes high). If the signal BAL_DEL_REQ is negated low, or if the delayed request BAL_DEL_REQ is asserted high but the retrying master request is negated low (RTRYMAST_REQ is low) and the slot request ANY_SLOT_REQ is asserted high, then the L1 state machine 300 transitions back to the RR state. In the transition, the signal ADV_RR_MAST is asserted high and the next master signals N_CURMAST[2:0] are set equal to the next round-robin master N_RR_MAST[2:0]. If the signal BAL_DEL_REQ is deasserted, that indicates that the arbiter 124 should revert back to the level-two round-robin scheme. If the delayed request signal is asserted but the retrying master request is negated, then the level-one arbitration scheme is between the slots on the PCI bus 32 and the bridge chip 48.

If both the delayed request BAL_DEL_REQ and the retrying master request RTRYMAST_REQ are asserted, then the L1 state machine 300 transitions from state BAL to state RETRY_MAST, and the retrying master is set as the next master (N_CURMAST[2:0] is set equal to RTRY_MAST[2:0]). The signal ADV_RR_MAST is maintained low. In the RETRY_MAST state, if none of the PCI slot masters are asserting a request (ANY_SLOT_REQ is low), then the level-one arbitration scheme is between the retrying master and the bridge chip 48, and the L1 state machine 300 transitions back to the BAL state. The bridge chip 48 is set as the next master (N_CURMAST[2:0] is equal to the state BALBOA), and the signal ADV_RR_MAST is maintained low. However, the L1 state machine 300 transitions from the RETRY_MAST state to the RR state if any one of the slot masters is asserting a request (ANY_SLOT_REQ is high). In the transition, the signal ADV_RR_MAST is asserted high, and the next round-robin master is set as the next master (N_CURMAST[2:0] is set equal N_RR_MAST [2:0]).

To take advantage of the streaming capabilities of the bridge chip, when data for a DRC starts arriving from the cable 28, the master associated with that DRC becomes the highest priority device (assuming its REQ_ is asserted). This allows the master to receive the data stream coming down the cable 28 while the window of opportunity is there for streaming. If the bridge chip 48 cannot connect the master before the DRC queue fills up, then the upstream bridge chip 24 will disconnect and only a portion of the data would be passed to the requesting master, necessitating the master to issue another read request on the upstream bus 24. The streaming master retains the highest priority as long as DRC data continues to arrive from the cable 28. If the master repeats a different cycle/address, it will be retried, but it will maintain ownership of the secondary PCI bus 32 until its request goes away or the opportunity for streaming passes.

RETRYING REQUESTS AND MULTI-THREADED MASTERS

Since each bridge chip is a delayed transaction device, if a device on the downstream bus 32 issues a read request destined for an upstream target, the downstream bridge chip 48 will issue a retry transaction (described in the PCI specification) on the secondary bus 32 and forward the request up the cable 28. The retry transaction causes the requesting master to give up control of the PCI bus 32 and negate its REQ_ line. After negating its REQ_ line, the retried master will re-assert a request for the same cycle at a later time, which may result in its GNT_ being asserted (if its REQ_ line is not masked) and the bus master being retried again until the read completion indication is asserted in the downstream bridge chip 48.

Figure 25:
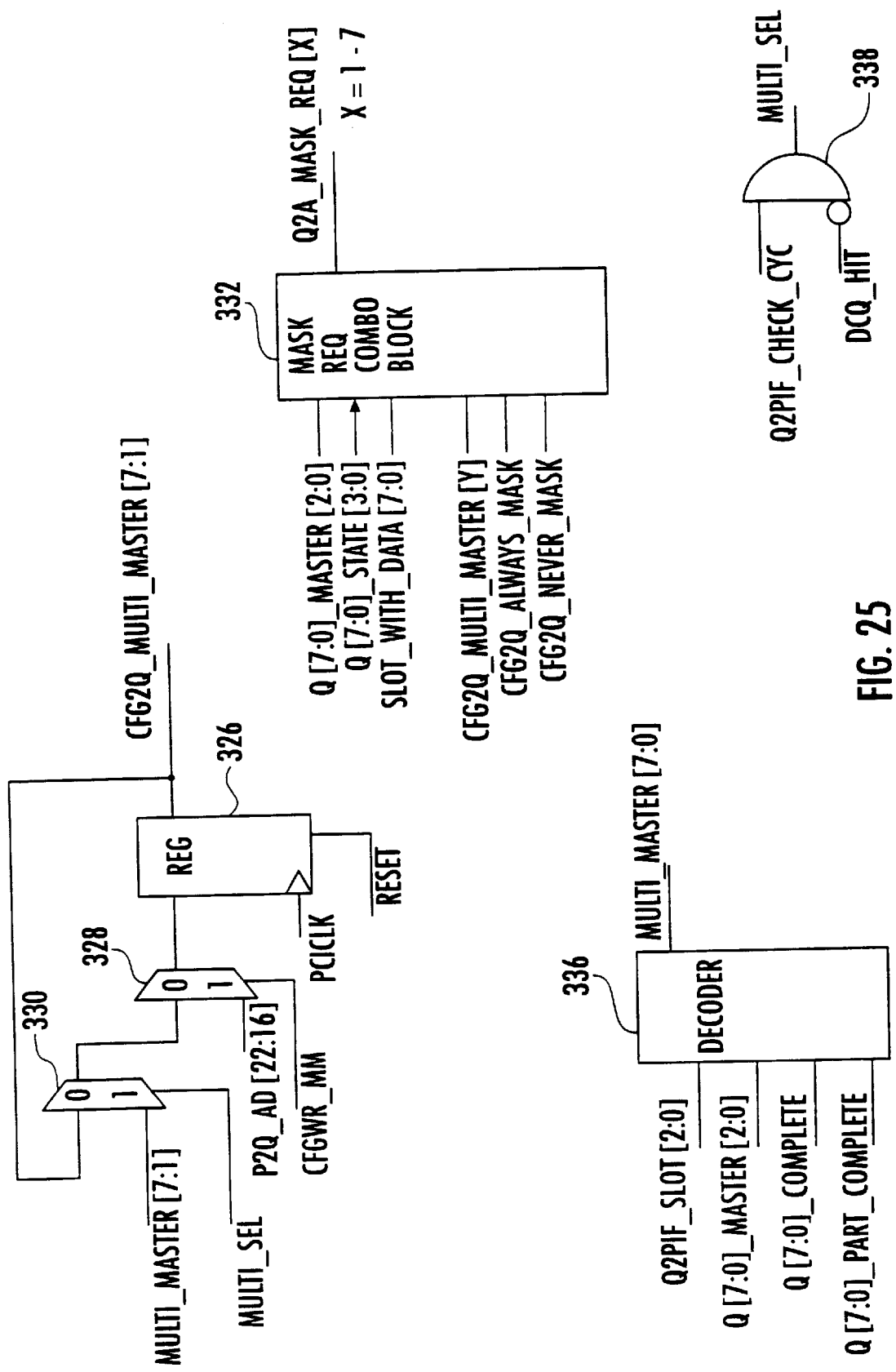
FIG. 25 is a block diagram of logic for generating mask bits and multi-threaded master indication bits.

Referring to FIG. 25, to avoid the unnecessary servicing of retry requests, the REQ_ line of a secondary bus master which issues a retried delayed read or write request is masked by asserting the appropriate one of signals Q2A_MASK_REQ[7:1] (requests from the bridge chip 48 which are retried are not masked) until the delayed completion returns. In this fashion, other requesting masters are given priority to get their requests in. As soon as the first information associated with the delayed completion is returned, the REQ_ line of the corresponding master is unmasked and the retried master is able to enter arbitration again.

However, a special case exists for multi-threaded (or multi-headed) masters on the downstream bus 32 (FIG. 26B), which are able to assert a first request, get retried, and come back with a different request. One such multi-threaded bus device is a PCI—PCI bridge 323 connecting the secondary PCI bus 32 and a subordinate PCI bus 325. The bus 325 is connected to network interface cards (NICs) 327A and 327B which are connected to two different networks. Thus, if the request from the NIC 327A for the primary PCI bus 32 is retried by the bridge chip 48, the NIC 327B can generate a different request. In this case, the REQ_ lines of the multi-threaded masters are not masked, as indicated by the signal CFG2Q_MULTI_MASTER[X] being set high.

A status register 326 determines if a slot is single-or multi-threaded. On reset, the register 326 is cleared to assume that each secondary bus device is single-threaded. Each slot is then monitored to determine if it requests a different cycle while another cycle from the same master is pending. If multi-threaded behavior is observed in a master, then that master is marked as such by setting the corresponding bit CFG2Q_MULTI_MASTER[X] high.

The input of the status register 326 is connected to the output of a 14:7 multiplexer 328, whose 0 input is connected to the output of a 14:7 multiplexer 330 and whose 1 input is connected to address bits P2Q_AD[22:16]. A select signal CFGWR_MM selects the 0 and 1 inputs of the multiplexer 328. When asserted high, the signal CFGWR_MM causes a configuration write of the status register 326 from the data bits P2Q_AD[22:16], allowing software control of the bits in the register 326. The 1 input of the multiplexer 330 receives multi-master signals MULTI_MASTER[7:1], the 0 input receives the output of the register 326, and the multiplexer 330 is selected by a signal MULTI_SEL. The signal MULTI_SEL is generated by an AND gate 338, whose first input receives a signal Q2PIF_CHECK_CYC (asserted high to indicate that the current transaction information should be checked with information stored in the queue block 127 for a match, such as during a delayed memory read or write request from a bus device on the secondary PCI bus 32), and the other input receives the inverted state of a signal DCQ_HIT (indicating that the current address information does not match the address information associated with a pending request of the requesting master in the DCQ 148). Thus, if a failed comparison occurred, the value of signals CFG2Q_MULTI_MASTER[7:1] is updated.

A bit MULTI_MASTER[X] is asserted high if master X has a pending request that has been retried, and master X subsequently comes back with a different request. This is checked by comparing the transaction information (e.g., address, byte enables, data for a write) of the pending request with the address of the new request. A failed comparison indicates that the master is multi-threaded. Once a multi-master configuration bit CFG2Q_MULTI_MASTER[X] (X=1–7) is set high, the bit is maintained high.

The signals MULTI_MASTER[7:1] are generated by a decoder 336. The decoder 336 receives signals Q2PIF_SLOT[2:0] (slot number for the current delayed request from a master), Q[7:0]_MASTER[2:0] (the master associated with each of the eight buffers in the DCQ 148), Q[7:0]_COMPLETE (the completion status of each of the eight queues), and Q[7:0]_PART_COMPLETE (the partial completion status of each of the buffers in the delayed completion queue). For example, if the signal Q0_MASTER[2:0] contains the value 4, then that indicates DCQ buffer 0 stores the transaction information of a delayed request from the bus device in slot 4. The signal QY_COMPLETE, Y=0–7, if asserted high indicates if DCQ buffer Y has received all the data associated with delayed request transaction. The signal QY_PART_COMPLETE, Y=0–7, if asserted high indicates that DCQ buffer Y has been allocated as the DCQ buffer for a delayed transaction of one of the masters but all the data associated with the delayed transaction has not been received.

If the current slot number Q2PIF_SLOT[2:0] is equal to the value of any one of the eight queue master indication signals Q[7:0]_MASTER[2:0], and the corresponding DCQ buffer is in the complete or part complete state, then the corresponding one of the bits MULTI_MASTER[7:1] is set high if the signal DCQ_HIT is low and the signal Q2PIF_CHECK_CYC is high. Thus, for example, if the signal Q2PIF_SLOT[2:0] contains the value 2, indicating that the device in slot 2 is the current master of the delayed request, and DCQ buffer 5 is storing a pending request for the slot 2 master (Q5_MASTER[2:0]=5), and either of signals Q5_COMPLETE or Q5_PART_COMPLETE is high, and if the signal Q2PIF_CHECK_CYC is high and the signal DCQ_HIT is low, then the bit MULTI_MASTER[2] is set high to indicate that the slot 2 device is a multi-threaded master.

A mask request generation block 332 produces signals Q2A_MASK_REQ[X] (X=1–7) in response to signals Q[7:0]_MASTER[2:0], Q[7:0]_STATE[3:0] (which indicates the state of delayed completion queues 0–7), SLOT_WITH_DATA[7:0] (which indicate if delayed completion Qs 0–7 contain valid data), CFG2Q_MULTI_MASTER[X] (X=1–7), CFG2Q_ALWAYS_MASK, and CFG2Q_NEVER_MASK.

Figure 26A:
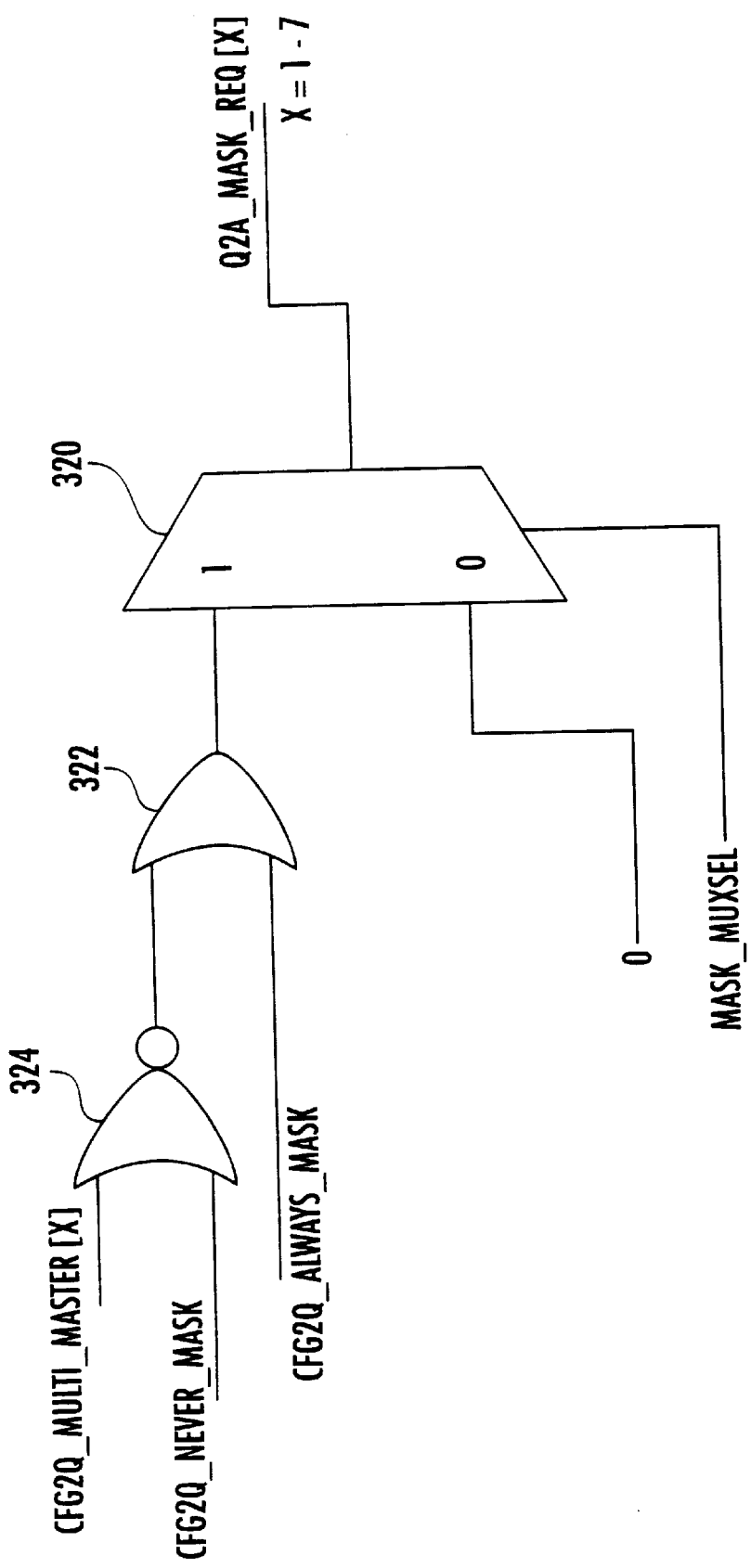
FIG. 26A is a logic diagram of circuits for generating the masked bits.
Figure 26B:
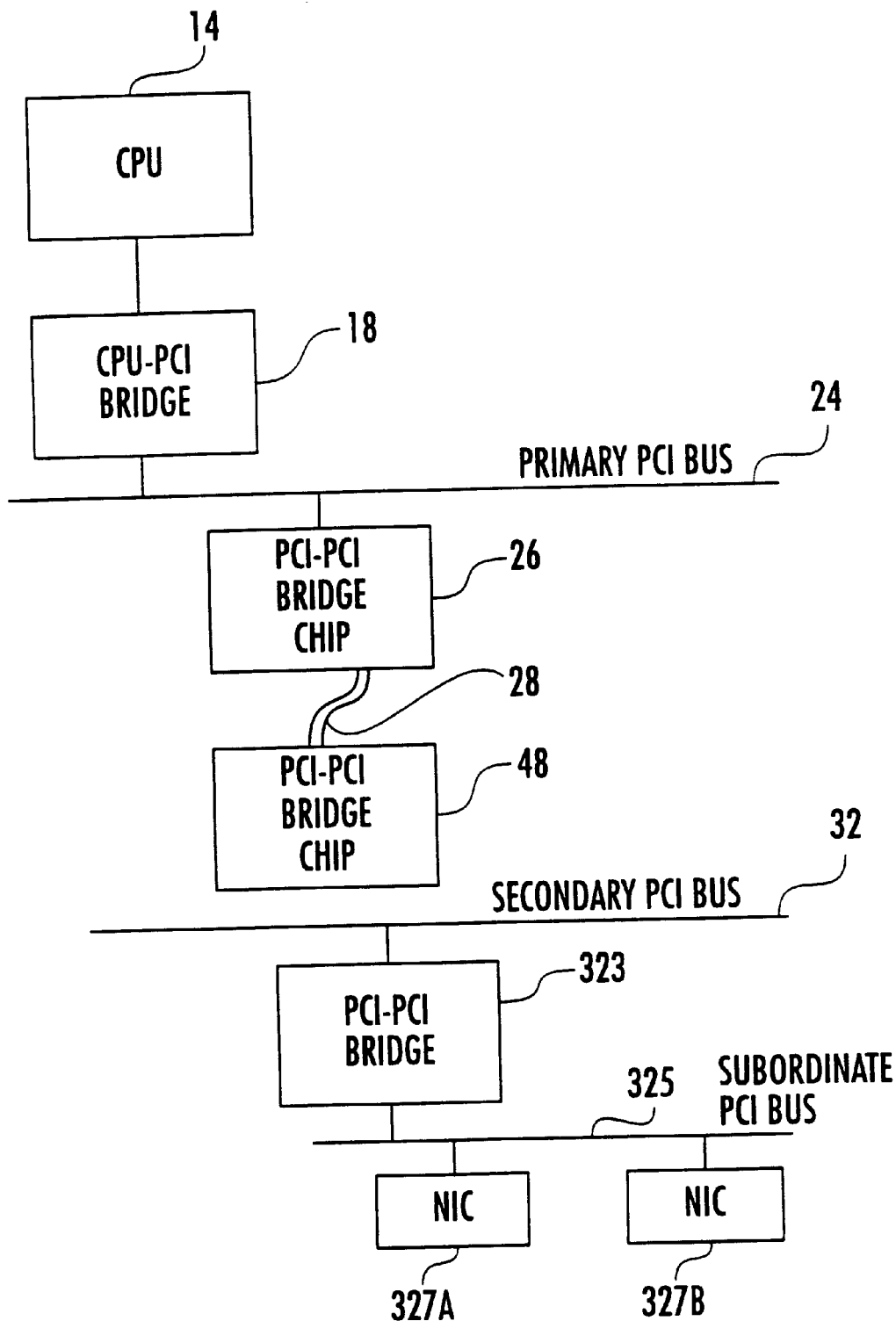
FIG. 26B is a block diagram of a computer system with multiple layers of buses.

Referring to FIG. 26A, the mask request generation block 332 includes a 2:1 multiplexer 320 for producing the signal Q2A_MASK_REQ[X] (X=1–7). The 1 input of the multiplexer 320 is connected to the output of an OR gate 322 and the 0 input is tied low. The select input of the multiplexer 320 is driven by a signal MASK_MUXSEL. One input of the OR gate 322 is connected to the output of a NOR gate 324, which receives a signal CFG2Q_MULTI_MASTER [X] (indicating a multi-threaded master), and the other input receives a signal CFG2Q_NEVER_MASK (a configuration bit indicating that the request line should not be masked if a multi-threaded master is detected). The other input of the OR gate 322 receives a signal CFG2Q_ALWAYS_MASK, which is a configuration bit indicating that the corresponding mask bit Q2A_MASK_REQ[X] should always be masked if the signal MUXSEL is asserted high. The signal MASK_MUXSEL is asserted high if the request from the secondary bus master is not to data already existing in the queue block 127, i.e., the request must be transmitted to the primary PCI bus 24. Thus each time a request is transmitted from a device on the secondary PCI bus 32 upstream to the primary PCI bus 24, a check is performed on bits CFG2Q_MULTI_MASTER[7:1] to determine if a multi-threaded master has been detected.

The masking of requests can be overridden by setting the appropriate bits in the configuration registers 125. The available modes include: 1) normal mode in which request masking is enabled except if multi-threaded master (CFG2Q_NEVER_MASK=0, CFG2Q_ALWAYS_MASK=0), 2) always mask mode in which requests from retried masters are masked even if multi-threaded (CFG2Q_ALWAYS_MASK=1), and 3) never mask mode in which the requests are never masked (CFG2Q_NEVER_MASK=1, CFG2Q_ALWAYS_MASKED=0).

EXPANSION CARD INSERTION AND REMOVAL CONNECTING EXPANSION CARDS

As shown in FIGS. 1 and 27A, the two expansion boxes 30a and 30b, of common design 30, each have the six hot-plug slots 36 (36a–f) in which the conventional expansion cards 807 can be inserted and removed (hot-plugged) while the computer system 10 remains powered up. The six mechanical levers 802 are used to selectively secure (when closed, or latched) the expansion cards 807 that are inserted into corresponding hot-plug slots 36. For purposes of removing or inserting the expansion card 807 into one of the slots 36, the corresponding lever 802 must be opened, or unlatched, and as long as the lever 802 is opened, the corresponding slot 36 remains powered down.

When the lever 802 that secures the expansion card 807 to its slot 36 is opened, the computer system 10 senses this occurrence and powers down the card 807 (and corresponding slot 36) before the card 807 can be removed from its slot 36. Slots 36 that are powered down, like other slots 36 not holding cards 807, remain powered down until software of the computer system 10 selectively powers up the slots 36.

The card 46 inserted into the card slot 34 has the bridge chip 48 that monitors the securement status (open or closed) of the levers 802 and powers down any card 807 (and corresponding slot 36) that is not secured by its lever 802. Software of the computer system 10 can also selectively power down any one of the slots 36.

The cards 807 are powered up through a power up sequence and powered down through a power down sequence. In the power up sequence, power is first supplied to the card 807 being powered up, and thereafter, a PCI clock signal (from the PCI bus 32) is furnished to the card 807 being powered up. Remaining PCI bus signal lines of the card 807 are then coupled to corresponding lines of the PCI bus 32. Lastly, the reset signal for the card 807 being powered up is negated which brings the card 807 out of reset.

The power up sequence allows the circuitry of the card 807 being powered up to become fully functional with the PCI clock signal before the remaining PCI bus signals are provided. When the clock signal and remaining PCI bus signals are connected to the card 807 and before the card 807 is reset, the bridge chip 48 has control of the P=bus 32. Because the bridge chip 48 has control of the PCI bus 32 during these times, potential glitches on the PCI bus 32 from the power up sequence do not disturb operations of the cards 807 that are powered up.

In the power down sequence, the card 807 being powered down is first reset. Next, the PCI bus signals, excluding the PCI clock signal, are removed from the card 807. The bridge chip 48 subsequently disconnects the PCI clock signal from the card 807 before power from the card 807 is removed. The power down sequence minimizes the propagation of false signals from the card 807 being powered down to the bus 32 because circuitry on the card 807 remains fully functional until the PCI bus signal lines are removed.

When the PCI clock signal and remaining PCI bus signals are disconnected, and when the card 807 is reset, the bridge chip 48 has control of the PCI bus 32. Because the bridge chip 48 has control of the PCI bus 32 during these times, potential glitches on the PCI bus 32 from the power down sequence do not disturb operations of the cards 807 that are powered up.

The bridge chip 48 includes the Serial Input/Output (SIO) circuit 50 which controls the power up and power down sequences of the slots 36 through twenty-four control signals POUT[39:16]. The control signals POUT[39:16] are a subset of forty output control signals POUT[39:0] generated by the SIO circuit 50. The control signals POUT[39:16] are latched versions of slot bus enable signals BUSEN#[5:0], slot power enable signals PWREN[5:0], slot clock enable signals CLKEN#[5:0] and slot reset signals RST#[5:0], all internal signals of the SIO circuit 50, further described below. The control signals POUT[39:0] and their relationship to the signals BUSEN#[5:0], PWREN[5:0], CLKEN#[5:0] and RST#[5:0] are described in the following table:

PARALLEL OUTPUT CONTROL SIGNALS (POUT[39:0])

| SIGNAL POSITION | DESCRIPTION | ASSOCIATED CONTROL SIGNALS | WHEN SIGNAL IS ACTIVE |
|---|---|---|---|
| 0–11 | Control signals for LEDs 54 | | |
| 12–15 | General purpose output signals | GPOA[3:0] | |
| 16 | Reset signal for slot 36a | (RST#[0]) | Low |
| 17 | Reset signal for slot 36b | (RST#[1]) | Low |

-continued

PARALLEL OUTPUT CONTROL SIGNALS (POUT[39:0])

| SIGNAL POSITION | DESCRIPTION | ASSOCIATED CONTROL SIGNALS | WHEN SIGNAL IS ACTIVE |
|---|---|---|---|
| 18 | Reset signal for slot 36c | (RST#[2]) | Low |
| 19 | Reset signal for slot 36d | (RST#[3]) | Low |
| 20 | Reset signal for slot 36e | (RST#[4]) | Low |
| 21 | Reset signal for slot 36f | (RST#[5]) | Low |
| 22 | Clock enable signal for slot 36a | (CLKEN#[0]) | Low |
| 23 | Clock enable signal for slot 36b | (CLKEN#[1]) | Low |
| 24 | Clock enable signal for slot 36c | (CLKEN#[2]) | Low |
| 25 | Clock enable signal for slot 36d | (CLKEN#[3]) | Low |
| 26 | Clock enable signal for slot 36e | (CLKEN#[4]) | Low |
| 27 | Clock enable signal for slot 36f | (CLKEN#[5]) | Low |
| 28 | Bus enable signal for slot 36a | (BUSEN#[0]) | Low |
| 29 | Bus enable signal for slot 36b | (BUSEN#[1]) | Low |
| 30 | Bus enable signal for slot 36c | (BUSEN#[2]) | Low |
| 31 | Bus enable signal for slot 36d | (BUSEN#[3]) | Low |
| 32 | Bus enable signal for slot 36e | (BUSEN#[4]) | Low |
| 33 | Bus enable signal for slot 36f | (BUSEN#[5]) | Low |
| 34 | Power enable signal for slot 36a | (PWREN[0]) | High |
| 35 | Power enable signal for slot 36b | (PWREN[1]) | High |
| 36 | Power enable signal for slot 36c | (PWREN[2]) | High |
| 37 | Power enable signal for slot 36d | (PWREN[3]) | High |
| 38 | Power enable signal for slot 36e | (PWREN[4]) | High |
| 39 | Power enable signal for slot 36f | (PWREN[5]) | High |

Figure 28:
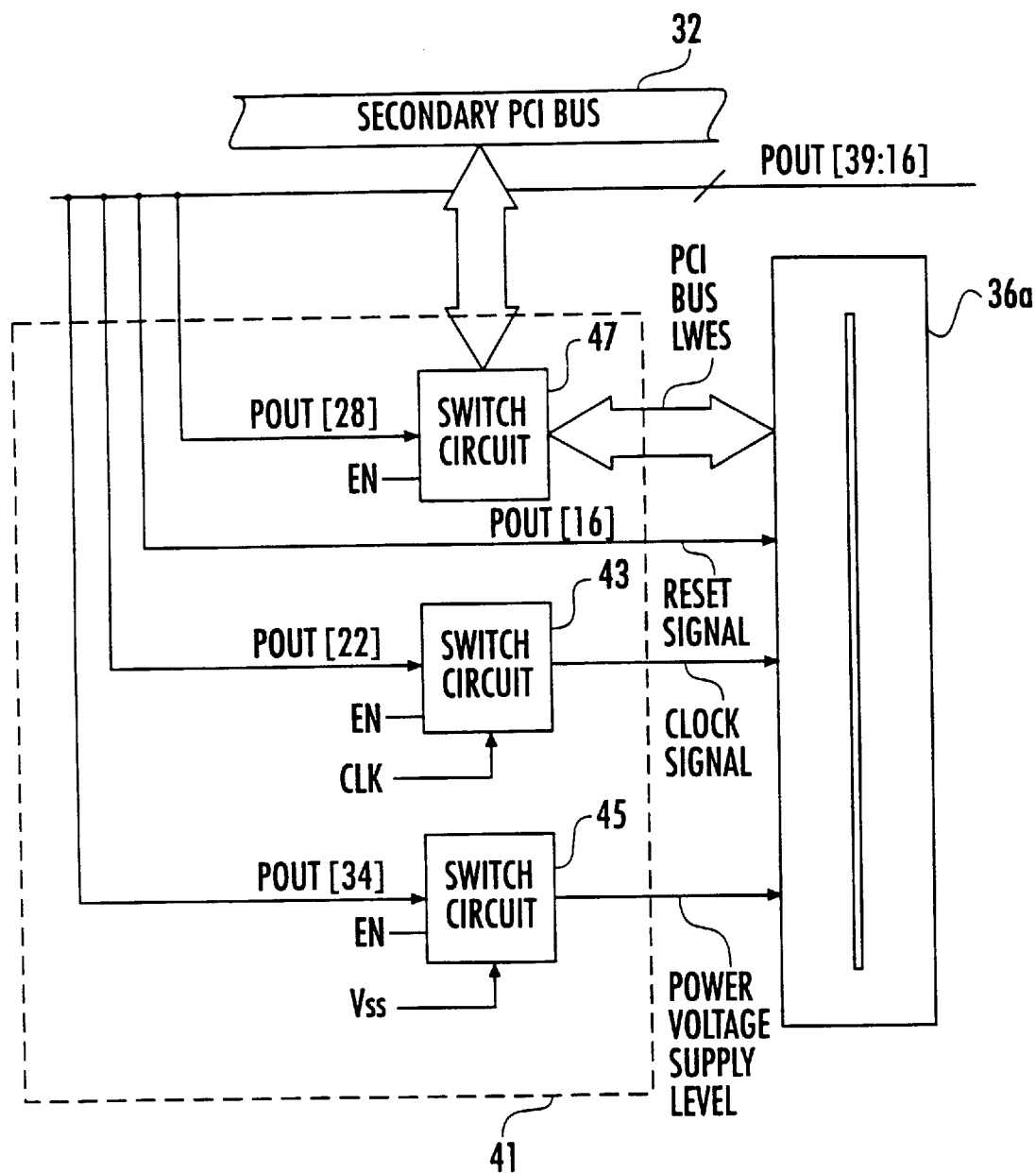

As shown in FIGS. 2 and 28, each hot-plug slot 36 has the associated switch circuitry 41 for connecting and disconnecting the slot 36 to and from the PCI bus 32. The switch circuitry 41 for each slot 36 receives four of the control signals POUT[39:16]. As an example, for the slot 36a, when the control signal POUT[28] is asserted, or low, the slot 36a is connected to the bus signal lines of the PCI bus 32 by a switch circuit 47. When the control signal POUT[28] is deasserted, or high, the slot 36a is disconnected from the bus signal lines of the PCI bus 32.

When the control signal POUT[22] is asserted, or low, the slot 36a is connected to a PCI clock signal CLK through a switch circuit 43. When the control signal POUT[22] is deasserted, or high, the slot 36a is disconnected from the clock signal CLK.

When the control signal POUT[34] is asserted, or high, the slot 36a is connected to a card voltage supply level $V_{ss}$ through a switch circuit 45. When the control signal POUT[34] is deasserted, or low, the slot 36a is disconnected from the card voltage supply level $V_{ss}$.

When the control signal POUT[16] is asserted, or low, the slot 36a is reset and when the control signal POUT[16] is deasserted, or high, the slot 36a comes out of the reset state.

As seen in FIG. 2, the SIO circuit 50 may selectively monitor up to one hundred twenty-eight (sixteen bytes) of latched status signals STATUS[127:0] furnished by the expansion box 30. The status signals STATUS[127:0] form a "snapshot" of selected conditions of the expansion box 30. The status signals STATUS[127:0] include six status signals STATUS[5:0] which indicate the securement status (opened or closed) of each of the levers 802. The SIO circuit 50 monitors the status signals STATUS[31:0] for changes in their logical voltage levels. The SIO circuit 50 serially shifts the status signals STATUS[127:32] into the SIO circuit 50 when instructed to do so by the CPU 14.

The SIO circuit 50 serially receives the status signals STATUS[127:0], least significant signal first, via a serial data signal NEW_CSID. The data signal NEW_CSID is furnished by the serial output of the thirty-two bit, parallel input shift register 82 located on board the expansion box 30 along with the slots 36.

The register 82, through its parallel inputs, receives twenty-four parallel status signals PIN[23:0], four associated with each of the hot-plug slots 36, that are included in the thirty-two least significant status signals STATUS[31:0]. When the status indicated by one or more of the status signals STATUS[31:0] changes (the logical voltage level changes), the bridge chip 48 generates an interrupt request to the CPU 14 by asserting, or driving low, a serial interrupt request signal SI_INTR# which is received by the interrupt receiving block 132. The status signals PIN[23:0] include two PCI card presence signals (PRSNT1# and PRSNT2#) associated with each slot 36.

Six status signals PIN[5:0], corresponding to their latched versions, status signals STATUS[5:0], indicate the securement, or engagement, status (open or closed) of each the levers 802. Six sliding switches 805 (FIGS. 27A–27C) are actuated by the movement of their corresponding levers 802 and are used to electrically indicate the securement status of the corresponding lever 802. Each switch 805 has a first terminal coupled to ground and a second terminal furnishing the corresponding one of the status signals PIN [5:0]. The second terminal is coupled to a supply voltage level $V_{DD}$ through one of six resistors 801.

If one of the levers 802 opens and the card 807 secured by the lever 802 becomes unsecured, the corresponding one of the status signals PIN[5:0] is asserted, or driven high. As an example, for the slot 36a, the status signal PIN[0] is deasserted, or driven low, when the corresponding lever 802 is closed. When the lever 802 for the slot 36a is opened, the status signal PIN[0] is asserted, or driven high.

The register 82 also receives a serial stream of latched status signals STATUS[127:32] that do not cause interrupts when the logical voltage level of one of the signals STATUS [127:32] changes. The status signals STATUS[127:32] are formed by the sixteen bit shift register 52 located on board the expansion box 30 with the slots 36. The shift register 52 receives status signals at its parallel inputs and latches the status signals STATUS[127:32] when instructed to do so by the SIO circuit 50. The shift register 52 serializes the status signals STATUS[127:32] and furnishes the signals STATUS[127:32] to the serial input of the register 82 via a serial data signal CSID_I.

When instructed by the SIO circuit 50, the register 82 latches status signals PIN[23:0], forms the status signals STATUS[31:0], furnishes the status signals STATUS[31:0] and furnishes a byte or more of the status signals STATUS[127:32] (when requested by the CPU 14), in a least significant signal first fashion, to the SIO circuit 50 via the serial data signal NEW_CSID. The status signals STATUS[127:0] are described by the following table:

STATUS[127:0]

| BIT | DESCRIPTION |
| --- | --- |
| 0 | Lever 802 status signal for slot 36a (PIN[0]) |
| 1 | Lever 802 status signal for slot 36b (PIN[1]) |
| 2 | Lever 802 status signal for slot 36c (PIN[2]) |
| 3 | Lever 802 status signal for slot 36d (PIN[3]) |
| 4 | Lever 802 status signal for slot 36e (PIN[4]) |
| 5 | Lever 802 status signal for slot 36f (PIN[5]) |
| 6 | Reserved for lever 802 statuB Bignal for additional hot-plug slot |
| 7 | Reserved for lever 802 status signal for additional hot-plug slot |
| 8 | PRSNT2# signal for slot 36a (PIN[6]) |
| 9 | PRSNT2# signal for slot 36b (PIN[7]) |
| 10 | PRSNT2# signal for slot 36c (PIN[8]) |
| 11 | PRSNT2# signal for slot 36d (PIN[9]) |
| 12 | PRSNT2# signal for slot 36e (PIN[10]) |
| 13 | PRSNT2# signal for slot 36f (PIN[11]) |
| 14 | Reserved for PRSNT#2 signal for additional hot-plug slot 36 |
| 15 | Reserved for PRSNT#2 signal for additional hot-plug slot 36 |
| 16 | PRSNT1# signal for slot 36a (PIN[12]) |
| 17 | PRSNT1# signal for slot 36b (PIN[13]) |
| 18 | PRSNT1# signal for slot 36c (PIN[14]) |
| 19 | PRSNT1# signal for slot 36d (PIN[15]) |
| 20 | PRSNT1# signal for slot 36e (PIN[16]) |
| 21 | PRSNT1# signal for slot 36f (PIN[17]) |
| 22 | Reserved for PRSNT1# signal for additional hot-plug slot 36 |
| 23 | Reserved for PRSNT1# signal for additional hot-plug slot 36 |
| 24 | Power fault status for slot 36a (PIN[18]) |
| 25 | Power fault status for slot 36b (PIN[19]) |
| 26 | Power fault status for slot 36c (PIN[20]) |
| 27 | Power fault status for slot 36d (PIN[21]) |
| 28 | Power fault status for slot 36e (PIN[22]) |
| 29 | Power fault status for slot 36f (PIN[23]) |
| 30 | Reserved for power fault status for additional hot-plug slot 36 |
| 31 | Reserved for power fault status for additional hot-plug slot 36 |
| 32–127 | Status signals that do not cause interrupt requests when their status changes |

Figure 30:
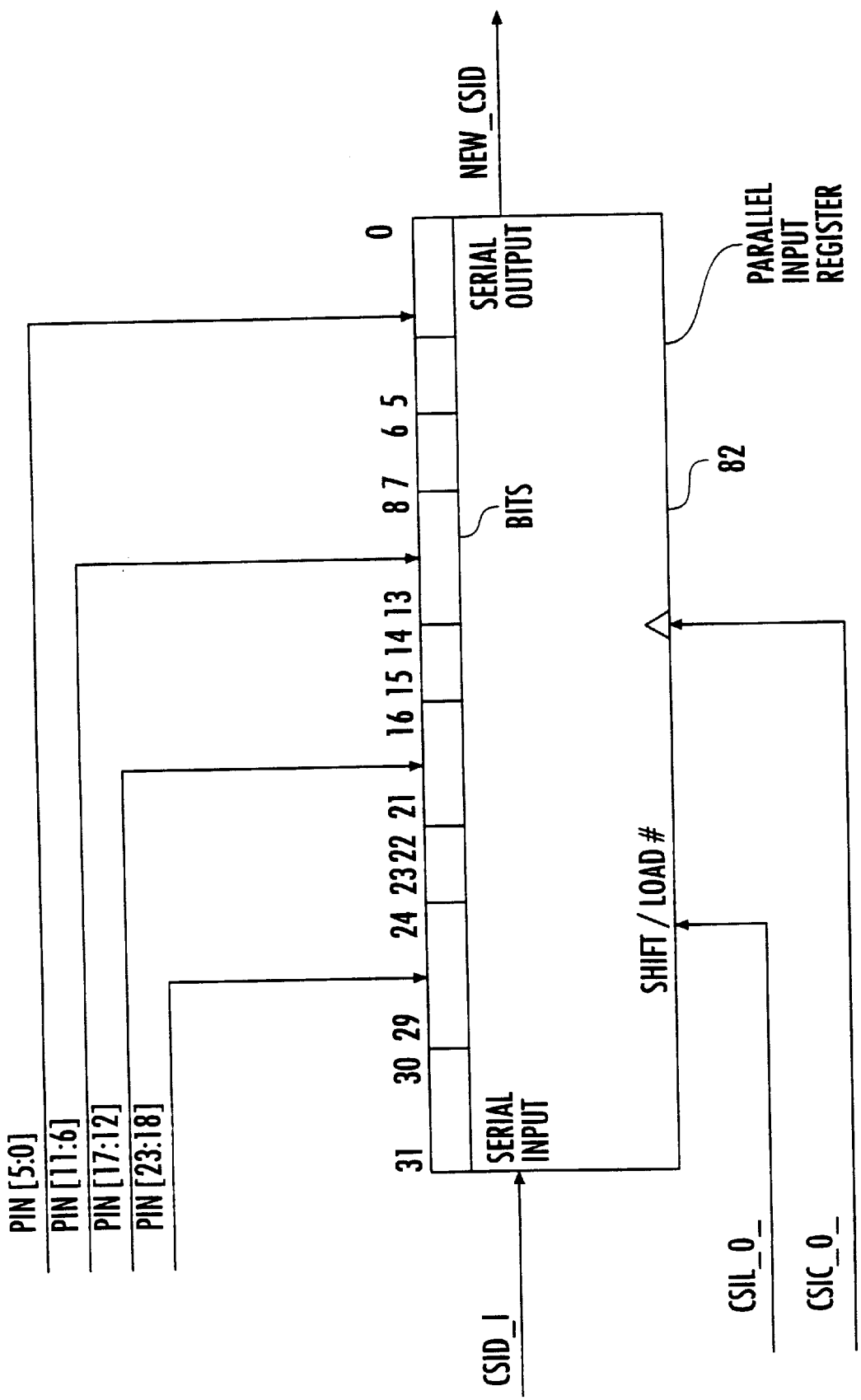

As shown in FIGS. 2 and 30, when the SIO circuit 50 asserts, or drives low, a register load signal CSIL_O_, the shift register 52 latches the status signals STATUS[127:32] and the shift register 82 latches the status signals STATUS[31:0]. When the SIO circuit 50 negates, or drives high, the signal CSIL_O_, both the registers 52 and 82 serially shift their data to the SIO circuit 50 on the positive edge of a clock signal CSIC_O furnished by the SIO circuit 50. The clock signal CSIC_O is synchronized to and one fourth the frequency of the PCI clock signal CLK.

Figure 29:
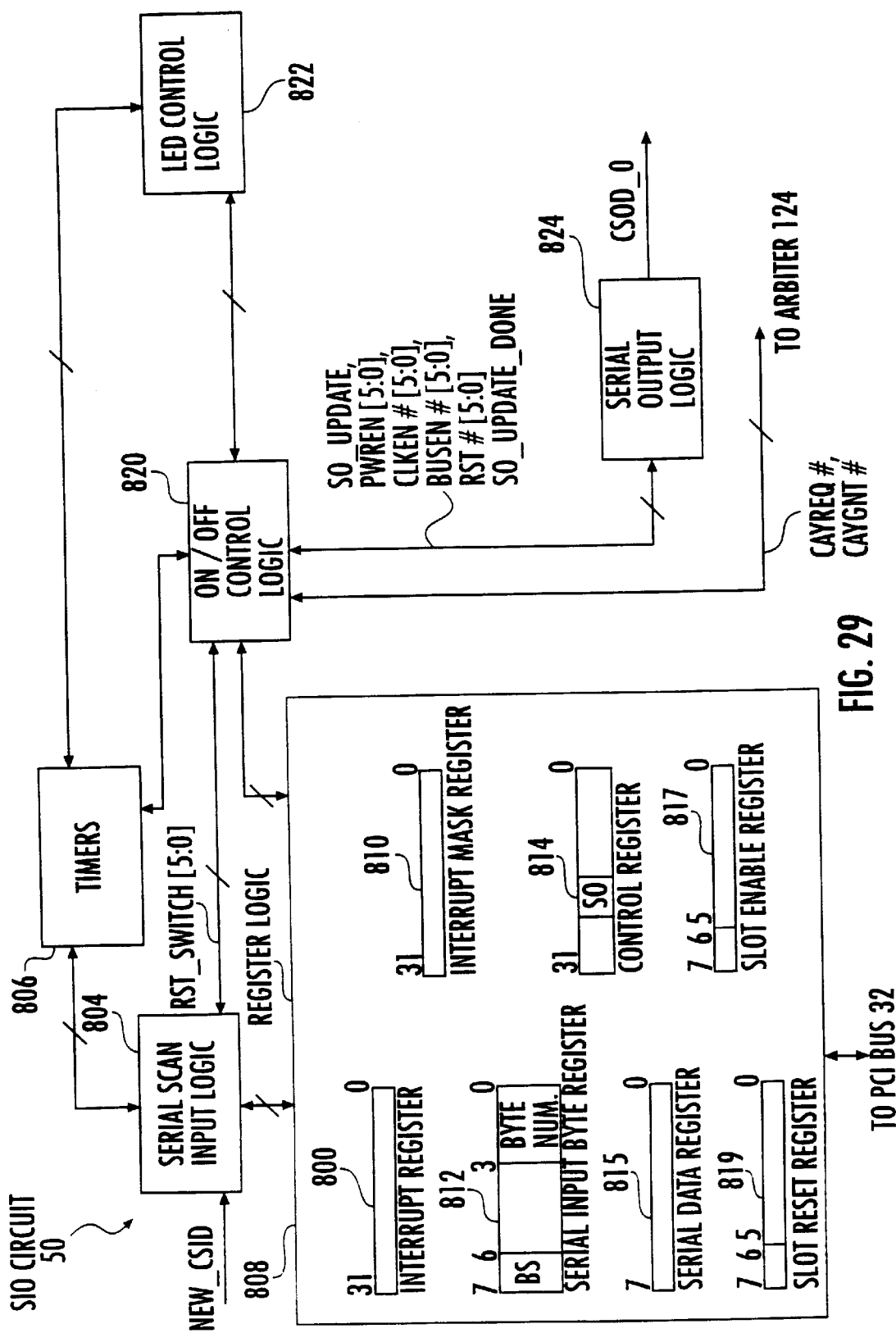

As shown in FIG. 29, for purposes of monitoring, or scanning, the status signals STATUS[31:0], the SIO circuit 50 uses a thirty-two bit interrupt register 800 whose bit positions correspond to the signals STATUS[31:0]. The SIO circuit 50 updates the bits of the interrupt register 800 to equal the corresponding status signals STATUS[31:0] that have been debounced, as further described below. Two status signals STATUS[7:6] are reserved for additional hot-plug slots 36, and the seventh and eighth most significant bits of the interrupt register 800 are also reserved for the additional slots 36. The interrupt register 800 is part of a register logic block 808 of the SIO circuit 50 which is coupled to the PCI bus 32.

Serial scan input logic 804 of the SIO circuit 50 sequentially scans, or monitors, the status signals STATUS[31:0], least significant signal first, for changes, as indicated by transitions in their logical voltage levels. If the status of one or more of the status signals STATUS[5:0] associated with the levers 802 changes, the serial scan input logic 804 enters a slow scan mode such that the status signals STATUS[5:0] are scanned thirty-two times within a predetermined debounce time interval. If one or more of the status signals STATUS[5:0] changes, the serial scan input logic 804 updates the interrupt register 800 (and asserts the serial interrupt signal SI_INTR#) if the changed status signal STATUS[5:0] remains at the same logical voltage level for at least a predetermined debounce time interval. The serial scan input logic 804 is coupled to programmable timers 806 which generate and indicate the end of the debounce delay interval initiated by the serial scan logic 804. Requiring the status to remain stable for the debounce time interval minimizes the inadvertent powering down of one of the hot-plug slots 36 due to a false value (i.e., a "glitch") indicated by one of the status signals STATUS[5:0]. When all of the status signals STATUS[5:0] remain at the same logical voltage level for at least the debounce time interval, the serial scan input logic 804 then proceeds to once again scan all thirty-two status signals STATUS[31:0] in the faster scan mode.

If the serial scan input logic 804 detects a change in one of the status signals STATUS[31:6], the serial scan input logic 804 instructs the timers 806 to measure another debounce delay interval, subsequently asserts the serial interrupt signal SI_INTR#, updates the interrupt register 800 with the signals STATUS[31:6] that have changed, and ignores further changes in the status signals STATUS[31:6] until the debounce time interval expires. After expiration of the debounce time interval, the serial scan input logic 804 proceeds to recognize changes in the thirty-two status signals STATUS[31:0].

When the serial interrupt signal SI_INTR# is asserted, the CPU 14 subsequently reads the interrupt register 800, determines which (may be more than one) status signals STATUS[31:0] caused the interrupt, and deasserts the serial interrupt signal SI_INTR# by writing a "1" to the bit or bits of the interrupt register 800 that have changed.

The CPU 14 may selectively mask interrupt requests caused by the status signals STATUS[31:0] by writing a "1" to a corresponding bit of a thirty-two bit interrupt mask register 810. The CPU 14 can also selectively read any byte of the status signals STATUS[47:0] by writing a byte number of the selected byte to a serial input byte register 812. The SIO circuit 50 then transfers the desired byte into a serial data register 815.

For example, to read the third byte (byte number two) of the status signals STATUS[23:16], the CPU 14 writes a "2" to the serial input byte register 812. The serial scan input logic 804 then serially shifts byte two of the status signals STATUS[23:16] into the serial data register 815. A busy status bit BS of the serial input byte register 812 is equal to "1" when the CPU 14 initially writes the desired byte number to the serial input byte register 812. The bit BS is cleared by the SIO circuit 50 after the requested byte has been shifted into the serial data register 815.

The CPU 14 can power up one of the slots 36 by writing a "1" to a corresponding bit of a slot enable register 817 and disable the slot 36 by writing a "0" to this bit. Furthermore, the CPU 14 can reset one of the slots 36 by writing a "1" to a corresponding bit of a slot reset register 819. The contents of the slot enable 817 and slot reset 819 registers are represented by signals SLOT_EN[5:0] and SLOT_RST_[5:0], respectively.

To initiate the request indicated by the slot enable 817 and reset 819 registers, the CPU 14 writes a "1" to an SO bit of control register 814. After the SO bit is asserted (which asserts, or drives high, a GO_UPDATE signal), the SIO circuit 50 initiates and controls the required power down and/or power up sequences.

The serial scan input logic 804 is coupled to ON/OFF control logic 820 which controls the power up and power down sequences. The ON/OFF control logic 820 furnishes the signals BUSEN#[5:0], CLKEN#[5:0], RST#[5:0] and PWREN[5:0] to serial output logic 824.

Each power up or power down sequence involves four shift phases during which another step of the power down or power up sequence is performed. During each shift phase, the ON/OFF control logic 820 instructs the serial output logic 824 to combine the control signals BUSEN#[5:0], CLKEN#[5:0], RST#[5:0] and PWREN[5:0]; latch these signals; and serially furnish these signals (via a serial data signal CSOD_O) to the serial input of an output shift register 80. At end of each shift phase, the ON/OFF control logic 820 instructs the shift register 80 to update the control signals POUT[35:12].

The ON/OFF control logic 820 is also interfaced to the register logic 808 and Light Emitting Diode (LED) control logic 822. The LED control logic 122 controls the on/off status of the six LEDs 54, which visually indicate whether the corresponding levers 802 are latched or unlatched. The LEDs 54 can be programmed to blink when turned on through LED control registers (not shown) of the register logic 808.

Figure 31A:
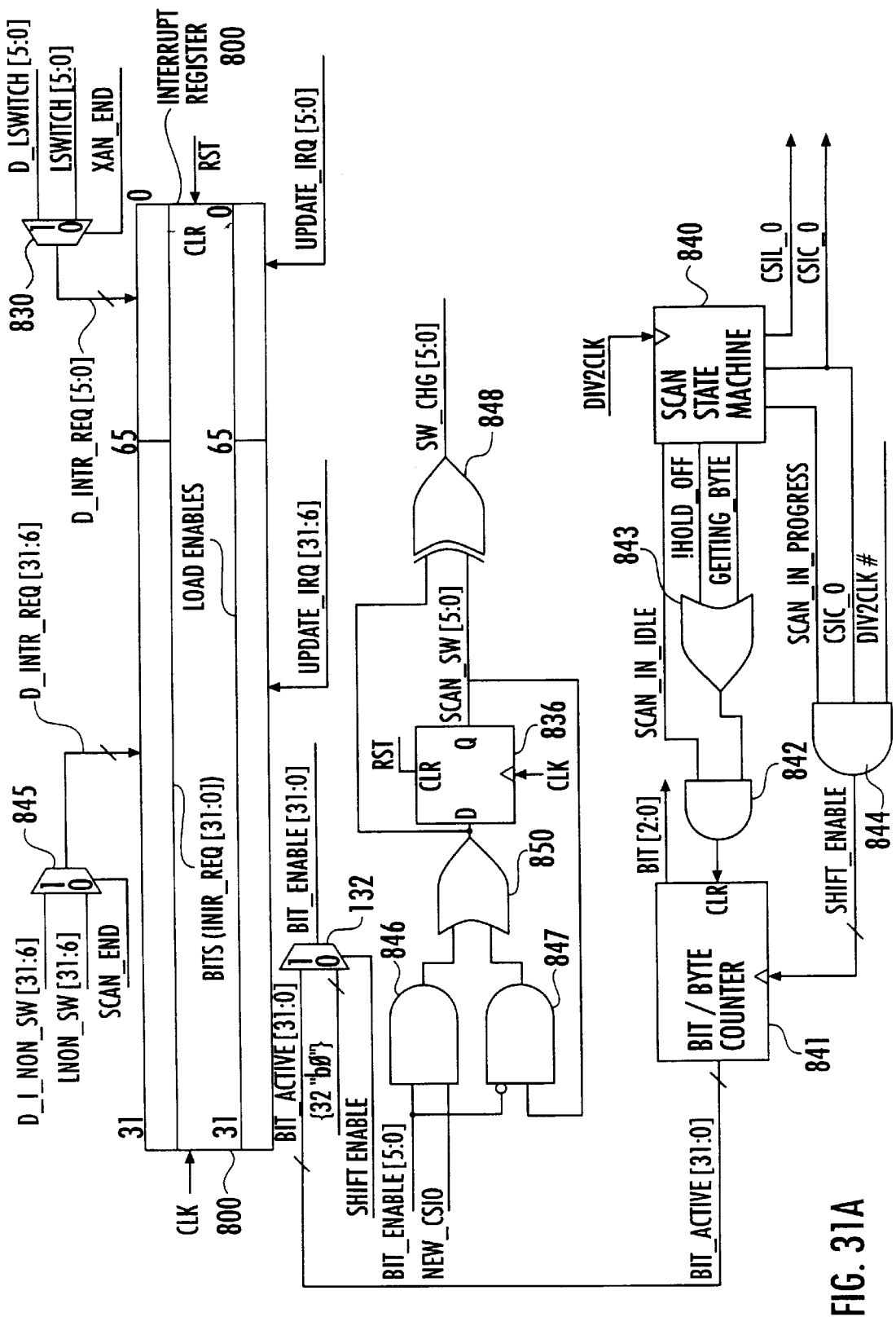

As shown in FIG. 31A, the serial scan input logic 804 includes a scan state machine 840 which controls the scanning of the status signals STATUS[31:0] for changes and controls the shifting of a selected byte of the status signals STATUS[47:0] into the serial input byte register 815.

The scan state machine 840 is clocked on the negative edge of a clock signal DIV2CLK, which is synchronized to a PCI clock signal CLK and one half of the frequency of the PCI clock signal CLK. The load and clock signals, CSIL_O_ and CSIC_O, respectively, are furnished by the scan state machine 840. The clock signal, when enabled, is synchronized to the clock signal CSIC_O.

A bit/byte counter 841, through a thirty-two bit signal BIT_ACTIVE[31:0], indicates which bit of the status signals STATUS[31:0] is currently represented by the serial data signal NEW_CSID. The asserted bit of the signal BIT_ACTIVE[31:0] has the same bit position as the status signal STATUS[31:0] represented by the data signal NEW_CSID.

The counter 841 also furnishes a three bit signal BIT[2:0] which represents which bit of the current byte of the status signals STATUS[31:0] is currently being scanned by the scan state machine 840. The counter 841 is clocked on the negative edge of a signal SHIFT_ENABLE. The outputs of the counter 841 are reset, or cleared, when the output of an AND gate 842, connected to the clear input of the counter 841, is negated.

The scan state machine 840 furnishes a signal SCAN_IN_IDLE which when asserted, or high, indicates that the scan state machine 840 is in an IDLE state and not currently scanning any of the status signals STATUS[127:0]. The signal SCAN_IN_IDLE is deasserted otherwise.

The signal SCAN_IN_IDLE is furnished to one input of the AND gate 842. The other input of the AND gate 842 is connected to the output of an OR gate 843. One input of the OR gate 843 receives an inverted HOLD_OFF signal, and the other input of the OR gate 843 receives a signal GETTING_BYTE.

The signal HOLD_OFF, when asserted, or driven high, indicates that a change in one of the status signals STATUS[5:0] has been detected, and the serial scan logic 804 has entered the slow scan mode. In the slow scan mode, the serial scan input logic 804 waits for a predetermined slow scan interval before traversing the status signals STATUS[31:0] again. The serial scan input logic 804 counts the number of times the serial scan signals STATUS[5:0] are scanned during the slow scan mode and uses this count to determine when one of the status signal STATUS[5:0] has remain unchanged for the debounce delay interval, as further described below.

Therefore, when the scan state machine 840 is in the IDLE state and the either the HOLD_OFF signal is deasserted or the scan state machine 840 is reading in a selected byte (selected by the CPU 14) of the status signals STATUS[47:0], all outputs of the counter 841 are cleared, or set equal to zero.

The signal SHIFT_ENABLE is furnished by the output of an AND gate 844. One input of the AND gate 844 receives the clock signal CSIC_O. Another input of the AND gate 844 receives a signal DIV2CLK#. The signal DIV2CLK# is asserted, or driven low, on the negative edge of the signal CLKDIV4. The third input of the AND gate 844 receives a signal SCAN_IN_PROGRESS, which when asserted, or driven high, indicates that the scan state machine 840 is currently scanning the status signals STATUS[127:0], and the signal SCAN_IN_PROGRESS is deasserted otherwise.

Therefore, when the scan state machine 840 is not shifting in the status signals STATUS[127:0], the counter 841 is disabled. Furthermore, when enabled, the counter 841 is clocked on the negative edge of the clock signal DIV2CLK.

The interrupt register 800 receives input signals D_INTR_REG[31:0] at its corresponding thirty-two inputs. The load enable inputs of the interrupt register 800 receive corresponding load enable signals UPDATE_IRQ[31:0]. The interrupt register 800 is clocked on the positive edge of the PCI clock signal CLK.

For purposes of keeping track of the status signals STATUS[5:0] after each scan, a multi-bit, D-type flip-flop 836 furnishes status signals SCAN_SW[5:0]. The clear input of the flip-flop 836 receives the reset signal RST, and the flip-flop 836 is clocked on the positive edge of the clock signal CLK. The input of the flip-flop 836 is connected to the output of a multi-bit OR gate 850 which has one input connected to the output of a multi-bit AND gate 846 and one input connected to the output of a multi-bit AND gate 847. One input of the AND gate 846 receives six bit enable signals BIT_ENABLE[5:0] (described below) and the other input of the AND gate 846 receives the serial data signal NEW_CSID. One input of the AND gate 847 receives inverted bit enable signals BIT_ENABLE[5:0], and the other input of the AND gate 847 receives the signals SCAN_SW[5:0].

Only one of the bit enable signals BIT_ENABLE[5:0] is asserted at one time (when the scan state machine 840 is scanning), and the asserted bit indicates which one of the corresponding status signals STATUS[31:0] is represented by the signal NEW_CSID. Thus, when the scan state machine 840 is scanning, on every positive edge of the clock signal CLK, the signals SCAN_SW[5:0] are updated.

The bit enable signals BIT_ENABLE[31:0] are furnished by the output of a multi-bit multiplexer 832 that receives the bits BIT_ACTIVE[31:0] at its one input. The zero input of the multiplexer 832 receives a thirty-two bit signal indicative of logic zero. The select input of the multiplexer 832 receives the signal SHIFT_ENABLE.

For purposes of detecting a change in the status signals STATUS[5:0], a multi-bit, Exclusive Or (XOR) gate 848 furnishes switch change signals SW_CHG[5:0]. When one of the signals SW_CHG[5:0] is asserted, or high, the logical voltage of the corresponding status signal STATUS[5:0] changed during successive scans. One input of the XOR gate 848 is connected to the input of the flip-flop 836, and the other input of the XOR gate 848 receives the signals SCAN_SW[5:0].

Figure 31C:
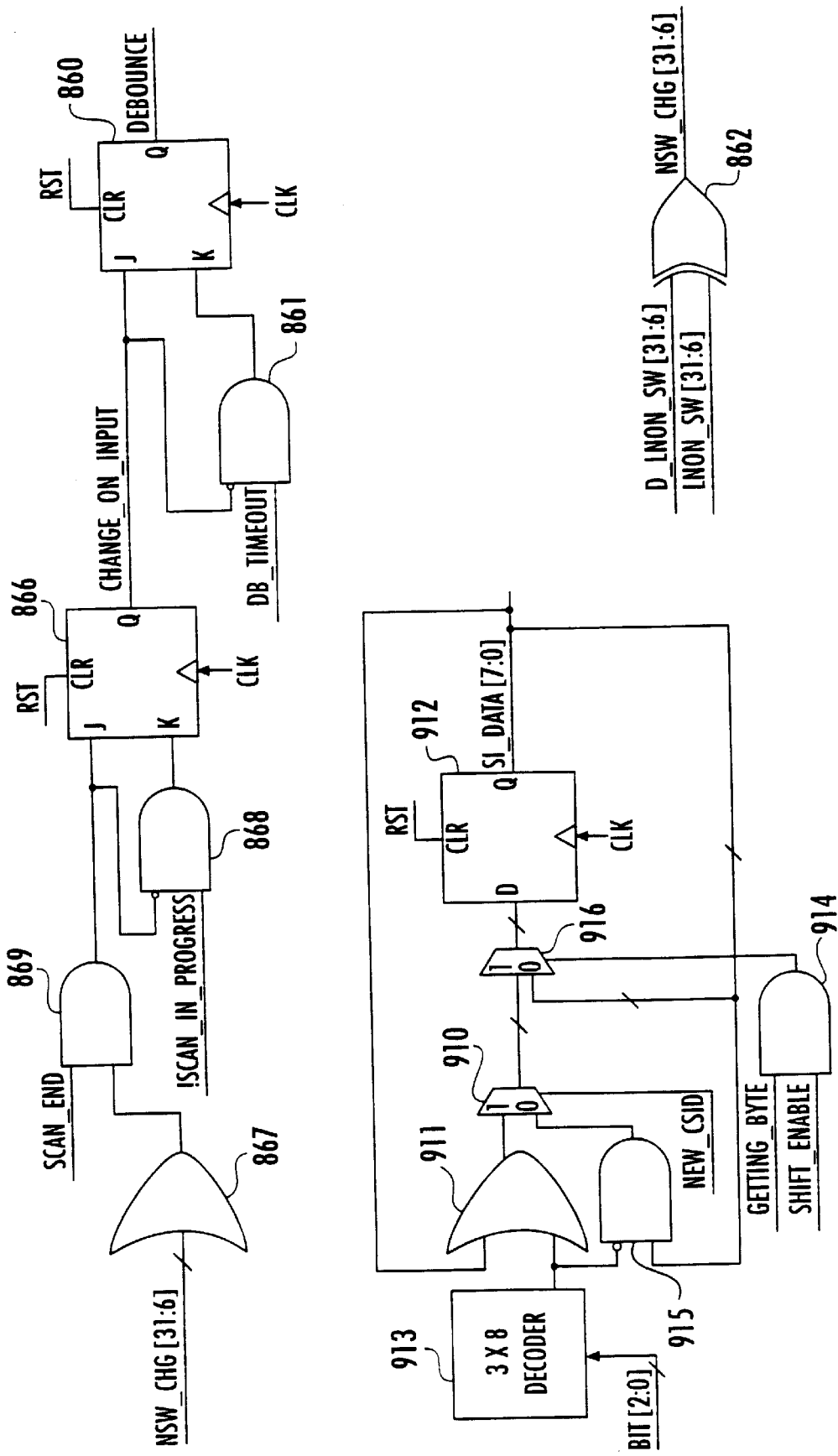
Figure 31D:
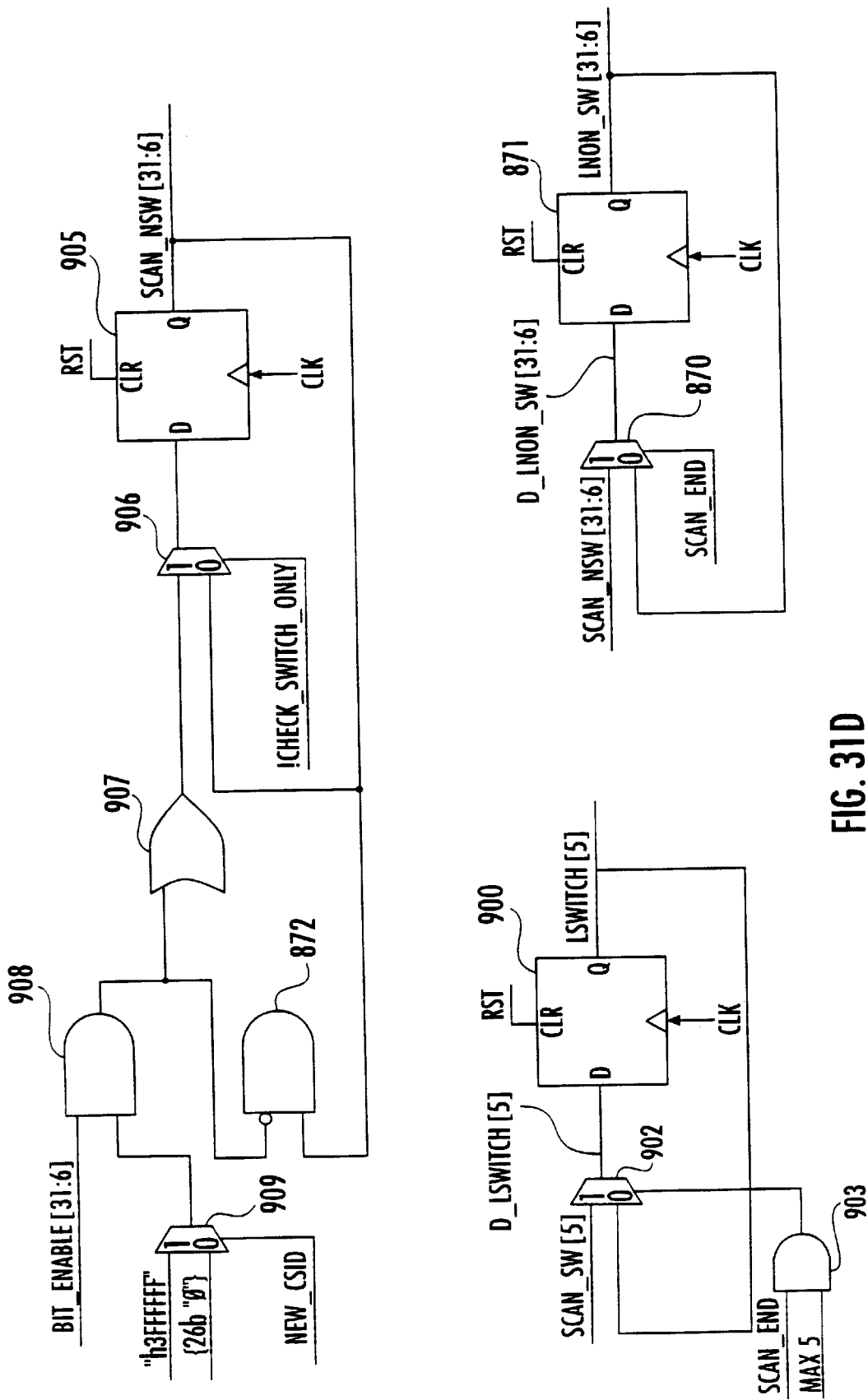

As shown in FIG. 31D, for purposes of indicating when the logical voltage level of a selected status signal STATUS [5:0] has remained at the logical voltage level for at least the duration of the debounce delay interval, the scan input logic 804 has six signals LSWITCH[5:0]. The non-inverting input of a D-type flip-flop 900 furnishes the signal LSWITCH[5] at its non-inverting output. The signal LSWITCH[5] is asserted, or driven high, to indicate the above-described condition and deasserted otherwise. The flip-flop 900 is clocked on the positive edge of the clock signal CLK, and the clear input of the flip-flop 900 receives the RST signal.

The input of the flip-flop 900 is connected to the output of a multiplexer 902 which furnishes a D_LSWITCH[5] signal. The select input of the multiplexer 902 is connected to the output of an AND gate 903 that receives a MAX5 signal and a SCAN_END signal. The SCAN_END signal, when asserted, indicates the scan state machine 840 has completed the current scan. Five signals (MAX5, MAX4, MAX3, MAX2, MAX1 AND MAX0) indicate whether the corresponding status signal STATUS[5], STATUS[4], STATUS [3], STATUS[2], STATUS[1], or STATUS[0], respectively, has remained at the same logical voltage level for a least the duration of the debounce time interval. The zero input of the multiplexer 902 receives the signal LSWITCH[5], and the one input of the multiplexer 902 receives the signal SCAN_SW[5]. The signal SCAN_END is furnished by the output of an AND gate 851 (FIG. 31B). The AND gate 851 receives a signal STOP_SCAN and a signal SCAN_DONE. The signal STOP_SCAN is asserted, or driven high, when conditions for ending the scanning by the scan state machine 840 are present, as further described below. The signal SCAN_END is a pulsed (for one cycle of the CLK signal) version of the STOP_SCAN signal. The signals LSWITCH [4]–LSWITCH[0] and D_LSWITCH[4]–D_LSWITCH[0] are generated in a similar fashion from the respective SCAN_SW[4]–SCAN_SW[0] signals and the respective signals MAX4–MAX0.

For purposes of updating the logical voltage level of the status signals STATUS[31:6] as these signals are scanned in, a multi-bit D-type flip-flop 905 (FIG. 31D) furnishes twenty-six signals SCAN_NSW[31:6]. One of the signals SCAN_NSW[31:6] is asserted, or driven high, to indicate this condition and deasserted otherwise. The flip-flop 905 is clocked on the positive edge of the clock signal CLK, and the clear input of the flip-flop 905 receives the RST signal.

The input of the flip-flop 905 is connected to the output of a multi-bit multiplexer 906. The select input of the multiplexer 906 receives an inverted CHECK_SWITCH_ONLY signal. The CHECK_SWITCH_ONLY signal is asserted, or driven high, when the scan state machine 840 is only scanning the status signals STATUS[5:0] or status signals STATUS[127:32] (i.e., ignoring changes in the signals STATUS[31:6]) and deasserted otherwise. The zero input of the multiplexer 906 receives the signals SCAN_NSW [31:6], and the one input of the multiplexer 906 is connected to the output of a multi-bit OR gate 907. One input of the OR gate 907 is connected to the output of a multi-bit AND gate 908, and the other input of the OR gate 907 is connected to the output of a multi-bit AND gate 872.

One input of the AND gate 908 receives the signals BIT_ENABLE[31:6]. The other input of the AND gate 908 is connected to the output of a multi-bit multiplexer 909. If the NEW_CSID signal is asserted, or high, the multiplexer 909 furnishes a twenty-six bit signal equal to "h3FFFFFF." Otherwise, the multiplexer furnishes a twenty-six bit signal equal to "0." One input of the AND gate 872 is connected to the inverted output of the AND gate 908, and the other input of the AND gate 872 receives the signals SCAN_NSW[31:6].

For purposes of storing the logical voltage level of the status signals STATUS[31:6] after every scan, a multi-bit, D-type flip-flop 871 furnishes twenty-six signals LNON_SW[31:6]. One of the signals LNON_SW[31:6] is asserted, or driven high, to indicate this condition and deasserted otherwise. The flip-flop 871 is clocked on the positive edge of the clock signal CLK, and the clear input of the flip-flop 871 receives the RST signal.

The input of the flip-flop 871 is connected to the output of a multi-bit multiplexer 870 which furnishes the signals D_LNON_SW[31:6]. The select input of the multiplexer 870 receives the signal SCAN_END. The zero input of the multiplexer 870 receives the signals LNON_SW[31:6], and the one input of the multiplexer 807 receives the signals SCAN_NSW[31:6].

As shown in FIG. 31B, for purposes of generating the MAX0, MAX1, MAX2, MAX3, MAX4, and MAX5 signals, the serial input logic 804 includes six counters 831a–f, respectively, of common design 831. Each counter 831 is initialized (to a predetermined count value) when an AND gate 892 asserts, or drives high, its output. For the counter 831a, the AND gate 892 receives the signal BIT_ENABLE[0], the signal SW_CHG[0] and an inverted signal QUICK_FILTER. The signal QUICK_FILTER, when asserted, or high, can be used to circumvent the debounce time interval. The QUICK_FILTER signal is normally deasserted, or low. The clock input of the counter 831 is connected to the output of an AND gate 893. For the counter 831a, the AND gate 893 receives the BIT_ENABLE[0] signal, the inverted SW_CHG[0] signal, the inverted GETTING_BYTE signal, and the inverted MAX0 signal. Therefore, for the counter 831a, once the logical voltage of the status signal STATUS[0] changes, each time the serial scan logic 804 scans the status signal STATUS[0], the counter 831a is incremented. When the counter 831a reaches its maximum value, the signal MAX0 is asserted which indicates the debounce time interval has elapsed. If the logical voltage of the status signal STATUS[0] changes during the count, the counter 831a is reinitialized and the count begins again. The other counters 831b–f function in a similar fashion for their corresponding status signals STATUS[5:1].

The HOLD_OFF signal, when asserted, instructs one of the timers 806 to measure a predetermined slow scan interval which puts the serial scan state machine 840 in the slow scan mode. When the timer 806 completes measuring this delay interval, the timer 806 asserts, or drives high, a FTR_TIMEOUT signal which is otherwise deasserted, or negated. The product of this slow scan interval and the number of counts for the counter 831 to reach its maximum value is equal to the debounce time interval (8 ms).

The HOLD_OFF signal is furnished by the output of a JK flip-flop 885. The flip-flop 885 is clocked on the positive edge of the CLK signal, and the clear input of the flip-flop 885 receives the RST signal. The J input is connected to the output of an AND gate 883, and the K input is connected to the output of an AND gate 884. One input of the AND gate 884 is connected to the output of a JK-type flip-flop 896, and the other input of the AND gate 883 receives the SCAN_END signal. One input of the AND gate 884 is connected to the inverted output of the AND gate 883, one input of the AND gate 884 receives the FTR_TIMEOUT signal, and another input of the AND gate 884 receives a SCAN_IN_IDLE signal, which is asserted when the scan state machine 840 is in its IDLE state, as further described below.

The flip-flop 895 is clocked on the positive edge of the CLK signal, and the clear input of the flip-flop 895 receives the RST signal. The J input is connected to the output of a NAND gate 894 which receives the MAX0, MAX1, MAX2, MAX3, MAX4 and MAX5 signals. The K input is connected to the output of an AND gate 826 which is connected to the inverted J input of the flip-flop 895 and receives an inverted SCAN_IN_PROGRESS signal which is asserted when the scan state machine 840 is scanning the status signals STATUS[31:0].

For purposes of generating the CHECK_SWITCH_ONLY signal, the serial scan input logic 804 includes a JK-type flip-flop 864 which furnishes the CHECK_SWITCH_ONLY signal at its non-inverting output and is clocked on the positive edge of the CLK signal. The clear input of the flip-flip 864 receives the RST signal, and the J input of the flip-flop 864 receives a DEBOUNCE signal, which when asserted, or driven high, indicates that one of the logical voltage level of one or more of the status signals STATUS[31:6] has changed. The K input of the flip-flop 864 is connected to the output of a AND gate 865. One input of the AND gate 865 receives the inverted DEBOUNCE signal, and one input of the AND gate 865 receives the SCAN_IN_IDLE signal.

As shown in FIG. 31C, the debounce signal DEBOUNCE is furnished by the non-inverting output of a JK-type flip-flop 860. The flip-flop 860 is clocked by the positive edge of the clock signal CLK, and the clear input of the flip-flop 860 receives the reset signal RST. The J input of the flip-flop 860 receives a signal CHANGE_ON_INPUT signal. The CHANGE_ON_INPUT signal is asserted, or driven high, when a change in one of the status signals STATUS[31:6] is detected at the end of a scan by the serial input logic 804 and deasserted otherwise. The K input is connected to the output of an AND gate 861 which receives a DB_TIMEOUT signal at one of its inputs. The other input of the AND gate 861 receives the inverted CHANGE_ON_INPUT signal. The DB_TIMEOUT signal is asserted by the timers 106 for one cycle of the CLK signal when the debounce time delay (initiated by the assertion of the DEBOUNCE signal) has expired. The assertion of the DB_TIMEOUT signal negates the DEBOUNCE signal on the next positive edge of the CLK signal.

The CHANGE_ON_INPUT signal is furnished by the non-inverting output of a JK-type flip-flop 866 which is clocked on the positive edge of the CLK signal. The clear input of the flip-flop receives the RST signal. The J input of the flip-flop 866 is connected to the output of an AND gate 869 which receives the SCAN_END signal, and another input of the AND gate 869 is connected to the output of an OR gate 867. The OR gate 867 logically ORs all of a set of NSW_CHG[31:6] signals. The bit positions of the signals NSW_CHG[31:6] correspond to the bit positions of the status signals STATUS[31:6] and indicate, by their assertion, whether the corresponding status signal STATUS[31:6] has changed after the last scan. The AND gate 869 further receives the SCAN_END signal. The K input of the flip-flop 866 is connected to the output of an AND gate 868 which receives the inverted SCAN_IN_PROGRESS signal and the inverted output of the AND gate 869. The signals NSW_CHG[31:6] are furnished by the output of a multi-bit, XOR gate 862 which receives the signals D_LNON_SW[31:6] and LNON_SW[31:6].

The non-inverting output of a multi-bit D-type flip-flop 912 furnishes bits SI_DATA[7:0] for the serial data register 815. The clear input of the flip-flop 912 receives the signal RST, and the flip-flop 912 is clocked on the positive edge of the CLK signal. The signal input of the flip-flop 912 is connected to the output of a multi-bit multiplexer 916. The select input of the multiplexer 916 is connected to the output of an AND gate 914, and the zero input of the multiplexer 916 receives the bits SI_DATA[7:0]. The AND gate 914 receives the signals GETTING_BYTE and SHIFT_ENABLE. Thus, when the serial scan logic 804 is not shifting in a requested byte of the status signals STATUS[47:0], the values of the bits SI_DATA[7:0] are preserved.

The one input of the multiplexer 916 is connected to the output of a multi-bit multiplexer 910. The one input of the multiplexer 910 is connected to the output of a multi-bit OR gate 911, and the zero input of the multiplexer is connected to the output of a multi-bit AND gate 915. The select input of the multiplexer 910 receives the signal NEW_CSID.

One input of the AND gate 915 receives the bits SI_DATA[7:0], and an inverting input of the AND gate 915 is connected to the output of a 3×8 decoder 913. The decoder 913 receives the signal BIT[2:0]. One input of the OR gate 911 receives the bits SI_DATA[7:0], and the other input of the OR gate 911 receives the output of the decoder 913.

The serial input logic 804 furnishes five signals RST_SWITCH[5:0] (corresponding to the bit positions of the status signals STATUS[5:0]) to the ON/OFF control logic 820 which indicate, by their assertion, whether the corresponding slot 36a–f should be powered down. The ON/OFF control logic 820 indicates when the slot 36 (indicated by the RST_SWITCH[5:0] signals) has subsequently been powered down by the subsequent assertion of one of five signals CLR_SWITCH_[5:0] signals whose bit positions correspond to the signals RST_SWITCH[5:0]. After receiving the indication that the slot 36 has been powered down, the serial logic 804 then deasserts the corresponding RST_SWITCH[5:0] signal.

The signals RST_SWITCH[5:0] are furnished by the non-inverting output of a multi-bit, D-type flip-flop 891 (FIG. 31B). The clear input of the flip-flop 891 receives the reset signal RST, and the flip-flop 891 is clocked on the positive edge of the clock signal CLK. The input of the flip-flop 891 is connected to the output of a multi-bit OR gate 857 which has one input connected to the output of a multi-bit AND gate 859 and one input connected to the output of a multi-bit AND gate 855. One input of the AND gate 859 is connected to the output of a multiplexer 853, and the other input of the AND gate 859 receives latched slot enable signals LSLOT_EN[5:0] which indicate, by their assertion, whether the corresponding slot 36a–f is powered up. One input of the AND gate 855 receives the signals CLR_SWITCH_[5:0] signals. Another input of the AND gate 855 receives the signals RST_SWITCH[5:0]. Another input of the AND gate 855 is connected to the inverted output of the multiplexer 853.

The zero input of the multiplexer 853 receives a six bit signal indicative of zero. The one input of the multiplexer 853 is connected to the output of a multi-bit AND gate 849. One input of the AND gate 849 receives the signals D_LSWITCH[5:0], and the other input of the AND gate 849 receives the inverted signals L_SWITCH[5:0]. The select input of the multiplexer 853 receives the SCAN_END signal.

For purposes of generating the SI_INTR# signal, the serial scan logic 804 includes a D-type flip-flop 882 which furnishes the serial interrupt signal SI_INTR# at its inverting output. The flip-flop 882 is clocked on the positive edge of the CLK signal, and the clear input of the flip-flip 882 receives the RST signal. The input of the flip-flop 882 is connected to the output of an OR gate 881 which receives thirty two pending interrupt signals PENDING_IRQ[31:0], which indicate, by their assertion, or driving high, whether an interrupt is pending for the corresponding one of the status signals STATUS[31:0]. The signals PENDING_IRQ [31:0] are otherwise deasserted.

Figure 31E:
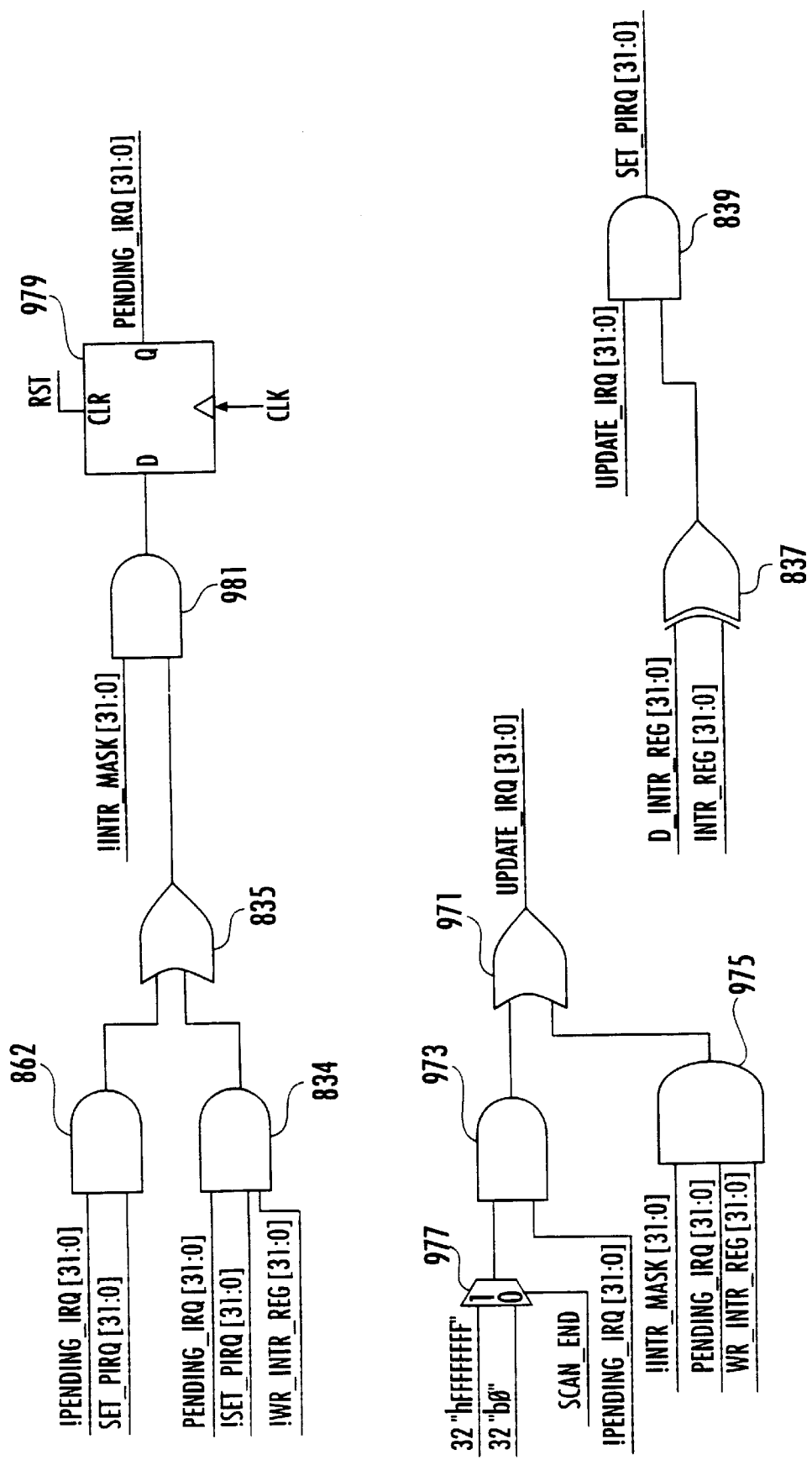

As shown in FIG. 31E, a multi-bit, D-type flip-flop 979 furnishes the signals PENDING_IRQ[31:0] at its non-inverting output. The flip-flop 979 is clocked on the positive edge of the signal CLK signal and receives the signal RST at its clear input. The input of the flip-flop 979 is connected to the output of a multi-bit AND gate 981 which receives inverted interrupt mask signals INTR_MASK[31:0] at one input. The signals INTR_MASK[31:0] are indicative of corresponding bit of the interrupt mask register 810. The other input of the AND gate 981 is connected to the output of a multi-bit OR gate 835. One input of the OR gate 835 is connected to the output of a multi-bit AND gate 862, and the other input of the OR gate 835 is connected to the output of a multi-bit AND gate 834.

The AND gate 862 receives inverted PENDING_IRQ [31:0] signals and signals SET_PIRQ[31:0]. The signals SET_PIRQ[31:0] are asserted to indicate an interrupt request should be generated for the corresponding one of the status signals STATUS[31:0]. Therefore, the signals PENDING_IRQ[31:0] are updated with the signals SET_PIRQ[31:0] if not masked by the signals INTR_MASK [31:0].

The AND gate 834 receives the signals PENDING_IRQ [31:0], inverted signals SET_PIRQ[31:0] and inverted WR_INTR_REG[31:0] signals. The signals WR_INTR_REG[31:0] indicate the write data furnished by the CPU 14 to the interrupt register 800. The CPU clears an interrupt by writing a "1" to the corresponding bit of the interrupt register 800. Therefore, if this occurs, and no new interrupt requests are indicated for the corresponding one of the status signals STATUS[31:0], the corresponding one of the signals PENDING_IRQ[31:0] is cleared.

The signals SET_PIRQ[31:0] are furnished by the output of a multi-bit AND gate 839. One input of the AND gate 839 receives the signals UPDATE_IRQ[31:0]. The other input of the AND gate 839 is connected to the output of a multi-bit XOR gate 837. One input of the XOR gate 837 receives the signals D_INTR_REG[31:0], the other input of the XOR gate 837 receives the signals INTR_REG[31:0]. Therefore, when the bits of the interrupt register 800 transition from one logical state to another, an interrupt request is generated.

For purposes of updating the bits of the interrupt register 800, the signals UPDATE_IRQ[31:0] are furnished to the corresponding load inputs of the register 800. When one of the signals UPDATE_IRQ[31:0] is asserted, or driven high, the corresponding bit is loaded with the corresponding one of the signals D_INTR_REG[31:0].

The signals UPDATE_IRQ[31:0] are furnished by the output of a multi-bit OR gate 971. One input of the OR gate 971 is connected to the output of a multi-bit AND gate 973. One input of the AND gate 973 is connected to the output of a multi-bit multiplexer 977, and the other input of the AND gate 973 receives inverted PENDING_IRQ[31:0] signals. The select input of the multiplexer 977 receives the signal SCAN_END, the one input of the multiplexer 977 receives a thirty-two bit signal indicative of "hFFFFFFFF," and the zero input of the multiplexer 977 receives a thirty-two bit signal indicative of "0." Therefore, at the end of a scan, the signals UPDATE_IRQ[31:0] allow the bits of the interrupt register 800 to be updated that correspond to the asserted PENDING_IRQ[31:0] signals.

Another input of the OR gate 971 is connected to the output of a multi-bit AND gate 975. One input of the AND gate 975 receives the inverted INTR_MASK[31:0] signals, another input of the AND gate 975 receives the signals PENDING_IRQ[31:0], and another input of the AND gate 975 receives the signals WR_INTR_REG[31:0]. Therefore, the CPU 14 can selectively clear bits of the signals PENDING_IRQ[31:0].

The signals D_INTR_REG[5:0] are furnished by the output of a multi-bit multiplexer 830. When the SCAN_END signal is asserted, the signals D_INTR_REG[5:0] are equal to the signals D_LSWITCH[5:0]. When the SCAN_END signal is deasserted, the signals D_INTR_REG[5:0] are equal to the signals LSWITCH[5:0].

The signals D_INTR_REG[31:6] are furnished by the output of a multi-bit multiplexer 845. When the SCAN_END signal is asserted, the signals D_INTR_REG[31:6] are equal to the signals D_LNON_SW[31:6]. When the SCAN_END signal is deasserted, the signals D_INTR_REG[5:0] are equal to the signals LNON_SW[31:6]. The interrupt register 800 takes on new values only when the signal SCAN_END is asserted.

As shown in FIGS. 32A–B, the scan state machine 840 enters an IDLE state after the assertion of the reset signal RST. When not in the IDLE state, the scan state machine 840 toggles the states of the serial input clock signal CSIC_O in order to clock the shift register 82. Furthermore, when not in a first load state LD1, the scan state machine 840 asserts, or drives high, the load signal CSIL_O_ in order to enable the registers 82 and 52 to serially shift the status signals STATUS[127:0] to the SIO circuit 50. In the IDLE state, the scan state machine 840 sets the signal SCAN_DONE equal to zero.

The scan state machine 840 transitions from the IDLE state to the state LD1 when either the signal GETTING_BYTE is asserted or the signal HOLD_OFF is deasserted. Otherwise, the scan state machine 840 remains in the IDLE state. In the LD1 state, the scan state machine 840 asserts, or drives low, the load signal CSIL_O_ which enables the registers 82 and 52 to latch and start receiving the status signals STATUS[127:0].

The scan state machine 840 transitions from the LD1 state, to a load two state LD2. In the LD2 state, the load signal CSIL_O_ is kept asserted which enables the registers 82 and 52 to serially shift the status signals STATUS [127:0].

The scan state machine 840 subsequently transitions to a scan state SCAN. In the SCAN state, the serial scan input logic 804 scans in one of the status signals STATUS[127:0] on each negative edge of the clock signal DIV2CLK. When the signal STOP_SCAN is asserted, the scan state machine 840 transitions back to the IDLE state. The STOP SCAN signal is asserted when either the desired byte of the status signals STATUS[127:0] has been shifted into the serial data register 815; the lever status signals STATUS[5:0] have been scanned in and the serial interrupt signal SI_INTR# has been asserted; or all of the status signals STATUS[31:0] have been shifted in. In the SCAN state, the SCAN_DONE signal is set equal to the STOP_SCAN signal.

As shown in FIG. 33A, the ON/OFF control logic 820 includes an ON/OFF state machine 998 which receives the signals RST_SWITCH[5:0], SLOT_EN[5:0] and SLOT_RST[5:0]. Based on the conditions indicated by these signals, the ON/OFF state machine 998 indicates and controls the appropriate power up or power down sequences. The ON/OFF state machine 998 furnishes control signals to control logic 999.

The ON/OFF state machine 998 furnishes a serial output update signal SO_UPDATE to the serial output logic 824. When the signal SO_UPDATE is asserted, or driven high, the serial output logic 824 begins the shifting phase and serially shifts control data, via the signal CSOD_O, to the register 80. The serial output logic 824 indicates completion of the shifting phase by asserting a signal SO_UPDATE_DONE which is received by the ON/OFF state machine 998. The ON/OFF state machine 998 subsequently updates the control signals POUT[39:0] by negating, or clocking, the latch signal CSOLC_O which is received by the register 80.

The control logic 999 furnishes the signals PWREN[5:0], CLKEN#[5:0], BUSEN#[5:0] and RST#[5:0] to the serial output logic 824. The control logic 999 also furnishes a PCI bus request signal CAYREQ# to and receives a PCI bus grant signal CAYGNT# from the arbiter 124. The ON/OFF control logic 820 asserts, or drives low, the signal CAYREQ# to request the PCI bus 32, and when the arbiter 124 asserts, or drives low, the signal CAYGNT#, the arbiter 124 has granted control of the PCI bus 32 to the ON/OFF control logic 820.

As shown in FIGS. 33B–G, the ON/OFF state machine 998 enters an idle state IDLE upon assertion of the reset signal RST. If not idle, the ON/OFF state machine 998 controls one of three sequences: the power down sequence, the power on sequence, or the one pass sequence used to update the control signals POUT[39:0] as indicated by the slot enable 817 and LED control (not shown) registers. The ON/OFF state machine 998 asserts, or drives high, the load signal CSOLC_O for one cycle of the clock signal CLK of the register 80 until the ON/OFF state machine 998 determines the control signals POUT[39:0] are to be updated. When the control signals POUT[39:0] are updated, the ON/OFF state machine 998 negates the signal CSOLC_O which updates the control signals POUT[39:0].

The ON/OFF state machine 998 begins the power down sequence when either the software requests a power down of at least one of the slots 36, as indicated by the deassertion of the signals SLOT_EN[5:0]; or the serial scan input logic 804 determines at least one of the slots 36*a*–*f* should undergo the power down sequence, as indicated by the assertion of the signals RST_SWITCH[5:0]. To begin the power down sequence, the ON/OFF state machine 998 asserts the SO_UPDATE signal to begin a shifting phase and transitions from the IDLE state to a RSTON state.

During the RSTON state, the control logic 999 negates the reset signals RST#[5:0] for the slots 36 that are to be powered down, and the serial output logic 824 serially shifts the reset signals RST#[5:0] to the output register 80. The ON/OFF state machine 998 also negates the signal SO_UPDATE. Once all forty-control signals are shifted by the serial output logic 824 to the register 80, as indicated by the assertion of the signal SO_UPDATE_DONE, the ON/OFF state machine 998 transitions from the RSTON state to an OFF_ARB1 state.

In the OFF_ARB1 state, the ON/OFF state machine 998 requests control of the secondary PCI bus 32 by asserting the request signal CAYREQ#. The ON/OFF state machine 998 then transitions to an OFF_WGNT1 state where it waits for the grant of the secondary PCI bus 32. When the arbiter 124 grants control of the bus 32, as indicated by the assertion of the CAYGNT# signal, the ON/OFF state machine 998 negates the signal CSOLC_O for one cycle of the signal CLK to update the control signals POUT[39:0] and transitions to an OFF_LCLK1 state.

In the OFF_LCLK1 state, the ON/OFF state machine 998 asserts the signal SO_UPDATE to begin another shift phase. The ON/OFF state machine 998 transitions from the OFF_LCLK1 state to a bus off state BUSOFF. During the BUSOFF state, the control logic 999 deasserts, or drives high, the bus enable signals BUSEN#[5:0] for the slots 36 that are to be powered down, and the serial output logic 824 serially shifts the bus enable signals BUSEN#[5:0] to the output register 80. The ON/OFF state machine 998 also negates the signal SO_UPDATE. Once all forty-control signals are shifted by the serial output logic 824, as indicated by the assertion of the signal SO_UPDATE_DONE, the ON/OFF state machine 998 transitions from the BUSOFF state to an OFF_ARB2 state where the state machine 998 once again requests control of the secondary PCI bus 32. The state machine 998 then transitions to an OFF_WGNT2 state where it waits for the grant of the PCI bus 32. Once the grant is received, the state machine 998 transitions to an OFF_LCLK2 state where the control signals POUT[39:0] are updated by negating the signal CSOLC_O for one cycle of the signal CLK. The state machine 998 then transitions to a clock off state CLKOFF.

During the CLKOFF state, the control logic 999 deasserts, or drives high, the clock enable signals CLKEN#[5:0] for the slots 36 that are to be powered down. The bus enable signals BUSEN#[5:0] do not change, and the serial output logic 824 serially shifts the clock enable signals CLKEN# [5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the CLKOFF state to an OFF_ARB3 state, where the state machine 998 once again requests control of the PCI bus 32. The state machine 998 then transitions to an OFF_WGNT3 state where it waits for the grant of the PCI bus 32. Once the grant is received, the state machine 998 transitions to an OFF_LCLK3 state where the control signals POUT[39:0] are updated by negating the signal CSOLC_O for one cycle of the signal CLK. The state machine 998 then transitions to a power off state PWROFF.

During the PWROFF state, the control logic 999 deasserts, or dries low, the power enable signals PWREN

[5:0] for the slots 36 that are to be powered down. The signals RST#[5:0], BUSEN#[5:0], and CLKEN#[5:0] do not change, and the serial output logic 824 serially shifts the power enable signals PWREN[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the PWROFF state to an OFF_LCLK4 state where the signals POUT[39:0] are updated by negating the signal CSOLC_O for one cycle of the signal CLK. The state machine 998 then transitions to the IDLE state which completes the power down sequence.

If a power down sequence is not required, the ON/OFF state machine 998 then determines if the power up sequence is required. If either the software has requested at least one of the slots 36 to powered up or a power up of the expansion box 30 is pending, then the ON/OFF state machine 998 transitions from the IDLE state to a power on PWRON state to begin the power on sequence. To begin the power on sequence, the ON/OFF state machine 998 asserts the SO_UPDATE signal to begin a shift phase and transitions from the IDLE state to a power on state PWRON.

During the PWRON state, the control logic 999 asserts the power enable signals PWREN[5:0] for the slots 36 that are to be powered up, and the serial output logic 824 serially shifts the power enable signals PWREN[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the PWRON state to a timer 806 initialization state LDCNT1 and negates the load signal CSOLC_O to update the control signals POUT[39:0].

In the LDCNT1 state, the ON/OFF state machine 998 initializes the timers 806 so that the timers 806 provide an indication when a predetermined stabilization delay interval has expired. The stabilization delay interval allows sufficient time for the card 807 that is being powered up to stabilize once the voltage level $V_{ss}$ is furnished to the card 807. In the LDCNT1 state, the ON/OFF state machine 998 also asserts the signal CSOLC_O. The ON/OFF state machine 820 transitions from the LDCNT1 state to a CLKON state.

During the CLKON state, the control logic 999 asserts, or drives low, the clock enable signals CLKEN#[5:0] for the slots 36 that are to be powered up. The PWREN[5:0] signals remain unchanged, and the serial output logic 824 serially shifts the clock enable signals CLKEN#[5:0] to the output register 80. The ON/OFF state machine 998 also negates the signal SO_UPDATE. Once the stabilization delay interval has expired, the ON/OFF state machine 998 transitions from the CLKOFF state to an ON_ARB1 state.

In the ON_ARB1 state, the ON/OFF state machine 998 requests control of the secondary PCI bus 32 by asserting the request signal CAYREQ#. The ON/OFF state machine 998 then transitions to an ON_WGNT1 state where it waits for the grant of the secondary PCI bus 32. Once control of the bus 32 is granted, as indicated by the assertion of the CAYGNT# signal, the ON/OFF state machine 998 negates the signal CSOLC_O to update the control signals POUT[39:0] and transitions to an ON_LCLK1 state where the signals POUT[39:0] are updated.

The ON/OFF state machine 998 transitions from the ON_LCLK1 state to a LDCNT2 state where the timers 806 are initialized so that the timers 806 provide an indication when another predetermined stabilization delay interval has expired. This delay interval is used to allow the clock signal on the card 807 being powered up to stabilize before the power up sequence continues. The ON/OFF state machine 998 transitions from the LDCNT2 state to a bus on state BUSON.

During the BUSON state, the control logic 999 asserts, or drives low, the bus enable signals BUSEN#[5:0] for the slots 36 that are to be powered down. The signals CLKEN#[5:0] and PWREN[5:0] remain unchanged, and the serial output logic 824 serially shifts the bus enable signals BUSEN#[5:0] to the output register 80. The ON/OFF state machine 998 also negates the signal SO_UPDATE. Once the stabilization delay interval has expired, the ON/OFF state machine 998 transitions from the BUSON state to an ON_ARB2 state where the state machine 998 once again requests control of the PCI bus 32. The state machine 998 then transitions to an ON_WGNT2 state where it waits for the grant of the bus 32. Once the grant is received, the state machine 998 transitions to an ON_LCLK2 state where the signals POUT[39:0] are updated by negating the signal CSOLC_O for one cycle of the signal CLK. The state machine 998 then transitions to a reset off state RSTOFF.

During the RSTOFF state, the control logic 999 asserts, or negates, the reset signals RST#[5:0] for the slots 36 that are to be powered up, depending on their respective SLOT_RST_[5:0] signals. The signals CLKEN#[5:0], PWREN[5:0] and BUSEN#[5:0] remain unchanged, and the serial output logic 824 serially shifts the reset signals RST#[5:0] to the output register 80. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the RSTON state to an ON_ARB3 state where the state machine 998 once again requests control of the bus 32. The state machine 998 then transitions to an ON_WGNT3 state where it waits for the grant of the bus 32. Once the grant is received, the state machine 998 transitions to an ON_LCLK3 state where the signals POUT[39:0] are updated by negating the signal CSOLC_O for one cycle of the signal CLK. The state machine 998 then transitions back to the IDLE state.

If neither the power up sequence nor the power down sequence is required, the ON/OFF state machine 998 then determines if a one pass sequence is needed to update selected ones of the signals POUT[39:0]. If the GO_UPDATE signal is asserted, and if any bits of the slot enable register 817 or slot reset register 819 changes, then the ON/OFF state machine 998 transitions to a ONEPASS state and asserts the SO_UPDATE signal.

The ON/OFF state machine 998 remains in the ONEPASS state until the forty control signals have been shifted to the register 80. The ON/OFF state machine 998 then transitions to an OP_ARB state where the state machine 998 requests control of the PCI bus 32 by asserting the signal CAYREQ#. The state machine 998 then transitions to an OP_WGNT state where it waits for the grant of the bus 32. Once the grant is received, the state machine 998 transitions to an OP_LCLK state where the signals POUT[39:0] are updated by negating the signal CSOLC_O for one cycle of the signal CLK. The state machine 998 then transitions back to the IDLE state.

As shown in FIG. 34, the serial output logic 824 includes a shift output bit counter 921 that provides a six bit counter output signal BIT_CNTR[5:0] which tracks the control signal shifted out of the serial output logic 824 via the signal CSOD_O. When the signal BIT_CNTR[5:0] is equal to a six digit number equivalent to "39" then a signal MAX_CNT is asserted. The signal MAX_CNT is provided to the input of an AND gate 922. The AND gate 922 further receives a signal SHIFT4 which is asserted when the output shift state machine 920 enters its SHIFT4 state, further described below. The output of the AND gate 922 provides the signal SO_UPDATE_DONE.

The output shift state machine 920 furnishes an increment counter signal INC_CNTR to the bit counter 921. When the INC_CNTR signal is asserted, the bit counter 921 increments the value represented by the signal BIT_CNTR[5:0]. When a load counter signal LOAD_CNTR is asserted or when the RST signal is asserted, then the output of an OR gate 925, connected to a clear input of the bit counter 921, clears the signal BIT_CNTR[5:0].

The signal BIT_CNTR[5:0] is furnished to the select input of a multi-bit multiplexer 924 that furnishes the signal CSOD_O. The zero through eleven inputs of the multiplexer 924 receive the LED control signals LEDS[11:0]. The twelve through fifteen inputs of the multiplexer 924 receive general purpose output signals GPOA[3:0]. The sixteen through twenty-one inputs receive the reset signals RST#[5:0]. The twenty-two through twenty-seven inputs receive the clock enable signals CLKEN#[5:0]. The twenty-eight through thirty-three inputs receive the bus enable signals BUSEN#[5:0]. The thirty-four through thirty-nine inputs receive the power enable signals PWREN[5:0].

As shown in FIGS. 35A–B, the output shift state machine 920 enters an IDLE state when the signal RST is asserted. If the signal SO_UPDATE is asserted, then the output shift state machine 920 transitions from the IDLE state to a SHIFT1 state.

Because the output shift state machine 920 is clocked on the positive edge of the PCI clock signal CLK, the output shift state machine 920 transitions through a SHIFT1 state, a SHIFT2 state, a SHIFT3 state and a SHIFT4 state to generate the clock signal CSOSC_O that is one fourth of the frequency of the clock signal CLK. During the SHIFT1 and SHIFT2 states the clock signal CSOSC_O is negated, or low, and during the SHIFT3 and SHIFT4 states, the clock signal CSOSC_O is asserted, or high. When the current shift phase is completed, as indicated by the assertion of the signal MAXCNT, the shift state machine 920 returns to the IDLE state and the clock signal CSOSC_O is asserted until the beginning of the next shifting phase.

As shown in FIG. 36, a HANG_PEND signal is received by the clear input of the register 80. The assertion, or driving high, or the HANG_PEND signal asynchronously clears the appropriate output control signals POUT[39:0] to power down all slots 36 when the PCI bus 32 is in a locked up condition, as further described below.

FAULT ISOLATION

The bus watcher 129 can detect for a hang condition on the secondary PCI bus 32. If a hang condition is detected, the bus watcher 129 sets a bus hang pending bit, which causes the SIO 50 to power down the slots on the secondary PCI bus 32 and a non-maskable interrupt (NMI) to be transmitted to the CPU 14. The CPU 14 responds to the NMI by invoking an NMI routine to isolate the slot(s) causing the hang condition. Once identified, the defective slot(s) are disabled or powered off.

For software diagnostic purposes, the bus watcher 129 in the downstream bridge chip 48 includes a bus history FIFO and a bus vector FIFO. When the secondary PCI bus 32 is functioning properly, the bus history information, which includes an address group (including the PCI address, PCI command signals, PCI master number, and the address parity bit) and a data group (including the PCI data, byte enable signals C/BE[3:0]_, parity error signal PERR_, the data parity bit, a burst cycle indication bit, and a data valid flag), are recorded by the bus watcher 129 in each transaction. When the PCI signal FRAME_ is asserted on the secondary PCI bus 32 to start a bus transaction, the address group and each subsequent data group are stored in the bus history FIFO. If the transaction is a burst transaction, then the burst cycle indication bit is set active on the second data phase. After the first data phase, the address field in the address group associated with the subsequent data groups in the burst transaction is incremented by 4 and the new address group and data group are stored in the next location of the bus history FIFO. If data is not transferred because of a retry condition or a disconnect-without-data condition, the valid data indication bit is set low.

Both the address group and the data group flow through a 2-stage pipeline to allow time for the data group to collect the data parity bit and data parity error bit, and stop the recording process when a data parity error occurs before the next address group is stored. If the bus hangs in the middle of a write data phase, the data is stored, and a bus-hang status bit is set in a bus-hang indication register 482 (FIG. 42) accessible via configuration space. If the bus hangs in the middle of a read data phase, the data is marked as not valid, and the bus-hang bit is set.

Bus state vectors are assembled and stored in the bus vector FIFO, including the following PCI control signals: slot request signals REQ[7:0]_; slot grant signals GNT[7:0]_; the FRAME_ signal; the PCI device select signal DEVSEL_; the PCI initiator ready signal IRDY_; the PCI target ready signal TRDY_; the STOP_ signal; the PCI parity error signal PERR_; the PCI system error signal SERR_; and the LOCK_ signal. On each PCI clock in which the bus state vector changes, i.e., any one of the listed signals changes state, the new vector is stored into the bus vector FIFO.

The bus watcher 129 includes a watch-dog timer 454 (FIG. 40) to determine whether the secondary bus 32 has locked up. If the watch-dog timer 454 expires, then the bus 32 has hung. The following are examples of bus-hang conditions that can be detected by the watch-dog timer 454: The FRAME_ signal is stuck high or low; the signal TRDY_ is not asserted in response to IRDY_; the PCI arbiter 124 does not grant the bus to any master; and a master requesting the bus 32 keeps getting retried.

When the watch-dog timer 454 expires, the bus hang pending bit is set active in the bus-hang indication register 482. When set active, the bus hang pending bit disables the bus watcher 129. Next, the slot enable bits in the SIO 50 are cleared, causing the slots to be powered off. The SIO 50 then asserts the system error signal SERR_.

To isolate the cause of a bus-hang condition, the system error signal SERR_ causes the interrupt logic in the system to issue the NMI to the CPU 14. Referring to FIG. 37, the NMI handler first determines 400 if the bus hang pending bit is set by reading the bus hang indication register 482. If so, the NMI handler calls 401 a BIOS isolation handler for isolating the defective slot or slots. Otherwise, other NMI procedures are called 402.

As a fail-safe mechanism, the computer system also includes the automatic server recovery (ASR) timer 72 which is cleared when certain software routines are executed by the operating system. If the ASR timer expires (e.g., after 10 minutes), that indicates that the operating system has locked up. The secondary PCI bus 32 hanging may be the cause of the system lock up, in which case the NMI may never get to the CPU 14. If the ASR timer expires, then an ASR-generated reboot occurs. The ASR timer also ensures that if the BIOS isolation handler is in the middle of isolating a faulty slot on the PCI bus 32, and the computer system hangs to cause the ASR reboot, the isolate routine can pick up where it left off just before the ASR time-out event.

Referring to FIG. 38, a BIOS ASR handler is invoked in response to an ASR reboot condition. The ASR handler first checks 444 to determine if an isolation-in-progress event variable (EV) contains active information indicating that the isolation process was in progress prior to the ASR time-out event. The isolation-in-progress EV is stored in non-volatile memory (NVRAM) 70 and includes header information which is set active to indicate that the isolation process has started. The isolation-in-progress EV is also updated with the current state of the isolation process, including the slots which have been checked, the slots which are defective, and the slots which have been enabled.

If the isolation process was in progress, the BIOS ASR handler re-enables 448 all slots except the ones that were enabled immediately prior to the ASR event, which is determined from the isolation-in-progress EV. The enabled slots prior to the ASR reboot were probably the cause of the ASR lock-up. As a result, those slots are disabled (i.e., powered off). Next, the disabled slot numbers are logged 450 as fail status information stored in the NVRAM, and the isolation-in-progress EV is cleared. The BIOS ASR handler then checks 452 to determine if the bus-hang pending bit is set. If so, the bus-hang pending bit is cleared (by performing an I/O cycle on the secondary PCI bus 32) to re-enable the bus watcher 129.

If the isolation-in-progress EV is not set 444 to the active state, indicating that the isolation process was not running when the ASR event occurred, the routine checks 446 to determine if the bus-hang pending bit is set. If not, then the BIOS ASR handler is done. If the bus-hang pending bit is set 446, indicating that a bus-hang condition occurred before the ASR event, the BIOS ASR handler calls the BIOS isolation handler to isolate the faulty slot or slots.

Referring to FIG. 39, the BIOS isolation handler first logs 408 to the fail status information portion of the NVRAM the bus history and bus state vector information stored in the history and vector FIFOs in the bus monitor 127. The bus history and bus state vector FIFOs are read and their contents transferred to the NVRAM. Next, the header information of the isolation-in-progress event variable is set 410 to indicate that the isolation process is in progress. The bus-hang pending bit is cleared (by writing to a predetermined configuration address) to re-enable the bus watcher 129. Next, the isolation routine re-enables 412 (i.e., powers up) the first populated slot (i.e., slot with a PCI device connected), and reads and writes from the PCI configuration space of the device. A slot is re-enabled by writing to the slot enable register 817 (FIG. 29). Next, the routine determines 414 if the bus-hang pending bit is set active, indicating that the device connected to the slot caused the bus to hang while reading from it. If not, the routine determines 416 if all populated slots have been checked. If not, the first populated slot is disabled 418 and the isolation-in-progress EV is updated 420 to indicate that the first populated slot has been tried by the BIOS isolation handler. If the routine determines 414 that the bus-hang pending bit is set active, the slot is indicated as being failed (e.g., by setting active a fail flag for that slot) in the fail status information portion of the NVRAM. Next, the loop consisting of steps 412, 414, 416, 418 and 420 is performed until all populated slots have been checked.

If all populated slots have been checked 416, the routine checks 424 to determine if any slot is indicated as failed in the fail status information portion of the NVRAM. If so, the routine 398 re-enables 426 only the non-failing slots. Then, the isolation-in-progress EV is cleared 428, and the BIOS isolation routine is complete.

If none of the slots are indicated 424 as failed, then that indicates that the bus-hang condition is not caused by a single slot, but may be caused by more than one device being active at the same time. To confirm that, the BIOS isolation handler first disables (i.e., powers down) 430 all the slots, and updates the isolation-in-progress EV with this information. Next, the BIOS isolation handler clears 431 a count variable N to zero and sets a count variable I to the value of N. The count variable N represents the count of the populated slots.

The BIOS isolation handler re-enables (i.e., powers up) 432 the populated slot I (which is initially slot N) and reads and writes to its PCI configuration space. The handler then checks 438 to determine if the bus-hang pending bit is set. If not, the handler decrements 433 the variable I and checks 434 if the variable I is greater than or equal to zero. If so, the handler updates 435 the isolation-in-progress EV and re-enables 432 and reads and writes the next populated slot I. The handler then checks 438 if the bus hang pending bit is set for this next slot. In this manner, for each slot N that is to be enabled, the previously enabled slots are also powered on one at a time to determine if a combination of slots is causing the failure.

If the variable I is determined 434 to be less than zero, then the handler checks 436 to determine if all populated slots have been enabled. If not, the variable N is incremented 437, the isolation-in-progress EV is updated 439, and the variable I is again set 441 equal to the value of N.

If the bus hang pending bit is set 438 active, then potentially two slots are disabled 440: slot N (which is the slot currently being enabled) and slot I (which is the slot currently being read from and written to). If the value of I and N are the same, then only slot N is disabled.

If the handler determines 436 that all populated slots have been enabled (and a failure could not be identified), then the handler logs 442 in the NVRAM its inability to isolate the failure. Next, the handler clears 428 the isolation-in-progress EV.

Referring to FIG. 40, the watch-dog timer 454, provides output signals WD_TMR_OUT[17:0] (timer count value), HANG_PEND (bus hang condition present), EN_CAP (the software has enable capture of the bus and vector history information), TIME_OUT (the watch-dog timer 454 has timed out), a signal HANG_RCOVR_EN (set high by software to enable the hang recovery logic in the bus watcher 129 and in the SIO 50) and a signal CAP_ILLEG_PROT (to indicate an illegal cycle on the PCI bus 32).

The signal HANG_PEND is provided to the SIO 50 to shut down the secondary bus slots. The input signals to the watch-dog timer 454 include some of the PCI bus signals, a signal WRT_EN_CAP_1 (pulsed high by software to re-enable the capture of the bus history and bus vector information by the fault isolation block 129), and a power-good indicator signal SYNC_POWEROK (indicating that power in the computer system is stable).

A bus hang recovery state machine 456 receives the signals HANG_PEND, TIME_OUT, and HANG_

RCOVR_EN from the watch-dog timer 454. The recovery state machine 456 also receives some of the PCI signals. The output signals from the bus hang recovery state machine 456 includes a device select signal DEVSEL_O for driving the PCI signal DEVSEL_, a signal STOP_O for driving the PCI signal STOP_, a signal SERR_EN which enables assertion of the system error signal SERR_, a signal BR_M_ABORT (indicating that the bus watcher 129 has recovered with a master abort), a signal BR_T_ABORT (indicating that the bus watcher 129 has recovered with a target abort), and a signal RCOVR_ACTIVE (for indicating when the bus hang recovery state machine 456 is active). The bus hang recovery state machine 456 ensures that the secondary PCI bus 32 is brought back to the idle state to allow the software to isolate the faulty slot. When the hang condition is detected, the SIO 50 powers down the secondary bus slots, which would automatically place the bus 32 into the idle state if one of the slot devices was the bus master when the hang condition occurred. However, if one of the slot devices was the target (and the bridge chip 48 was the master) when the bus hang occurred, then the bridge chip 48 would remain on the bus. To take the bridge chip off the bus, the recovery state machine 456 forces a retry cycle on the PCI bus 32 by asserting the signal STOP_.

A bus history capture block 458 monitors the PCI bus 32 for transactions, and presents the bus history information (including the address and data) on to output signals BUS_HIST_DATA3[31:0] (the bus history address), BUS_HIST_DATA2[31:0] (the bus history data), and BUS_HIST_DATA1[15:0] (parity error signal IPERR_, parity bit PAR, valid data bit VALID_DAT, address parity bit ADDRPAR, burst indicator BURST, master number MASTER[2:0], byte enable bits CBE[3:0]_, and command bits CMD[3:0]). The bus history capture block 458 asserts a signal HIST_RDY when data is available on the BUS_HIST_DATA signals, which is true at the end of each data phase in a normal transaction, or if the transaction is terminated with a master abort, a retry, while the assertion of the time out signal TIME_OUT.

A bus vector capture block 460 captures the states of certain PCI control signals when any of the those control signals changes state. The vector is captured and output as signals BUS_VECT_DATA[20:0], which contain the request signals !REQ[7:0]_, grant signals !GNT[7:0]_, time out signal TIME_OUT, lock signal LOCK_, system error signal SERR_, parity error signal PERR_, stop signal STOP_, target ready signal TRDY_, initiator ready signal IRDY_, device select signal DEVSEL_, and frame signal FRAME_. The bus vector capture block 460 asserts a signal VECT_RDY if any of the bus vector BUS_VECT_DATA [24:0] has changed or the watch-dog timer 454 has expired (TIME_OUT is high).

The bus history and bus vector signals are presented to the inputs of bus watcher FIFOS, which includes a 2-deep bus history FIFO and a 4-deep vector history FIFO. The outputs of the bus history FIFOs are presented as signals BUS_HIST_REG1[31:0], BUS_HIST_REG2[31:0], and BUS_HIST_REG3[31:0]. The outputs of the vector history FIFO are presented as signals BUS_VECT_REG[31:0]. The system software reads the outputs of the bus history FIFO by generating an I/O read cycle which causes a signal BUS_HIST_RD1 to be asserted, and reads the outputs of the vector FIFO by generating an I/O read cycle which causes a signal BUS_VECT_RD to be asserted.

Referring to FIG. 41, the recovery state machine 456 begins in state IDLE when the signal SYNC_POWEROK is negated low, indicating that power is not yet stable. The state machine remains in state IDLE while the signal HANG_PEND is low. In state IDLE, signals BR_M_ABORT, BR_T_ABORT and RCOVR_ACTIVE are negated low. The signal RCOVR_ACTIVE is active high in the other states WAIT, ABORT, and PEND_OFF. If the signal SET_HANG_PEND is asserted high, the state machine transitions to state WAIT. In the transition, the signal DEVSEL_O is set equal to the inverted state of the device select signal DEVSEL_. This insures that if the device select signal DEVSEL_ is asserted by a target before the bus hang condition, the recovery state machine 456 maintains the signal DEVSEL_ asserted. In state WAIT, the signal DEVSEL_O is set equal to the state of the signal DEV_SEL_WAS, which is set high if the signal DEVSEL_ is asserted by a target before the state machine transition to the WAIT state.

From state WAIT, the bus hang recovery state machine 456 transitions to the PEND_OFF state if a signal PCI_IDLE is asserted, indicating that the PCI bus 32 has gone idle (i.e., signals FRAME_ and IRDY_ are both negated high). In the transition, the signal BR_M_ABORT is set high to indicate that one of the slot devices was the master before the hang condition and powering down the slot device caused the PCI bus to go idle. A signal SERR_EN is also set high to enable assertion of the system error signal SERR_ or if INTA_ is enabled.

If a slot device was a target before the bus hang condition, then the bus master will remain on the PCI bus 32. To force the bus master off the PCI bus 32, the bus hang recovery state machine 456 issues a retry on the PCI bus 32. A counter 457 counts a predetermined number of PCLK periods (e.g., 15 PCLK period) after the signal HANG_PEND is asserted high. The 15 PCLK periods insure sufficient rise time on FRAME_ and IRDY_ to give the signals time to go back to their idle states. When 15 PCLK periods have elapsed, the counter 457 asserts the signal TIME_OUT15. If the signal TIME_OUT15 is asserted high, and the signal PCI_IDLE remains low, then the state machine transitions from state WAIT to state ABORT. In the transition, the signal STOP_O is asserted high to drive the PCI STOP_ signal active to retry the bus master. The state machine remains in state ABORT while the bus master maintains the signal FRAME_ asserted low. In state ABORT, the signal STOP_O is maintained high. Once the bus master deasserts the FRAME_ signal in response to the retry condition, the state machine transitions from state ABORT to state PEND_OFF. In the transition, the signal BR_T_ABORT is asserted high to indicate that the target abort was necessary after the bus hang condition to place the bus 32 in the idle state. The signal SERR_EN is also asserted high to enable assertion of the signal SERR_ or if INTA_ is enabled. The state machine remains in state PEND_OFF until the signal WRT_EN_CAP_1 has been asserted high at which time it transitions back to state IDLE.

System software can read the value of the BR_M_ABORT and BR_T_ABORT signals to determine if the slot device involved in the bus hang was a master or a slave.

Referring to FIG. 42, the watch-dog timer 454 includes an 18-bit LSFR counter 464 which is clocked by the signal PCLK. The counter 464 is enabled when the output of an AND gate 467 is asserted high, which occurs when a new master issues a request (ANY_REQ is high), the bus cycle has started (signals FRAME_ and IRDY_ are both asserted), the enable capture signal EN_CAP is asserted, and the signal TIME_OUT is low. An OR gate 466 receives the signal ANY_REQ and the inverted states of signals FRAME_ and IRDY_. The AND gate 467 receives the output fo the OR gate 466, the signal EN_CAP, and the inverted state of the signal TIME_OUT. The output of the counter drives signals WD_TMR_OUT[17:0] and is cleared when a time out condition is detected (TIME_OUT is high), a data transfer has taken place (both signals IRDY_ and TRDY_ are asserted low), or all output bits of the counter 464 are high (which is an illegal condition). The clear condition is indicated by an OR gate 470, which receives the signal TIME_OUT, the bit-wise AND of the signals WD_TMR_OUT[17:0], and the output of an AND gate 472. The inputs of the AND gate 472 receive the inverted state of the signal IRDY_ and the inverted state of the signal TRDY_.

The signal TINE_OUT is asserted high by a time out detector 474 when the timer signals WD_TMR_OUT [17:0] count to the binary value 1000000000000000. The signal TIME_OUT is provided to one input of an OR gate 476, whose output is connected to the input of an AND gate 478. The other input of the AND gate 478 receives the inverted state of a signal WRT_EN_CAP_1 (controlled by software to re-enable the bus history and bus vector capture), and its output is connected to the D input of a D-type flip-flop 488. The flip-flop 488 is clocked by the signal PCLK and drives an output signal WD_TIME_OUT, which is fed back to the other input of the OR gate 476. The flip-flop 488 is cleared when the power-good signal SYNC_POWEROK is negated. Thus, an ASR reset does not clear the signal WD_TIME_OUT.

The HANG_PEND signal is asserted high by a D-type flip-flop 482, whose D input is connected to the output of an AND gate 484 and which is clocked by the signal PCLK. One input of the AND gate 484 is connected to the output of an OR gate 486, and its other input receives the inverted state of the signal WRT_EN_CAP_1. One input of the OR gate 486 is connected to the signal HANG_PEND, and the other input is connected to the output of an AND gate 488. The inputs of the AND gate 488 receive the signal TIME_OUT and the enable signal HANG_RCOVR_EN. Thus, if system software enables bus hang recovery (HANG_RCOVR_EN is high), then a time-out condition will cause the signal HANG_PEND to be set high. The signal HANG_PEND is cleared when the system software causes the signal WRT_EN_CAP_1 to be asserted (by performing an I/O cycle on the bus 32) or when the signal SYNC_POWEROK is negated. The bit HANG_PEND is not negated by an ASR reboot.

The enable capture signal EN_CAP is generated by a D-type flip-flop 490, whose D input receives the output of an AND gate 492. One input of the AND gate 492 is connected to the output of an OR gate 494, and its other input is connected to the inverted state of a signal CLR_EN_CAP. One input of the OR gate 494 is routed back to the signal EN_CAP and the other input receives the signal WRT_EN_CAP_1. The flip-flop 490 is clocked by the signal PCLK and set high when the signal SYNC_POWEROK is negated low. Once the signal EN_CAP is set high by the software via the signal WRT_EN_CAP_1, it is maintained high. The signal CLR_EN_CAP is asserted to clear the signal EN_CAP (disable capture of information), which occurs when a time-out has occurred (TIME_OUT is high), a system error has occurred (SERR_ is low), a parity error has occurred (PERR_ is low), or an illegal bus protocol has been detected (CAP_ILLEG_PROT is high).

The signal CAP_ILLEG_PROT is generated by a D-type flip-flop 483, whose D input receives the output of an AND gate 485. One input of the AND gate receives the inverted state of the signal WRT_EN CAP_1, and the other input receives the output of an OR gate 487. The OR gate 487 receives the signals CAP_ILLEG_PROT and SET_ILLEG_PROT. The signal SET_ILLEG_PROT is asserted when capture is enabled (EN_CAP is high), the state machine 456 is not active (RCOVR_ACTIVE is low), the bus is idle, and any of signals DEVSEL_, TRDY_, or IRDY_ is asserted low. This condition is an illegal condition, which triggers capture of the bus history and bus vector information.

Referring to FIG. 43, the bus history ready signal HIST_RDY is generated by a D-type flip-flop 502, which is clocked by the signal PCLK and cleared by the signal RESET. The D input of the flip-flop 502 is connected to the output of an OR gate 504, whose inputs receive the signal TIME_OUT, a signal M_ABORT (master abort signal delayed by one PCLK), the output of an AND gate 506, and the output of an AND gate 508. The AND gate 506 asserts its output if a retry, disconnect C or target abort cycle is present on the secondary bus 32 (the signal FRAME_, the inverted state of the signal IRDY_, the inverted state of the signal STOP_, and the inverted state of the signal DSC_A_B are all true). The AND gate 508 asserts its output when a completed data transfer has occurred (the signals IRDY_ and TRDY_ are both low). Thus, the bus history information is loaded into the bus history FIFOs when the watch-dog timer 454 times out, a retry, disconnect C, or target abort condition is present, the master has aborted the cycle, or a cycle has successfully completed.

The valid data indication signal VALID_DAT is generated by a D-type flip-flop 510, which is clocked by the signal PCLK and cleared by the signal RESET. The D input of the flip-flop 510 is connected to the output of a NOR gate 512, which receives the signal TIME_OUT, master abort signal M_ABORT, and the output of the AND gate 506. Thus, data is valid unless a time out is detected, a master abort cycle is issued, or a retry, disconnect C, or target abort cycle is present.

The signal VECT_RDY is generated by a D type flip-flop 514, which is clocked by the signal PCLK and cleared by the signal RESET. The D input of the flip-flop 514 is connected to the output of an OR gate 516, which receives the time out signal TIME_OUT and a signal CHANGE_STATE indicating that one of the PCI control signals in the bus vector has changed state. Thus, the state vector information is loaded into the vector FIFOs whenever control signals on the PCI bus 32 change state or when a time-out occurred.

Referring to FIG. 44, the bus history data {BUS_HIST_DATA3[31:0], BUS_HIST_DATA2[31:0], BUS_HIST_DATA1[15:0] is provided to the input of bus history register 540, which is the first stage of the bus history FIFO. The bus history 501 provides output signals BUS_HIST_FIFO1 [79:0], to the register 542 (the second state of the pipeline), which provides output signals BUS_HIST_FIFO0[79:0]. Both bus history registers 540 and 542 are clocked by the signal PCLK and cleared when the power-good signal SYNC_POWEROK is low.

The bus history registers 540 and 542 are loaded when the output of an AND gate 518 is driven high. The AND gate 518 receives the enable capture bit EN_CAP and the OR of the bus history ready signal HIST_RDY and the CAP_ILLEG_PROT signal (OR gate 519). The output signals BUS_HIST_FIFO0[79:0] and BUS_HIST_FIFO1[79:0] are provided to the 0 and 1 inputs, respectively, of multiplexers 520, 522, and 524. Each of the multiplexers 520, 522, and 524 is selected by a read address signal HIST_FIFO_RD_ADDR (which starts out low to select the output of the bus register 502 and is toggled on each subsequent read). The multiplexers 520, 522, and 524 drive output signals BUS_HIST_REG3[31:0], BUS_HIST_REG2[31:0], and BUS_HIST_REG1[15:0], respectively.

The bus vector data signals BUS_VECT_DATA[24:0] are provided to the inputs of a bus vector register 544, whose output is routed to the input of a bus vector register 546. The output of the bus vector register 546 is routed to the input of a bus vector register 548, whose output is in turn routed to the input of a bus vector register 550. Each of the bus vector registers 0–3 are clocked by the signal PCLK and cleared when the signals SYNC_POWEROK is low. The bus vector registers are loaded when the output of the AND gate 521 is asserted high. The AND gate 521 receives the signal EN_CAP and the OR of signals VECT_RDY and CAP_ILLEG_PROT (OR gate 523). The bus vector registers 550, 548, 546 and 544 produce output signals BUS_VECT_FIFO0[24:0], BUS_VECT_FIFO1[24:0], BUS_VECT_FIFO2[24:0], and BUS_VECT_FIFO3[24:0], respectively, which are in turn provided to the 0, 1, 2, and 3 inputs of a multiplexer 526, respectively. The output of the multiplexer 526 provides signals BUS_VECT_REG[31:0], with the multiplexer 526 selecting one of its inputs based on the state of address signals VECT_FIFO_RD_ADDR[1:0] (which begin with a binary value 00 and is incremented on each successive read). Thus, the bus history and bus state vector information is captured in response to assertion of signals HIST_RDY or VECT_RDY, respectively, or in response to assertion of the signal CAP_ILLEG_PROT if an illegal bus protocol condition is detected.

EXPANSION CARD SPACE RESERVATION

Unlike conventional computer systems, in the initial configuration of the computer system 10 at power up, the CPU 14 reserves memory space and PCI bus numbers for the slots 36 that are empty (no card 807 inserted) or powered down.

As is typically done, the CPU 14 assigns bus numbers for PCI buses (e.g., PCI buses 24, 32a–b and PCI bus(es) of the cards 807 that are inserted into slots 36 and powered up) that are present when the computer system 10 is first powered up.

Each PCI—PCI bridge circuit (e.g., PCI—PCI bridge 26, 48), in its configuration register space 1252 (FIG. 49), has a subordinate bus number register 1218 and a secondary bus number register 1220. The subordinate bus number register 1218 contains a subordinate bus number which is the highest PCI bus number downstream of the PCI—PCI bridge circuit, and the secondary bus number register 1220 contains a secondary bus number which is the PCI bus number of the PCI bus immediately downstream of the PCI—PCI bridge circuit. Thus, the values stored in the subordinate 1218 and secondary 1220 bus number registers define the range of PCI bus numbers that are downstream of the PCI—PCI bridge circuit.

The configuration register space 1252 also has a primary bus number register 1222. The primary bus number register 1222 contains the number of the PCI bus located immediately upstream of the PCI—PCI bridge circuit.

The system controller/host bridge circuit 18 also has the subordinate 1218 and secondary 1220 bus number registers. After configuration, the subordinate bus number register 1218 of the circuit 18 contains the maximum PCI bus number present in the computer system. The secondary bus number register 1220 of the circuit 18 contains bus number zero, as the PCI bus immediately downstream of the circuit 18 (PCI bus 24) always is assigned bus number zero.

Unlike the known system, the CPU 14 recognizes that one of the slots 36 that is initially powered down or empty may introduce one or more additional PCI buses (present on the card 807 inserted into the slot 36 initially powered down) into the computer system 10 after the computer system 10 is already powered up and configured. Accordingly, during initial configuration, the CPU 14 reserves memory space, I/O space and a predetermined number (e.g., one or three) of PCI bus numbers for any slot 36 that is powered down or empty.

Thus, PCI—PCI bridge circuits of the computer system 10 do not have to be reconfigured to accommodate the card 807 that has recently been powered up. Only the PCI—PCI bridge circuit of the card 807 that was recently powered up needs to be configured. The remainder of the computer system 10 remains unchanged.

As part of the resource reservation process, a Basic Input/Output System (BIOS) stored in the ROM 23 and shadowed (and write-protected) in the memory 20, builds a table specifying resource ranges being reserved for the slots 36. This table includes bus number, memory, and I/O resource ranges for use in configuring a PCI device that has been newly added to the system 10. The operating system uses this table to determine what resources have been reserved and what resources are available for configuring the newly added PCI devices.

As shown in FIG. 45, in a recursive PCI configuration routine called BUS_ASSIGN, the CPU 14 assigns PCI bus numbers and programs configuration registers 1252 of the PCI—PCI bridge circuits accordingly. The CPU 14 accomplishes this by scanning one PCI bus at a time for PCI devices. The BUS_ASSIGN routine is part of the BIOS stored in the ROM 23 and is used to initially configure the computer system 10 after power up.

The CPU 14 first sets 1000 the value of a search parameter PCI_BUS equal to the value of another search parameter CURRENT_PCI_BUS and initializes 1000 search parameters FCN and DEV. The parameter PCI_BUS indicates the bus number of the PCI bus currently being scanned by the CPU 14, and when the BUS_ASSIGN routine is first executed by the CPU 14, the parameter PCI_BUS indicates bus number zero.

The parameter CURRENT_PCI_BUS indicates the next PCI bus number available for assignment by the CPU, and when the routine BUS_ASSIGN is first executed by the CPU 14, the parameter CURRENT_PCI_BUS indicates bus number zero. The parameters FCN and DEV indicate the current PCI function and PCI device, respectively, currently being scanned by the CPU 14.

The CPU 14 determines 1001 whether the parameter PCI_BUS indicates bus number zero, and if so, the CPU 14 sets 1002 the secondary bus number register 1220 of the system controller/host bridge circuit 18 equal to zero. The CPU 14 then finds 1004 the next PCI—PCI bridge circuit or the slot 36 that is powered down or empty on the PCI bus indicated by the parameter PCI_BUS.

For purposes of determining if the next found PCI device is a PCI—PCI bridge circuit or does not exist (a powered down or empty slot) the CPU 14 attempts to read from a value from a one word vendor ID register located in the configuration space of every PCI device. A value of "hFFFF" (where the prefix "h" denotes hexadecimal representation) is reserved and not used by any vendor. If the attempted read from the vendor ID register returns a value of "HFFFF," then this indicates no PCI device is present.

If the CPU 14 determines 1006 there are no more unfound PCI—PCI bridge circuits or slots 36 that are powered down or empty on the PCI bus indicated by the parameter PCI_BUS, a return is made from the last call made to the BUS_ASSIGN routine. Otherwise, the CPU 14 determines 1008 whether another PCI—PCI bridge circuit was found, and if not, the CPU 14 increments 1010 the parameter CURRENT_PCI_BUS, as a slot 36 that is powered down or empty was found, and finds 1004 the next PCI—PCI bridge circuit or slot 36 that is powered down or empty. Thus, by incrementing 1010 the parameter CURRENT_PCI_BUS, the CPU 14 effectively reserves a bus number for the slot 36 that is powered down or empty. Alternatively, the CPU 14 may reserve more than one bus number for the slot 36 that is powered down or empty.

If the CPU 14 found a PCI—PCI bridge circuit, the CPU 14 then sets 1012 the primary bus number of the PCI—PCI bridge circuit equal to the parameter CURRENT_PCI_BUS. The CPU 14 then increments 1014 the parameter CURRENT_PCI_BUS and sets 1016 the secondary bus number of the PCI—PCI bridge equal to the new bus number indicated by the parameter CURRENT_PCI_BUS.

The CPU 14 then sets 1018 the subordinate bus number of the found PCI—PCI bridge circuit equal to the maximum possible number of PCI buses by writing to the subordinate bus number register 1218. This value for the subordinate bus number register 1218 is temporary and allows the CPU 14 to find and program additional downstream PCI—PCI bridge circuits or slots 36 that are powered down or empty.

The CPU 14 finds additional downstream PCI—PCI bridge circuits or slots 36 that are powered down or empty by preserving 1022 the parameters PCI_BUS, DEV and FCN and recursively calling 1022 the BUS_ASSIGN routine. The CPU 14 then restores 1024 the values for the parameters PCI_BUS, DEV and FCN, and returns the latest call of the BUS_ASSIGN routine to update the parameter CURRENT_PCI_BUS with the next PCI bus number to be assigned by the CPU 14.

The CPU 14 then updates 1026 the subordinate bus number of the found PCI—PCI bridge by setting 1026 the subordinate bus number equal to the parameter CURRENT_PCI_BUS. Thus, this completes the assignment of the PCI bus number to the found PCI—PCI bridge circuit and additional downstream PCI—PCI bridge circuits and slots 36 that are powered down or empty . The CPU 14 then finds 1004 the next PCI—PCI bridge circuit or slot 36 that is powered down or empty on the PCI bus indicated by the parameter PCI_BUS.

As shown in FIG. 46, after the PCI bus numbers are assigned, the CPU 14 executes a memory space allocation routine called MEM_ALLOC to allocate memory space for PCI functions and slots 36 that are powered down or empty. The CPU 14 first initializes 1028 search parameters used in aiding the CPU 14 in finding the located PCI functions and slots 36 that are powered down or empty.

The CPU 14 then finds 1030 the next PCI function or slot 36 that is powered down or empty. If the CPU 14 determines 1032 that all PCI functions and all slots 36 that are powered down or empty have been allocated memory space, the CPU 14 returns from the routine MEM_ALLOC. Otherwise, the CPU 14 determines 1032 whether a PCI function was found.

If so, the CPU 14 allocates 1038 memory resources as specified by the PCI function. Otherwise, one of the slots 36 that is powered down or empty is found, and the CPU 14 allocates 1036 a default memory size and memory alignment for the slot 36. The default memory size can either be a predetermined size determined before power up of the computer system 10 or a size determined after a determination of the memory resources required by the computer system 10.

When allocating memory space, the CPU 14 programs memory base 1212 and memory limit 1214 registers of the PCI—PCI bridge circuits that are upstream of the found PCI function. The CPU 14 also programs base address registers of the corresponding PCI devices appropriately. The CPU 14 then finds 1030 the next PCI function or slot 36 that is powered down or empty.

As shown in FIG. 47, after the PCI bus numbers are assigned, the CPU 14 executes an I/O space allocation routine called I/O_ALLOC to allocate I/O space for PCI functions and slots 36 that are empty. The CPU 14 first initializes 1040 search parameters used in aiding the CPU 14 in finding the located PCI functions and slots 36 that powered down or empty.

The CPU 14 finds 1042 the next PCI function or slot 36 that is powered down or empty. If the CPU 14 determines 1044 that all PCI functions and slots 36 that are powered down or empty have been allocated I/O space, the CPU 14 returns from the I/O_ALLOC routine. Otherwise, the CPU 14 determines 1044 whether a PCI function was found. If so, the CPU 14 allocates 1050 I/O resources as specified by the PCI function. Otherwise, a slot 36 that is powered down or empty was found, and the CPU 14 allocates 1048 a default I/O size and I/O alignment for the slot 36. The default I/O size can either be a predetermined size determined before power up of the computer system 10 or a size determined after a determination of the I/O resources required by the computer system 10.

When allocating I/O space, the CPU 14 programs the I/O base 1208 and limit 1210 registers of the PCI—PCI bridge circuits upstream of the PCI function or slot 36. The CPU 14 also programs base address registers of the corresponding PCI devices appropriately. The CPU 14 then finds 1042 the next PCI function or slot 36 that is powered down or empty.

As shown in FIG. 48, after initial configuration, when an interrupt is generated that indicates one of the levers 802 has opened or closed, the CPU 14 executes an interrupt service routine called CARD_INT. The CPU 14 reads 1052 the contents of the interrupt register 800 to determine 1053 whether the lever 802 has been opened or closed. If the CPU 14 determines 1053 that the lever 802 causing the interrupt was opened, the CPU 14 returns from the routine CARD_INT.

Otherwise, the CPU 14 writes 1054 to the slot enable register 817 and sets 1054 the SO bit to initiate the power up of the slot 36 and the card 807 inserted into the slot 36. The CPU 14 then waits (not shown) for the card 807 to power up. The CPU 14 then accesses 1055 the PCI bus on the card, if any. The CPU 14 then determines 1056 whether the card 807 that was just powered up has a PCI bus (and PCI—PCI bridge circuit). If so, the CPU 14 determines 1057 the primary, secondary and subordinate bus numbers reserved for the slot 36 in which the card 807 was powered up. The CPU 14 subsequently configures 1058 the PCI—PCI bridge circuit on the card 807 that was powered up.

The CPU 14 then determines 1060 the location and size of I/O and memory spaces reserved for the slot 36. The CPU 14 subsequently writes 1062 to base address registers in the PCI configuration header space of the card 807 that was powered up. The CPU 14 then reads 1064 an interrupt pin register in the configuration space of the card 807 to determine 1066 whether the card 807 uses interrupt requests. If so, the CPU 14 writes 1068 an interrupt line register in the configuration space of the card 807 with an assigned IRQ number.

The CPU then enables 1070 command registers of the card 870 which are located in the configuration space of the card 807 and allow the card 807 to respond to memory and I/O accesses on the PCI bus 32. The CPU 14 subsequently writes 1072 to the interrupt register 800 to clear the interrupt request and loads 1074 a software device driver for the card 807. The CPU 14 then returns from the routine CARD_INT.

BRIDGE CONFIGURATION

Functionally, bridge chips 26 and 48 form a PCI—PCI bridge between PCI buses 24 and 32. However, each bridge chip includes configuration space which must be independently configured. One solution is to treat the two bridges as independent devices forming one bridge, but that would require modification of the BIOS configuration routine. The other solution is to define the cable 28 as a bus so that the configuration routine can configure the upstream bridge chip 26 as a PCI—PCI bridge between the PCI bus 24 and the cable 28, and the downstream bridge chip 48 as a PCI—PCI bridge between the cable 28 and the PCI bus 32. One advantage of this second solution is that standard PCI configuration cycles can be run to configure the bridge chips 26 and 48 as if they were two PCI—PCI bridges, when in fact the two bridge chips actually form one PCI—PCI bridge.

There are two types of configuration transactions on a PCI bus: type 0 and type 1. A type 0 configuration cycle is intended for devices on the PCI bus on which the configuration cycle is generated while a type 1 configuration cycle is targeted for devices on a secondary PCI bus accessed via a bridge. FIG. 51 illustrates the address format of the type 0 and type 1 configuration cycles. A type 0 configuration command is specified by setting PCI address bits AD[1:0] to 00 during a configuration cycle. A type 0 configuration cycle is not forwarded across a PCI—PCI bridge, but stays local on the bus on which the type 0 configuration transaction was generated.

A type 1 configuration command is specified by setting address bits AD[1:0] to binary value 01. Type 1 configuration commands can be forwarded by a PCI—PCI bridge to any level in the PCI bus hierarchy. Ultimately, a PCI—PCI bridge converts a type 1 command to a type 0 command to configure devices connected to the secondary interface of the PCI—PCI bridge.

Configuration parameters stored in the configuration registers 105 or 125 of the bridge identify the bus numbers for its primary PCI interface (primary bus number) and secondary PCI interface (secondary bus number) and a subordinate bus number that indicates the highest numbered PCI bus subordinate to the bridge. The bus numbers are set by the PCI configuration routine BUS_ASSIGN (FIG. 45). For example, in the upstream bridge chip 26, the primary bus number is the bus number of the bus 24, the secondary bus number is the number of the cable 28, and the subordinate bus number is the number of the secondary PCI bus 32 or the number of a deeper PCI bus if one exists. In the downstream bridge chip 48, the primary bus number is the number of the cable bus 28, the secondary bus number is the number of the PCI bus 32, and the subordinate bus number is the number of a PCI bus located deeper in the PCI bus hierarchy, if one exists.

Referring to FIG. 53A, detection of configuration cycles are handled by logic in the PCI target block 103 or 121 in the upstream bridge chip 26 or downstream bridge chip 48, respectively. A type 0 configuration cycle detected on the upstream bus 24 is indicated by asserting a signal TYP0_CFG_CYC_US generated by an AND gate 276. The AND gate 276 receives signals UPSTREAM_CHIP, IDSEL (chip select during configuration transactions), CFGCMD (configuration command cycle detected) and ADDR00 (bits 1 and 0 are both zeros). A type 0 configuration cycle detected by the downstream bridge chip 48 is indicated by a signal TYP0_CFG_CYC_DS generated by an AND gate 278, which receives a signal S1_BL_IDSEL (IDSEL signal for the downstream bridge chip 48), the signal CFGCMD, the signal ADDR00, a signal MSTR_ACTIVE (indicating that the bridge chip 48 is the master on a secondary PCI bus 32), and the inverted state of a signal UPSTREAM_CHIP.

Detection of a type 1 configuration cycle by the PCI target 103 in the upstream bridge chip 26 is indicated by asserting a signal TYP1_CFG_CYC_US from an AND gate 280, which receives signals CFGCMD, ADDR01 (bits 1 and 0 are low and high, respectively) and UPSTREAM_CHIP. Detection of a type 1 configuration cycle on the downstream bus 32 is indicated by asserting a signal TYP1_CFG_CYC_DS from an AND gate 282, which receives the signals CFGCMD, ADDR01, and the inverted state of the signal UPSTREAM_CHIP.

The bridge chip receiving the type 0 transaction uses the register number field 250 in the configuration transaction address to access the appropriate configuration register. The function number field 252 specifies one of eight functions to be performed in a multi-functional device during the configuration transaction. A PCI device can be multi-functional and have such functions as a hard disk drive controller, a memory controller, a bridge, and so forth.

When the bridge chip 26 sees a type 1 configuration transaction on its upstream bus 26, it can forward the transaction either downstream, translate the transaction to a type 0 transaction, convert the transaction to a special cycle, or ignore the transaction (based on the bus number parameters stored in the configuration registers 105 or 125). If a transaction is forwarded, it is up to the PCI master of the destination bridge chip to convert the type 1 transaction to the corresponding appropriate transaction. If a bridge chip handles the transaction itself, then it responds by asserting the signal DEVSEL_ on the PCI bus and handles the transaction as a normal delayed transaction.

In a type 1 configuration transaction, the bus number field 260 selects a unique PCI bus in the PCI hierarchy. PCI target block 103 passes a type 1 configuration cycle from the upstream chip 26 down to the downstream bridge chip 48 if a signal PASS_TYP1_DS is asserted by an AND gate 284. The AND gate 284 receives the signal TYP1_CFG_CYC_US and a signal IN_RANGE (the bus number field 260 is greater than or equal to the stored secondary bus number and less than or equal to the stored subordinate bus number). The other input of the AND gate 284 is connected to the output of an OR gate 286, which has one input connected to the output of an AND gate 288 and the other input receiving the inverted state of a signal SEC_BUS_MATCH. Thus, if a type 1 cycle is detected, the signal IN_RANGE is asserted and the bus number field 260 does not match the stored secondary bus number, the signal PASS_TYP1_DS is asserted. If the bus field 260 does not match the stored secondary bus number, then bus devices on or below the downstream bus 32 are addressed. The AND gate 288 asserts its output high if the signal SEC_BUS_MATCH is asserted high and the device number field 258 indicates that the target of the type 1 configuration cycle is the configuration space of the downstream bridge chip 48. If this is true, the type 1 configuration transaction is forwarded down the cable 28 to the downstream bridge chip 48 for translation to a type 0 configuration transaction. The PCI target 121 in the downstream bridge chip 48 responds to the transaction and reads and writes the downstream bridge configuration registers 125 according to the type 0 transaction. The control pins of the downstream chip are driven and read and write data appear on the downstream PCI bus 32 as if a type 0 transaction is running on the downstream bus (for debug purposes), although each IDSEL on the downstream bus 32 is blocked so that no device actually responds to the type 0 transaction.

If the PCI target block 103 in the upstream bridge chip 26 detects a type 1 configuration transaction on its upstream bus 24, having a bus number field equal to the stored secondary bus number (the cable bus 28) but not addressing device 0 (searching for other devices on the cable bus 28), then the target block 103 ignores the transaction on the primary bus 26.

If the PCI target 121 detects a type 1 configuration write transaction (WR__ high) on the secondary PCI bus 32, which has a bus number field 260 outside the range of the secondary bus number and subordinate bus number (IN__RANGE low), and if the device number 258, the function number 256, and the register number 254 indicate a special cycle (SP__MATCH high), then a signal PASS__TYP1__US is asserted by an AND gate 290. The AND gate 290 receives the signal TYP1__CFG__CYC__DS, the signal SP__MATCH, the write/read strobe WR__, and the inverted state of the signal IN__RANGE. When the PCI master 101 in the upstream bridge chip 26 receives such a cycle, it runs a special cycle on the primary PCI bus 24.

Configuration transactions are ignored by a bridge chip under certain conditions. If the target block 103 in the upstream bridge chip 26 detects a type 1 configuration transaction on the PCI bus 24 (its upstream bus), and the bus number field 260 is less than the secondary bus number or greater than the subordinate bus number stored in the bridge chip's configuration space, then the target block 103 ignores the transaction.

If the target block 121 in the downstream bridge chip 48 detects a type 1 configuration transaction on the secondary PCI bus 32 (its downstream bus), and the bus number field 260 is greater than or equal to the secondary bus number and less than or equal to the subordinate bus number stored in the bridge chip's configuration space, then the target block 121 ignores the transaction. In addition, type 1 configuration commands going upstream are ignored if the type 1 command does not specify a conversion to a special cycle transaction regardless of the bus number specified in the type 1 command.

Referring to FIG. 53B, the PCI master 101 or 123 watches for a configuration cycle transferred over the cable 28. If the PCI master 123 in the downstream bridge chip 48 detects a type 1 configuration transaction from the upstream bridge chip 26, it compares the bus number field 260 with the primary bus number and secondary bus number stored in the configuration space of the bridge chip 48. If the bus number field 260 matches either the stored primary bus number (i.e., cable 28) or the stored secondary bus number (addressing a device directly connected to the downstream bus 32), the downstream bridge chip 48 translates the transaction to a type 0 transaction (by setting AD[1:0]=00) as it passes the configuration transaction onto the bus. The type 0 transaction is performed on the PCI bus 32 by the PCI master block 123.

The following are translations performed of fields in the type 1 configuration transaction. The device number field 258 in the type 1 configuration transaction is decoded by the PCI master 123 to generate a unique address in the translated type 0 transaction on the secondary bus 32, as defined in table of FIG. 52. The secondary address bits AD[31:16] decoded from the device number field 258 are used by the PCI master 123 to generate the appropriate chip select signals IDSEL for the devices on the secondary PCI bus 32. When the address bit AD[15] is equal to 1, then the bridge chip 48 maintains all of address bits AD[31:16] deasserted low (no IDSEL asserted). The register number field 254 and the function number field 256 of the type 1 configuration command are passed unmodified to the type 0 configuration command. The function number field 256 selects one of eight functions, and the register number field 254 selects a double word in the configuration register space of the selected function.

For a type 1 configuration transaction targeted to the downstream bridge chip 48, the bridge chip 48 converts the type 1 transaction to a type 0 transaction as if it were addressing a device on the downstream bus 32, but the AD[31:16] pins are set to zeros so that no secondary PCI bus device receives an IDSEL. The PCI master logic 123 detects this by asserting a signal TYP1__TO__INT0 driven by an AND gate 262. The AND gate 262 receives a signal CFG__CMD (indicating a configuration command cycle), the output of an OR gate 264, and the inverted state of the signal UPSTREAM__CHIP (type-1-to-type-0 translation is disabled in the upstream bridge chip 26). The OR gate 264 asserts its output high if a signal PRIM__BUS__MATCH is asserted (the bus number field 260 matches the stored primary bus number), or if the stored primary bus number CFG2P__PRIM__BUS__NUM[7:0] is equal to zero (indicating that the primary bus number in the configuration space of the bridge chip 48 has not been configured by the system BIOS yet and the current type 1 configuration cycle is going to the internal configuration space to program the primary bus number of the bridge chip 48).

A signal TYP1__TO__EXT0 is asserted by an AND gate 266 and responds to a match to the stored secondary bus number. The inputs of the AND gate 266 receive the signal CFG__CMD, the signal SEC__BUS__MATCH, the inverted state of the signal UPSTREAM__CHIP, and the inverted state of a signal SP__MATCH (not a special cycle). The signal TYP1__TO__EXT0 indicates that the converted type 0 configuration transaction is targeted to a device on the secondary PCI bus 32.

The signal TYP1__TO__INT0 is provided to the 1 input of a 4:1 multiplexer 274. The 2 input is tied low and the 0 and 3 inputs of the multiplexer 274 receive a signal LTYP1__TO__INT0 from a D type flip-flop 270. The select input S1 of the multiplexer 274 receives a signal CMD__LATCH (FRAME__ asserted for a new cycle on the PCI bus 32), and the select input S0 receives a signal P2Q__START__PULSE (which indicates when high that an address has been sent to the PCI bus 32). The output of the multiplexer 274 is connected to the D input of a flip-flop 270, which is clocked by the signal PCLK and cleared by the signal RESET. The IDSEL signals to the secondary bus devices are blocked by asserting a signal BLOCK__IDSEL from an OR gate 272, which receives at its inputs signals Q2P__AD[15] (no conversion needed according to Table 1 of the FIG. 6), TYP1__TO__INT0 and LTYP1__TO__INT0. The signal LTYPL__TO__INT0 extends the assertion of the signal BLOCK__IDSEL.

If the PCI master 123 in the downstream bridge chip 48 receives a type 1 configuration transaction from the upstream bridge chip 26 in which the bus number field 260 is greater than the stored secondary bus number and less than or equal to the stored subordinate bus number, then the PCI master block 123 forwards the type 1 transaction to the secondary PCI bus 32 unchanged. Some other device on the secondary PCI bus 32, e.g., another bridge device 323 (FIG. 26B), will receive the type 1 configuration transaction and forward to its secondary bus (PCI bus 325).

A type 1 configuration transaction to special cycle translation is performed if the PCI master 123 detects a type 1 configuration write transaction from the upstream bridge chip 26 and the bus number field 260 matches the stored secondary bus number and if the device number field 258, the function number field 256, and the register number field 254 indicates a special cycle (SP_MATCH is high). This is indicated by an AND gate 268 asserting a signal TYPE1_TO_SPCYC high. The AND gate 268 receives SP_MATCH, and Q2P_CBE_[0] (command bit for special cycle). The data from the type 1 configuration transaction becomes the data for the special cycle on the destination bus. The address during a special cycle is ignored.

BUS PERFORMANCE MONITOR

The bus monitor 127 (FIG. 3) includes circuitry for storing information to calculate certain bus performance parameters. The parameters include bus utilization, bus efficiency, and read data efficiency. Bus utilization is the ratio of the time that the bus is busy performing a transaction to a predetermined global period of time. Bus efficiency is the ratio of the number of PCI clock periods actually used for data transfer to the total number of clock periods during the bus busy period. Read data efficiency is the ratio of the number of the read data bytes accessed by a device on the secondary PCI bus 32 from the delayed completion queue (DCQ) 144 (FIG. 4) to the total number of data bytes fetched for that master by the bridge chip 48. The information stored in the bus monitor 127 is retrieved by system software to calculate the desired parameters. Referring to FIG. 54A, a global period timer 1300 (which can be 32 bits wide) counts a total period of time during which the various parameters are to be calculated. The timer 1300 is programmed to the hexadecimal value FFFFFFFF. If the PCI clock PCICLK2 is running at 33 MHz, then the timer period is approximately 2 minutes. When the timer 1300 decrements to 0, it asserts a signal GL_TIME_EXPIRE.

The bus monitor 127 includes 7 slot-specific bus-busy counters 1302A–G, six of the counters corresponding, respectively, to the 6 slots on the secondary PCI bus 32 and one to the SIO 50. The bus-busy counters 1302A–G are cleared when the signal GL_TIME_EXPIRE is asserted. Depending on which bus device has control of the secondary bus 32, the bus-busy counter 1302 increments on every PCI clock in which the secondary PCI bus FRAME_ or IRDY_ signal is asserted. The appropriate one of the seven counters is selected by one of the grant signals GNT[7:1]_. Thus, for example, the bus-busy counter 1302A is selected when the signal GNT[1]_ is asserted low, indicating that the SIO is the current master on the secondary PCI bus 32.

Seven data-cycle counters 1306A–G, corresponding, respectively, to the 6 slots on the secondary PCI bus 32 and the SIO 50, keep track of the time during which a data transfer is actually occurring between a master and a target during a transaction on the PCI bus 32. The selected data-cycle counter 1306 is incremented on every PCI clock in which the secondary bus IRDY_ and TRDY_ signals are both asserted low. The data-cycle counters 1306A–G are cleared when the signal GL_TIME_EXPIRE is asserted.

Six DCQ data counters 1310A–F are included in the bus monitor 127 for keeping track of the amount of data loaded into the DCQ buffers. The six DCQ data counters 1310A–F correspond to the 6 slots on the secondary PCI bus 32. The selected DCQ data counter 1310 increments on every PCI clock in which delayed read completion (DRC) data is received from the cable 28 and loaded into the prefetch buffers.

Another set of counters, DCQ-data-used counters 1314A–F, are used to keep track of the amount of data loaded into the DCQ 144 actually used by the 6 slots on the secondary PCI bus 32. The selected DCQ-data-used counter 1314 increments on every PCI clock in which the secondary bus master reads data from the corresponding DCQ buffer. Both the DCQ-data counters 1310A–F and DCQ-data-used counters 1314A–F increment on each data cycle regardless of the number of bytes actually transferred. In most cases, the number of bytes transferred in each data cycle is 4.

When the global period timer 1300 times out and asserts the signal GL_TIME_EXPIRE, several events occur. First, the global period timer 1300 reloads its original count value, which is the hexadecimal value FFFFFFFF. The contents of all the other counters, including the bus-busy counters 1302A–G, data-cycle counters 1306A–G, DCQ data counters 1310A–F, and DCQ-data-used counters 1314A–F, are loaded into registers 1304, 1308, 1312, and 1316, respectively. The counters 1302, 1306, 1310, and 1314 are then cleared to 0. The global period timer 1300 then begins to count again after it is reloaded with its original value.

The signal GL_TIME_EXPIRE is provided to the interrupt receiving block 132, which forwards the interrupt over the cable 28 to the interrupt output block 114, which in turn generates an interrupt to the CPU 14. The CPU 14 responds to the interrupt by invoking an interrupt handler to perform the bus performance analysis. The interrupt handler accesses the contents of the registers 1304, 1308, 1312, and 1316, and calculates the several parameters, including the bus utilization, bus efficiency, and prefetch efficiency parameters associated with the 6 secondary bus slots and the SIO 50.

The bus utilization parameter is the value of the bus-busy counter 1302 divided by the initial value of the global period timer 1300, which is the hexadecimal value FFFFFFFF. Thus, bus utilization is the percentage of the total global time during which a bus master is performing a bus transaction.

A PCI transaction includes an address phase and at least one data transfer phase. A bus master asserts the signal FRAME_ to indicate the beginning and duration of an active bus transaction. When the signal FRAME_ is deasserted, that indicates the transaction is in the final data phase or the transaction has been completed. The signal IRDY_ indicates that the bus master is able to complete the current data phase of the bus transaction. During a write, the signal IRDY_ indicates that valid data is present on the bus. During a read, the signal IRDY_ indicates the master is prepared to accept read data. The addressed PCI target responds to the bus transaction by asserting the signal TRDY_ to indicate that the target is able to complete the current data phase of the transaction. During a read, the signal TRDY_ indicates that valid data is present on the bus; during a write, the signal TRDY_ indicates the target is prepared to accept data. Wait states can be inserted between the address and data phases and between consecutive data phases of the bus transaction. During the address phase or the wait states, no data transfer is actually occurring.

Actual data transfer is occurring only when both signals IRDY_ and TRDY_ are asserted low. To determine the data transfer bus efficiency, the interrupt handler divides the value of the data-cycle counter 1306 by the value of the bus-busy counter 1302. The bus efficiency represents the amount of time during which a data transfer actually occurs during a bus transaction. By calculating this value, the computer system can be made aware of target devices which require many wait states and therefore are inefficient.

The bridge chip 48 can fetch data from the primary PCI bus 26 and store the data in the DCQ 144. The DCQ 144 has eight buffers, each being assignable to a secondary bus master. For example, a memory read multiple transaction generated by a secondary bus master targeted at the primary bus will cause bridge 26, 48 to fetch 8 cache lines from the memory 20 and load into the DCQ 144. A memory read line transaction will cause the PCI—PCI bridge 26, 48 to fetch one line of data from the memory 20. In addition, as described in conjunctin with FIGS. 75 and 79, the PCI—PCI bridge 26, 48 can perform read promotion, which converts a read request from a secondary bus master to a read request for a larger block of data. In these instances, there exists a possibility that not all of the fetched data will be used by the bus master. In that case, the unread data is discarded, which reduces the read data efficiency. Measuring the read data efficiency allows system designers to understand how a bus master is utilizing read data fetched by the bridge chip 26, 48 from the primary bus 24.

Referring to FIG. 54B, the counter 1310 increments on the rising edge of the clock PCLK if the signal DCQ__DATA_RECEIVED[X], X=2–7, is asserted, indicating that four bytes of data are being received by a DCQ buffer associated with master X from the cable 28. The counter 1310 outputs count value DCQ__DATA[X] [20:0], X=2–7, which is cleared to zero when the signal GL__TIME__EXPIRE is asserted.

The counter 1314 increments on the rising edge of the clock PCLK if a signal DCQ__DATA__TAKEN[X], X=2–7, is asserted, indicating that four bytes of data are read from a DCQ buffer associated with master X. The counter 1314 is cleared when the signal GL__TIME__EXPIRE is high.

To determine the amount of the DCQ data that is actually used by the devices on the secondary PCI bus 32, the prefetch efficiency is calculated by the interrupt handler. This is determined by taking the ratio of the value in the DCQ-data-used counter 1314 to the value in the DCQ data counter 1310. Even though not all data transferred into or out of the prefetch buffers are 4 bytes wide, that ratio is closely approximated by assuming that every data phase transfers the same number of bytes.

In response to the calculated parameters, a user or the computer manufacturer can better understand computer system performance. For example, if bus efficiency is low, then the PCI device involved could be replaced with a different part by the computer manufacturer. Knowing the DCQ read data efficiency allows the computer manufacturer to change its DCQ fetch algorithm to better improve efficiency.

USING SUBORDINATE BUS DEVICES

As shown in FIG. 88, six expansion cards inserted into the six expansion cards slots 36a–f introduce bus devices 1704–1708 that are subordinate to the CPU 14 and bus devices 1701–1702 that are subordinate to an I$_2$O processor 1700. Although all of the subordinate bus devices 1701–1708 are connected to the common PCI bus 32, the I$_2$O subordinate devices 1701–1702 appear to the CPU 14 to only be addressable through the I$_2$O processor 1700 and not directly addressable via the PCI bus 32. Therefore, the PCI bus 32 serves as both an I$_2$O subordinate device bus and a CPU 14 subordinate device bus.

For purposes of preventing the CPU 14 from recognizing the I$_2$O subordinate devices 1701–1702 as PCI bus 32 devices, the bridge chip 48 includes logic 1710 (FIG. 90) for preventing the I$_2$O subordinate devices 1701–1702 from responding to configuration cycles run by the CPU 14. The expansion box 30 also includes multiplexing circuitry 1712 which cooperates with the interrupt receiving block 132 of the bridge chip 48 to mask interrupt requests originating with the I$_2$O subordinate devices 1701–1702 from propagating to the CPU 14. Interrupt requests originating with I$_2$O subordinate bus devices 1701–1702 are redirected by the interrupt receiving block 132 to the I$_2$O processor 1700. The I$_2$O processor 1700 configures the I$_2$O subordinate devices 1701–1702; receives and processes interrupt requests originating from the I$_2$O subordinate devices 1701–1702; and controls operation of the I$_2$O subordinate devices as directed by the CPU 14.

After power up of the computer system 10 and when a card 807 is powered up (i.e., a new bus device is introduced on the PCI bus 32), the I$_2$O processor 1700 scans the PCI bus 32 to identify I$_2$O subordinate bus devices. For purposes of identifying the type of bus device (I$_2$O subordinate bus device or CPU 14 subordinate device), the I$_2$O processor 1700 runs configuration cycles on the PCI bus 32 to read the device identification word (Device ID) of each bus device. The Device ID is located in the configuration header space of all PCI devices. The I$_2$O processor 1700 stores the results of this scan in a six bit I$_2$O subordinate register 1729 (FIG. 93) inside the I$_2$O processor 1700 which is accessible by the CPU 14. Bits zero through five of the register 1729 are associated with slots 36a–f, respectively. A value of "1" for a bit indicates the associated slot 36 has a bus device subordinate to the CPU 14 and a value of "0" for a bit indicates the associated slot 36 has a bus device subordinate to the I$_2$O processor 1700.

The I$_2$O processor 1700 can be inserted into any of the slots 36a–f. For purposes of identifying which slot 36, if any, contains an I$_2$O processor, the CPU 14 scans the PCI bus 32 and reads the Device ID of the bus devices connected to the bus 32. The CPU 14 does not attempt to configure any devices 1704–1708 on the bus 32 until a host configuration enable bit 1726 (FIG. 94) inside the I$_2$O processor 1700 indicates to the CPU 14 that the I$_2$O processor 1700 has completed its identification of I$_2$O subordinate devices 1701–1702 on the bus 32. The host configuration enable bit 1726 has a value of "0" (value at power up) to disable configuration of the devices on the bus 32 by the CPU 14 and a value of "1" to enable configuration of the CPU 14 subordinate devices 1704–1708 on the bus 32. When the CPU 14 does configure bus devices on the bus 32, the CPU 14 does not "see" the I$_2$O subordinate device 1701–1702 because of the masking by the logic 1710, as described below.

After the host enable configuration bit 1726 is set, the CPU 14 reads the contents of the I$_2$O subordinate register 1729 and transfers the read contents to a six bit I$_2$O subordinate register 1728 (FIG. 91) of the bridge chip 48. The register 1728 indicates the subordinate status (I$_2$O processor 1700 subordinate or CPU 14 subordinate) of the bus devices in the same manner as the register 1729. Before the CPU 14 writes to the register 1728, the register 1728 contains all ones (value at power up) which allows the CPU 14 to scan the bus 32 for the I$_2$O processor 1700. The interrupt receiving block 132 uses the register 1728 to identify which interrupt requests received by the block 132 should be routed to the CPU 14 and which interrupt requests received by the block 132 should be routed to the I$_2$O processor 1700 for processing. Furthermore, the logic 1710 uses the contents of the register 1728 to block recognition by the CPU 14 of the I$_2$O subordinate devices 1701–1702 from the CPU 14.

For purposes of indicating to the interrupt receiving block 132, which bus device, if any, is an I$_2$O processor, the CPU 14 sets one bit of an I$_2$O slot register 1730 (FIG. 92) whose bits 0–5 correspond to the slots 36a–f, respectively. For this register 1730, located inside the bridge chip 48, a value of "0" for a bit indicates the associated slot 36 does not have an I$_2$O processor and a value of "1" for the bit indicates the associated slot 36 has an I$_2$O processor.

As shown in FIG. 90, the logic 1710 includes a multi-bit AND gate 1711 which furnishes signals AD_IDSEL[5:0] to address/data lines of the bus 32 to select devices on the bus 32 during configuration cycles. The AND gate 1711 receives a six bit signal ENABLE[5:0] having bits indicative of and corresponding to bits of the I$_2$O subordinate register 1728. The AND gate 1711 also receives the typical identification select signals SLOT_IDSEL[5:0] furnished by the bridge chip 48 for selecting devices on the bus 32 during configuration cycles. Therefore, the signals ENABLE[5:0] are used to selectively mask the signals SLOT_IDSEL[5:0] from the PCI bus 32 when configuration cycles are run by the CPU 14.

For purposes of controlling the destination of interrupt requests from the slots 36a–d, the four standard PCI interrupt request signals (INTA#, INTB#, INTC# and INTD#) provided by each slot 36 are furnished to multiplexing circuitry 1712 (FIG. 88). The multiplexing circuitry 1712 serializes the PCI interrupt request signals received from the slots 36 and furnishes the signals to the interrupt receiving block 132 via four time multiplexed serial interrupt request signals: INTSDA#, INTDSB#, INTSDC#, and INTSDD#.

As shown in FIG. 89, the interrupt receiving block 132 furnishes interrupt request signals for the CPU 14 to the interrupt output block 114 via a time multiplexed serial interrupt request signal INTSDCABLE#. The interrupt receiving block 132 furnishes interrupt request signals for the I$_2$O processor 1700 via a time multiplexed serial interrupt request signal INTSDIIO# furnished via a PCI INTC# line 1709 of the bus 32 to the I$_2$O processor 1700

The interrupt output block 114 furnishes the interrupt requests destined for the CPU 14 to one or more of the standard PCI interrupt request lines (INTA#, INTB#, INTC#, and INTD#) of the PCI bus 24. An interrupt controller 1900, external to the bridge chip 26, receives the interrupt requests from the PCI interrupt request lines of the PCI bus 24. The interrupt controller 1900 prioritizes the interrupt requests (which may include interrupt requests from other devices on the PCI bus 24) and furnishes them to the CPU 14. The interrupt output block 114 may either asynchronously (when in an asynchronous mode) furnish the interrupt request signals to the interrupt request lines of the PCI bus 24 or serially (when in a serial mode) furnish the interrupt request signals to the INTA# line of the PCI bus 24, as further described below.

As shown in FIG. 95, all of the time multiplexed serial data signals represent their data via an interrupt cycle 1850 which comprises eight successive time slices (T0–T7). The duration of each time slice is one cycle of the PCI clock signal CLK. Each time slice represents a "snapshot" of the status of one or more interrupt request signals. As shown in FIG. 99, the signal INTSDA# represents the sampled INTA# interrupt request signals from the slots 36a–f. The signal INTSDB# represents the sampled INTB# interrupt request signals from the slots 36a–f. The signal INTSDC# represents the sampled INTC# interrupt request signals from the slots 36a–f. The signal INTSDD# represents the sampled INTD# interrupt request signals from the slots 36a–f.

For purposes of combining the interrupt signals INTSDA#-D# into the signal INTSDIIO#, the interrupt receiving block 132 logically ANDs the signals INTSDA#-D# together while simultaneously masking interrupt request signals destined for the CPU 14. Similarly, for purposes of combining the interrupt signals INTSDA#-D# into the signal INTSDCABLE#, the interrupt receiving block 132 logically ANDs the signals INTSDA#-D# together while simultaneously masking interrupt request signals destined for the CPU 14.

For the purpose of instructing the interrupt output block 114 when another interrupt cycle 1850 is beginning, the interrupt receiving block 132 furnishes a synchronization signal INTSYNCCABLE# to the interrupt output block 114. The falling, or negative, edge of the signal INTSYNC-CABLE# indicates that time slice T0 of the interrupt cycle 1850 transmitted via the signal INTSDCABLE# is beginning on the next positive edge of the CLK signal. A signal INTSYNCIIO# is used in an analogous fashion to indicate an upcoming time slice T0 of the interrupt cycle 1850 transmitted via the signal INTSDIIO#. The signal INTSYNCIIO# is furnished by the interrupt receiving block 132 to the I$_2$O processor 1700 via a PCI INTD# line 1713 of the bus 32. For the purpose of instructing the multiplexing circuitry 1712 when to transmit another interrupt cycle 1850 via the interrupt signals INTSDA#-D#, the interrupt receiving block 132 furnishes a synchronization signal INTSYNC# to the multiplexing circuitry 1712. The falling, or negative, edge of the signal INTSYNC# indicates the muliplexing circuitry 1712 should being transmitting time slice T0 of the signals INTSDA#-D# on the next positive edge of the CLK signal.

As shown in FIG. 96, the multiplexing circuitry 1712 includes four multiplexers 1741–1744 which furnish the signals INTSDA#, INTSDB#, INTSDC# and INTSDD#, respectively. The select inputs of the multiplexers 1741–1744 receive a time slice signal SLICEIN[2:0] which is used to indicate the time slices T0–T7 of the signals INTSDA#-D#. The INTA–D# interrupt request signals from the slots 36 are furnished to the inputs of the multiplexers 1741–1744, respectively.

The signal SLICEIN[2:0] is furnished by the output of a three bit counter 1745 that is clocked on the positive edge of the PCI clock signal CLK. The interrupt synchronization signal INTSYNC# is received by a clocked enable input of the counter 1745. On the negative edge of the signal INTSYNC#, the counter 1745 resets to zero (SLICEIN[2:0] equals zero). The counter 1745 increments the value indicated by the SLICEIN[2:0] signal until the SLICEIN[2:0] signal is equal to "1" where it remains until the counter 1745 is once again reset by the INTSYNC# signal.

Figure 97A:
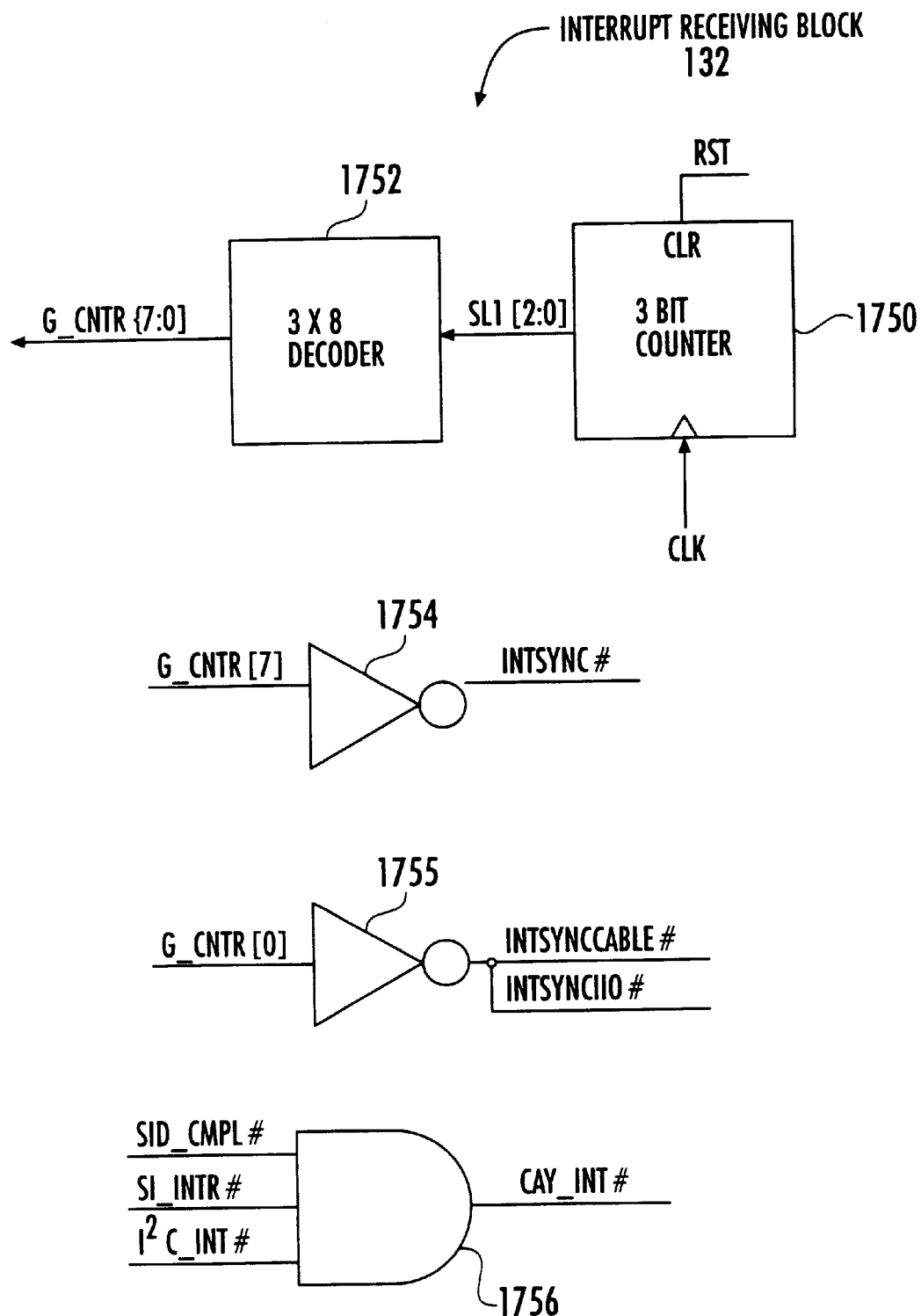

As shown in FIG. 97A, for purposes of tracking the time slices T0–T7, the interrupt receiving block 132 includes a three bit counter 1750 that is clocked on the positive edge of the CLK signal. The counter 1750 furnishes an output signal SL1[2:0] which is received by the select input of a 3×8 decoder 1752. The decoder 1752 furnishes an eight bit signal G_CNTR[7:0] with the asserted bit of the signal G_CNTR[7:0] indicating the time slice of the signals INTSDIIO# and INTSDCABLE#.

The INTSYNC# signal is furnished by the output of an inverter 1754 that receives the most significant bit of the G_CNTR[7:0] signal, G_CNTR[7]. Although the INTSYNC# signal is pulsed low during the time slice T7, the interrupt receiving block 132 could alternatively wait several cycles of the CLK signal after ending an interrupt cycle 1850 before pulsing the INTSYNC# signal low. The signals INTSYNCCABLE# and INTSYNCIIO# are both provided by the output of an inverter 1755 which receives the bit G_CNTR[0].

An additional interrupt request signal CAY_INT# for the CPU 14 is provided by the SIO circuit 50. The CAY_INT# signal is logically ANDed with the INTSDA#-D# signals during time slice T0. The CAY_INT# signal is furnished by the output of an AND gate 1756 which receives a SIO_CMPL# signal, the SI_INTR# signal, and an I$^2$C_INT# signal. The SIO_CMPL# signal is asserted, or driven low, when the SIO circuit 50 has completed a serial output process. The I$^2$C_INT# signal is asserted, or driven low, to indicate completion of a transaction over an I$^2$C bus (not shown) connected to the bridge chip 48. The I$_2$C_INT# signal is deasserted, or driven high, otherwise.

For purposes of masking interrupt requests, the interrupt receiving block 132 generates four masking signals: MASKA, MASKB, MASKC and MASKD. When the MASKA signal is asserted, or driven high, during a particular time slice (T0–T7) of the signal INTSDA#, an interrupt request indicated by the serial interrupt signal INTSDA# during that particular time slice is masked from the CPU 14. If the MASKA signal is deasserted, or driven low, during the particular time slice, the interrupt request indicated by the serial interrupt signal INTSDA# is masked from the I$_2$O processor 1700. The MASKB-D signals function similarly to mask interrupt requests furnished by the signals INTSDB#-D#.

Figure 97B:
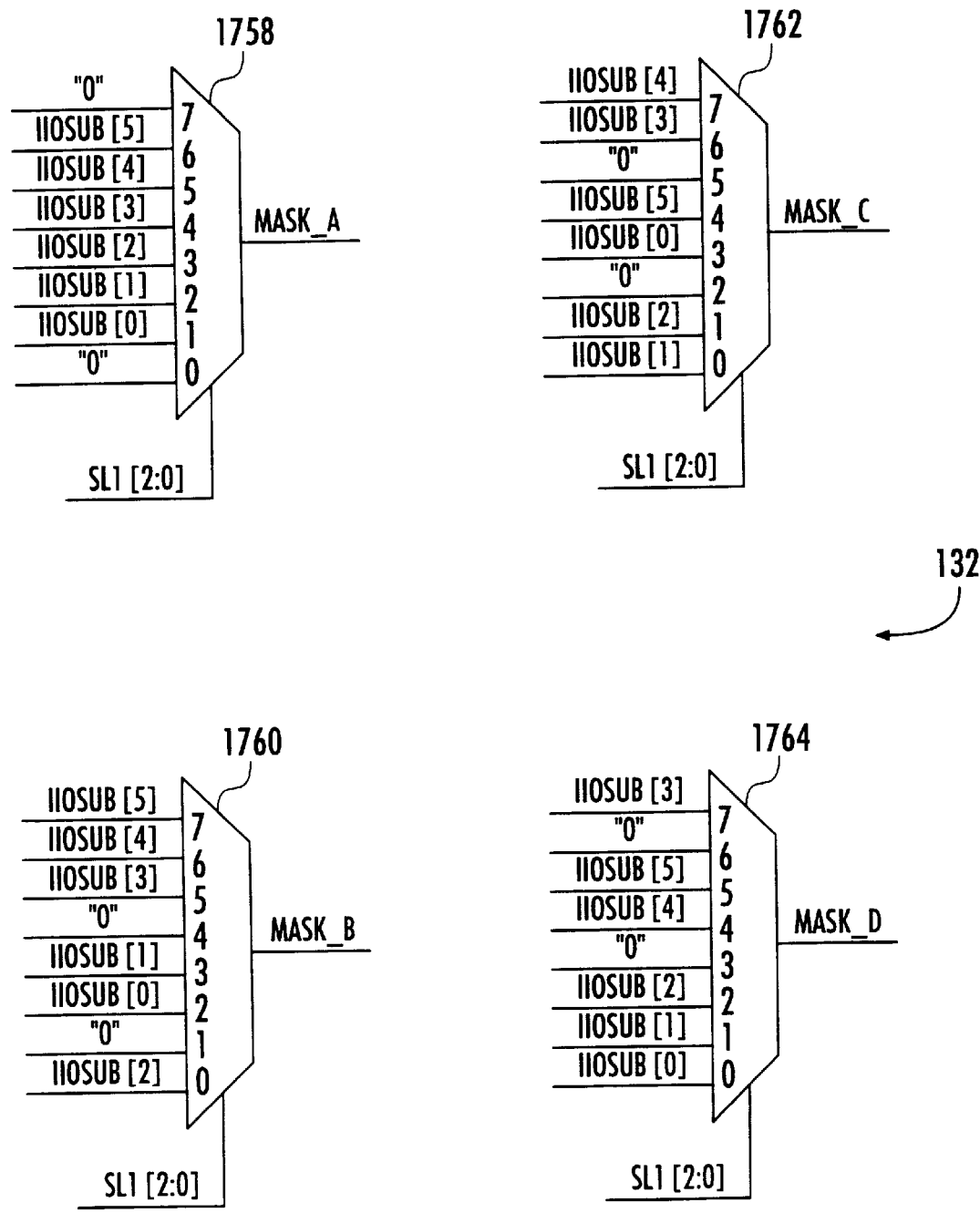

As shown in FIG. 97B, a multiplexer 1758 furnishes the MASKA signal. The select input of the multiplexer 1758 receives the SL1[2:0] signal. The eight inputs of the multiplexer 1758 receive inverted IIO_SUB[5:0] signals which are indicative of corresponding bits of the I$_2$O subordinate register 1728. The signals IIO_SUB[5:0] are connected to the appropriate inputs of the multiplexer 1758 so that when the INTSDA# signal indicates the interrupt status for a particular slot 36, the MASKA signal concurrently indicates the associated bit of the register 1728 for that slot 36. Three other multiplexers 1760, 1762, and 1764 furnish the signals MASKB, MASKC and MASKD, respectively. Similar to the generation of the MASKA signal, the signals IIO_SUB[5:0] are connected to the appropriate inputs of multiplexers 1760, 1762, and 1764 so that the MASKB, MASKC and MASKD signals indicate the bit of the register 1728 associated with the slot represented by the signals INTSDB#, INTSDC#, and INTSDD#. The multiplexers 1760–1764 receive the signal SL1[2:0] at their select inputs.

As shown in FIG. 97C, the interrupt receiving block 132 also includes two multiplexers 1768 and 1770 which furnish two masking signals, IIOTS_D and IIOTS_C, used to mask the INTD# and INTC# signals furnished by the slot interrupt lines of the I$_2$O processor 1700 because the lines 1709 and 1713 are used to furnish the signals INTSDIIO# and INTSYNCIIO#, respectively, to the I$_2$O processor 1700. The select inputs of both multiplexers 1768 and 1770 receive the signal SL1[2:0], and the signal inputs of the multiplexers 1768 and 1770 receive signals IIOSLOT[5:0] which are indicative of the corresponding bits of the I$_2$O slot register 1730. The signals IIOSLOT[5:0] are connected to the appropriate inputs of multiplexers 1768 and 1770 so that when the INTSDC#-D# signals indicate the interrupt status for a particular slot 36, the IIOSLOT[5:0] signal selected by the multiplexers 1768 and 1770 concurrently indicate the associated bit of the register 1730 for that slot 36.

Figure 97D:
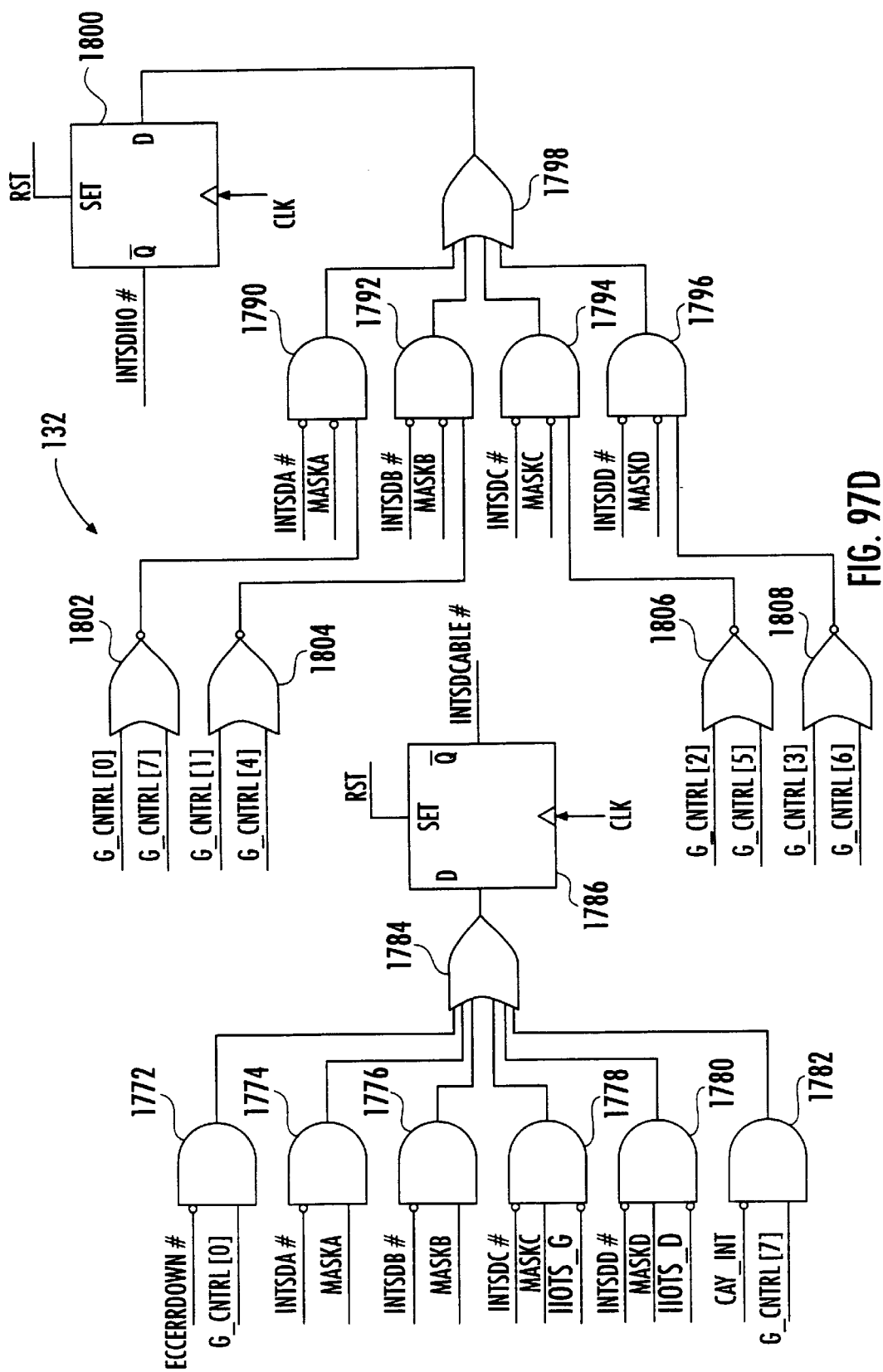

As shown in FIG. 97D, six AND gates 1772–1782 are used to combine the signals INTSDA#-INTSDD# and mask selected interrupt request signals from the CPU 14. The AND gate 1772 receives an inverted ECC ERR DOWN# signal (asserted to indicate an error detected by the chip 48*b* in cable transmissions) and the bit G_CNTRL[0]. The AND gate 1774 receives an inverted INTSDA# signal and the MASKA signal. The AND gate 1776 receives an inverted INTSDB# signal and the MASKB signal. The AND gate 1778 receives an inverted INTSDC# signal, the MASKC signal and the IIOTS_C signal. The AND gate 1780 receives an inverted INTSDC# signal, the MASKD signal, and the IIOTS_D signal. The AND gate 1782 receives an inverted CAY_INT signal and the G_CNTRL signal.

The outputs of the AND gates 1772–1782 are connected as inputs to an OR gate 1784 which has its output connected to the signal input of a D-type flip-flop 1786. The flip-flop 1786 is clocked on the positive edge of the CLK signal, and the set input of the flip-flop 1786 receives the RST signal. The inverting output of the flip-flop 1786 furnishes the INTSDCABLE# signal.

Four AND gates 1790–1796 are used to combine the INTSDA#-D# signals and mask selected interrupt request signals from the I$_2$O processor 1700. The AND gate 1790 receives an inverted INTSDA# signal and an inverted MASKA signal. Another input of the AND gate 1790 is connected to the output of a NOR gate 1802 which masks the INTSDA# signal during the time slices T0 and T7 because no card interrupt requests are include in these time slices. The NOR gate 1802 receives the bits G_CNTRL[0] and G_CNTRL[7]. The AND gate 1792 receives an inverted INTSDB# signal and an inverted MASKB signal. Another input of the AND gate 1792 is connected to the output of a NOR gate 1804 which masks the INTSDB# signal during the time slices T1 and T4 because no card interrupt requests are include in these time slices. The NOR gate 1802 receives the bits G_CNTRL[1] and G_CNTRL[4].

The AND gate 1794 receives an inverted INTSDC# signal and an inverted MASKC signal. Another input of the AND gate 1794 is connected to the output of a NOR gate 1806 which masks the INTSDC# signal during the time slices T2 and T5 because no card interrupt requests are include in these time slices. The NOR gate 1806 receives the bits G_CNTRL[2] and G_CNTRL[5]. The AND gate 1796 receives an inverted INTSDD# signal and an inverted MASKD signal. Another input of the AND gate 1796 is connected to the output of a NOR gate 1808 which masks the INTSDD# signal during the time slices T3 and T6 because no card interrupt requests are include in these time slices. The NOR gate 1808 receives the bits G_CNTRL[3] and G_CNTRL[6].

The outputs of the AND gates 1790–1796 are connected as inputs to an OR gate 1798 which has its output connected to the signal input of a D-type flip-flop 1800. The flip-flop 1800 is clocked on the positive edge of the CLK signal, and the set input of the flip-flop 1800 receives the RST signal. The inverting output of the flip-flop 1800 furnishes the INTSDIIO# signal.

As shown in FIG. 98, the interrupt output block 114 includes a three bit counter 1820 of common design with the counter 1745. The counter 1820 is clocked on the positive edge of the signal CLK, furnishes an output signal G_CNTR2[2:0], and begins counting from zero to seven after being reset by the INTSYNC# signal.

For purposes of furnishing the INTSYNCCPU# signal, the interrupt output block 114 includes a D-type flip-flop 1822 that is clocked on the positive edge of the CLK signal. The set input of the flip-flop 1822 receives the RST signal, and the signal input of the flip-flop 1822 receives the INTSYNCCABLE# signal. The non-inverting output of the flip-flop 1822 furnishes the INTSYNCCPU# signal.

For purposes of furnishing the INTSDCPU# signal, the interrupt output block 114 includes a D-type flip-flop 1824 that is clocked on the positive edge of the CLK signal. The set input of the flip-flop 1824 receives the RST signal, and the signal input of the flip-flop 1824 receives the INTSDCABLE# signal. The non-inverting output of the flip-flop 1824 furnishes the INTSDCPU# signal.

The interrupt requests received by the interrupt receiving block 114 are furnished to the interrupt controller 1900 either asynchronously or serially. In the asynchronous mode, the interrupt requests are mapped to the four PCI interrupt lines (commonly referred to as a "barber poling") on the PCI bus 24 as shown in FIG. 100.

For purposes of holding the interrupt information provided by the INTSDCABLE# signal, the interrupt output block 114 includes an eight bit register 1826. All signal inputs receive the INTSDCABLE# signal. The load enable inputs of bits 0–7 receive the bits G_CNTR[0]–G_CNTR[7], respectively. Therefore, for example, during time slice T4, bit 3 is loaded with the value represented by the INTSDCABLE# signal. Bits 0 (represented by a INT_A1signal) and 4 (represented by a INT_A2 signal) are mapped into a CPUINTA# signal. Bits 1 (represented by a INT_B1 signal) and 5 (represented by a INT_B2 signal) are mapped into a CPUINTB# signal. Bits 2 (represented by a INT_C1 signal) and 6 (represented by a INT_C2 signal) are mapped into a CPUINTC# signal. Bits 3 (represented by a INT_D1 signal) and 7 (represented by a INT_D2 signal) are mapped into a CPUINTD# signal.

Four OR gates 1828–1834 furnish the signals CPUINTA#, CPUINTB#, CPUINTC#, and CPUINTD#, which are provided to the PCI interrupt lines INTA#, INTB#, INTC# and INTD#, respectively, of the PCI bus 24. The OR gate 1828 has one input connected to the output of an AND gate 1836. The AND gate receives an inverted CM signal. The signal CM is furnished by a bit of a configuration register of the bridge chip 26 and is asserted, or driven high, to indicate the asynchronous mode and deasserted, or driven low, to indicate the synchronous mode. The AND gate 1836 also receives the signal INT_A1, the signal INT_A2, and a signal ECC_ERR_UP (used to indicate an error in cable transmissions).

The OR gate 1828 has an input connected to the output of an AND gate 1838. The AND gate 1838 receives the CM signal and the INTSDCPU# signal. Another input of the AND gate 1838 is connected to the output of an OR gate 1848. The OR gate 1848 receives the ECC_ERR_UP signal and the bit G_CNTR2[0].

The OR gate 1830 has one input connected to the output of an AND gate 1840 and one input connected to the output of an AND gate 1842. The AND gate 1840 receives an inverted CM signal, the signal INT_B1, and the signal INT_B2. The AND gate 1842 receives the signal CM and an inverted bit G_CNTR2[0] (used to provide the "sync" signal to the interrupt controller 1900 during the serial mode).

The OR gate 1832 has one input connected to the output of an AND gate 1844 and one input receiving the CM signal. The AND gate 1844 receives an inverted CM signal, the INT_C1 signal, and the INT_C2 signal. The OR gate 1834 has one input connected to the output of an AND gate 1846 and one input receiving the CM signal. The AND gate 1846 receives an inverted CM signal, the INT_D1 signal, and the INT_D2 signal.

Other embodiments are within the scope of the following claims.

What is claimed is:

1. A method for configuring a computer system, comprising:

accessing a slot coupled to one of the buses;

determining if an expansion card is accessible via the slot;

reserving resources for the slot in response to determining that the expansion card is not accessible;

at a later time, determining if the expansion card has become accessible via the slot; and allocating at least a portion of the resources reserved for the slot to the expansion card.

2. The method of claim 1 wherein determining if the expansion card is accessible includes determining if the expansion card is disconnected from the bus.

3. The method of claim 1, wherein determining if the expansion card is accessible includes determining if the expansion card is not inserted into the slot.

4. The method of claim 1, wherein determining if the expansion card is accessible includes determining whether communication is possible with a device on the expansion card.

5. The method of claim 1, wherein reserving the resources for the slot includes reserving at least one of a bus identifier, memory space, and I/O space.

6. The method of claim 1, further comprising programming a configuration memory space of a bus device on the expansion card based on the allocated portion of the resources.

7. The method of claim 1, wherein determining if the expansion card is accessible via the slot occurs at initial configuration of the computer system.

8. A method for configuring a computer system, comprising:

assigning bus identifiers to the buses in the computer system in accordance with an assignment sequence;

accessing a slot coupled to one of the buses;

determining if an expansion card is accessible via the slot; and reserving at least one of the bus identifiers for the slot in accordance with the assignment sequence in response to determining that the expansion card is not accessible.

9. The method of claim 8, wherein determining if the expansion card is accessible includes determining if the expansion card is disconnected from the bus.

10. The method of claim 8, wherein determining if the expansion card is accessible includes determining if the expansion card is not inserted into the slot.

11. The method of claim 8, wherein determining if the expansion card is accessible includes determining whether communication is possible with a device on the expansion card.

12. The method of claim 8, wherein reserving at least one of the bus identifiers for the slot includes reserving between one and three bus identifiers.

13. The method of claim 8, further comprising:

at a later time, determining if the expansion card has become accessible via the slot; and determining if the expansion card includes an expansion bus; and assigning the reserved bus identifier to the expansion bus on the card in response to determining the presence of the expansion bus.

14. The method of claim 13, further comprising programming a configuration memory space of a bridge circuit that interfaces the expansion bus to the bus connected to the slot with the reserved bus identifier.

15. The method of claim 8, further comprising reserving memory space for the slot in response to determining that the expansion card is not accessible.

16. The method of claim 15, wherein reserving memory space for the slot includes reserving a default amount of memory space.

17. The method of claim 15, wherein reserving memory space for the slot includes reserving an amount of memory space based on a memory resource requirement of the computer system.

18. The method of claim 15, further comprising:

at a later time, determining if the expansion card has become accessible via the slot; and allocating memory space for the expansion card from the memory space reserved for the slot.

19. The method of claim 8, further comprising reserving I/O space for the slot in response to determining that the expansion card is not accessible.

20. The method of claim 19, wherein reserving I/O space for the slot includes reserving a default amount of I/O space.

21. The method of claim 19, wherein reserving I/O space for the slot includes reserving an amount of I/O space based on an I/O resource requirement of the computer system.

22. The method of claim 19, further comprising:

at a later time, determining if the expansion card has become accessible via the slot; and allocating I/O space for the expansion card from the I/O space reserved for the slot.

23. The method of claim 8, wherein determining if the expansion card is accessible via the slot occurs at initial configuration of the computer system.

24. A computer system comprising:

at least one bus;

a slot coupled to the bus and being adapted to receive an expansion card;

a microprocessor; and a memory encoded with instructions that, when executed by the microprocessor, direct the microprocessor to:

access the slot determine if the expansion card is accessible via the slot; and reserve resources for the slot in response to determining that the expansion card is not accessible;

at a later time, determine if the expansion card has become accessible via the slot; and allocate at least a portion of the resources reserved for the slot to the expansion card.

25. The computer system of claim 24, wherein the instructions for determining if the expansion card is accessible include instructions that, when executed, determine if the slot is disconnected from the bus.

26. The computer system of claim 24, wherein the instructions for determining if the expansion card is accessible include instructions that, when executed, determine if the expansion card is not inserted into the slot.

27. The computer system of claim 24, wherein the instructions for determining if the expansion card is accessible include instructions that, when executed, determine whether communication is possible with a device on the expansion card.

28. The computer system of claim 24, wherein the instructions for reserving the resources for the slot include instructions that, when executed, reserve at least one of a bus identifier, memory space, and I/O space.

29. The computer system of claim 24 wherein the instructions, when executed, further direct the microprocessor to program a configuration memory space of a bus device on the expansion card based on the allocated portion of the resources.

30. The computer system of claim 24, wherein determining if the expansion card is accessible via the slot occurs at initial configuration of the computer system.

31. A computer system comprising:

at least one bus;

a slot coupled to the bus and being adapted to receive an expansion card;

a microprocessor; and a memory encoded with instructions, that, when executed by the microprocessor;

assign a bus identifier to the bus in accordance with an assignment sequence;

access the slot;

determine if the expansion card is accessible via the slot; and reserve at least one of the bus identifiers for the slot in accordance with the assignment sequence in response to determining that the expansion card is not accessible.

32. The computer system of claim 31, wherein the instructions for determining if the expansion card is accessible include instructions, that when executed, determine if the slot is disconnected from the bus.

33. The computer system of claim 31, wherein the instructions for determining if the expansion card is accessible include instructions, that when executed, determine if the expansion card is not inserted into the slot.

34. The computer system of claim 31, wherein the instructions for determining if the expansion card is accessible include instructions, that when executed, determine whether communication is possible with a device on the expansion card.

35. The computer system of claim 31, wherein the instructions for reserving at least one of the bus identifiers for the slot include instructions, that when executed, reserve between one and three bus identifiers.

36. The computer system of claim 31, wherein the instructions, when executed, further direct the microprocessor to:

at a later time, determine if the expansion card has become accessible via the slot; and determine if the expansion card includes an expansion bus; and assign the reserved bus identifier to the expansion bus on the card in response to determining the presence of the expansion bus.

37. The computer system of claim 36, wherein the instructions, when executed, further direct the microprocessor to program a configuration memory space of a bridge circuit that interfaces the expansion bus to the bus connected to the slot with the reserved bus identifier.

38. The computer system of claim 31, wherein the instructions, when executed, further direct the microprocessor to reserve memory space for the slot in response to determining that the expansion card is not accessible.

39. The computer system of claim 38, wherein the instructions for reserving memory space for the slot include instructions that, when executed, reserve a default amount of memory space.

40. The computer system of claim 38, wherein the instructions for reserving memory space for the slot include instructions that, when executed, reserve an amount of memory space based on a memory resource requirement of the computer system.

41. The computer system of claim 38, wherein the instructions, when executed, further direct the microprocessor to:

at a later time, determine if the expansion card has become accessible via the slot; and allocate memory space for the expansion card from the memory space reserved for the slot.

42. The computer system of claim 31, wherein the instructions, when executed, further direct the microprocessor to reserve I/O space for the slot in response to determining that the expansion card is not accessible.

43. The computer system of claim 42, wherein the instructions for reserving I/O space for the slot include instructions that, when executed, reserve a default amount of I/O space.

44. The computer system of claim 42, wherein the instructions for reserving I/O space for the slot include instructions that, when executed, reserve an amount of I/O space based on an I/O resource requirement of the computer system.

45. The computer system of claim 19, wherein the instructions, when executed, further direct the microprocessor to:

at a later time, determine if the expansion card has become accessible via the slot; and allocate I/O space for the expansion card from the I/O space reserved for the slot.

46. The computer system of claim 31, wherein determining if the expansion card is accessible via the slot occurs at initial configuration of the computer system.

47. A computer system comprising:

at least one bus;

a slot coupled to the bus and being adapted to receive an expansion card;

means for accessing the slot;

means for determining if the expansion card is accessible via the slot;

means for reserving resources for the slot in response to determining that the expansion card is not accessible;

means for determining if the expansion card has become accessible via the slot at a later time; and means for allocating at least a portion of the resources reserved for the slot to the expansion card.

48. A computer system comprising:

at least one bus;

a slot coupled to the bus and being adapted to receive an expansion card;

means for accessing the slot;

means for determining if the expansion card is accessible via the slot; and means for reserving at least one of the bus identifiers for the slot in accordance with the assignment sequence in response to determining that the expansion card is not accessible.

\* \* \* \* \*